(12) United States Patent
Ashrafi

(10) Patent No.: US 10,439,287 B2
(45) Date of Patent: Oct. 8, 2019

(54) FULL DUPLEX USING OAM

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days.

(21) Appl. No.: 16/225,458

(22) Filed: Dec. 19, 2018

(65) Prior Publication Data

US 2019/0198999 A1 Jun. 27, 2019

Related U.S. Application Data

(60) Provisional application No. 62/608,954, filed on Dec. 21, 2017.

(51) Int. Cl.

| | |
|---|---|
| *H01Q 9/04* | (2006.01) |
| *H04L 5/06* | (2006.01) |
| *H04L 5/14* | (2006.01) |
| *H04J 11/00* | (2006.01) |
| *H01Q 21/06* | (2006.01) |
| *H04L 5/12* | (2006.01) |

(52) U.S. Cl.
CPC ......... *H01Q 9/0428* (2013.01); *H01Q 21/065* (2013.01); *H04J 11/003* (2013.01); *H04J 11/0036* (2013.01); *H04L 5/06* (2013.01); *H04L 5/12* (2013.01); *H04L 5/143* (2013.01)

(58) Field of Classification Search
CPC ... H01Q 9/0428; H01Q 21/065; H04J 11/003; H04J 11/0036; H04L 5/12; H04L 5/06; H04L 5/143
See application file for complete search history.

(56) References Cited

U.S. PATENT DOCUMENTS

| | | |
|---|---|---|
| 3,459,466 A | 8/1969 | Giordmaine |
| 3,614,722 A | 10/1971 | Jones |
| 4,379,409 A | 4/1983 | Primbsch et al. |

(Continued)

OTHER PUBLICATIONS

Duarte et al., Full-Duplex Wireless Communications Using Off-The-Shelf Radios: Feasibility and First Results, IEEE, 2010; 5 pgs.

(Continued)

*Primary Examiner* — Andrew Lai
*Assistant Examiner* — Chuong M Nguyen

(57) ABSTRACT

A system for providing full-duplex communications includes a first transceiver for transmitting first signals having a first orthogonal function of a plurality of orthogonal functions applied thereto on a first channel and receiving second signals having a second orthogonal function of the plurality of orthogonal functions on a second channel at a same time. A second transceiver transmits the second signals having the second orthogonal function of the plurality of orthogonal functions on the second channel and receives the first signals having the first orthogonal function of the plurality of orthogonal functions on the first channel at the same time. The first channel having the first orthogonal function applied thereto and the second channel having the second orthogonal function applied thereto do not interfere with each other enabling full duplex transmissions between the first transceiver and the second transceiver.

26 Claims, 94 Drawing Sheets

(56) References Cited

U.S. PATENT DOCUMENTS

| | | | |
|---|---|---|---|
| 4,503,336 A | 3/1985 | Hutchin et al. | |
| 4,736,463 A | 4/1988 | Chavez | |
| 4,813,001 A * | 3/1989 | Sloane | G01R 27/28 |
| | | | 702/110 |
| 4,862,115 A | 8/1989 | Lee et al. | |
| 5,051,754 A | 9/1991 | Newberg | |
| 5,220,163 A | 6/1993 | Toughlian et al. | |
| 5,222,071 A | 6/1993 | Pezeshki et al. | |
| 5,272,484 A | 12/1993 | Labaar | |
| 5,543,805 A | 8/1996 | Thaniyavarn | |
| 5,555,530 A | 9/1996 | Meehan | |
| 5,761,346 A * | 6/1998 | Moody | G06F 17/10 |
| | | | 382/254 |
| 5,999,294 A * | 12/1999 | Petsko | H04B 10/1143 |
| | | | 398/115 |
| 6,337,659 B1 | 1/2002 | Kim | |
| 6,992,829 B1 | 1/2006 | Jennings et al. | |
| 7,577,165 B1 | 8/2009 | Barrett | |
| 7,729,572 B1 | 6/2010 | Pepper et al. | |
| 7,792,431 B2 | 9/2010 | Jennings et al. | |
| 8,432,884 B1 | 4/2013 | Ashrafi | |
| 8,503,546 B1 | 8/2013 | Ashrafi | |
| 8,559,823 B2 | 10/2013 | Izadpanah et al. | |
| 8,811,366 B2 | 8/2014 | Ashrafi | |
| 9,077,577 B1 | 7/2015 | Ashrafi | |
| 9,331,875 B2 * | 5/2016 | Ashrafi | H04L 27/362 |
| 9,391,375 B1 | 7/2016 | Bales | |
| 9,595,766 B2 | 3/2017 | Ashrafi et al. | |
| 9,793,615 B2 * | 10/2017 | Ashrafi | H01Q 21/061 |
| 9,998,187 B2 * | 6/2018 | Ashrafi | H04B 7/0456 |
| 2004/0027292 A1 * | 2/2004 | Gabriel | H01Q 9/0414 |
| | | | 343/700 MS |
| 2004/0184398 A1 | 9/2004 | Walton et al. | |
| 2005/0094714 A1 | 5/2005 | Robinson | |
| 2005/0254826 A1 | 11/2005 | Jennings et al. | |
| 2005/0259914 A1 | 11/2005 | Padgett et al. | |
| 2009/0231225 A1 * | 9/2009 | Choudhury | H01Q 3/26 |
| | | | 343/770 |
| 2010/0013696 A1 | 1/2010 | Schmitt et al. | |
| 2012/0121220 A1 | 5/2012 | Krummrich | |
| 2012/0207470 A1 | 8/2012 | Djordevic et al. | |
| 2013/0027774 A1 | 1/2013 | Bovino et al. | |
| 2013/0235744 A1 * | 9/2013 | Chen | H04L 47/82 |
| | | | 370/252 |
| 2014/0140189 A1 * | 5/2014 | Shattil | H04B 7/026 |
| | | | 370/208 |
| 2014/0226685 A1 * | 8/2014 | Omatsu | G02F 1/39 |
| | | | 372/23 |
| 2014/0355624 A1 | 12/2014 | Li et al. | |
| 2015/0098697 A1 | 4/2015 | Marom et al. | |
| 2015/0188660 A1 * | 7/2015 | Byun | H04B 10/2581 |
| | | | 398/44 |
| 2017/0026095 A1 | 1/2017 | Ashrafi et al. | |

OTHER PUBLICATIONS

Shen et al., Channel Estimation in OFDM Systems, Freescale Semiconductor, Inc., 2006; 16 pgs.

Jain et al., Practical, Real-time, Full Duplex Wireless, MobiCom' 11, Sep. 19-23, 2011, Las Vegas, NV, USA, 12 pgs.

Radunovic et al., Rethinking Indoor Wireless: Low Power, Low Frequency, Full-duplex; Technical Report, Microsoft Research, Redmond, WA, 2009, 7 pgs.

Choi et al., Achieving Single Channel, Full Duplex Wireless Communication, Stanford University, 12 pgs.

Zhao et al., A Dual-Channel 60 GHz Communications Link Using Patch Antenna Arrays to Generate Data-Carrying Orbital-Angular-Momentum Beams; 6 pgs.

Willner et al., Design challenges and guidelines for free-space optical communication links using orbital-angular-momentum multiplexing of multiple beams; IOP Publishing, Journal of Optics, Mar. 1, 2016; 14 pgs.

Wang et al. Terabit Free-Space Data Transmission Employing Orbital Angular Momentum Multiplexing. Nature Photonics, vol. 6. Jun. 24, 2012. pp. 488-496. [retrieved on Dec. 7, 2015]. Retrieved from the Internet: <URL:http://paloma.eng.tau.ac.il/~tur/pdfs/168.pdf>. entire document.

Zhou et al. Hybrid Coding Method of Multiple Orbital Angular Momentum States based on the Inherent Orthogonality. Optics Letters, vol. 39, No. 4 Feb. 15, 2014. pp. 731-734. [retrieved on Dec. 7, 2015]. Retrieved from the Internet: <URL:http://www.researchgate.net/profile/Hailong_Zhou2/publication/260375126_Hybrid_coding_method_of_multiple_orbital_angular_momentum_states_based_on_the_inherent_orthogonality/links/02e7e5320fcf201708000000.pdf>. entire document.

PCT: International Search Report and Written Opinion of PCT/US2015/55349 (related application), dated Feb. 2, 2016, 31 pgs.

Solyman Ashrafi, Spurious Resonances and Modelling of Composite Resonators, 37th Annual Symposium on Frequency Control, 1983.

Solyman Ashrafi, Splitting and contrary motion of coherent bremsstrahlung peaks in strained-layer superlattices, Journal of Applied Physics 70:4190-4193, Dec. 1990.

Solyman Ashrafi, Evidence of Chaotic Pattern in Solar Flux Through a Reproducible Sequence of Period-Doubling-Type Bifurcations, Proceedings of Flight Mechanics/Estimation Theory Symposium, National Aeronautics and Space Administration, May 1991.

Solyman Ashrafi, Combining Schatten's Solar Activity Prediction Model with a Chaotic Prediction Model, National Aeronautics and Space Administration, Nov. 1991.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Detecting and Disentangling Nonlinear Structure from Solar Flux Time Series, 43rd Congress of the International Astronautical Federation, Aug. 1992.

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

PCT: International Preliminary Report on Patentability of PCT/US2015/55349 (related application), Yukari Nakamura; dated Apr. 18, 2017; 10 pages.

PCT: International Search Report and Written Opinion of PCT/US2018/066646 (related application); dated Feb. 20, 2019; 18 pgs.

Zhang, Z., et al., "An Orbital Angular Momentum-Based In-Band Full-Duplex Communication System and Its Mode Selection." IEEE Communications Letters. vol. 21, No. 5, May 2017 [online] <URL:https://ieeexplore.ieee.org/document/7835632>.

Solyman Ashrafi, Channeling Radiation of Electrons in Crystal Lattices, Essays on Classical and Quantum Dynamics, Gordon and Breach Science Publishers, 1991.

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).

Solyman Ashrafi, Optical Communications Using Orbital Angular Momentum Beams, Adv. Opt. Photon. 7, 66-106, Advances in Optics and Photonic, 2015.

Solyman Ashrafi, Performance Enhancement of an Orbital-Angular-Momentum based Free-space Optical Communications Link Through Beam Divergence Controlling, IEEE/OSA Conference on Optical Fiber Communications (OFC) and National Fiber Optics Engineers

(56) References Cited

OTHER PUBLICATIONS

Conference (NFOEC),paper M2F.6, Los Angeles, CA, Mar. 2015 (Optical Society of America, Washington, D.C., 2015).
Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.
Solyman Ashrafi, Link Analysis of Using Hermite-Gaussian Modes for Transmitting Multiple Channels in a Free-Space Optical Communication System, The Optical Society, vol. 2, No. 4, Apr. 2015.
Solyman Ashrafi, Performance Metrics and Design Considerations for a Free-Space Optical Orbital-Angular-Momentum Multiplexed Communication Link, The Optical Society, vol. 2, No. 4, Apr. 2015.
Solyman Ashrafi, Demonstration of Distance Emulation for an Orbital-Angular-Momentum Beam. OSA Technical Digest (online), paper STh1F.6. The Optical Society, 2015.
Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.
Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.
Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.
Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.
Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.
Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).
Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.
Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).
Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.
Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.
Solyman Ashrafi, An Information Theoretic Framework to Increase Spectral Efficiency, IEEE Transactions on Information Theory, vol. XX, No. Y, Oct. 2014, Dallas, Texas.
Solyman Ashrafi, Acoustically induced stresses in elastic cylinders and their visualization, The Journal of the Acoustical Society of America 82(4):1378-1385, Sep. 1987.
Solyman Ashrafi, Splitting of channeling-radiation peaks in strained-layer superlattices, Journal of the Optical Society of America B 8(12), Nov. 1991.

Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.
Solyman Ashrafi, Orbital-Angular-Momentum-Multiplexed Free-Space Optical Communication Link Using Transmitter Lenses, Applied Optics, vol. 55, No. 8, pp. 2098-2103, 2016.
Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).
Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).
Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).
Solyman Ashrafi, Demonstration of OAM-based MIMO FSO link using spatial diversity and MIMO equalization for turbulence mitigation,IEEE/OSA Conference on Optical Fiber Communications (OFC), paper Th1H.2, Anaheim, CA, Mar. 2016 (Optical Society of America, Washington, D.C., 2016).
Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.
Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.
Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).
Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).
Solyman Ashrafi, Future Mission Studies: Forecasting Solar Flux Directly From Its Chaotic Time Series, Computer Sciences Corp., Dec. 1991.
Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).
Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).
Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center; Greenbelt, Maryland; May 21-23, 1991.
H. Yao et al.; Patch Antenna Array for the Generation of Millimeter-wave Hermite-Gaussian Beams, IEEE Antennas and Wireless Propagation Letters; 2016.
Yongxiong Ren et al.; Experimental Investigation of Data Transmission Over a Graded-index Multimode Fiber Using the Basis of Orbital Angular Momentum Modes.
Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).

(56) References Cited

OTHER PUBLICATIONS

Li, X. et al.; Investigation of interference in multiple-input multiple-output wireless transmission at W band for an optical wireless integration system. Optics Letters 38, 742-744 (2013).

Padgett, Miles J. et al., Divergence of an orbital-angular-momentum-carrying beam upon propagation. New Journal of Physics 17, 023011 (2015).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

Vasnetsov, M. V., Pasko, V.A. & Soskin, M.S.; Analysis of orbital angular momentum of a misaligned optical beam; New Journal of Physics 7, 46 (2005).

Byun, S.H., Haji, G.A. & Young, L.E.; Development and application of GPS signal multipath simulator; Radio Science, vol. 37, No. 6, 1098 (2002).

Tamburini, Fabrizio; Encoding many channels on the same frequency through radio vorticity: first experimental test; New Journal of Physics 14, 033001 (2012).

Gibson, G. et al., Free-space information transfer using light beans carrying orbital angular momentum; Optical Express 12, 5448-5456 (2004).

Yan, Y. et al.; High-capacity millimetre-wave communications with orbital angular momentum multiplexing; Nature Communications; 5, 4876 (2014).

Hur, Sooyoung et at.; Millimeter Wave Beamforming for Wireless Backhaul and Access in Small Cell Networks. IEEE Transactions on Communications, vol. 61, 4391-4402 (2013).

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

Anderson, Jorgen Bach; Rappaport, Theodore S.; Yoshida, Susumu; Propagation Measurements and Models for Wireless Communications Channels; 33 42-49 (1995).

Iskander, Magdy F.; Propagation Prediction Models for Wireless Communication Systems; IEEE Transactions on Microwave Theory and Techniques, vol. 50., No. 3, 662-673 (2002).

Wang, Jian, et al.; Terabit free-space data transmission employing orbital angular momentum multiplexing. Nature Photonics; 6, 488-496 (2012).

Katayama, Y., et al.; Wireless Data Center Networking with Steered-Beam mmWave Links; IEEE Wireless Communication Network Conference; 2011, 2179-2184 (2011).

Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).

Rapport, T.S.; Millimeter Wave Mobile Communications for 5G Cellular: It Will Work!; IEEE Access, 1, 335-349 (2013).

* cited by examiner

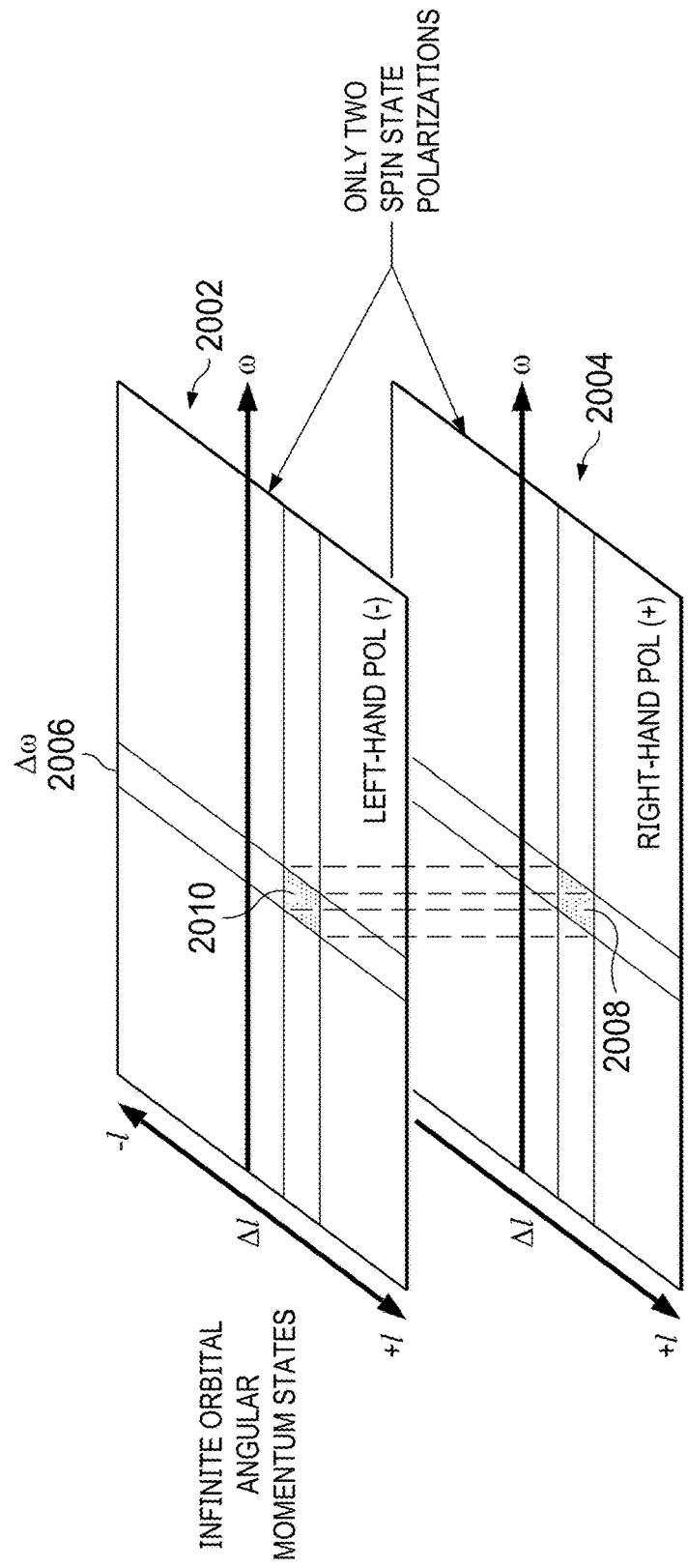

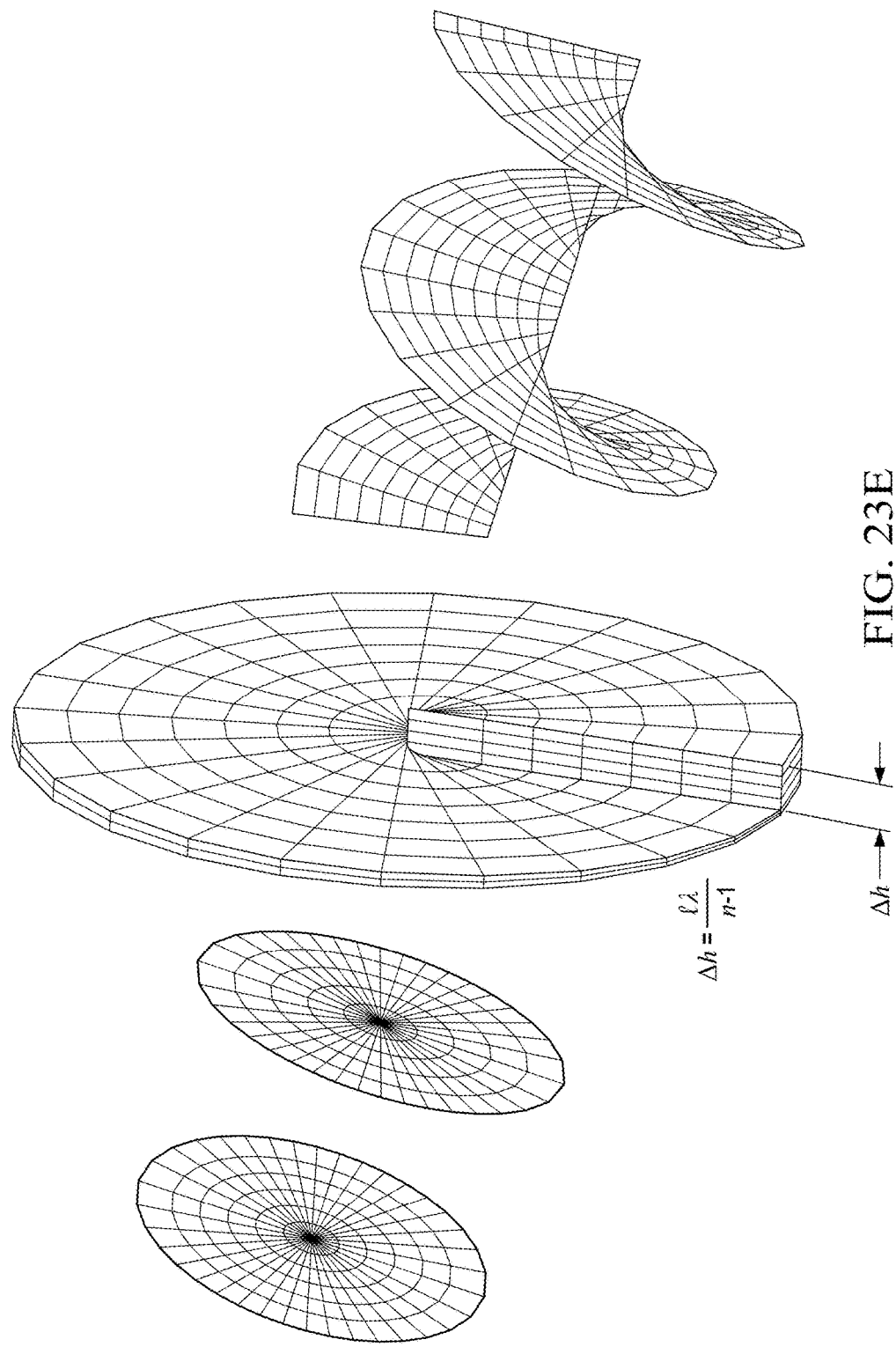

$$\begin{bmatrix} y_1 \\ y_2 \\ y_3 \end{bmatrix} = \begin{bmatrix} h_{1,1} & h_{1,2} & h_{1,3} & h_{1,4} & h_{1,5} & h_{1,6} & h_{1,7} & h_{1,8} & h_{1,9} & h_{1,10} & h_{1,11} & h_{1,12} & h_{1,13} & h_{1,14} & h_{1,15} \\ h_{2,1} & h_{2,2} & h_{2,3} & h_{2,4} & h_{2,5} & h_{2,6} & h_{2,7} & h_{2,8} & h_{2,9} & h_{2,10} & h_{2,11} & h_{2,12} & h_{2,13} & h_{2,14} & h_{2,15} \\ h_{3,1} & h_{3,2} & h_{3,3} & h_{3,4} & h_{3,5} & h_{3,6} & h_{3,7} & h_{3,8} & h_{3,9} & h_{3,10} & h_{3,11} & h_{3,12} & h_{3,13} & h_{3,14} & h_{3,15} \end{bmatrix} \begin{bmatrix} x_{-2,1} \\ x_{-1,1} \\ x_{0,1} \\ x_{1,1} \\ x_{2,1} \\ x_{-2,2} \\ x_{-1,2} \\ x_{0,2} \\ x_{1,2} \\ x_{2,2} \\ x_{-2,3} \\ x_{-1,3} \\ x_{0,3} \\ x_{1,3} \\ x_{2,3} \end{bmatrix}$$

FIG. 36

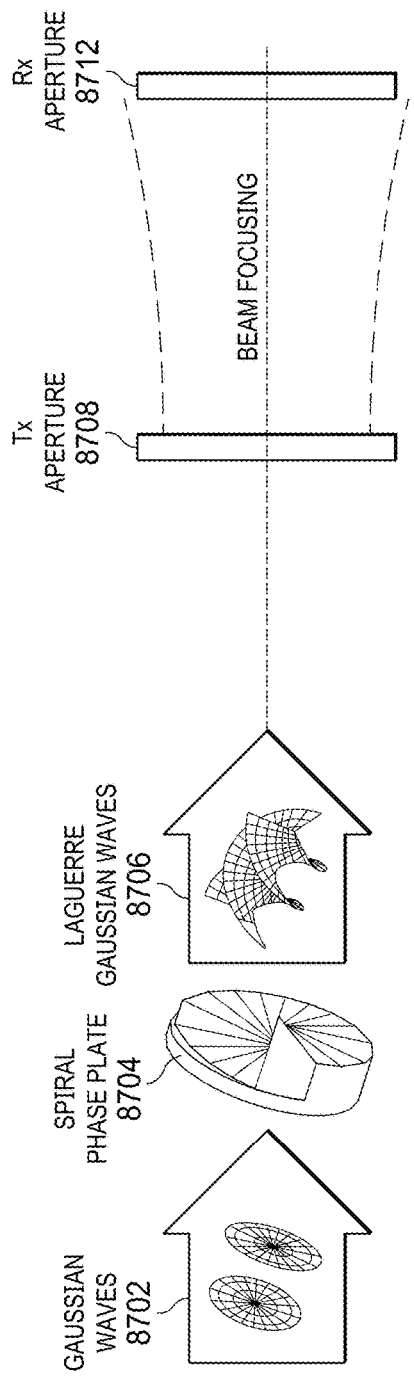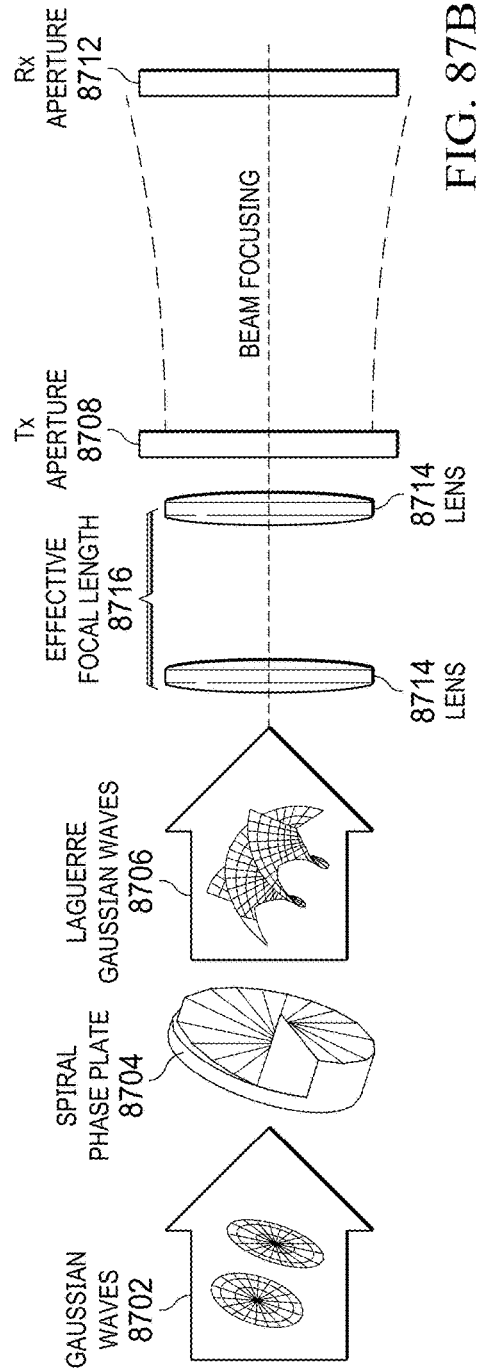
FIG. 87A
FIG. 87B

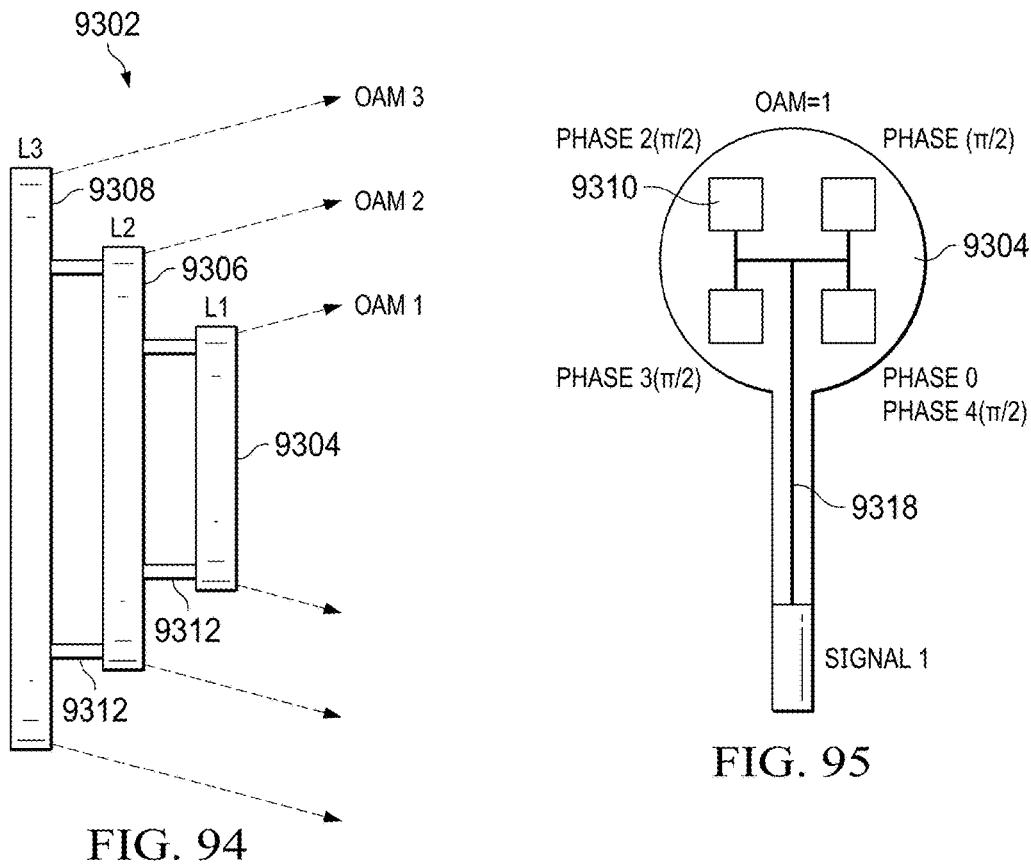
FIG. 94
FIG. 95
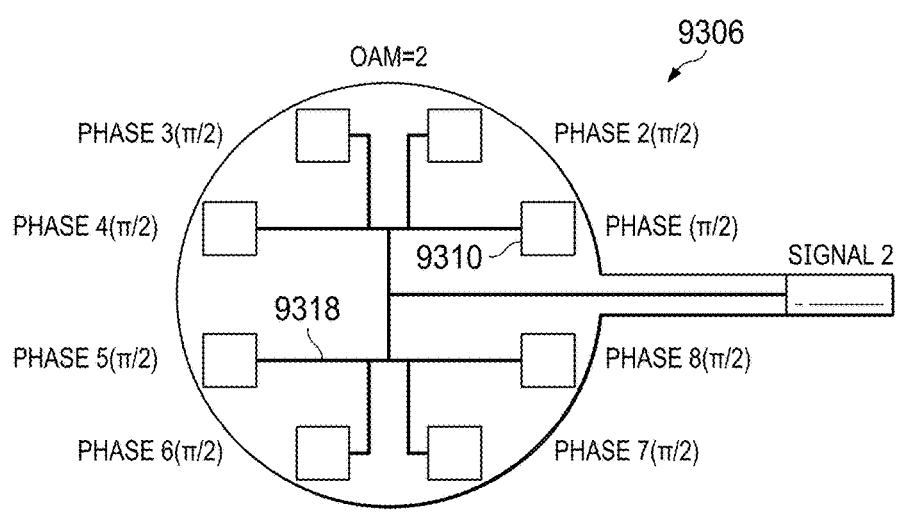
FIG. 96

FULL DUPLEX USING OAM

CROSS-REFERENCE TO RELATED APPLICATIONS

This application claims the benefit of U.S. Provisional Application No. 62/608,954, filed Dec. 21, 2017 and entitled FULL DUPLEX USING OAM, the specification of which is incorporated herein in its entirety.

This application is related to U.S. patent application Ser. No. 14/882,085, filed Oct. 13, 2015 and entitled APPLICATION OF ORBITAL ANGULAR MOMENTUM TO FIBER, FSO AND RF, and U.S. patent application Ser. No. 16/037,550, filed Jul. 17, 2018, entitled PATCH ANTENNA ARRAY FOR TRANSMISSION OF HERMITE-GAUSSIAN AND LAGUERRE GAUSSIAN BEAMS, which is a continuation of U.S. patent application Ser. No. 15/636,142, filed Jun. 28, 2018 and entitled PATCH ANTENNA ARRAY FOR TRANSMISSION OF HERMITE-GAUSSIAN AND LAGUERRE GAUSSIAN BEAMS, now U.S. Pat. No. 10,027,434, issued Jul. 17, 2018, the specifications of which are incorporated herein by reference.

TECHNICAL FIELD

The present invention relates to full duplex communications, and more particularly, to the use of orbital angular momentum functions within full duplex communications to limit channel interference.

BACKGROUND

Full duplex systems have the ability to simultaneously transmit and receive signals on a single channel. If the self-interference of a wireless network can be reduced, a system's own transmissions will not interfere with incoming packets. In addition to analog and digital techniques, antenna placement is used as an additional cancellation technique to minimize self-interference. However, there are many limitations to these techniques. Antenna placement techniques take advantage of the fact that distances naturally reduce self-interference, but impractically large distances are required to achieve enough reduction through antenna placement alone.

To further cancel self-interference, an additional technique, called antenna cancellation may be used. Antenna cancellation combined with other mechanisms, allows for full duplex operation. Antenna cancellation-based designs have three major limitations. The first limitation is that they require three antennas (two transmit, one receive). The second limitation is a bandwidth constraint, a theoretical limit which prevents supporting wideband signals such as WiFi. The third limitation is that it requires manual tuning. Manual tuning is sufficient for lab experiments, but it brings into question whether a full duplex system can automatically adapt to realistic, real world environments.

Balun cancellation uses signal inversion, through a balun circuit. Balun cancellation has no bandwidth constraint. It requires only two antennas, one transmit and one receive. A tuning algorithm exists that allows a balun-based radio design to quickly, accurately, and automatically adapt the full duplex circuitry to cancel the primary self-interference component.

SUMMARY

The present invention, as disclosed and described herein, comprises a system for providing full-duplex communications includes a first transceiver for transmitting first signals having a first orthogonal function of a plurality of orthogonal functions applied thereto on a first channel and receiving second signals having a second orthogonal function of the plurality of orthogonal functions on a second channel at a same time. A second transceiver transmits the second signals having the second orthogonal function of the plurality of orthogonal functions on the second channel and receives the first signals having the first orthogonal function of the plurality of orthogonal functions on the first channel at the same time. The first channel having the first orthogonal function applied thereto and the second channel having the second orthogonal function applied thereto do not interfere with each other enabling full duplex transmissions between the first transceiver and the second transceiver.

BRIEF DESCRIPTION OF THE DRAWINGS

For a more complete understanding, reference is now made to the following description taken in conjunction with the accompanying Drawings in which:

FIG. 20 illustrates a single wavelength having two quantispin polarizations providing an infinite number of signals having various orbital angular momentums associated therewith;

FIG. 23E illustrates a spiral phase plate;

FIG. 36 illustrates a fixed channel matrix;

FIG. 87A illustrates beam divergence between a transmitting aperture and a receiving aperture;

FIG. 87B illustrates the use of a pair of lenses for reducing beam divergence;

FIG. 94 illustrates a side view of a multilayer patch antenna array;

FIG. 95 illustrates a first layer of a multilayer patch antenna array;

FIG. 96 illustrates a second layer of a multilayer patch antenna array;

FIG. 100 illustrates a microstrip patch antenna;

FIG. 101 illustrates a coordinate system for an aperture of a microstrip patch antenna;

FIG. 102 illustrates a 3-D model of a single rectangular patch antenna;

FIG. 103 illustrates the radiation pattern of the patch antenna of FIG. 10;

FIG. 104a illustrates the radiation pattern of a circular array for an OAM mode order l=0;

FIG. 104b illustrates the radiation pattern for an OAM mode order l=0 in the vicinity of the array axis;

FIG. 104c illustrates the radiation pattern for an OAM mode order l=1 in the vicinity of the array axis;

FIG. 104d illustrates the radiation pattern for an OAM mode order l=2 in the vicinity of the array axis;

FIG. 105 illustrates a multilayer patch antenna array with a parabolic reflector;

FIG. 106 illustrates various configurations of the patch antenna and parabolic reflector;

FIG. 107 illustrates a hybrid patch and parabolic antenna using a single reflector;

FIG. 108 illustrates the simulated results of received power as a function of transmission distance with a single reflection and double reflection hybrid patch and parabolic antenna;

Figure 109:
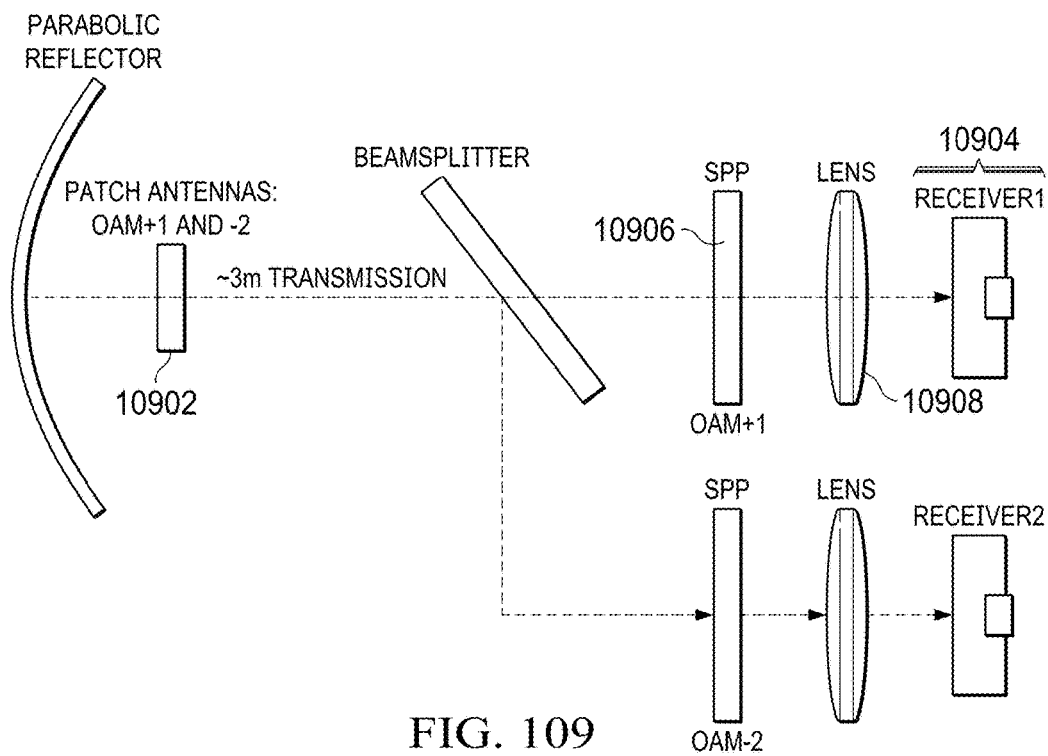
Figure 110:
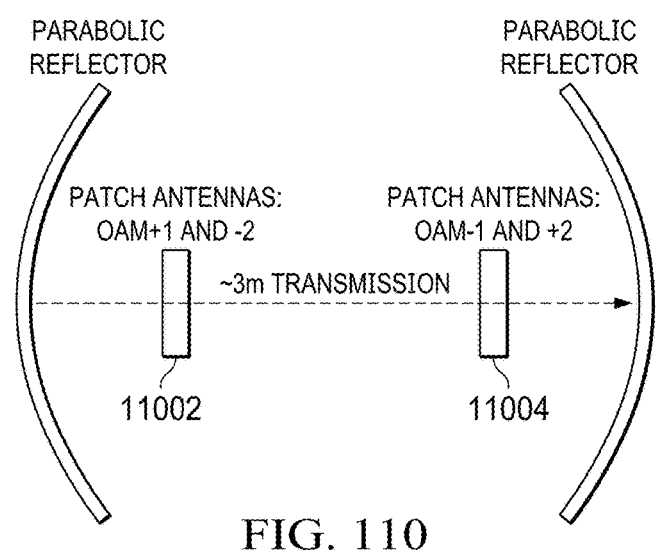
Figure 111:
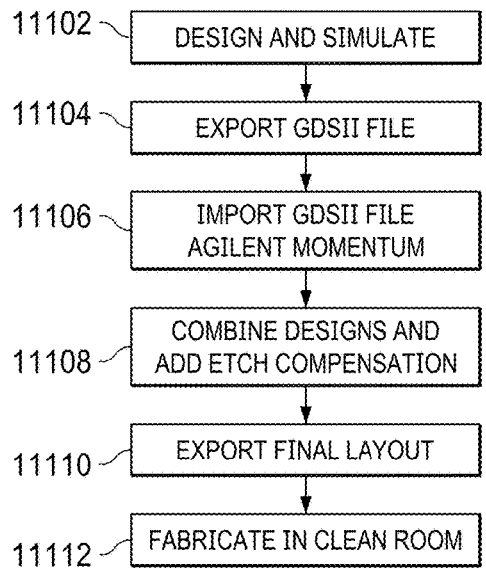
Figure 113:
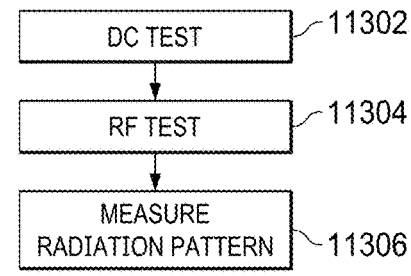
Figure 114:
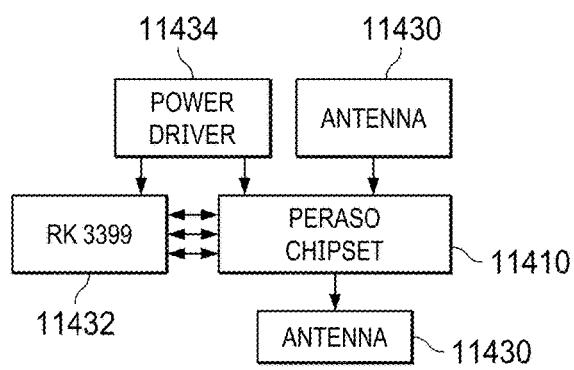
Figure 112:
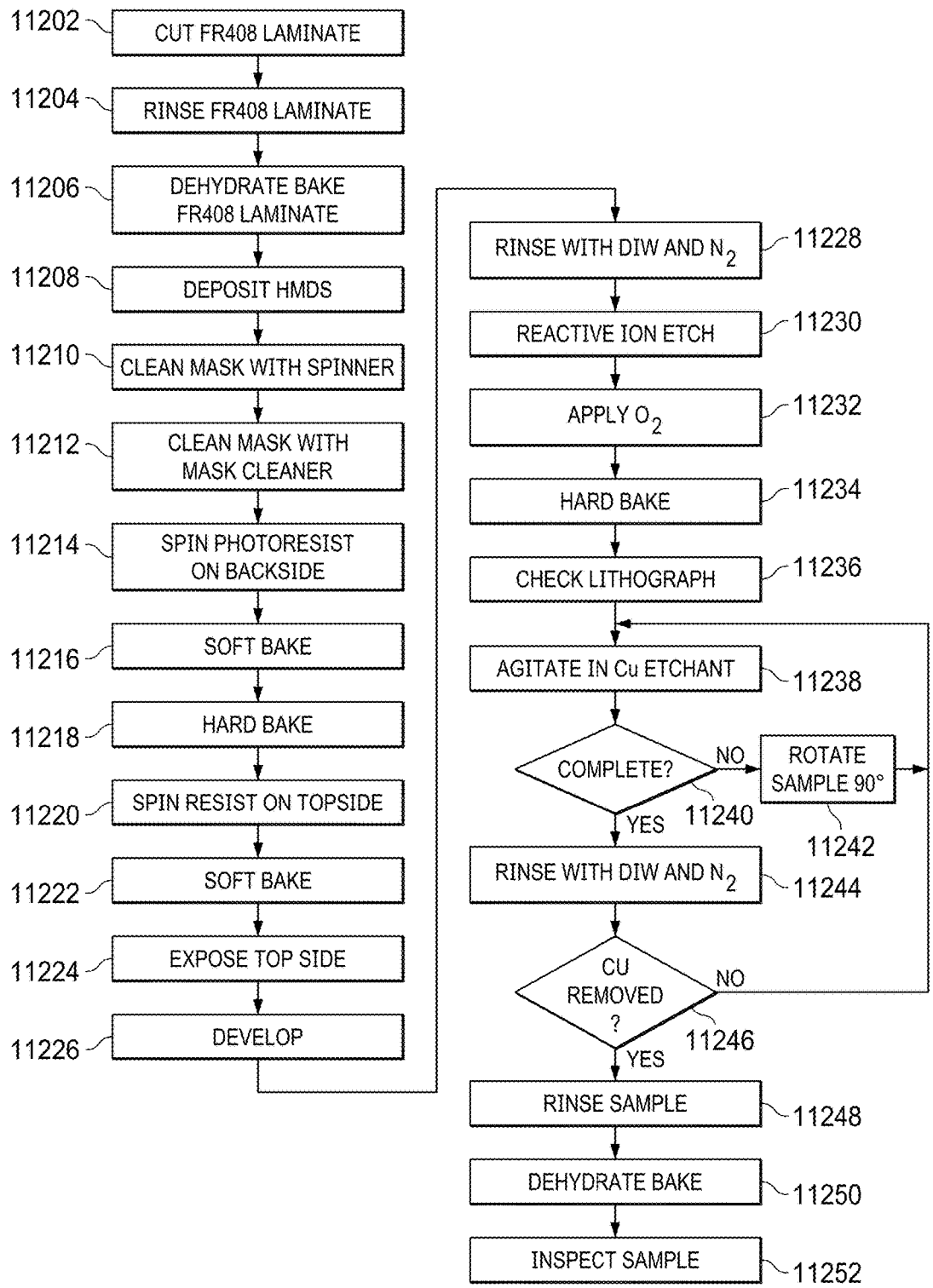
Figure 115A:
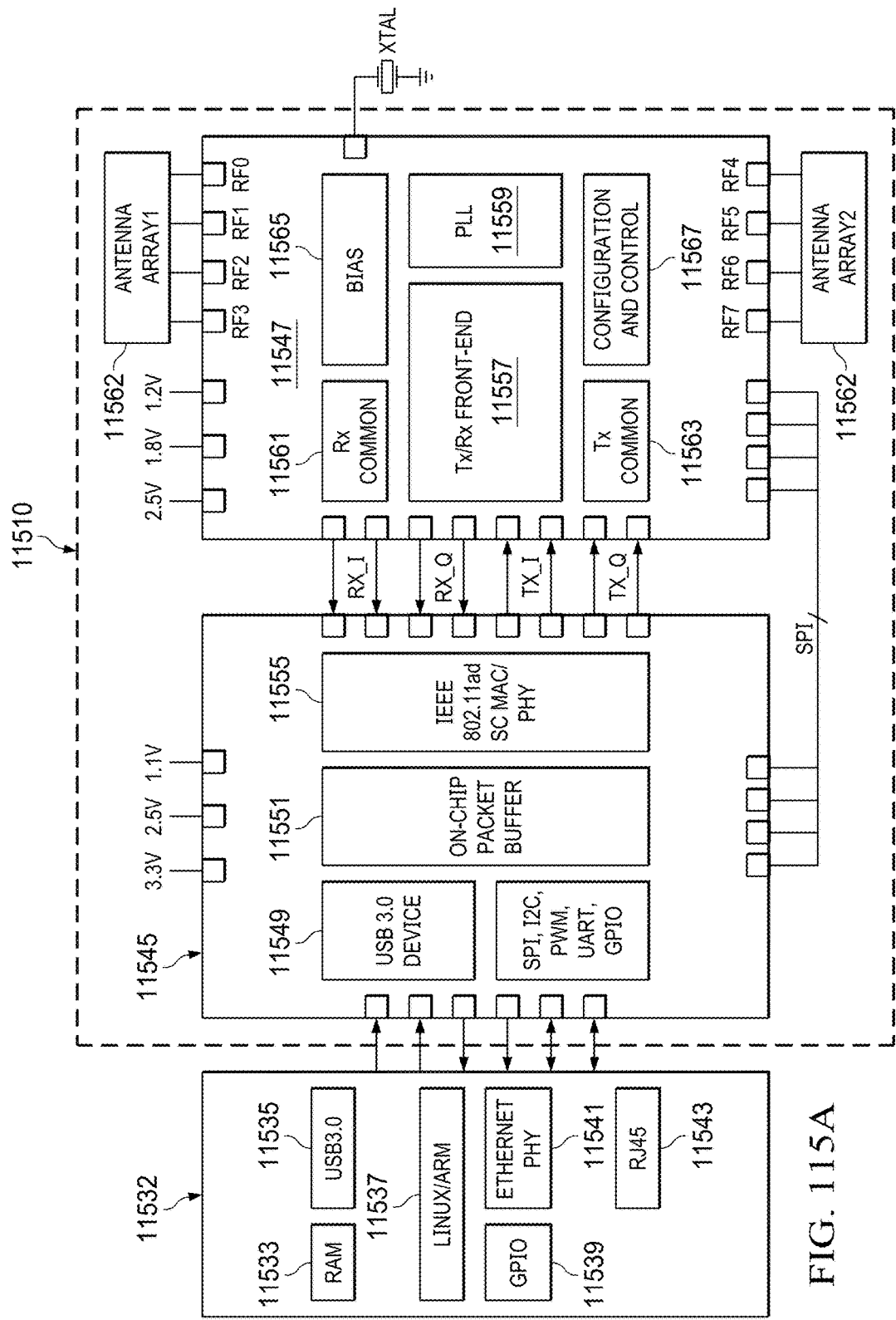
Figure 115B:
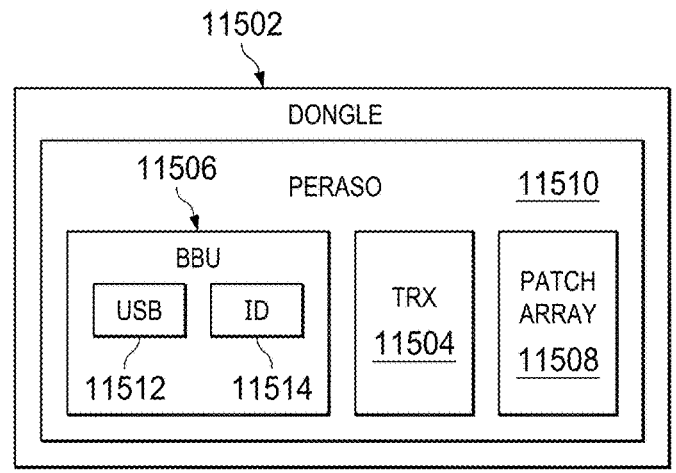
Figure 116:
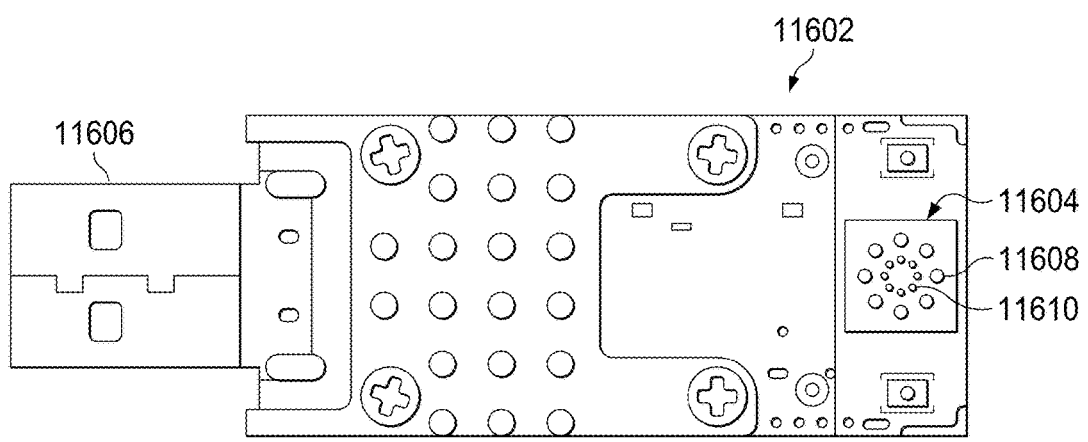
Figure 115C:
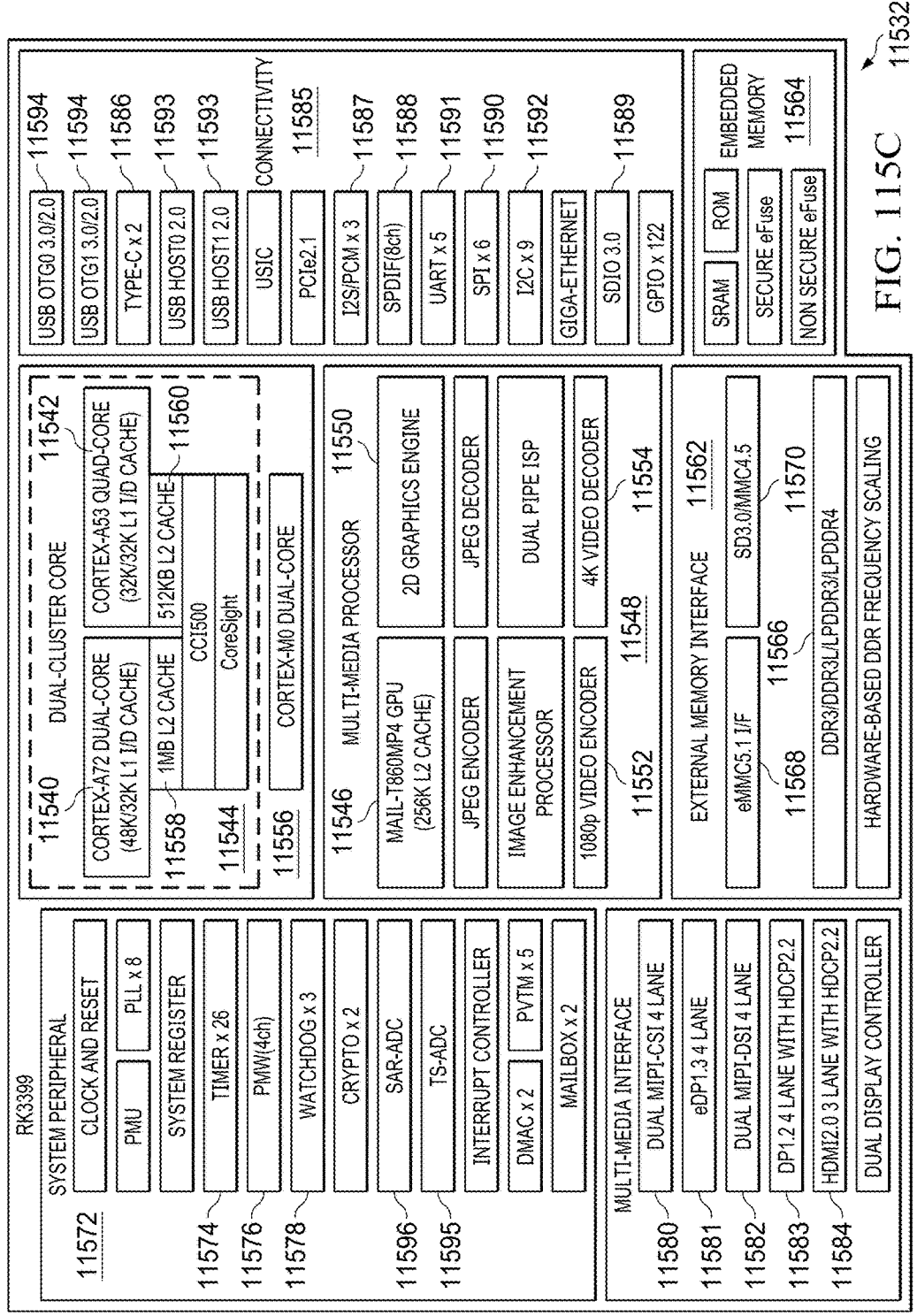
Figure 117:
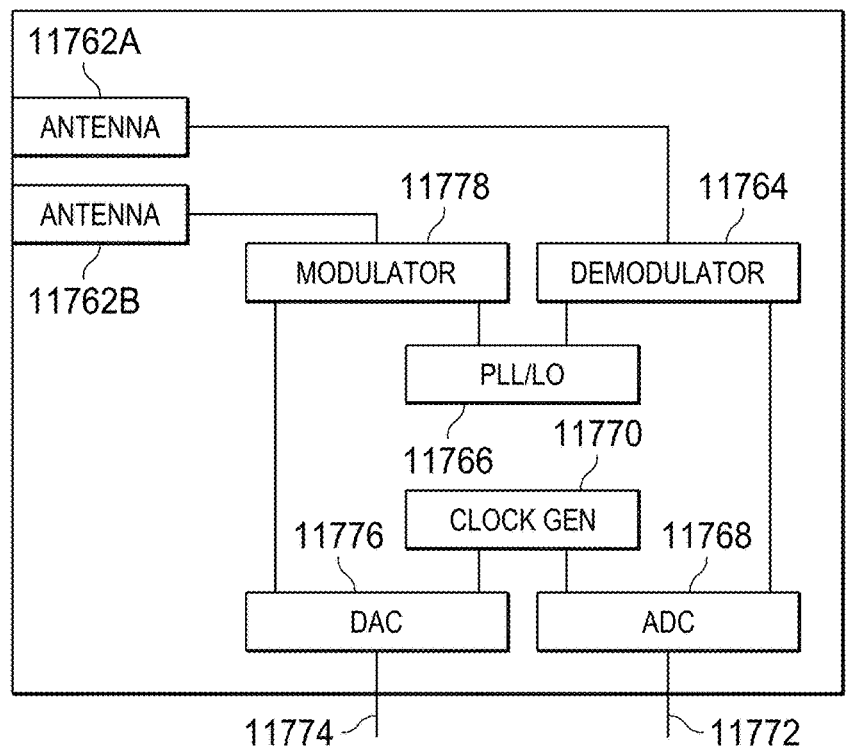
Figure 119:
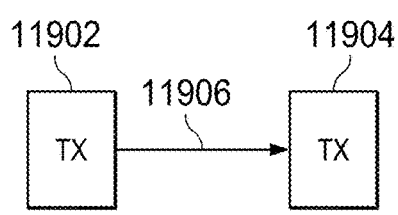
Figure 120:
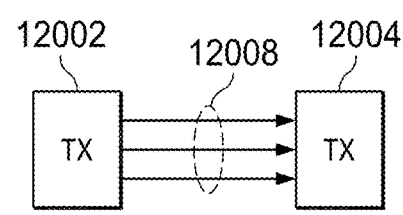
Figure 118A:
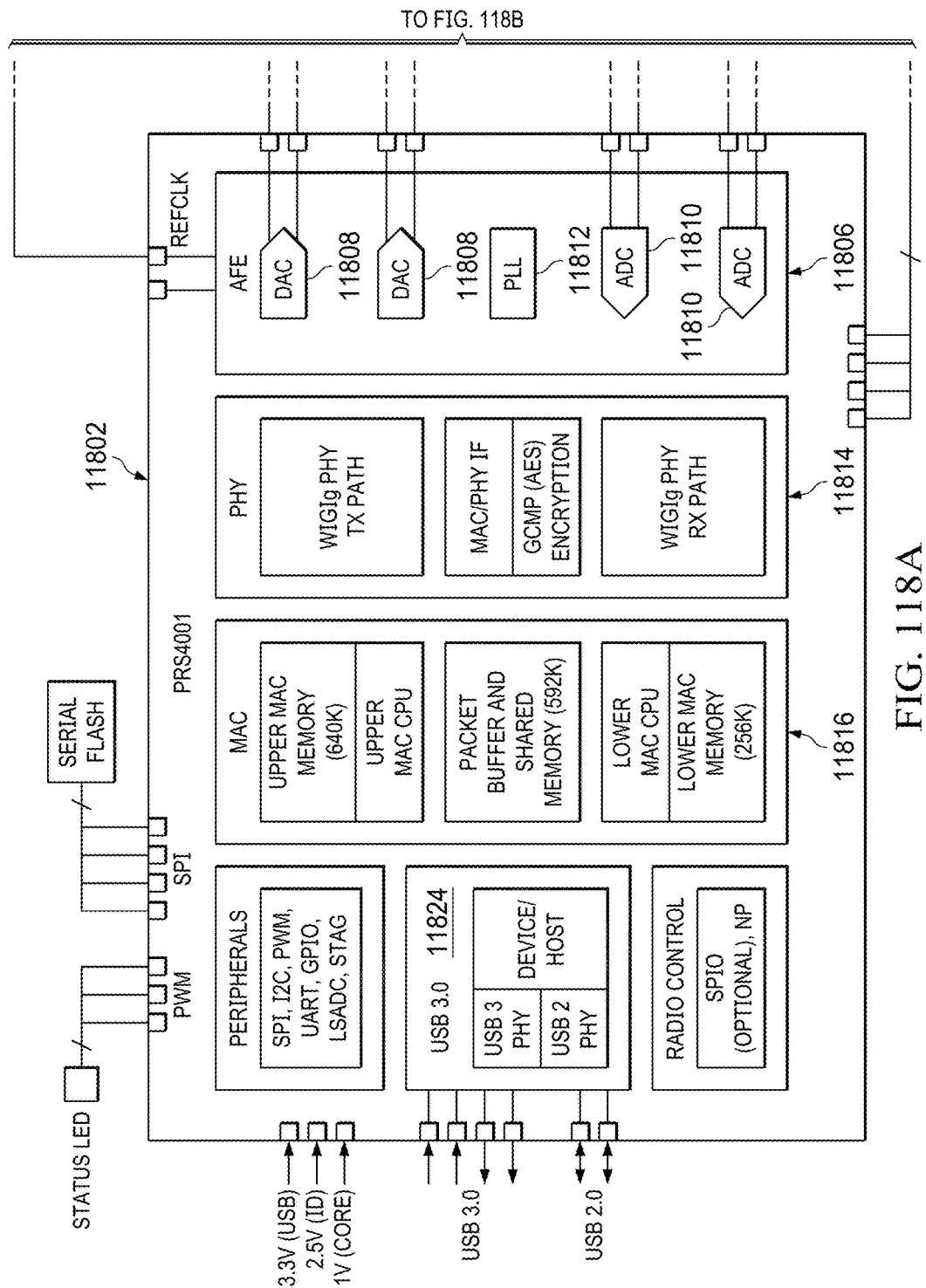
Figure 118B:
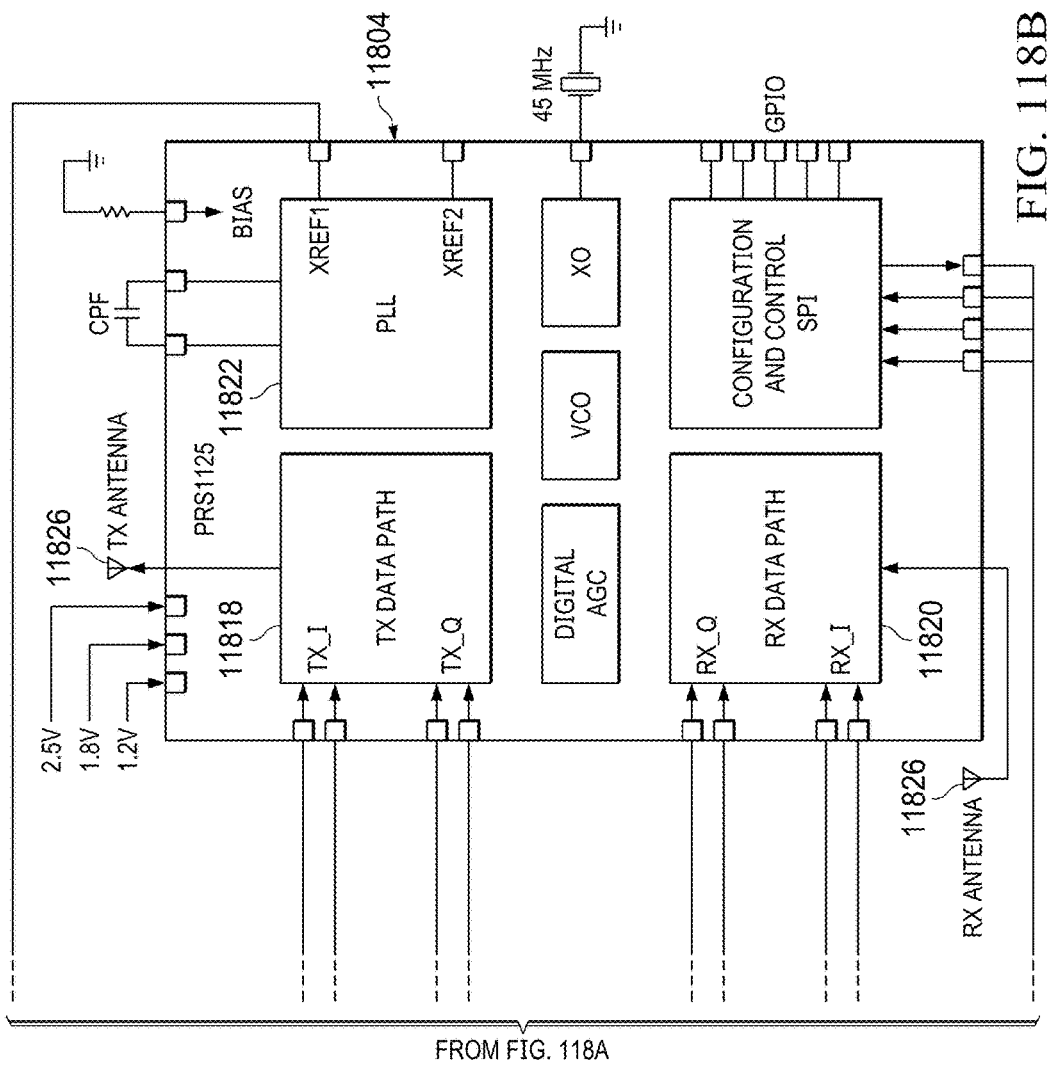
Figure 121:
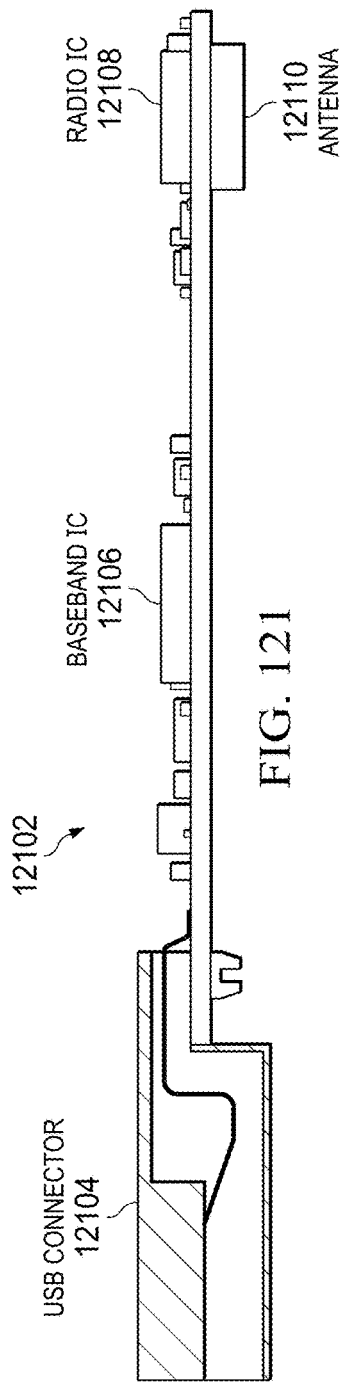
Figure 122:
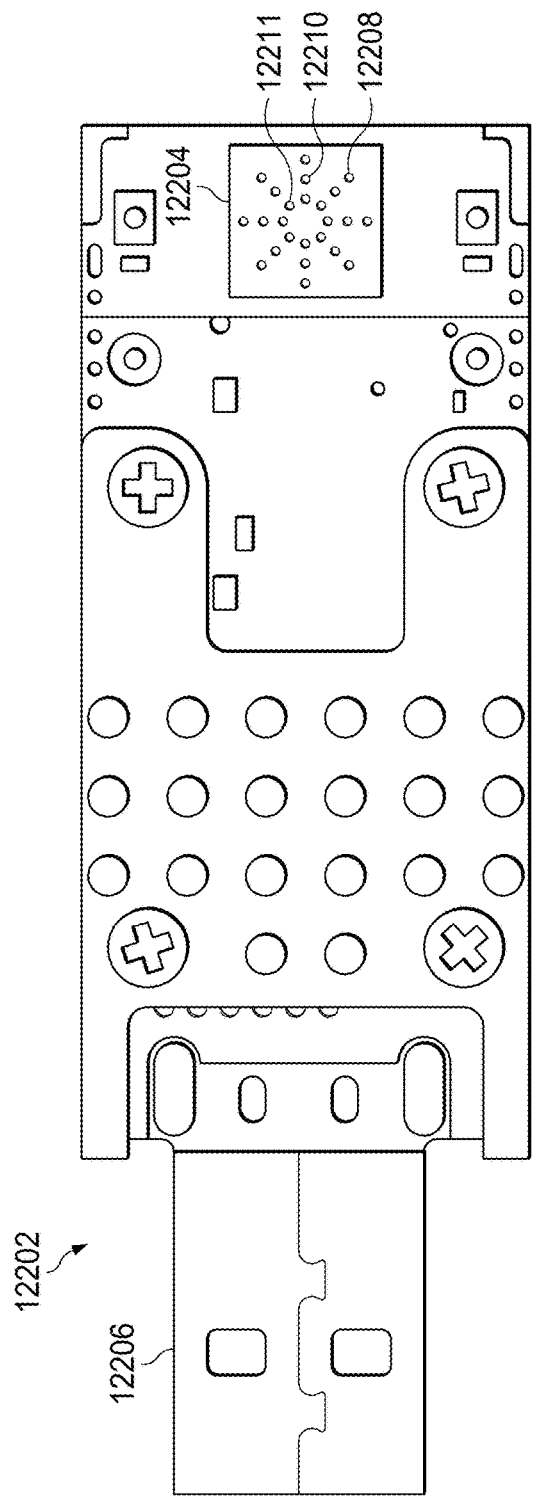
Figure 123:
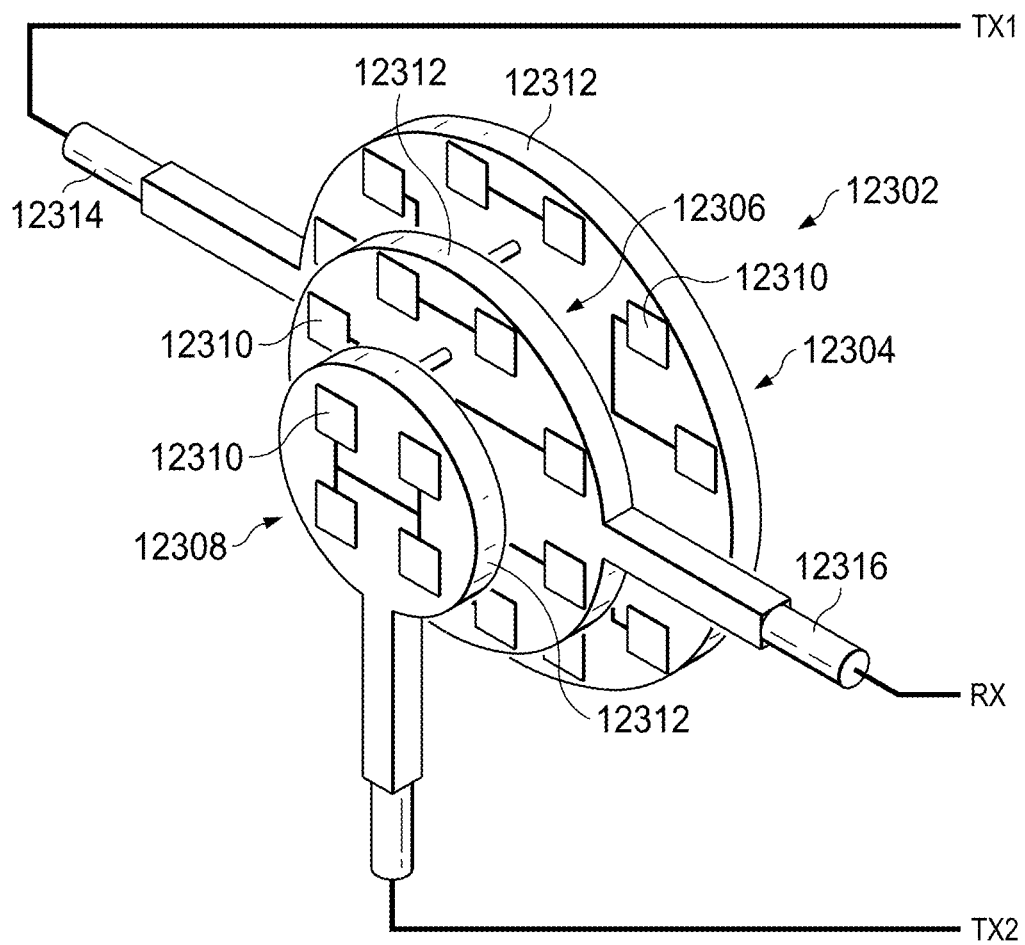
Figure 124:
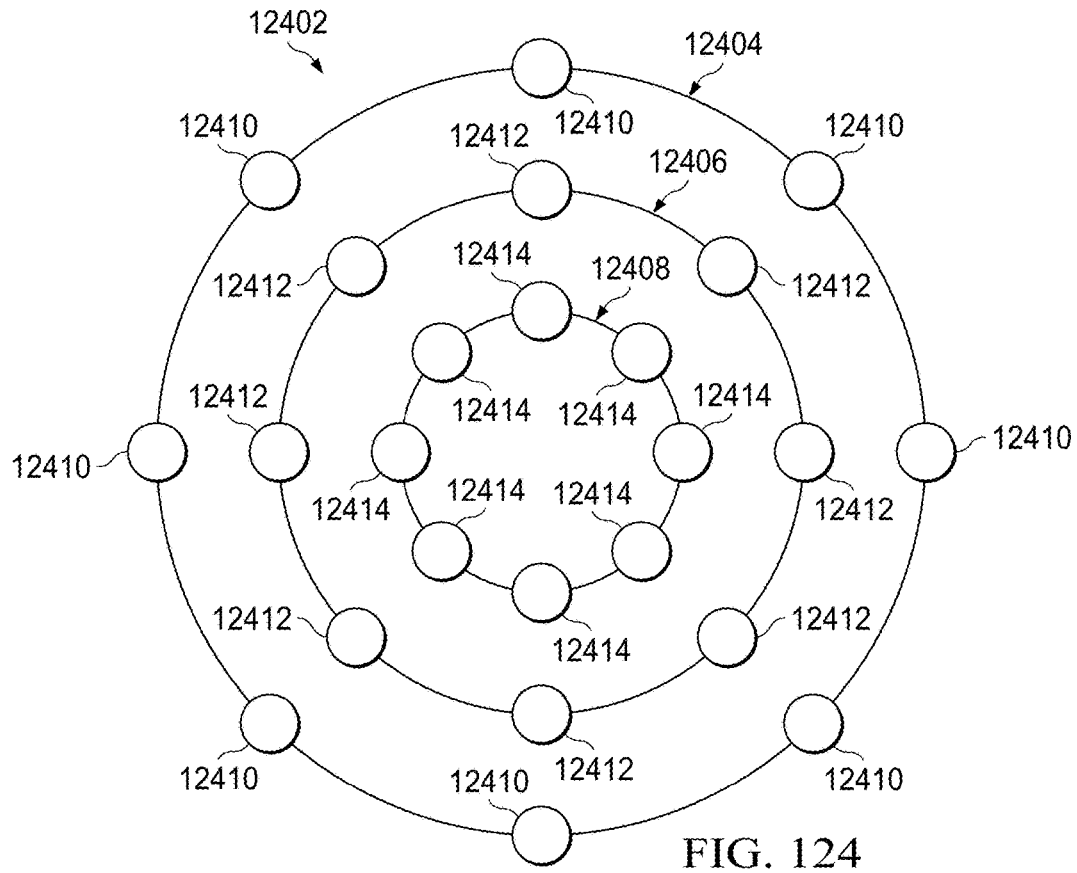
Figure 125:
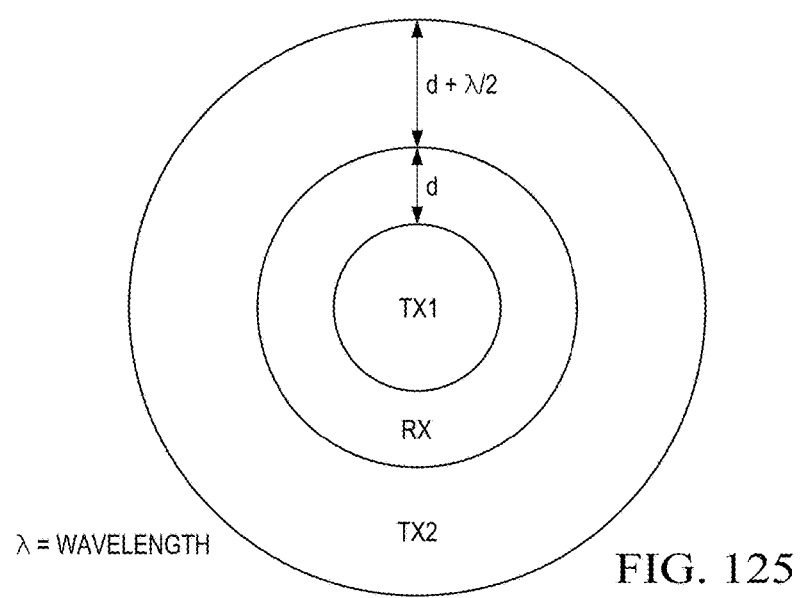
Figure 126:
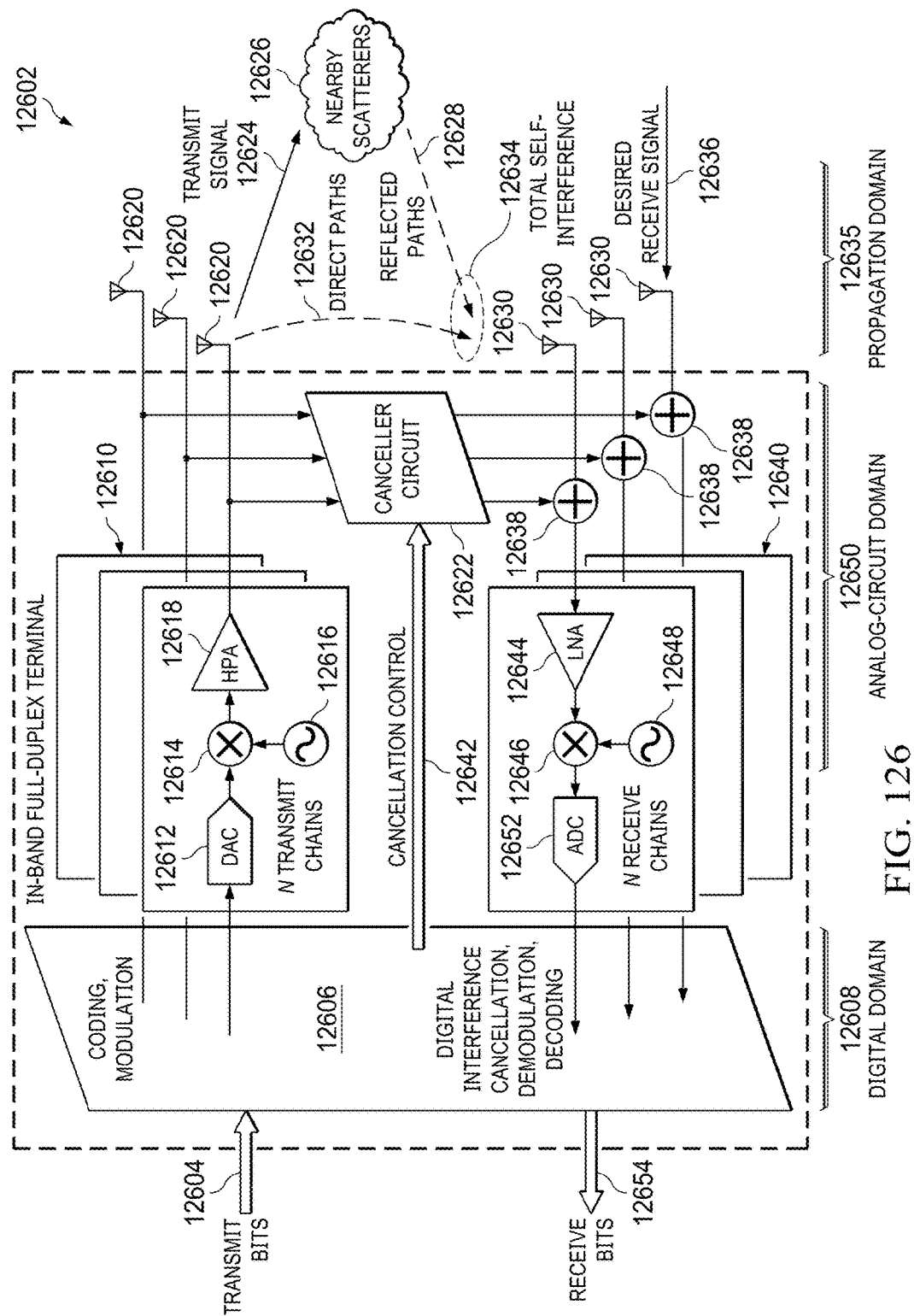
Figure 127:
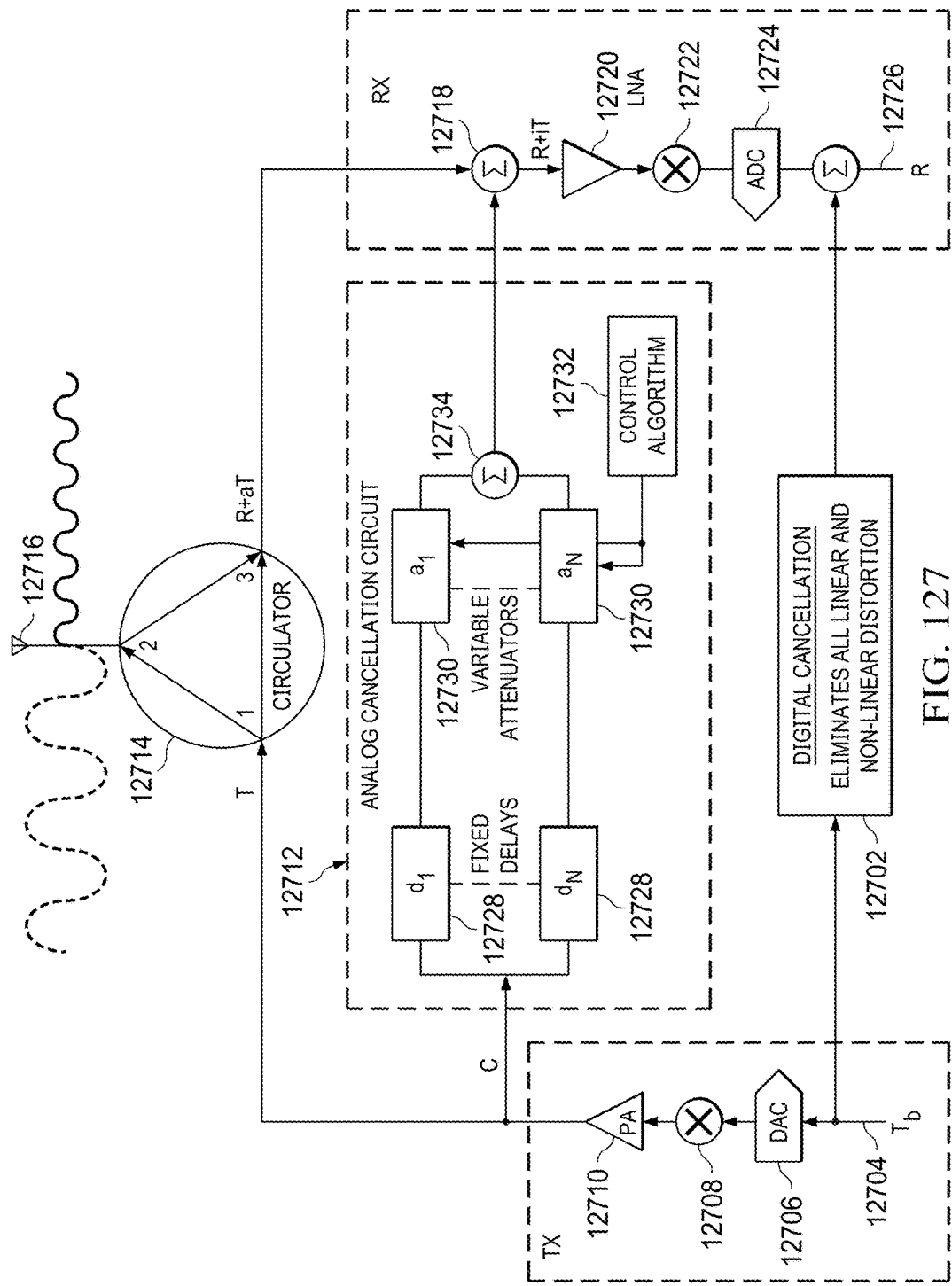
Figure 128:
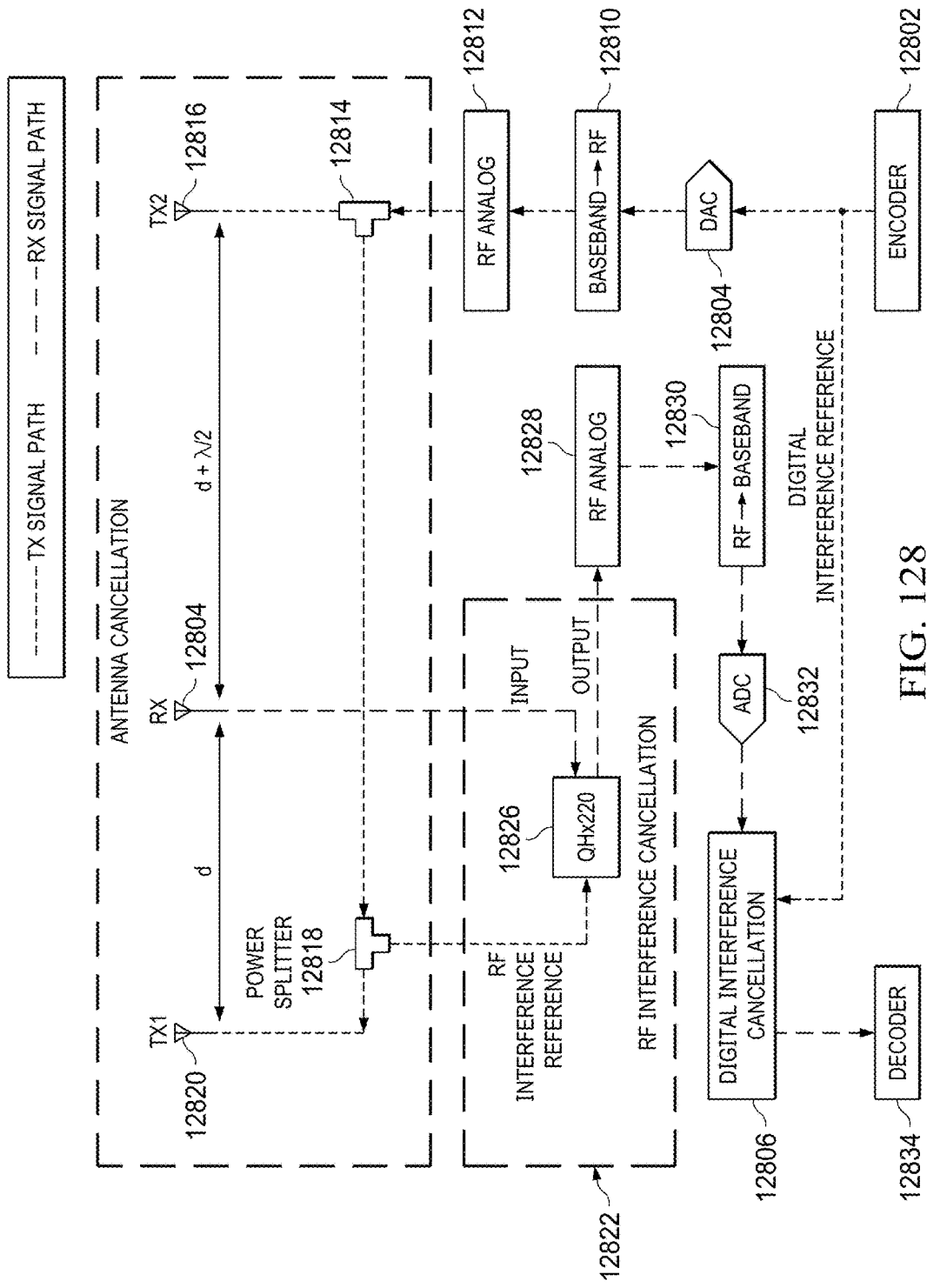

FIG. 109 illustrates an OAM multiplexed link using hybrid patch and parabolic antenna with spiral phase plate at a receiver;

FIG. 110 illustrates an OAM multiplexed link using hybrid patch and parabolic antenna for the transmitter and the receiver;

FIG. 111 is a flow diagram illustrating the design and layout process of a patch antenna;

FIG. 112 is a flow diagram illustrating the process for patterning a copper layer on a laminate for a patch antenna;

FIG. 113 is a flow diagram illustrating a testing process for a manufactured patch antenna;

FIG. 114 illustrates a functional block diagram of a RK 3399 processor and a Peraso chipset;

FIG. 115A illustrates a more detailed block diagram of a RK 3399 processor and a Peraso chipset;

FIG. 115B illustrates a block diagram of a transceiver dongle for providing full-duplex communications;

FIG. 115C illustrates a block diagram a device implementing a Peraso chipset;

FIG. 116 illustrates a transceiver dongle and a multilevel patch antenna array for transmitting and receiving OAM signals;

FIG. 117 is a top-level block diagram of a Peraso transceiver;

FIGS. 118A and 118B illustrate a detailed application diagram of a Peraso chipset;

FIG. 119 illustrates serial transmissions between Peraso transceivers;

FIG. 120 illustrates parallel transmissions between Peraso transceivers;

FIG. 121 illustrates a side view of the transceiver dongle;

FIG. 122 illustrates an alternative view of a transceiver dongle with two transmitting and one receiving antenna;

FIG. 123 illustrates a view of a three layer patch antenna;

FIG. 124 illustrates a top view of the three layer patch antenna;

FIG. 125 illustrates the separation between antenna layer of the three layer patch antenna;

FIG. 126 illustrates the analog and digital cancellation for multiple transmit and receive chains;

FIG. 127 illustrates a block diagram of the transmitter and receiver circuit;

FIG. 128 illustrates transmit and receive paths for the analog and digital cancellation processes.

DETAILED DESCRIPTION

Referring now to the drawings, wherein like reference numbers are used herein to designate like elements throughout, the various views and embodiments of full-duplex communications using orbital angular momentum (OAM) functions are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

There are digital and analog techniques to cancel channel interference. Digital cancellation is insufficient by itself. Analog to Digital Converters (ADCs) have a limited dynamic range and self-interference is extremely strong. An ADC can quantize away the received signal making it unrecoverable after digital sampling. Analog cancellation uses knowledge from the transmission to cancel self-interference before it is digitized. One approach uses a second transmit chain to create an analog cancellation signal from the digital estimate of the self-interference. Another approach uses techniques similar to noise-cancelling headphones. The self-interference signal is the "noise" which a circuit subtracts from the received signal. These techniques cannot provide more than 25 dB of cancellation and cannot be combined with digital cancellation, so it is insufficient for full duplex.

Figure 1:
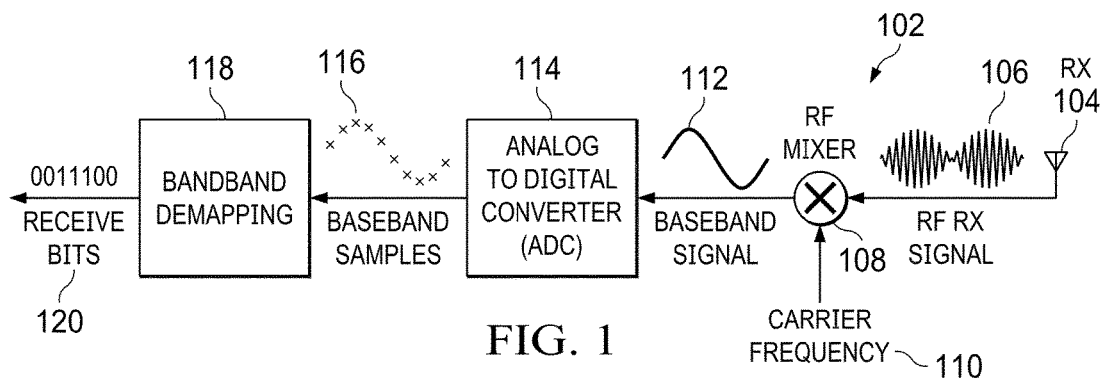
FIG. 1 illustrates a simplified block diagram of an RF receiver.

FIG. 1 illustrates a simplified block diagram of an RF receiver. The receiver antenna 104 receives the RF signal 106. The RF signal 106 is provided to an RF mixer 108 where the signal is mixed with a carrier frequency 110 to generate the baseband signal 112. The baseband signal is provided to an analog to digital converter 114 to generate baseband signal 116. A baseband demapper 118 demaps the baseband signal 116 into the received bits 120. Interference between the received RF signal 106 and an RF signal from a transmitting antenna can interfere each other causing distortion of the received bits 120. Thus, the ability to overcome this interference using full-duplex transmission techniques can improve signal reception. As discussed above, existing techniques of overcoming interference in full-duplex systems have a variety of limitations.

Figure 2:
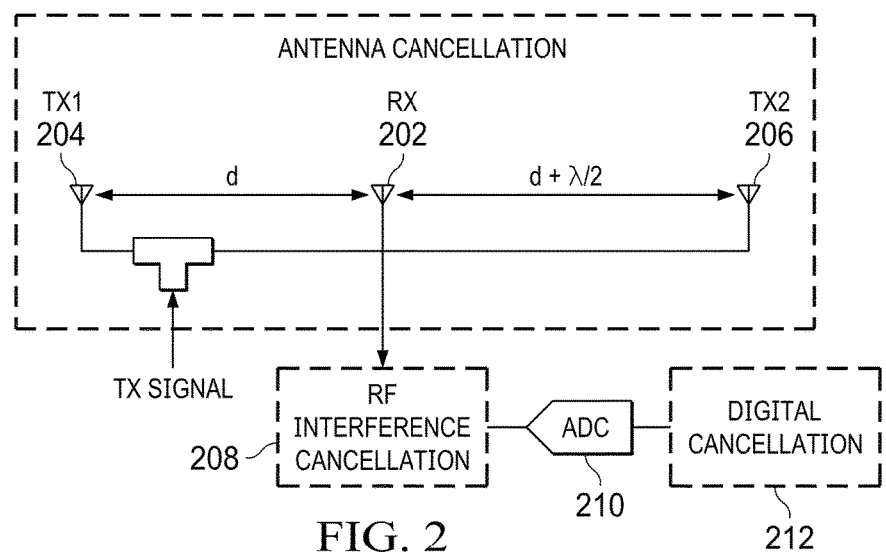
FIG. 2 illustrates a block diagram of a full-duplex design with three cancellation techniques.

Motivated by these limitations, recent work has proposed antenna placement techniques. The state of the art in full duplex operates on narrowband 5 MHz signals with a transmit power of 0 dBm (1 mW). The design achieves this result by augmenting the digital and analog cancellation schemes described above with a novel form of cancellation called "antenna" cancellation as shown in FIG. 2. The separation between the receive antenna 202 and the transmit antennas 204 attenuates the self-interference signal, but the separation is not enough. A second transmit antenna 206 placed in such a way that the two transmit signals interfere destructively at the receive antenna. This is achieved by having one-half wavelength distance offset between the two transmit antennas. The receive antenna 210 utilizes RF interference cancellation 208 to attempt to overcome the transmission signal interference and processes the signal using analog to digital conversion at ADC 210 and further digital cancellation techniques at digital canceler 212. This design thus uses multiple cancellation techniques including the antenna cancellation, RF interference cancellation and digital cancellation.

This design still has limitations. The first limitation relates to the bandwidth of the transmitted signal. Only the signal at the center frequency is perfectly inverted in phase at the receiver 202 so it is fully cancelled. However, the further away a signal is from the center frequency, the further the signal shifts away from perfect inversion and does not cancel completely. Cancellation performance also degrades as the bandwidth of the signal to cancel increases.

The cancellation is highly frequency selective and modulation approaches such as OFDM which break a bandwidth into many smaller parallel channels will perform even more poorly. Due to frequency selectivity, different subcarriers will experience drastically different self-interference. Another limitation is the need for three antennas. Full duplex can at most double throughput, but a 3×3 MIMO array can theoretically triple throughput which suggests that it may be better to use MIMO. The third limitation is that the full duplex radio requires manually tuning the phase and amplitude of the second transmit antenna to maximize cancellation at the receive antenna.

Figure 3:
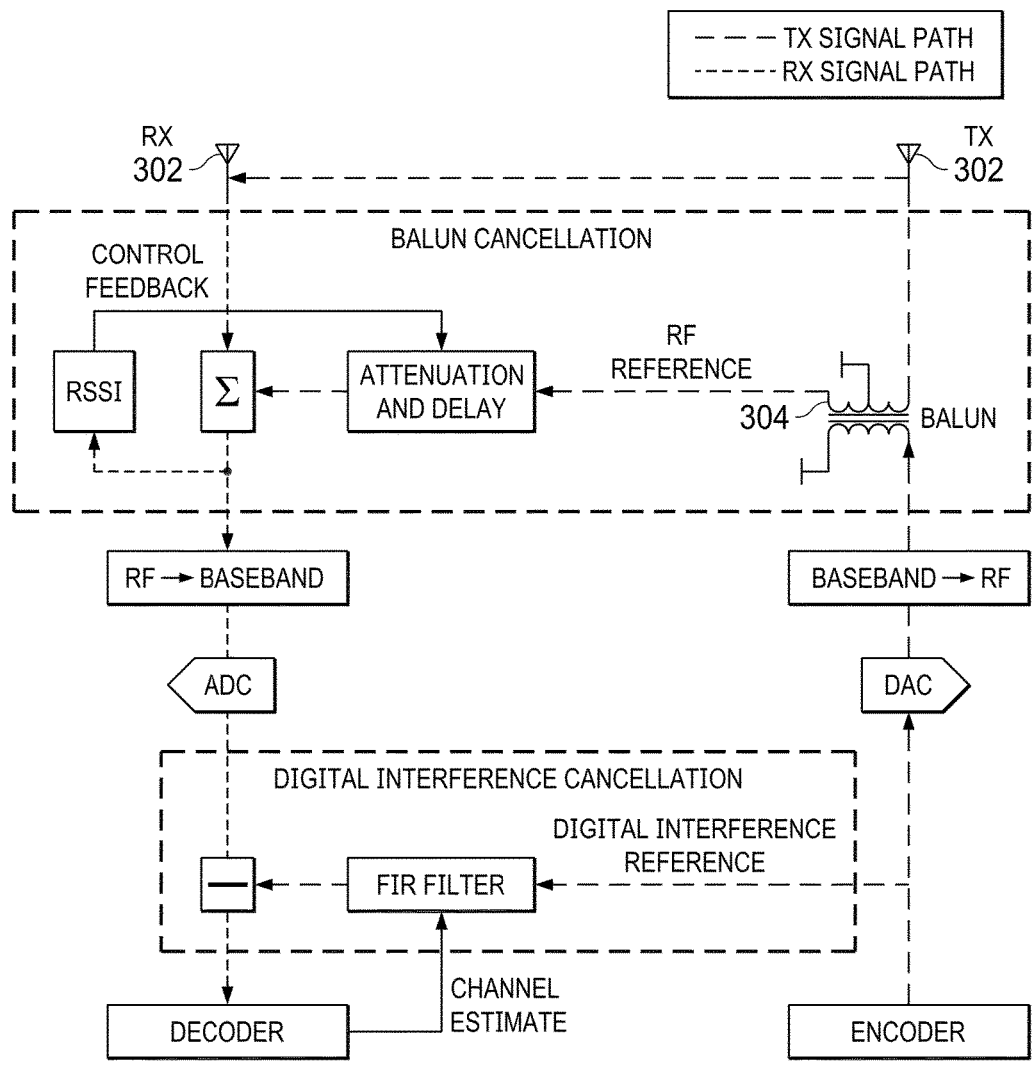
FIG. 3 illustrates a block diagram of a full-duplex system.

FIG. 3 illustrates a block diagram of a full-duplex system. A full duplex system radio can be created that requires only two antennas 302, has no bandwidth constraint, and automatically tunes its self-interference cancellation. To achieve this, a radio needs to have the perfect inverse of a signal so that it can be fully cancelled out. A balun transformer 304 can be used to obtain the inverse of a self-interference signal then use the inverted signal to cancel the interference. This technique is called balun passive cancellation and uses high precision passive components to realize the variable attenuation and delay in the cancellation path.

There are practical limitations to this technique, for example, the transmitted signal on the air experiences attenuation and delay. To obtain perfect cancellation the radio must apply identical attenuation and delay to the inverted signal, which may be hard to achieve in practice. The balun transformer 304 may also have engineering imperfections such as leakage or a non-flat frequency response.

Figure 4:
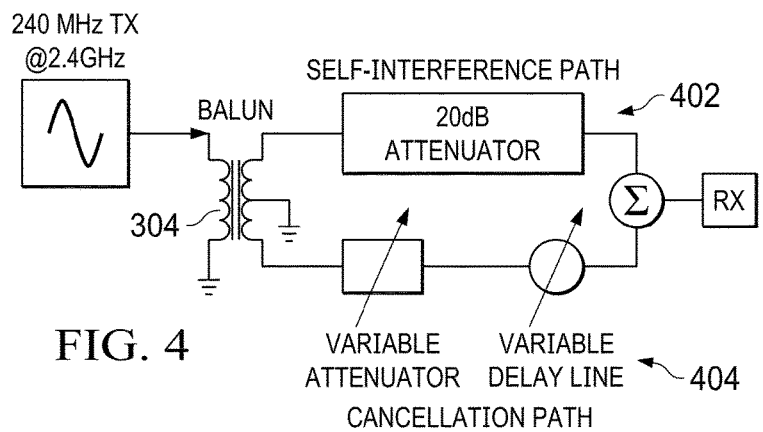
FIG. 4 illustrates a circuit for measuring the cancellation performance of signal inversion versus offset.
Figure 5:
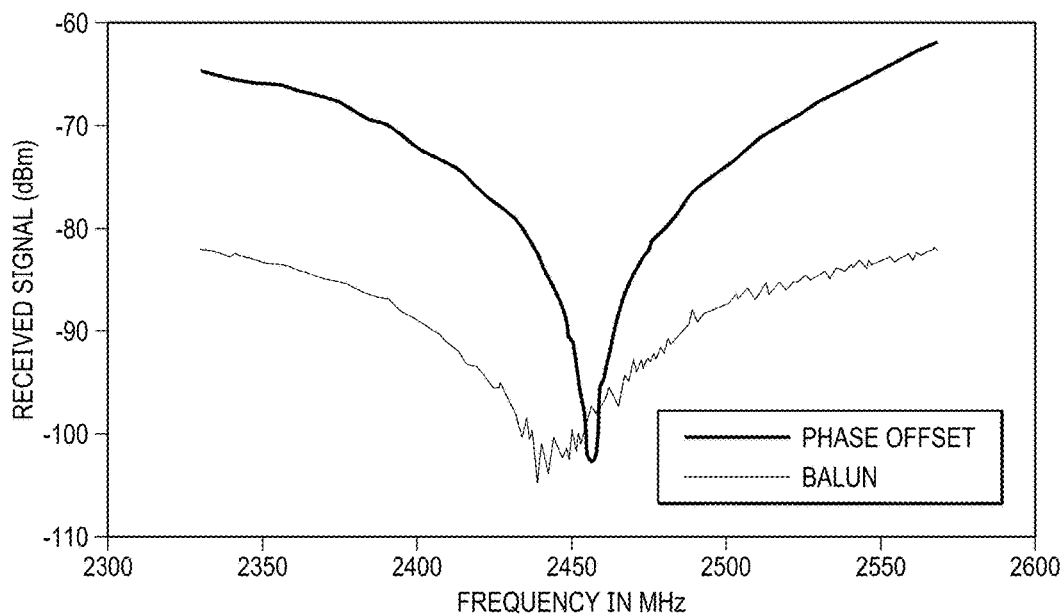
FIG. 5 illustrates the cancellation of a self-interference signal with balun versus with phase offset.
Figure 6:
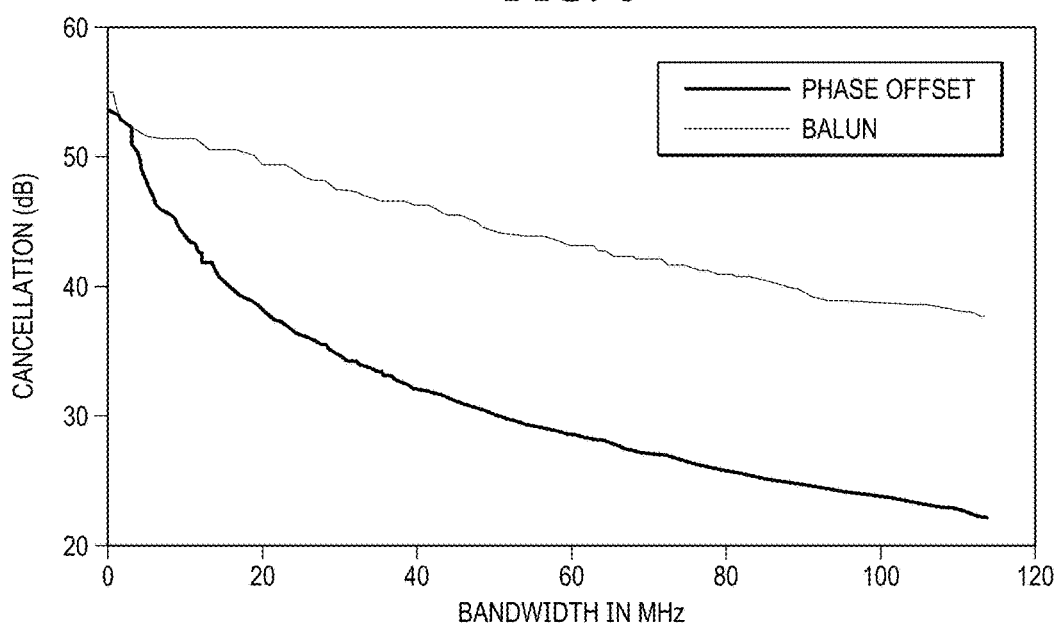
FIG. 6 illustrates cancellation performance with increasing signal bandwidth using a balun method versus using a phase offset cancellation.

Referring now also to FIG. 4, the balun transformer 304 splits the transmit signal and uses wires of the same length for the self-interference path 402 and the cancellation path 404. The passive delay line and attenuator provide fine-grained control to match phase and amplitude for the interference and cancellation paths 402, 404 to maximize cancellation. Balun cancellation is not perfect across the entire band, and this is because the balun circuit is not frequency flat. Based on FIG. 5, the best possible cancellation can be obtained with the balun transformer 304 and phase-offset cancellation for a given signal bandwidth. FIG. 6 shows the best cancellation achieved using each method.

FIG. 6 shows that if the phase and amplitude of the inverted signal are set correctly, the balun cancellation can be very effective. If one can estimate the attenuation and delay of the self-interference signal and match the inverse signal appropriately, then one can self-tune a cancellation circuit. The auto-tuning algorithm would adjust the attenuation and delay such that the residual energy after balun cancellation would be minimized. Let g and τ be the variable attenuation and delay factors respectively, and s(t) be the signal received at the input of the programmable delay and attenuation circuit. The delay over the air relative to the programmable delay is $\tau_a$. The attenuation over the wireless channel is $g_a$. The energy of the residual signal after balun cancellation is:

$$E = \int_{T_o} (g_a s(t-\tau_a) - g s(t-\tau))^2 dt$$

where $T_o$ is the baseband symbol duration. The goal of the algorithm is to adjust the parameters g and τ to minimize the energy of the residual signal.

Figure 7A:
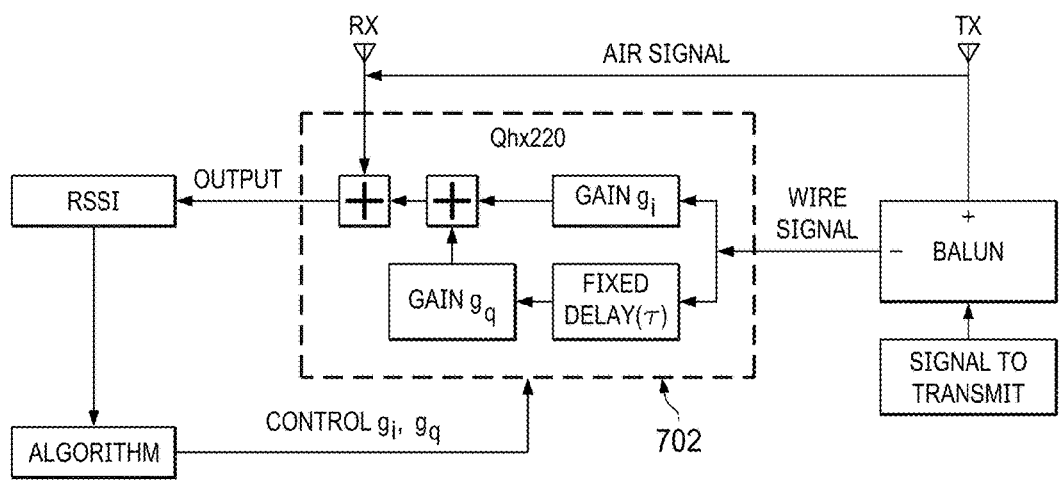
FIG. 7A illustrates a block diagram of a full-duplex system with balun active cancellation.
Figure 7B:
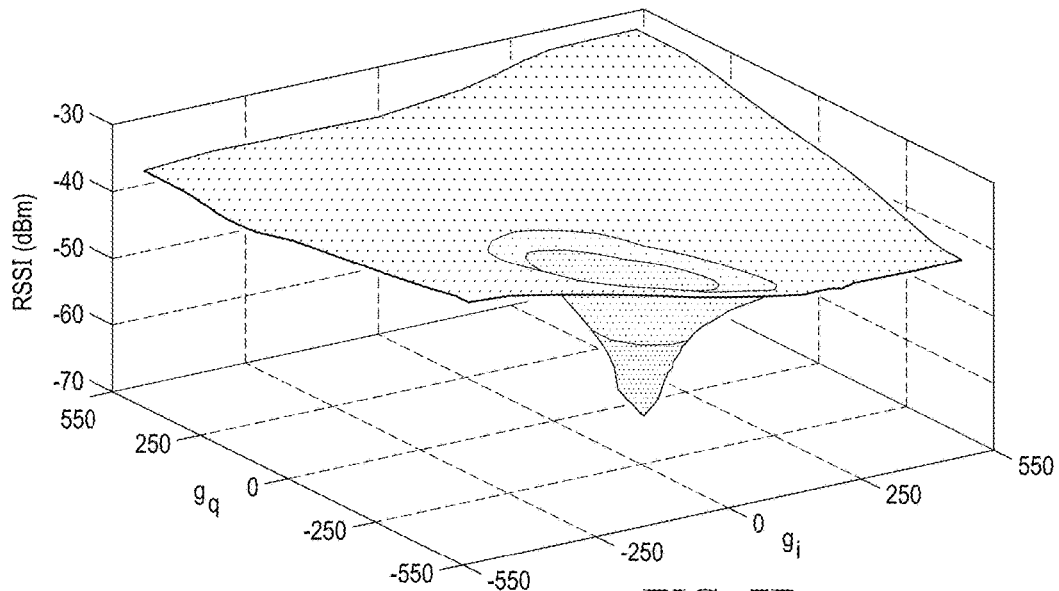
FIG. 7B illustrates the RSSI of the residual signal after balun cancellation.

FIG. 7A shows the block diagram of Balun Active Cancellation with the auto-tuning circuit 702. For a single frequency, this approach can correctly emulate any phase. However, for signals with a bandwidth, the fixed delay T only matches one frequency. The goal of the auto tuning algorithm would be to find the attenuation factors on both lines such that the QH×220 chip output is the best approximation of the self-interference needed to cancel from the received signal. A pseudo-convex structure can be seen in FIG. 7B where a deep null exists at the optimal point.

FIG. 4 shows the balun cancellation circuit, but it only handles the dominant self-interference component. A node's self-interference may have other multipath components which are strong enough to interfere with reception. The balun circuit may also distort the cancellation signal slightly which introduces some leakage. A full duplex radio uses digital cancellation to prevent the loss of packets which a half-duplex radio could receive.

The digital cancellation has three novel achievements compared to existing software radio implementations. It is the first real-time cancellation implementation that runs in hardware. The second achievement is that it is the first cancellation implementation that can operate on 10 MHz signals. Finally, it is the first digital cancellation technique that operates on OFDM signals.

Digital cancellation has two components: estimating the self-interference channel, and using the channel estimate on the known transmit signal to generate digital samples to subtract from the received signal. The radio uses training symbols at the start of a transmitted OFDM packet to estimate the channel. Digital cancellation models the combination of the wireless channel and cancellation circuitry effects together as a single self-interference channel. Due to its low complexity, the least squares algorithm is used in the estimation. The least squares algorithm estimates the channel frequency response of each subcarrier:

$$\hat{H}_s[k] = \frac{1}{M}\left[\frac{1}{X[k]}\left(\sum_{m=1}^{M} Y^{(m)}[k]\right)\right]$$

The radio applies the inverse fast Fourier transform to the frequency response to obtain the time domain response of the channel. This method of estimating the frequency response uses the least squares algorithm to find the best fit that minimizes overall residual error. The radio applies the estimated time domain channel response to the known transmitted baseband signal and subtracts it from the received digital samples. To generate these samples, the hardware convolves with the FIR filter. The output i[n] of the filter:

$$i[n] = \sum_{k=0}^{N-1} \hat{h}_s[k] s[n-k]$$

The radio subtracts the estimates of the transmit signal from the received samples r[n]:

$$\hat{r}[n] = r[n] - i[n] = \sum_{k=0}^{N-1} h_d[k] d[n-k] + \sum_{k=0}^{N-1} (h_s[k] - \hat{h}_s[k]) s[n-k] + z[n]$$

Where d[n] and $h_d$[n] are transmitted signal and channel impulse response from the intended receiver, and z[n] is additive white Gaussian noise.

As described above, full duplex communication involves simultaneous transmission and reception of signals over an available bandwidth between transmission sites. The various details of full-duplex communications and other full-duplex wireless transmission techniques are more fully described in "Practical, Real-time, Full Duplex Wireless," Jain et al., MobiCom '11, Sep. 19-23, 2011, Las Vegas, Nev., USA, 2011, which is incorporated herein by reference in its entirety.

Figure 8:
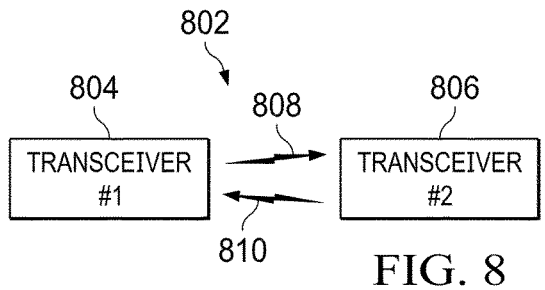
FIG. 8 illustrates full-duplex transmissions between first and second transceivers.

Referring now to FIG. 8, as referenced above, a communication system 802 including a first transceiver 804 and a second transceiver 806 communicate with each other over communication channel 808 from the first transceiver to the second transceiver and communication channel 810 from the second transceiver to the first transceiver. The first communication channel 808 and the second communication channel 810 will interfere with each other if transmitted using the same frequency or channel. Thus, some manner for overcoming the interference between the channels is necessary in order to enable the transmissions from the first transceiver 804 to the second transceiver 806 to occur at a same time. One manner for achieving this is the use of full-duplex communications. Some embodiments for full-duplex communication have been described hereinabove.

Figure 9:
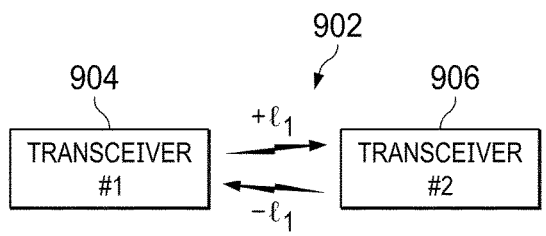
FIG. 9 illustrates full-duplex transmissions using orbital angular momentum between first and second transceivers.

FIG. 9 illustrates a full duplex communication system 902 wherein a first transceiver 904 is an communication with the second transceiver 906. In the implementation of the communications channel from transceiver 904 to transceiver 906 has incorporated therein an orbital angular (OAM) of $+l_1$, and the communication channel from transceiver 906 to transceiver 904 has incorporated therein an OAM of $-l_1$. The transceiver 904 transmits signals having the OAM $+l_1$ function applied thereto, and the transceiver 904 transmits signals having the OAM $-l_1$ signal applied thereto to prevent interference therebetween. The OAM signals each comprise orthogonal functions that are orthogonal to each other. Since the signals are orthogonal to each other, they do not interfere with each other even when being transmitted over the same frequency or channel. This achieves isolation between the transmitting and the receiving channels. This allows the full-duplex communications with transmissions from transceiver 904 to transceiver 906 and from transceiver 906 to transceiver 904 to occur at the same time without interfering with each other. For longer distances within optical transmissions systems, lenses may be used to focus the beams transmitted between transmitters 904 and 906. This enables beams to be transmitted over a further distance. The applied orthogonal functions can be orbital angular momentum, Laguerre-Gaussian functions or others in a cylindrical coordinate system for transmitting and receiving.

Figure 10:
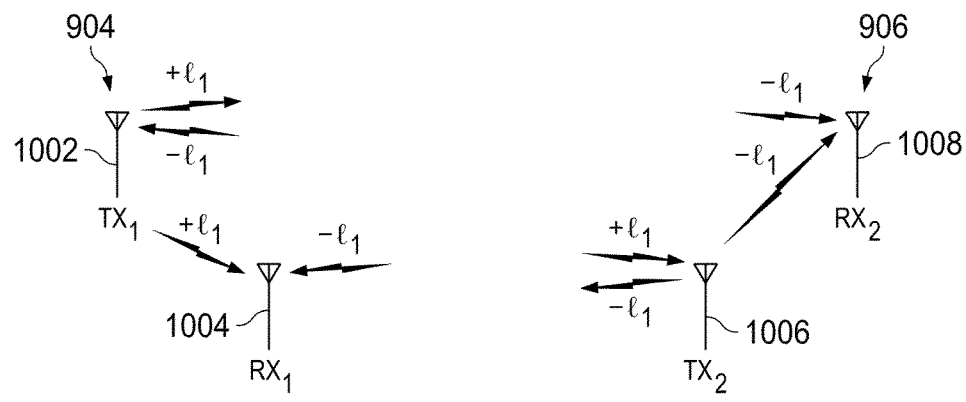
FIG. 10 illustrates signals received by antennas in full-duplex with OAM communications.

The full-duplex communications capability and potential interference issues are more fully illustrated with respect to FIG. 10. In FIG. 10, the transceiver 904 includes a transmitting antenna 1002 and a receiving antenna 1004. The second transceiver 906 consist of a transmitting antenna 1006 and receiving antenna 1008. The transmitting antenna 1002 transmits a signal having a +$l_1$ OAM function applied thereto. The +$l_1$ signal is received by the receiving antenna 1008, by the transmitting antenna 1006 and by the receiving antenna 1004. Similarly, the transmitting antenna 1006 transmits a signal having a −$l_1$ OAM function applied thereto. The transmitted −$l_1$ OAM processed signal is received at the receiving antenna 1008, the receiving antenna 1004 and the transmitting antenna 1002. In this manner, both the +$l_1$ signals and the −$l_1$ signals are received at each antenna. By applying the orthogonal OAM functions to the transmitted signals, each of the receivers associated with the antennas 1002-1008 may process the signals in such a manner as to only look for transmitted signals having a particular OAM value applied thereto. Signals having another OAM value applied thereto are ignored. Thus, antennas 1002 and 1006 would only concentrate on transmitting the +$l_1$ signals and the −$l_1$ signals, respectively. The receiver antenna 1004 would be configured to only pay attention to received −$l_1$ signals and the receiver antenna 1008 would only pay attention to received +$l_1$ signals. Thus, by utilizing different orthogonal functions, the receiver $RX_1$ may be configured to only process signals having the orthogonal function −$l_1$ applied thereto. The received signals including the orthogonal function +$l_1$ are ignored. The receiver $RX_2$ functions in a similar manner in only processes the received signals having the orthogonal function +$l_1$ applied thereto while ignoring the orthogonal function −$l_1$. In this manner, interference between the simultaneously transmitting full-duplex transmit and receive channels may be managed. Other types of orthogonal functions other than OAM may also be used.

Figure 11:
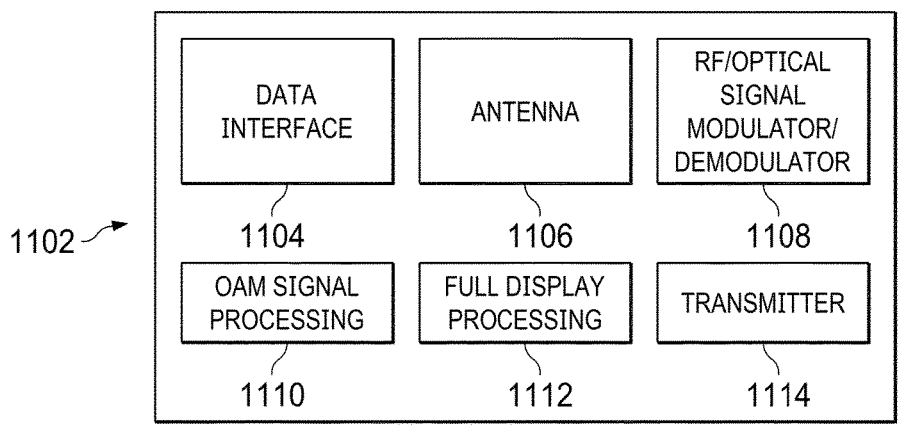
FIG. 11 illustrates a block diagram of a transceiver implementing full-duplex communications.

FIG. 11 illustrates a functional block diagram of a transceiver that may be utilized for each of the transceivers 904 and 906 that are illustrated with respect to FIGS. 9 and 10. The transceiver 1102 includes a data interface 1104 enabling the transceiver to receive one or more data streams for transmission from the transceiver 1102 via an antenna 1106. Information received over the data interface 1104 is processed via an RF/optical signal modulator/demodulator 1108 that modulates signals to be transmitted from the transceiver 1102 using the applicable RF or optical data transmission protocol, and for demodulating received RF/optical signals using the applicable protocol. The OAM signal processing circuitry 1110 is used for applying the orbital angular momentum or other orthogonal function to the modulated data signal that is to be transmitted from the antenna 1106. Additionally, the OAM signal processing circuitry 1110 may be used for removing of the OAM or orthogonal function that is applied to received signals prior to their demodulation by the demodulator 1108. The full-duplex processing circuitry 1112 is used for controlling the received signals that are to be processed by the transceiver 1102. As described earlier with respect to FIG. 10, when two signals are received at RX1 1004 having the OAM value +$l_1$ applied thereto and the other having the OAM value −$l_1$ applied thereto, the full-duplex processing circuitry 1112 will control which of the received signals are to be processed by the receiver. This will require the full-duplex processing circuitry 1112 to identify the OAM value or orthogonal function value that has been applied to the receive signal in order to determine whether the received signal should be processed. Finally, the transmitter 1114 is used for outputting the generated signals from the antenna 1106 of the transceiver 1102.

The RF/optical modulator/demodulator 1108 and OAM signal processing circuitry 1110 may utilize configuration similar to those described within U.S. patent application Ser. No. 14/882,085, entitled Application of Orbital Angular Momentum to Fiber, F30 and RF, filed Oct. 13, 2015 which is incorporated herein by reference in its entirety. These various implementations are more fully described hereinbelow. This technique may be implemented into the full duplex communications system described above.

FIG. 122 illustrates an embodiment of transceiver dongle 12202 and the multilevel patch antenna array 12204 for transmitting and receiving OAM signals that includes three layers of patch antennas for transmitting and receiving. The transceiver dongle 12202 interfaces with other devices using a USB connector 12206. The transceiver dongle 12202 also includes the patch antenna array 12204 which includes a first layer of patch antennas 12208 in a circular array, a second level of patch antennas 12210 within a circular array and a third level of patch antennas 12211 within a circular array. The first layer of patch antennas 12208 would transmit, for example, signals having an OAM function including an l=+1 helical beam. The second layer of patch antennas 12210 would receive signals having an OAM function including an l=−1 helical beam. Finally, the third layer of patch antennas 12211 would also transmit signal having the OAM function including the l=+1 helical beam. Each of the first layer patch antennas 12208, the second layer of patch antennas 12210 and third layer of patch antennas 12211 are at different levels as described herein above with respect to FIGS. 93-100 to enable the transmission and reception of OAM signals between transceivers. The use of two transmit antennas transmitting the second same signal allows the use of destructive interference cancellation for the received signal.

Referring now to FIG. 123, there is illustrated the three level patch antenna array 120 302 including a first level of a substantially circular patch antenna array 12304, a second level of a substantially circular patch antenna array 12306 and a third level of a substantially circular patch antenna array 12308. Each of the levels of patch antenna arrays comprise a plurality of patch antennas 12310 that are located on a substrate 12312. Each of the levels include a separate input or output depending on whether the array comprises a transmitting or receiving array. Antenna array 12304 comprises a transmit array having an input 12314 for receiving a signal to be transmitted by the array 12304. Antenna array 12306 comprises a receive patch antenna array having an output 12316 for outputting a received signal received by the patch antenna array. Antenna array 12308 also comprises a transmit array having an input 12318 for receiving a signal to be transmitted by the array 12308. By transmitting the same signals from the patch antenna array 12304 and patch antenna array 12308, destructive interference will enable cancellation of any of the transmitted signals received by the receive patch antenna array 12306 as will be more fully described hereinbelow. The improvement of signal interference between the transmitted and received signals may also be improved by the selection of a substrate 12312 for containing the patch antennas 12310 that has characteristics for limiting signal interference between antenna layers.

Referring now to FIG. 124 there is illustrated a top view of the multilevel patch antenna array 12402 comprising the bottom layer 12404, the mid-layer 12406 and the top layer 12408. The bottom layer 12404 includes a first circular array of patch antennas 12410. The mid-layer 12406 includes a second circular array of patch antennas 12412. The top layer 12408 includes a third circular array of patch antennas 12414. Each of the layers are concentric with the mid-layer 12406 and top layer 12408 being within the area of the bottom layer 12404, and the top layer 12408 being within the area of the mid-layer 12406. This enables unimpeded transmission and reception of signals by the associated patch antennas in each layer.

Referring now also to FIG. 125, there is provided a top-level view more fully illustrating the size of the bottom layer 12404, mid-layer 12406 and top layer 12408. The distance between the edge of the top layer 12408 and the mid-layer 12406 will have an established value equal to d. The distance between the edge of the mid-layer 12406 and the bottom layer 12404 is defined in accordance with the distance d to have a distance of d+X/2. This configuration of the distances between bottom layer 12404, mid-layer 12406 and top layer 12408 causes the signal from the two transmit layers on the bottom layer 12404 and the top layer 12408 to add destructively causing significant attenuation in the signal received at the receive antenna on the mid-layer 12406 from the bottom layer and the top layer.

FIG. 126 provides an illustration of the analog and digital cancellation process provided by the processing circuitry of a full-duplex system. Within the in-band full-duplex terminal 12602, there is an input for receiving the transmit bits 12604. The transmit bits 12604 are applied to coding and modulation circuitry 12606 within the digital domain 12608 to apply digital coding and modulation to the transmit bits 12604. The coded and modulated bits are passed on to N transmit chains 12610 for further processing. Each of the N transmit chains 12610 include a digital-to-analog (DAC) converter 12612 for converting the signal from the digital domain to the analog domain. The analog signal from the DAC 12612 is applied to one input of a mixer circuit 12614 that is mixed with a signal from an oscillator 12616 for up-conversion. The up-converted signal from the mixer circuit 12614 is applied to a high power amplifier 12618 for amplification. The amplified signal is transmitted from an associated antenna 12620 and to a canceller circuit 12622. The transmitted signals 12624 may be reflected from nearby scatterers 12626 as a reflected path signal 12628 to the receive antenna 12630. The transmitted signal 12624 may also create a direct path signal 12632 to the receive antenna 12630. The direct path signal 12632 and that the reflected path signals 12628 comprise the combined total self-interference 12634 that interferes with the desired received signal 12636 at the receive antennas 12630. The transmit antenna 12620 and receive antennas 12630 comprise part of the propagation domain 12635. The total self-interference 12634 may be canceled from the signals received at the receive antennas 12630 using the canceller circuit 12622.

The canceller circuit 12622 generates a cancellation signal that is applied at an adder circuit 12638 on each of the N receive chains 12640 to remove the total interference signal 12634 from the received signal 12636. The canceller circuit 12622 generates the cancellation signal for the adder circuit 12638 responsive to cancellation control signals 12642 applied from the digital domain 12608, and the transmit signals 12624 from each of the N transmit chains 12610. Each of the N receive chains 12640 include a low noise amplifier (LNA) 12644 for amplifying the received signal that has analog cancellation applied thereto. The output of the LNA 12644 is applied to a mixing circuit 12646 along with an oscillation signal from oscillator 12648 to down-convert the receive signal. The canceller circuit 12622, adders 12638, LNA 12644, mixer circuit 12646 and oscillator 12648 are all part of the analog circuit domain 12650.

The down converted signal from the mixer circuit 12646 is applied to an input of an analog to digital converter (ADC) 12652 to convert the signal from the analog domain to the digital domain in each of the N receive chains 12640. The digital received signals have digital interference cancellation, demodulation and decoding applied to them within the digital domain 12608. The processed signals are output as receive bits 12654.

Referring now to FIG. 127, there is illustrated a block diagram of the analog and digital cancellation circuitry. The digital cancellation circuitry 12702 limits all linear and nonlinear distortion within the receive signal responsive to digital inputs of the transmitted bits $T_b$ 12704. The transmitted bits 12704 are provided to a digital to analog converter 12706 followed by a mixing circuit 12708 before being amplified by a power amplifier 12710 on the transmitter side of the circuit. The transmitted signal from the output of the power amplifier 12710 is applied as an input to analog cancellation circuit 12712 and to a first input of the circulator 12714 that applies the transmitted signal to an antenna 12716. The antenna 12716 also receives signals that are provided to the circulator 127144 output at a third port of the circulator that are received by the antenna 12716 at a second port. The receive signal includes the desired received signal and any interference caused by the transmitted signals and reflected transmitted signals (R+aT). The receive signal is applied to the receiver circuitry including a summation circuit 12718 that receives a cancellation signal from the analog cancellation circuit 12712. The summation circuit 12718 cancels the analog interference portion of the received signal that is applied to a low noise amplifier 12720. The amplified received signal from the low noise amplifier 12720 is applied to a mixing circuit 12722 for down conversion. The down-converted signal is applied to the digital converter 12724 for conversion from the analog-to-digital domain. The digital signal is applied to a summation circuit 12726 for combination with a digital cancellation signal received from the digital cancellation circuitry 12702. This process removes linear and nonlinear distortion from the digital signal to output the received signal 12726.

The analog cancellation circuit 12712 receives an input from the output of the power amplifier 12710 of the transmitter. From the signal, a fixed delay $d_N$ is determined at 12728 for each transmission chain 12610. Next, the analog cancellation circuit 12712 determines a variable attenuator $a_N$ 12730 for each transmission chain 12610 responsive to the signal from the power amplifier 12710 processed by the fixed delays 12728 and a control input from control algorithm 12732. The outputs from each of the variable attenuators 12730 are summed at a summation circuit 12734 before being output to the summation circuit 12718 of the receiver.

Referring now to FIG. 128, there is provided a functional illustration of the transmit and receive signal paths for the analog and digital cancellation process. Beginning with the transfer, the encoder 12802 provides the transmitted signal to a digital to analog converter (DAC) 12804 and to digital interference cancellation circuitry 12806. The signal provided to the digital interference cancellation circuit 12806 is referred to as a digital interference reference signal and is used for cancellation. The analog converted signal from the DAC 12804 is provided to a baseband to RF conversion circuit 12810 and to RF analog transmission circuitry 12812. The transmitted signal passes through a first power splitter 12814 that splits the signal for transmission over antenna TX2 12806 or to a second power splitter 12818 that splits the transmitted signal for provision to antenna TX1 12820 and to RF interference cancellation 12822.

The receive signal path receives signals at receiving antenna RX 12824. In order to improve destructive interference cancellation by the antennas. The receive antenna RX 12824 is spaced from antenna TX1 12820 a distance d and is spaced from antenna TX2 12816 a distance d+λ/2. The placement of the transmit and receive antennas in the manner described reduces self-interference based upon antenna cancellation. The antenna cancellation evaluates limits with respect to bandwidth of the signal being transmitted and the sensitivity of antenna cancellation to engineering errors. Antenna cancellation can potentially achieve 20 dB reduction in self-interference. The effects of using two transmit antennas for antenna cancellation can be postulated as follows. If the wavelength of transmission is X, and the distance of the receive antenna 12824 is d from one transmit antenna 12820, the other transmit antenna 12816 is placed at d+λ/2 away from the receive antenna. This causes the signal from the two transmit antennas to add destructively, thus causing significant attenuation in the signal received, at the receive antenna.

The receive signal is input to the RF interference cancellation 12822 to an OHx220 cancellor 12826. Also input to the OHx220 cancellor 12826 is the transmitted signal provided to antenna TX 112807. The signal is referred to as the RF interference reference signal. The OHx220 cancellor 12826 is output to an RF analog receiver 12828. The signal is next forwarded for RF to baseband down conversion at RF to baseband down converter 12830. The down converted signal is provided to analog to digital converter 12832 before being provided to the digital interference cancellation 12806 for digital signal cancellations responsive to the previously discussed digital interference reference signal. The receive signal is decoded by the decoder 12834.

With respect to the digital interference cancellation circuit 12806, there is extensive existing work that describes various digital cancellation techniques. Traditionally, digital cancellation is used by a receiver to extract a packet from a desired transmitter after the packet has collided with a packet from an unwanted transmitter. To do this, the receiver first decodes the unwanted packet, re-modulates it and then subtracts the packet from the originally received collided signal. In case of canceling self-interference for full-duplex, the transmitted symbols are already known, and thus decoding is not necessary in order to reconstruct a clean signal. Instead of decoding, coherent detection is used to detect the self-interfering signal. The detector correlates the incoming received signal with the clean transmitted signal, which is available at the output of the transmitter. The main challenge in subtracting the known signal is in estimating the delay and phase shift between the transmitted and the received signals. As the detector has the complete knowledge of originally transmitted signal, the detector uses this signal to correlate with the incoming signal to detect where the correlation peaks occur. The correlation peak technique gives both the delay and the phase shift needed to subtract the known signal from the received signal. Thus, this technique, unlike some of the digital interference techniques, does not require any special preamble or postamble and is backwards compatible. Moreover, this technique is modulation-independent as long as the clean signal can be constructed from the transmitted signal. Coherent detection can detect the self-interference signal even when the self-interference signal is weaker than the received signal. Therefore, digital interference cancellation can improve the SNR level even when the received signal is stronger than self-interference. This property is useful when operating with variable data rates to allow using higher data rates for high SNR links.

Typical interference cancellation also requires compensating for clock drift between the transmitter and receiver. Since the transmitter and receiver daughterboards in a full-duplex node share the same clock, there is no clock drift. However, since the daughterboards use separate PLL logic, there can be a jitter introduced into the transmissions.

Figure 12:
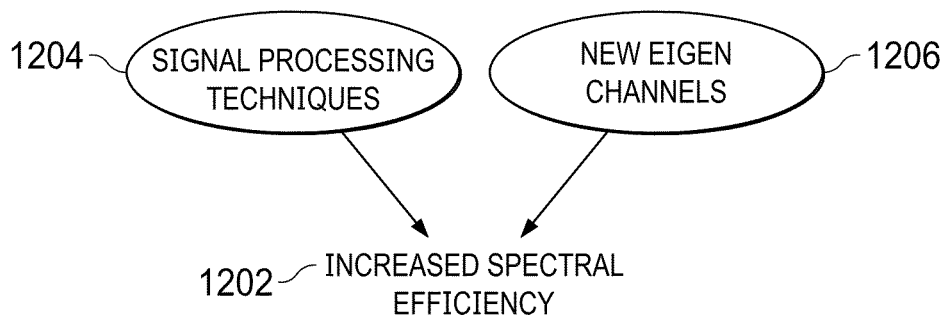
FIG. 12 illustrates various techniques for increasing spectral efficiency within a transmitted signal.

Referring now more particularly to FIG. 12, there is illustrated two manners for increasing spectral efficiency of a communications system. In general, there are basically two ways to increase spectral efficiency 1202 of a communications system. The increase may be brought about by signal processing techniques 1204 in the modulation scheme or using multiple access technique. Additionally, the spectral efficiency can be increase by creating new Eigen channels 1206 within the electromagnetic propagation. These two techniques are completely independent of one another and innovations from one class can be added to innovations from the second class. Therefore, the combination of this technique introduced a further innovation.

Spectral efficiency 1202 is the key driver of the business model of a communications system. The spectral efficiency is defined in units of bit/sec/hz and the higher the spectral efficiency, the better the business model. This is because spectral efficiency can translate to a greater number of users, higher throughput, higher quality or some of each within a communications system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 1206, the innovations include diversity techniques including space and polarization diversity as well as multiple input/multiple output (MIMO) where uncorrelated radio paths create independent Eigen channels and propagation of electromagnetic waves.

Combination of QLO/MLO with OAM Processing

Figure 13:
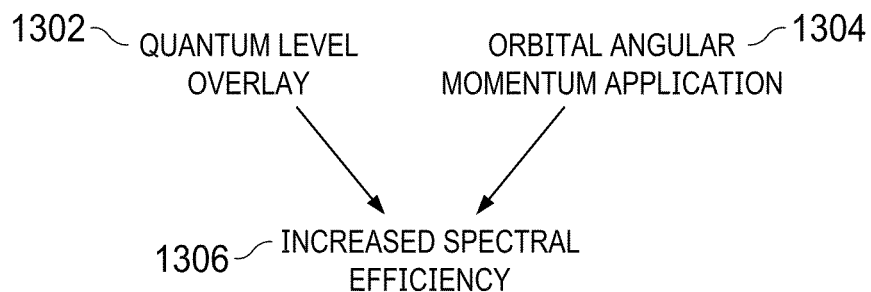
FIG. 13 illustrates a particular technique for increasing spectral efficiency within a transmitted signal.

Referring now to FIG. 13, the present communication system configuration introduces two techniques, one from the signal processing techniques 1204 category and one from the creation of new eigen channels 1206 category that are entirely independent from each other. Their combination provides a unique manner to disrupt the access part of an end to end communications system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access. The first technique involves the use of a new signal processing technique using new orthogonal signals to upgrade QAM modulation using non sinusoidal functions. This is referred to as quantum level overlay (QLO) 1302. The second technique involves the application of new electromagnetic wavefronts using a property of electromagnetic waves or photon, called orbital angular momentum (QAM)

1204. Application of each of the quantum level overlay techniques 1302 and orbital angular momentum application 1304 uniquely offers orders of magnitude higher spectral efficiency 1306 within communication systems in their combination.

With respect to the quantum level overlay technique 1302, new eigen functions are introduced that when overlapped (on top of one another within a symbol) significantly increases the spectral efficiency of the system. The quantum level overlay technique 1302 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 1304, this technique introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a communications link. OAM beams are interesting in communications due to their potential ability in special multiplexing multiple independent data carrying channels.

With respect to the combination of quantum level overlay techniques 1302 and orbital angular momentum application 1304, the combination is unique as the OAM multiplexing technique is compatible with other electromagnetic techniques such as wave length and polarization division multiplexing. This suggests the possibility of further increasing system performance. The application of these techniques together in high capacity data transmission disrupts the access part of an end to end communications system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

Telecom operators and vendors are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 1302 has an advantage that the independent channels are created within the symbols without needing new antennas. This will have a tremendous cost and time benefit compared to other techniques. Also, the quantum layer overlay technique 1302 is a physical layer technique, which means there are other techniques at higher layers of the protocol that can all ride on top of the QLO techniques 1302 and thus increase the spectral efficiency even further. QLO technique 1302 uses standard QAM modulation used in OFDM based multiple access technologies such as WIMAX or LTE. QLO technique 1302 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 14:
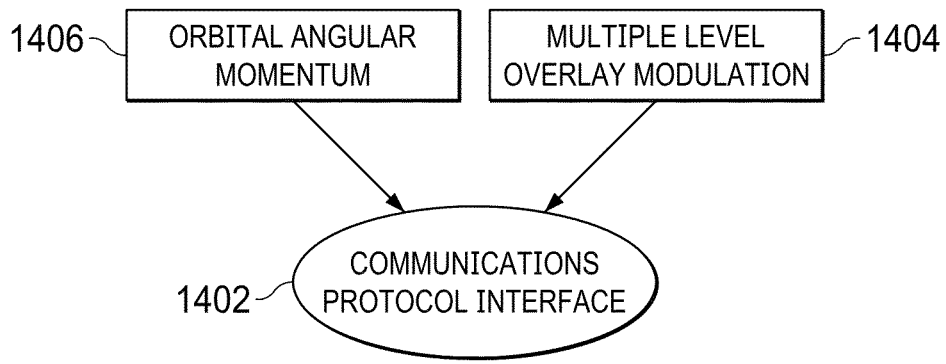
FIG. 14 illustrates a general overview of the manner for providing communication bandwidth between various communication protocol interfaces.

Referring now more particularly to FIG. 14, there is illustrated a general overview of the manner for providing improved communication bandwidth within various communication protocol interfaces 1402, using a combination of multiple level overlay modulation 1404 and the application of orbital angular momentum 1406 to increase the number of communications channels.

The various communication protocol interfaces 1402 may comprise a variety of communication links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 1404 with orbital angular momentum (OAM) technique 1406, a higher throughput over various types of communication links 1402 may be achieved. The use of multiple level overlay modulation alone without OAM increases the spectral efficiency of communication links 1402, whether wired, optical, or wireless. However, with OAM, the increase in spectral efficiency is even more significant.

Multiple overlay modulation techniques 1404 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 1404. Within the multiple level overlay modulation technique 1404, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time. At will have an envelope described by certain time-bandwidth minimizing signals. The time-bandwidth products for these signals take the form:

$$\Delta t \Delta f = \frac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 1406 provides a twist to wave fronts of the electromagnetic fields carrying the data stream that may enable the transmission of multiple data streams on the same frequency, wavelength, or other signal-supporting mechanism. Similarly, other orthogonal signals may be applied to the different data streams to enable transmission of multiple data streams on the same frequency, wavelength or other signal-supporting mechanism. This will increase the bandwidth over a communications link by allowing a single frequency or wavelength to support multiple Eigen channels, each of the individual channels having a different orthogonal and independent orbital angular momentum associated therewith.

Figure 15:
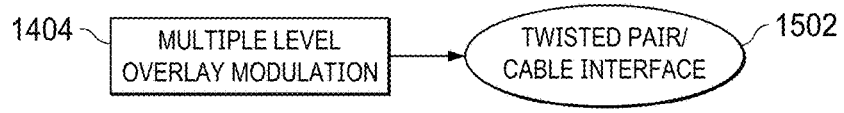
FIG. 15 illustrates the manner for utilizing multiple level overlay modulation with twisted pair/cable interfaces.

Referring now to FIG. 15, there is illustrated a further communication implementation technique using the above described techniques as twisted pairs or cables carry electrons (not photons). Rather than using each of the multiple level overlay modulation 1404 and orbital angular momentum techniques 1406, only the multiple level overlay modulation 1404 can be used in conjunction with a single wireline interface and, more particularly, a twisted pair communication link or a cable communication link 1502. The operation of the multiple level overlay modulation 1504, is similar to that discussed previously with respect to FIG. 14, but is used by itself without the use of orbital angular momentum techniques 1406, and is used with either a twisted pair communication link or cable interface communication link 1502 or with fiber optics, free space optics, RF used in cellular, backhaul and satellite, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), Internet of Things (IOT), Wi-Fi, Bluetooth, a personal device cable replacement, an RF and FSO hybrid system, Radar, electromagnetic tags and all types of wireless access.

Figure 16:
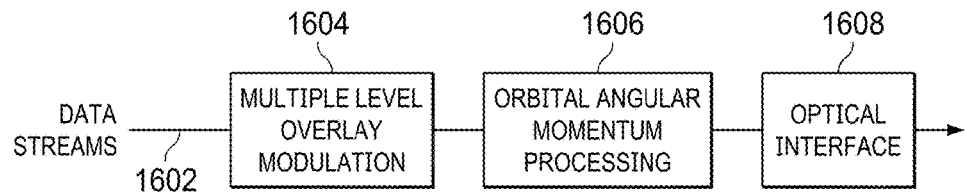
FIG. 16 illustrates a general block diagram for processing a plurality of data streams within an optical communication system.

Referring now to FIG. 16, there is illustrated a general block diagram for processing a plurality of data streams 1602 for transmission in an optical communication system. The multiple data streams 1602 are provided to the multi-layer overlay modulation circuitry 1604 wherein the signals are modulated using the multi-layer overlay modulation technique. The modulated signals are provided to orbital angular momentum processing circuitry 1606 which applies a twist to each of the wave fronts being transmitted on the wavelengths of the optical communication channel. The twisted waves are transmitted through the optical interface 1608 over an optical or other communications link such as an optical fiber or free space optics communication system. FIG. 16 may also illustrate an RF mechanism wherein the interface 1608 would comprise and RF interface rather than an optical interface.

Figure 17:
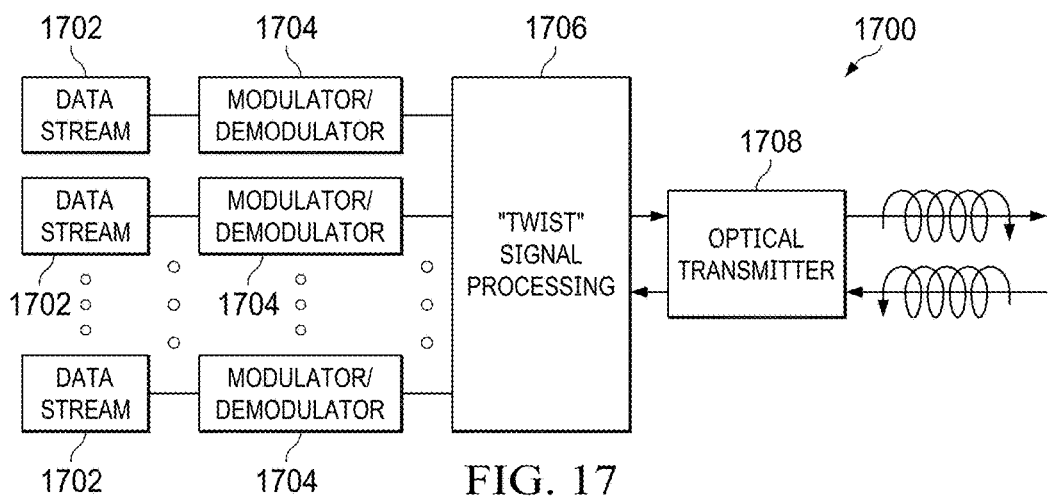
FIG. 17 is a functional block diagram of a system for generating orbital angular momentum within a communication system.

Referring now more particularly to FIG. 17, there is illustrated a functional block diagram of a system for generating the orbital angular momentum "twist" within a communication system, such as that illustrated with respect to FIG. 14, to provide a data stream that may be combined with multiple other data streams for transmission upon a same wavelength or frequency. Multiple data streams 1702 are provided to the transmission processing circuitry 1700. Each of the data streams 1702 comprises, for example, an end to end link connection carrying a voice call or a packet connection transmitting non-circuit switch packed data over a data connection. The multiple data streams 1702 are processed by modulator/demodulator circuitry 1704. The modulator/demodulator circuitry 1704 modulates the received data stream 1702 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 1706. The orbital angular momentum signal processing block 1706 applies in one embodiment an orbital angular momentum to a signal. In other embodiments the processing block 1706 can apply any orthogonal function to a signal being transmitted. These orthogonal functions can be spatial Bessel functions, Laguerre-Gaussian functions, Hermite-Gaussian functions or any other orthogonal function. Each of the modulated data streams from the modulator/demodulator 1704 are provided a different orbital angular momentum by the orbital angular momentum electromagnetic block 1706 such that each of the modulated data streams have a unique and different orbital angular momentum associated therewith. Each of the modulated signals having an associated orbital angular momentum are provided to an optical transmitter 1708 that transmits each of the modulated data streams having a unique orbital angular momentum on a same wavelength. Each wavelength has a selected number of bandwidth slots B and may have its data transmission capability increase by a factor of the number of degrees of orbital angular momentum 1 that are provided from the OAM electromagnetic block 1706. The optical transmitter 1708 transmitting signals at a single wavelength could transmit B groups of information. The optical transmitter 1708 and OAM electromagnetic block 1706 may transmit 1×B groups of information according to the configuration described herein.

In a receiving mode, the optical transmitter 1708 will have a wavelength including multiple signals transmitted therein having different orbital angular momentum signals embedded therein. The optical transmitter 1708 forwards these signals to the OAM signal processing block 1706, which separates each of the signals having different orbital angular momentum and provides the separated signals to the demodulator circuitry 1704. The demodulation process extracts the data streams 1702 from the modulated signals and provides it at the receiving end using the multiple layer overlay demodulation technique.

Figure 18:
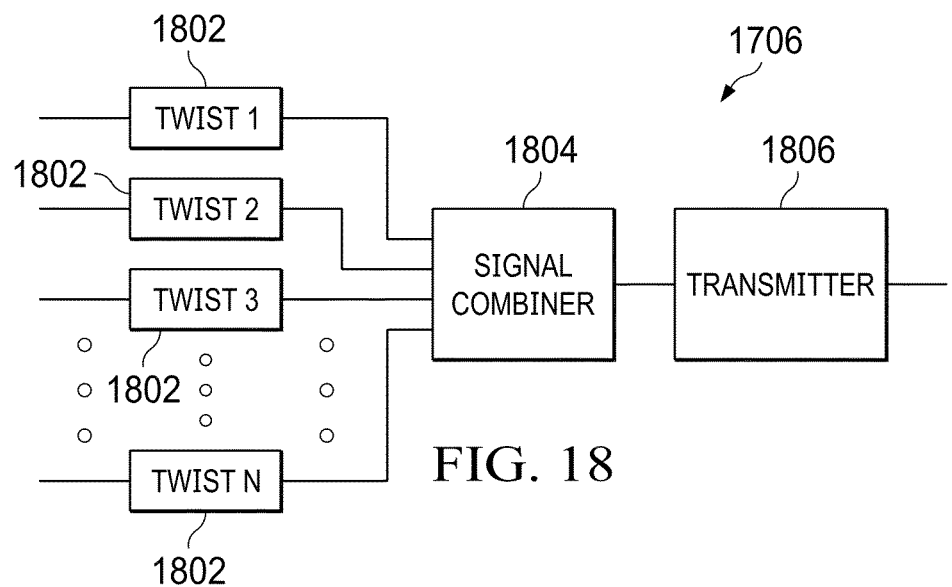
FIG. 18 is a functional block diagram of the orbital angular momentum signal processing block of FIG. 17.

Referring now to FIG. 18, there is provided a more detailed functional description of the OAM signal processing block 1706. Each of the input data streams are provided to OAM circuitry 1802. Each of the OAM circuitry 1802 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 1802 are unique to the data stream that is provided thereto. An infinite number of orbital angular momentums may be applied to different input data streams using many different currents. Each of the separately generated data streams are provided to a signal combiner 1804, which combines/multiplexes the signals onto a wavelength for transmission from the transmitter 1806. The combiner 1804 performs a spatial mode division multiplexing to place all of the signals upon a same carrier signal in the space domain.

Figure 19:
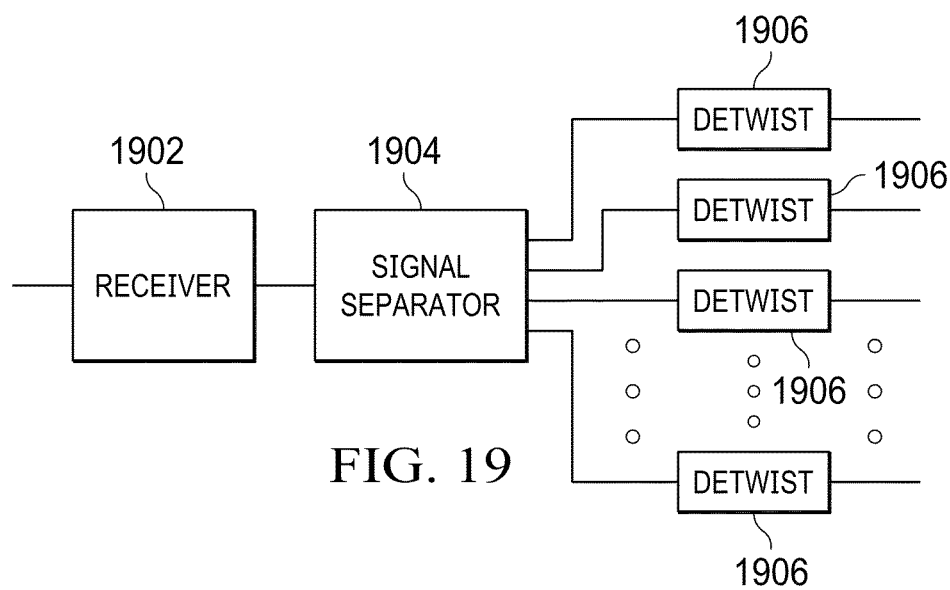
FIG. 19 is a functional block diagram illustrating the manner for removing orbital angular momentum from a received signal including a plurality of data streams.

Referring now to FIG. 19, there is illustrated the manner in which the OAM processing circuitry 1706 may separate a received signal into multiple data streams. The receiver 1902 receives the combined OAM signals on a single wavelength and provides this information to a signal separator 1904. The signal separator 1904 separates each of the signals having different orbital angular momentums from the received wavelength and provides the separated signals to OAM de-twisting circuitry 1906. The OAM de-twisting circuitry 1906 removes the associated OAM twist from each of the associated signals and provides the received modulated data stream for further processing. The signal separator 1904 separates each of the received signals that have had the orbital angular momentum removed therefrom into individual received signals. The individually received signals are provided to the receiver 1902 for demodulation using, for example, multiple level overlay demodulation as will be more fully described herein below.

FIG. 20 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 2002 represents the potentially available signals for a left handed signal polarization, while the bottom grid 2004 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 2006 in both the left handed polarization plane 2002 and the right handed polarization plane 2004 can provide an infinite number of signals at different orbital angular momentum states Δl. Blocks 2008 and 2010 represent a particular signal having an orbital angular momentum Δl at a frequency Δω or wavelength in both the right handed polarization plane 2004 and left handed polarization plane 2010, respectively. By changing to a different orbital angular momentum within the same frequency Δω or wavelength 2006, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 20, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Figure 21A:
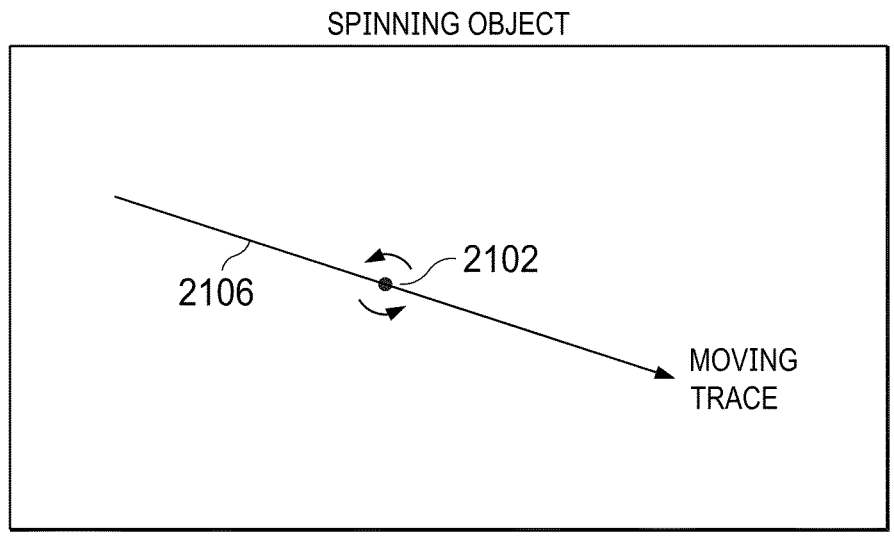
FIG. 21A illustrates an object with only a spin angular momentum.
Figure 21B:
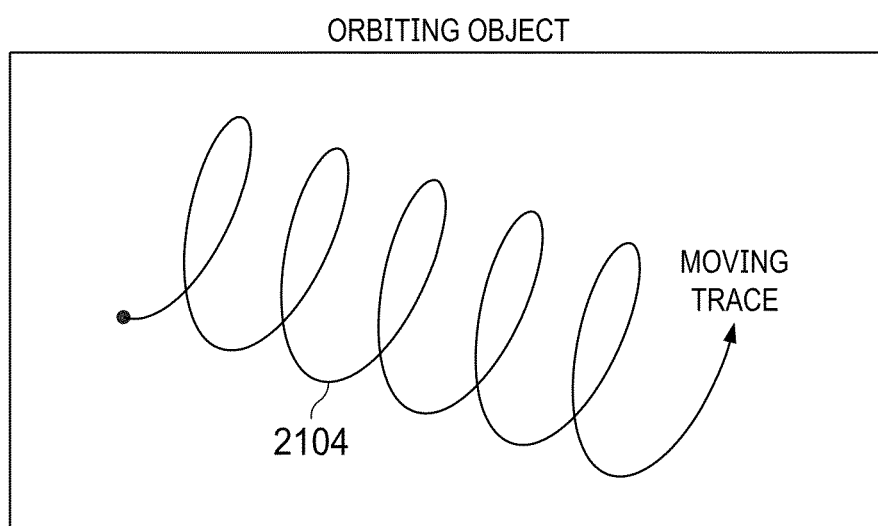
FIG. 21B illustrates an object with an orbital angular momentum.
Figure 21C:
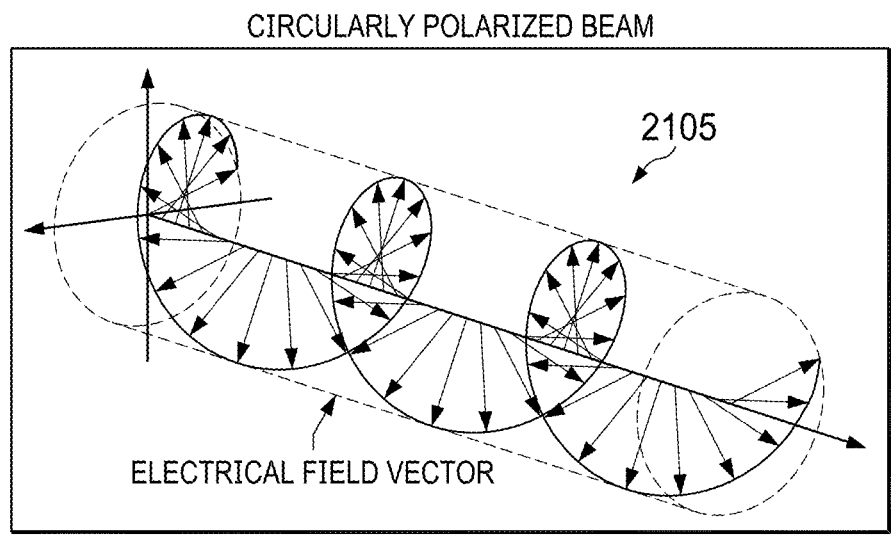
FIG. 21C illustrates a circularly polarized beam carrying spin angular momentum.
Figure 21D:
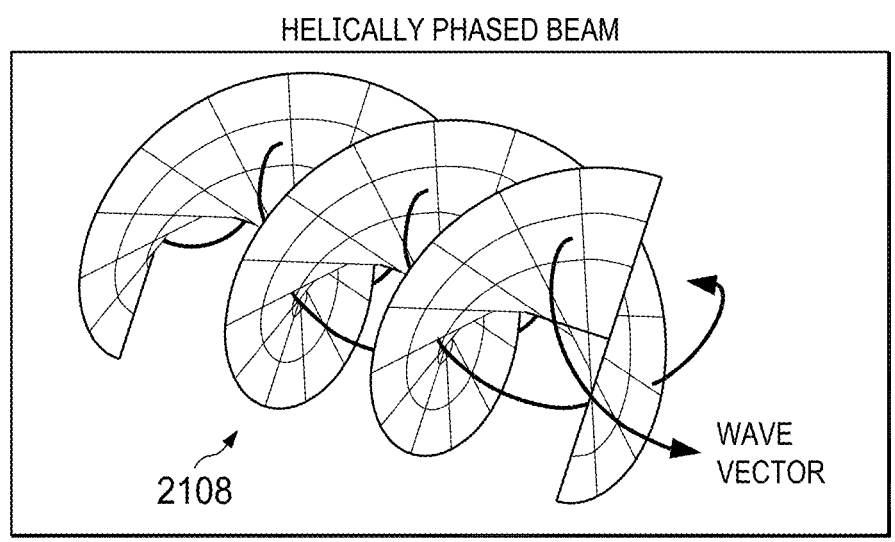
FIG. 21D illustrates the phase structure of a light beam carrying an orbital angular momentum.

It is well-known that the concept of linear momentum is usually associated with objects moving in a straight line. The object could also carry angular momentum if it has a rotational motion, such as spinning (i.e., spin angular momentum (SAM) 2102), or orbiting around an axis 2106 (i.e., OAM 2104), as shown in FIGS. 21A and 21B, respectively. A light beam may also have rotational motion as it propagates. In paraxial approximation, a light beam carries SAM 2102 if the electrical field rotates along the beam axis 2106 (i.e., circularly polarized light 2105), and carries OAM 2104 if the wave vector spirals around the beam axis 2106, leading to a helical phase front 2108, as shown in FIGS. 21C and 21D. In its analytical expression, this helical phase front 2108 is usually related to a phase term of $\exp(il\theta)$ in the transverse plane, where θ refers to the angular coordinate, and l is an integer indicating the number of intertwined helices (i.e., the number of 2π phase shifts along the circle around the beam axis). l could be a positive, negative integer or zero, corresponding to clockwise, counterclockwise phase helices or a Gaussian beam with no helix, respectively.

Two important concepts relating to OAM include: 1) OAM and polarization: As mentioned above, an OAM beam is manifested as a beam with a helical phase front and therefore a twisting wavevector, while polarization states can only be connected to SAM 2102. A light beam carries SAM 2102 of ±h/2π (h is Plank's constant) per photon if it is left or right circularly polarized, and carries no SAM 2102 if it is linearly polarized. Although the SAM 2102 and OAM 2104 of light can be coupled to each other under certain scenarios, they can be clearly distinguished for a paraxial light beam. Therefore, with the paraxial assumption, OAM 2104 and polarization can be considered as two independent properties of light.

2) OAM beam and Laguerre-Gaussian (LG) beam: In general, an OAM-carrying beam could refer to any helically phased light beam, irrespective of its radial distribution (although sometimes OAM could also be carried by a non-helically phased beam). LG beam is a special subset among all OAM-carrying beams, due to that the analytical expression of LG beams are eigen-solutions of paraxial form of the wave equation in a cylindrical coordinates. For an LG beam, both azimuthal and radial wavefront distributions are well defined, and are indicated by two index numbers, f and p, of which f has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same ℓ index but a different p index) due to the absence of radial definition. The term of "OAM beam" refers to all helically phased beams, and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electrotonic states (the Ag field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the Ag potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2) \quad \text{Hamiltonian (total energy)}$$

$$\frac{dU^{mech}}{dt} + \frac{dU^{em}}{dt} + \oint_{s'} d^2 x' \hat{n}' \cdot S = 0 \quad \text{conservation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B) \quad \text{linear momentum}$$

$$\frac{dp^{mech}}{dt} + \frac{dp^{em}}{dt} + \oint_{s'} d^2 x' \hat{n}' \cdot T = 0 \quad \text{conservation of linear momentum}$$

The conservation of system center of energy is represented by the equation:

$$R = \frac{1}{H} \sum_i (x_i - x_0) m_i \gamma_i c^2 + \frac{\varepsilon_0}{2H} \int d^3 x (x - x_0)(|E^2| + c^2 |B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' \hat{n}' \cdot M = 0 \quad \text{conservation of angular momentum}$$

For radiation beams in free space, the EM field angular momentum $J^{em}$ can be separated into two parts:

$$j^{em} = \varepsilon_0 \int_{V'} d^3 x' (E \times A) + \varepsilon_0 \int_{V'} d^3 x' E_i [(x' - x_0) \times \nabla] A_i$$

For each singular Fourier mode in real valued representation:

$$J^{em} = -i \frac{\varepsilon_0}{2\omega} \int_{V'} d^3 x' (E^* \times E) - i \frac{\varepsilon_0}{2\omega} \int_{V'} d^3 x' E_i [(x' - x_0) \times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $p^{em}$, and EM angular momentum $J^{em} = L^{em} + S^{em}$ are radiated all the way to the far field.

By using Poynting theorem, the optical vorticity of the signals may be determined according to the optical velocity equation:

$$\frac{\partial U}{\partial t} + \nabla \cdot S = 0, \quad \text{continuity equation}$$

where S is the Poynting vector $$S = \frac{1}{4}(E \times H^* + E^* \times H),$$

and U is the energy density $$U = \frac{1}{4}(\varepsilon|E|^2 + \mu_0|H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon|E|^2 + \mu_0|H|^2} \right)$$

Figure 22A:
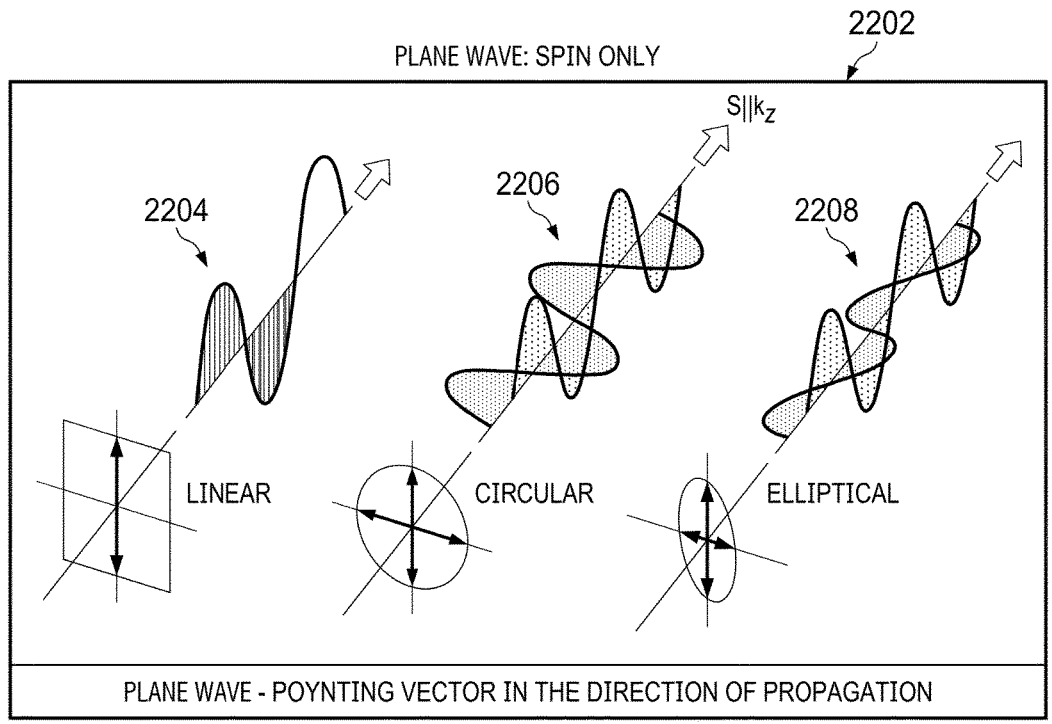
FIG. 22A illustrates a plane wave having only variations in the spin angular momentum.
Figure 22B:
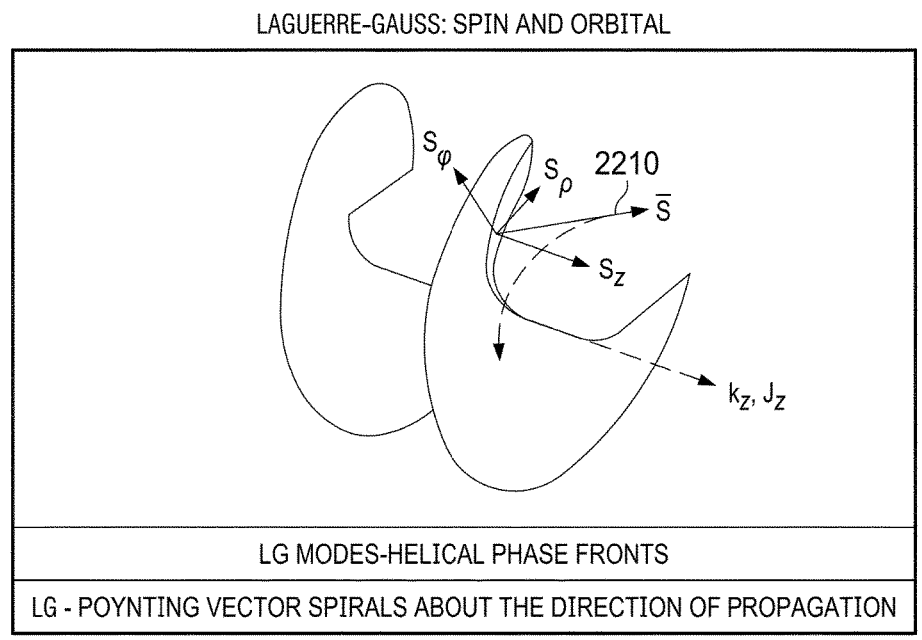
FIG. 22B illustrates a signal having both spin and orbital angular momentum applied thereto.

Referring now to FIGS. 22A and 22B, there is illustrated the manner in which a signal and its associated Poynting vector in a plane wave situation. In the plane wave situation illustrated generally at 2202, the transmitted signal may take one of three configurations. When the electric field vectors are in the same direction, a linear signal is provided, as illustrated generally at 2204. Within a circular polarization 2206, the electric field vectors rotate with the same magnitude. Within the elliptical polarization 2208, the electric field vectors rotate but have differing magnitudes. The Poynting vector remains in a constant direction for the signal configuration to FIG. 22A and always perpendicular to the electric and magnetic fields. Referring now to FIG. 22B, when a unique orbital angular momentum is applied to a signal as described here and above, the Poynting vector S 2210 will spiral about the direction of propagation of the signal. This spiral may be varied in order to enable signals to be transmitted on the same frequency as described herein.

Figure 23A:
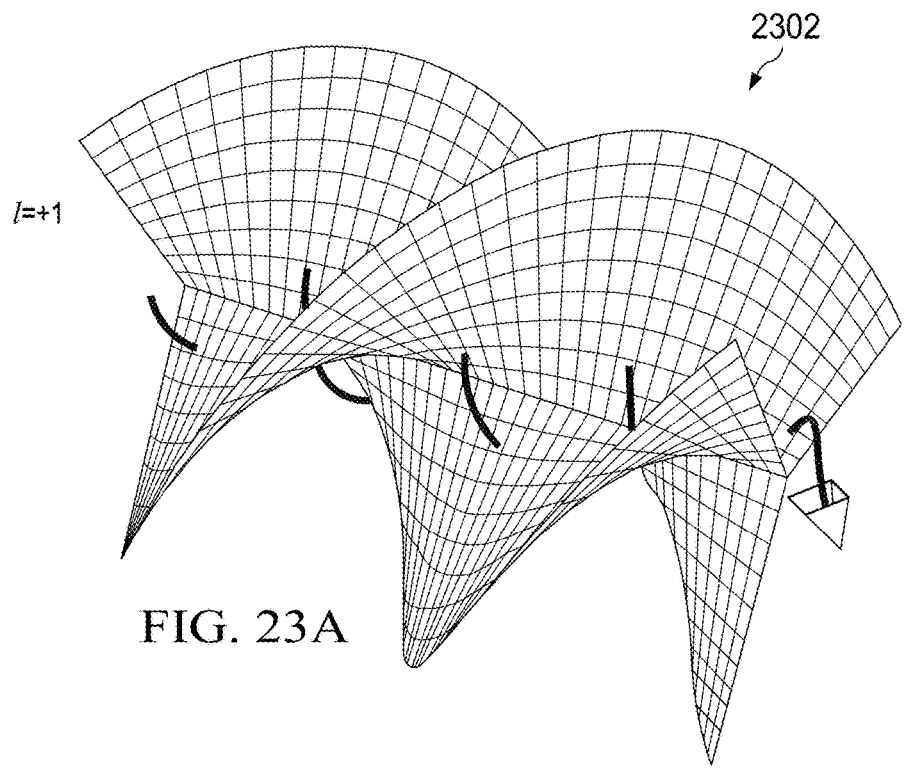
FIGS. 23A-23C illustrate various signals having different orbital angular momentum applied thereto.
Figure 23B:
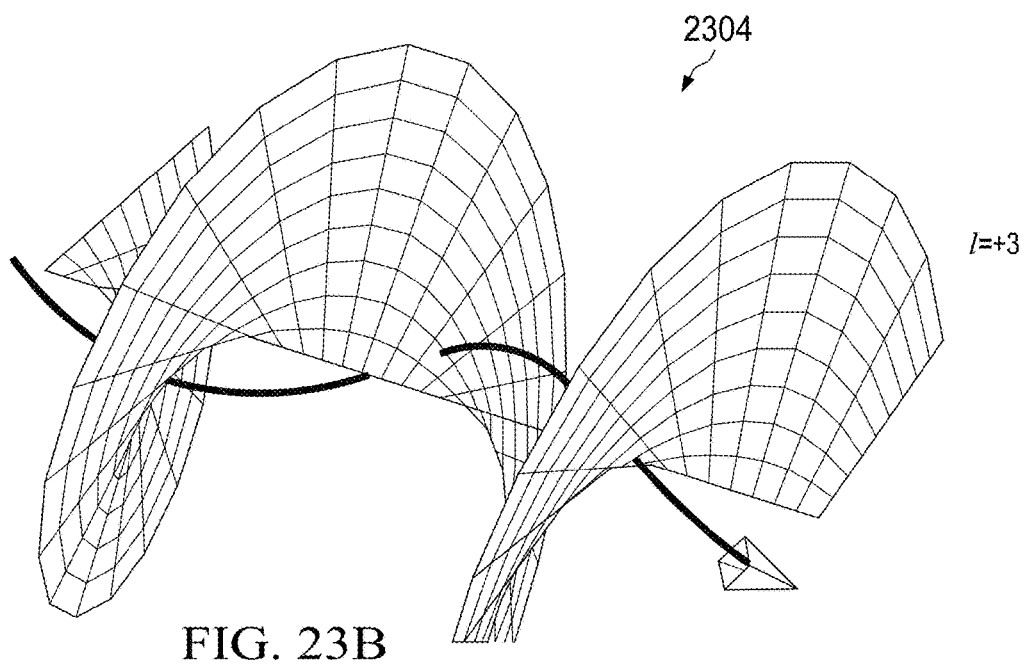
Figure 23C:
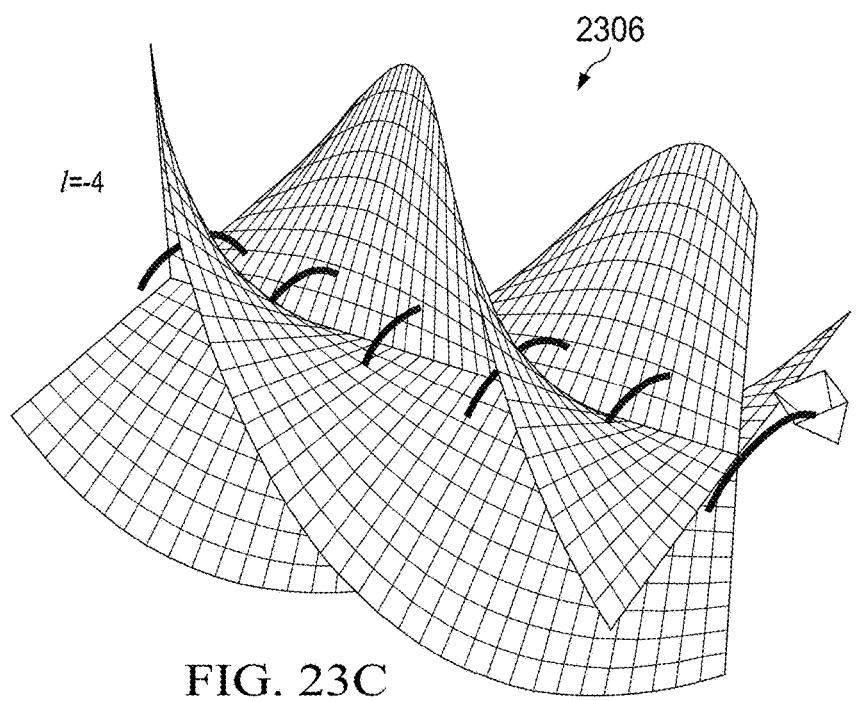

FIGS. 23A through 23C illustrate the differences in signals having different helicity (i.e., orbital angular momentums). Each of the spiraling Poynting vectors associated with the signals 2302, 2304, and 2306 provide a different shaped signal. Signal 2302 has an orbital angular momentum of +1, signal 2304 has an orbital angular momentum of +3, and signal 2306 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 23D:
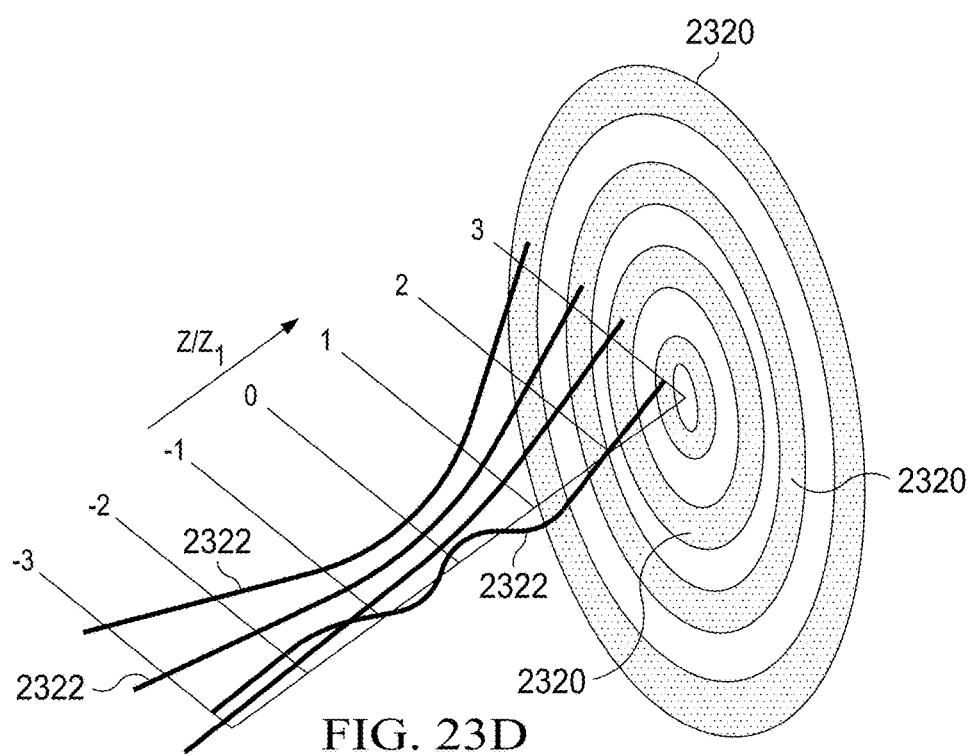
FIG. 23D illustrates a propagation of Poynting vectors for various Eigen modes.

FIG. 23D illustrates the propagation of Poynting vectors for various Eigen modes. Each of the rings 2320 represents a different Eigen mode or twist representing a different orbital angular momentum within the same frequency. Each of these rings 2320 represents a different orthogonal channel. Each of the Eigen modes has a Poynting vector 2322 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "I" or the amount of twist or OAM applied to the signal. Also, use of the orthogonal functions discussed herein above may also be multiplexed together onto a same signal in order to transmit multiple streams of information. The helicity index may be positive or negative. In wireless communications, different topological charges/orthogonal functions can be created and muxed together and de-muxed to separate the topological charges charges/orthogonal functions. The signals having different orthogonal function are spatially combined together on a same signal but do not interfere with each other since they are orthogonal to each other.

The topological charges l s can be created using Spiral Phase Plates (SPPs) as shown in FIG. 23E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

Cross talk and multipath interference can be corrected using RF Multiple-Input-Multiple-Output (MIMO). Most of the channel impairments can be detected using a control or pilot channel and be corrected using algorithmic techniques (closed loop control system).

While the application of orbital angular momentum to various signals allow the signals to be orthogonal to each other and used on a same signal carrying medium, other orthogonal function/signals can be applied to data streams to create the orthogonal signals on the same signal media carrier.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time. At will have an envelope described by certain time-bandwidth minimizing signals. The time-bandwidth products for these signals take the form;

$$\Delta t \Delta f = \frac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms. These types of orthogonal signals that reduce the time bandwidth product and thereby increase the spectral efficiency of the channel.

Hermite-Gaussian polynomials are one example of a classical orthogonal polynomial sequence, which are the Eigenstates of a quantum harmonic oscillator. Signals based on Hermite-Gaussian polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, and Laguerre-Gaussian polynomials. Q-functions are another class of functions that can be employed as a basis for MLO signals.

In addition to the time bandwidth minimization described above, the plurality of data streams can be processed to provide minimization of the Space-Momentum products in spatial modulation. In this case:

$$\Delta x \Delta p = \frac{1}{2}$$

Processing of the data streams in this manner create wavefronts that are spatial. The processing creates wavefronts that are also orthogonal to each other like the OAM twisted functions but these comprise different types of orthogonal functions that are in the spatial domain rather than the temporal domain.

The above described scheme is applicable to twisted pair, coaxial cable, fiber optic, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Hermite Gaussian Beams

Hermite Gaussian beams may also be used for transmitting orthogonal data streams. In the scalar field approximation (e.g. neglecting the vector character of the electromagnetic field), any electric field amplitude distribution can be represented as a superposition of plane waves, i.e. by:

$$E \propto \int\int \frac{dk_x dk_y}{(2\pi)^2} A(k_x, k_y) e^{ik_x x + ik_y y + ik_z z + iz\sqrt{k^2 - k_x^2 - k_y^2}}$$

This representation is also called angular spectrum of plane waves or plane-wave expansion of the electromagnetic field. Here $A(k_x, k_y)$ is the amplitude of the plane wave. This representation is chosen in such a way that the net energy flux connected with the electromagnetic field is towards the propagation axis z. Every plane wave is connected with an energy flow that has direction k. Actual lasers generate a spatially coherent electromagnetic field which has a finite transversal extension and propagates with moderate spreading. That means that the wave amplitude changes only slowly along the propagation axis (z-axis) compared to the wavelength and finite width of the beam. Thus, the paraxial approximation can be applied, assuming that the amplitude function $A(k_x, k_y)$ falls off sufficiently fast with increasing values of $(k_x, k_y)$.

Two principal characteristics of the total energy flux can be considered: the divergence (spread of the plane wave amplitudes in wave vector space), defined as:

$$\text{Divergence} \propto \int\int \frac{dk_x dk_y}{(2\pi)^2}(K_x^2 + K_y^2)|A(k_x, k_y)|^2$$

and the transversal spatial extension (spread of the field intensity perpendicular to the z-direction) defined as:

$$\text{Transversal Extention} \propto \int_{-\infty}^{\infty} dx \int_{-\infty}^{\infty} dy (x^2 + y^2)|E|^2 =$$

-continued $$\int\int \frac{dk_x dk_y}{(2\pi)^2}\left[\left|\frac{\partial A}{\partial x}\right|^2 + \left|\frac{\partial A}{\partial y}\right|^2\right]$$

Let's now look for the fundamental mode of the beam as the electromagnetic field having simultaneously minimal divergence and minimal transversal extension, i.e. as the field that minimizes the product of divergence and extension. By symmetry reasons, this leads to looking for an amplitude function minimizing the product:

$$\left[\int_{-\infty}^{\infty} \frac{dk_x}{(2\pi)} k_x^2 |A|^2\right]\left[\int_{-\infty}^{\infty} \frac{dk_x}{(2\pi)} \left|\frac{\partial A}{\partial k_x}\right|^2\right] = \frac{\|A\|^4}{(8\pi^2)^2}$$

Thus, seeking the field with minimal divergence and minimal transversal extension can lead directly to the fundamental Gaussian beam. This means that the Gaussian beam is the mode with minimum uncertainty, i.e. the product of its sizes in real space and wave-vector space is the theoretical minimum as given by the Heisenberg's uncertainty principle of Quantum Mechanics. Consequently, the Gaussian mode has less dispersion than any other optical field of the same size, and its diffraction sets a lower threshold for the diffraction of real optical beams.

Hermite-Gaussian beams are a family of structurally stable laser modes which have rectangular symmetry along the propagation axis. In order to derive such modes, the simplest approach is to include an additional modulation of the form:

$$E_{m,n}^H = \int_{-\infty}^{\infty} \frac{dk_x dk_y}{(2\pi)^2} (ik_x)^m (ik_y)^n e^s$$

$$S(k_x, k_y, x, y, z) = ik_x x + ik_y y + ik_z z - \frac{W_0}{4}\left(1 + i\frac{Z}{Z_R}\right)[k_x^2 + k_y^2]$$

The new field modes occur to be differential derivatives of the fundamental Gaussian mode $E_0$.

$$E_{m,n}^H = \frac{\partial^{m+n}}{\partial x^m \partial y^n} E_0$$

Looking at the explicit form E0 shows that the differentiations in the last equation lead to expressions of the form:

$$\frac{\partial^P}{\partial x^P} e^{(-\alpha x^2)}$$

with some constant p and α. Using now the definition of Hermits' polynomials, $$H_p(x) = (-1)^p e^{(x^2)} \frac{d^P}{dx^P} e^{(-\alpha x^2)}$$

Then the field amplitude becomes $$E_{m,n}^H(x, y, z) = \sum_m \sum_n C_{mn} E_0 \frac{w_0}{w(z)} H_m\left(\sqrt{2}\frac{x}{w(z)}\right)$$

$$H_n\left(\sqrt{2}\frac{y}{w(z)}\right) e^{\frac{-(x^2+y^2)}{w(z)^2}} e^{-j(m+n+1)\tan^{-1}z/z_R} e^{\frac{-(x^2+y^2)}{2R(z)}}$$

Where $\rho^2 = x^2 + y^2$ $\xi = \frac{z}{z_R}$ and Rayleigh length $z_R$ $Z_R = \frac{\pi w_0^2}{\lambda}$ And beam diameter $w(\xi) = w_0\sqrt{(1+\xi^2)}$ In cylindrical coordinates, the field takes the form:

$$E_{l,p}^L(\rho, \varphi, z) = \sum_l \sum_{np} C_{lp} E_0 \frac{w_0}{w(z)}\left(\sqrt{2}\frac{\rho}{w(z)}\right)^l$$

$$L_p^l\left(\sqrt{2}\frac{\rho}{w(z)}\right) e^{\frac{-\rho^2}{w(z)^2}} e^{-j(2p+l+1)\tan^{-1}z/z_R} e^{jl\varphi} e^{\frac{-jk\rho^2}{2R(z)}}$$

Where $L_p^l$ is Laguerre functions.

Mode division multiplexing (MDM) of multiple orthogonal beams increases the system capacity and spectral efficiency in optical communication systems. For free space systems, multiple beams each on a different orthogonal mode can be transmitted through a single transmitter and receiver aperture pair. Moreover, the modal orthogonality of different beans enables the efficient multiplexing at the transmitter and demultiplexing at the receiver.

Different optical modal basis sets exist that exhibit orthogonality. For example, orbital angular momentum (OAM) beams that are either Laguerre Gaussian (LG or Laguerre Gaussian light modes may be used for multiplexing of multiple orthogonal beams in free space optical and RF transmission systems. However, there exist other modal groups that also may be used for multiplexing that do not contain OAM. Hermite Gaussian (HG) modes are one such modal group. The intensity of an $HG_{m,n}$ beam is shown according to the equation:

$$I(x, y, z) = C_{m,n} H_m^2\left(\frac{\sqrt{2}x}{w(z)}\right) H_n^2\left(\frac{\sqrt{2}y}{w(z)}\right) \times \exp\left(-\frac{2x^2}{w(z)^2} - \frac{2y^2}{w(z)^2}\right),$$

$$w(z) = w_0\sqrt{1 + [\lambda z/\pi w_0^2]}$$

in which $H_m(*)$ and $H_n(*)$ are the Hermite polynomials of the mth and nth order. The value $w_0$ is the beam waist at distance Z=0. The spatial orthogonality of HG modes with the same beam waist $w_0$ relies on the orthogonality of Hermite polynomial in x or y directions.

Figure 24:
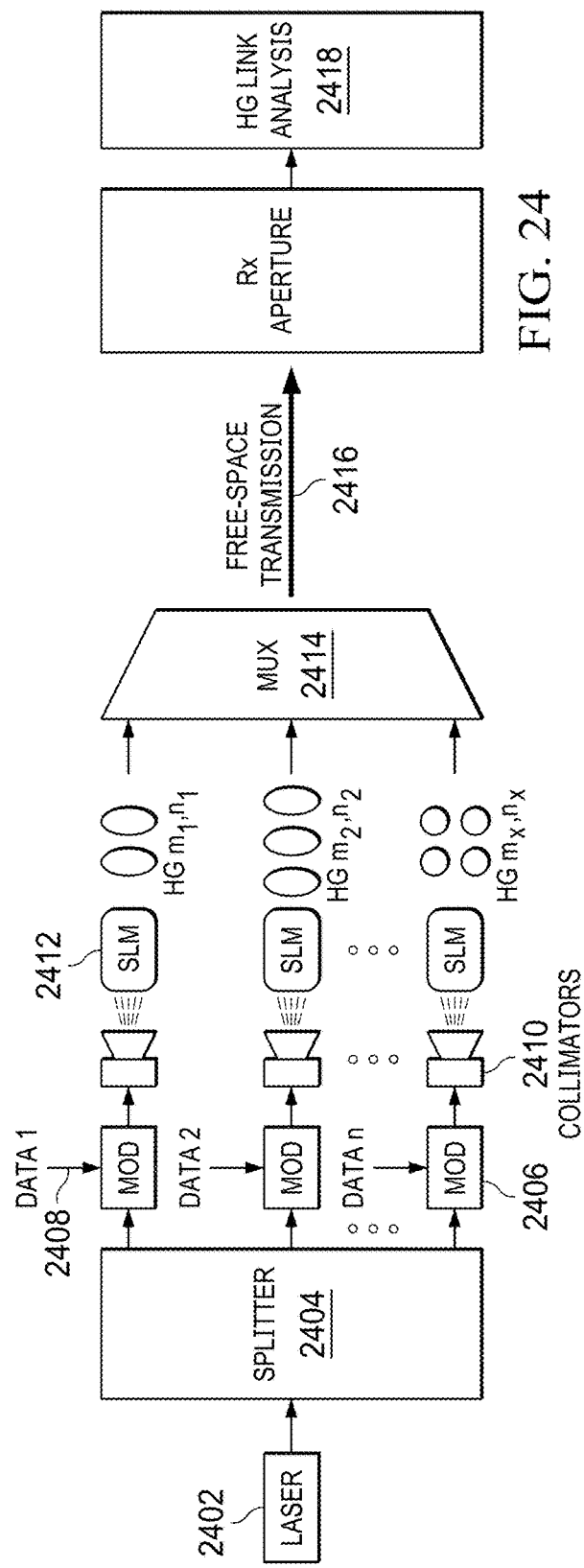
FIG. 24 illustrates a system for using to the orthogonality of an HG modal group for free space spatial multiplexing.

Referring now to FIG. 24, there is illustrated a system for using the orthogonality of an HG modal group for free space spatial multiplexing in free space. A laser 2402 is provided to a beam splitter 2404. The beam splitter 2404 splits the beam into multiple beams that are each provided to a modulator 2406 for modulation with a data stream 2408. The modulated beam is provided to collimators 2410 that provides a collimated light beam to spatial light modulators 2412. Spatial light modulators (SLM's) 2412 may be used for transforming input plane waves into HG modes of different orders, each mode carrying an independent data channel. These HG modes are spatially multiplexed using a multiplexer 2414 and coaxially transmitted over a free space link 2416. At the receiver 2418 there are several factors that may affect the demultiplexing of these HG modes, such as receiver aperture size, receiver lateral displacement and receiver angular error. These factors affect the performance of the data channel such as signal-to-noise ratio and crosstalk.

With respect to the characteristics of a diverged $HG_{m,0}$ beam (m=0-6), the wavelength is assumed to be 1550 nm and the transmitted power for each mode is 0 dBm. Higher order HG modes have been shown to have larger beam sizes. For smaller aperture sizes less power is received for higher order HG modes due to divergence at greater distances.

Since the orthogonality of HG modes relies on the optical field distribution in the x and y directions, a finite receiver aperture may truncate the beam. The truncation will destroy the orthogonality and cost crosstalk of the HG channels. When an aperture is smaller, there is higher crosstalk to the other modes. When a finite receiver is used, if an HG mode with an even (odd) order is transmitted, it only causes cross talk to other HG modes with even (odd) numbers. This is explained by the fact that the orthogonality of the odd and even HG modal groups remains when the beam is systematically truncated.

Moreover, misalignment of the receiver may cause crosstalk. In one example, lateral displacement can be caused when the receiver is not aligned with the beam axis. In another example, angular error may be caused when the receiver is on axis but there is an angle between the receiver orientation and the beam propagation axis. As the lateral displacement increases, less power is received from the transmitted power mode and more power is leaked to the other modes. There is less crosstalk for the modes with larger mode index spacing from the transmitted mode. Thus, specific lateral displacement characteristics may be used as a function of power for differing OAM helicity values.

Figure 25:
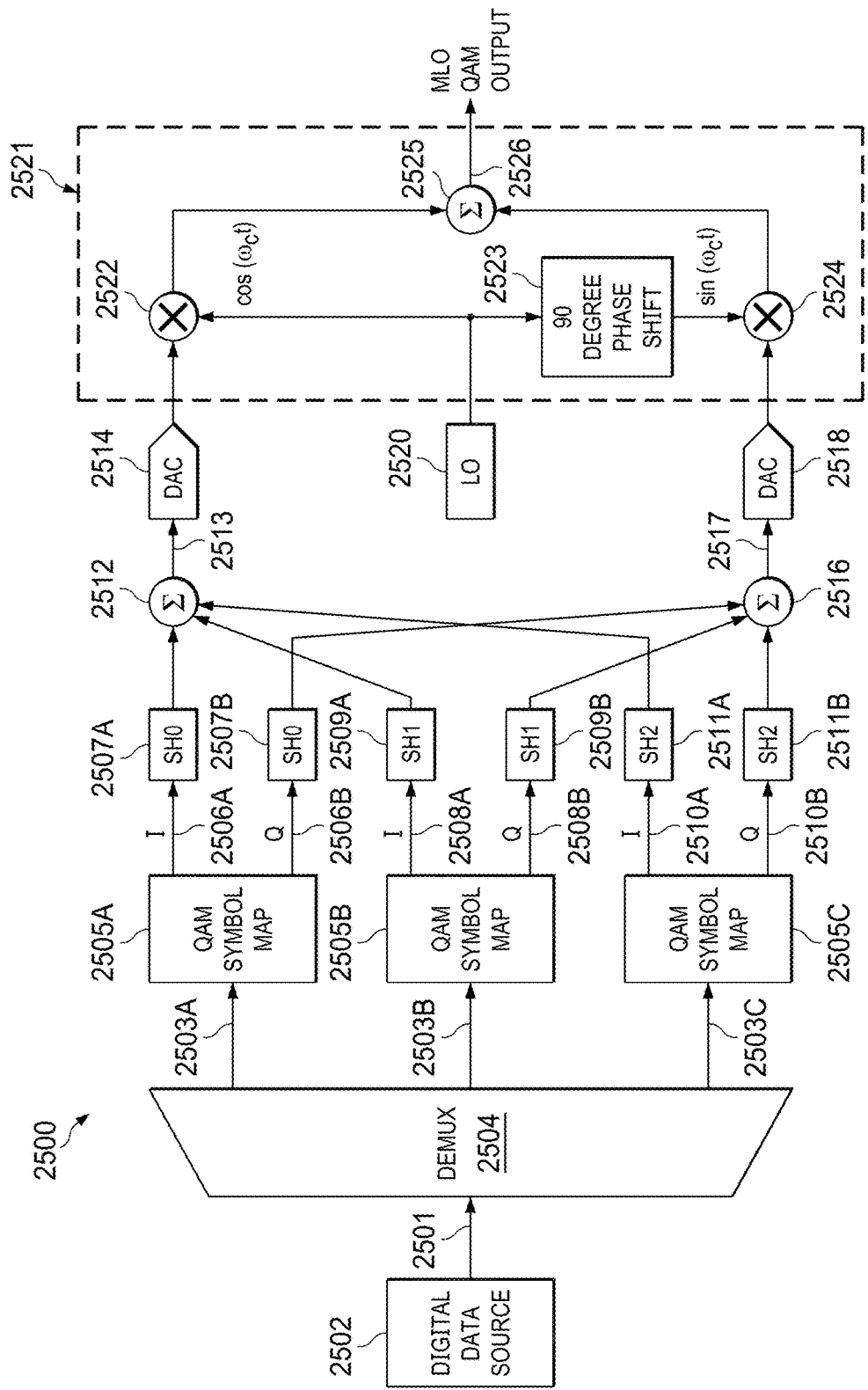
FIG. 25 illustrates a multiple level overlay modulation system.

Referring now to FIG. 25, the reference number 2500 generally indicates an embodiment of a multiple level overlay (MLO) modulation system, although it should be understood that the term MLO and the illustrated system 2500 are examples of embodiments. The MLO system may comprise one such as that disclosed in U.S. Pat. No. 8,503,546 entitled Multiple Layer Overlay Modulation which is incorporated herein by reference. In one example, the modulation system 2500 would be implemented within the multiple level overlay modulation box 504 of FIG. 16. System 2500 takes as input an input data stream 2501 from a digital source 2502, which is separated into three parallel, separate data streams, 2503A-2503C, of logical 1s and 0s by input stage demultiplexer (DEMUX) 2504. Data stream 2501 may represent a data file to be transferred, or an audio or video data stream. It should be understood that a greater or lesser number of separated data streams may be used. In some of the embodiments, each of the separated data streams 2503A-2503C has a data rate of 1/N of the original rate, where N is the number of parallel data streams. In the embodiment illustrated in FIG. 25, N is 3.

Each of the separated data streams 2503A-2503C is mapped to a quadrature amplitude modulation (QAM) symbol in an M-QAM constellation, for example, 16 QAM or 64 QAM, by one of the QAM symbol mappers 2505A-C. The QAM symbol mappers 2505A-C are coupled to respective outputs of DEMUX 2504, and produced parallel in phase (I) 2506A, 2508A, and 2510A and quadrature phase (Q) 2506B, 2508B, and 2510B data streams at discrete levels. For example, in 64 QAM, each I and Q channel uses 8 discrete levels to transmit 3 bits per symbol. Each of the three I and Q pairs, 2506A-2506B, 2508A-2508B, and 2510A-2510B, is used to weight the output of the corresponding pair of function generators 2507A-2507B, 2509A-2509B, and 2511A-2511B, which in some embodiments generate signals such as the modified Hermite polynomials described above and weights them based on the amplitude value of the input symbols. This provides 2N weighted or modulated signals, each carrying a portion of the data originally from income data stream 2501, and is in place of modulating each symbol in the I and Q pairs, 2506A-2506B, 2508A-2508B, and 2510A-2510B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

While the description relates to the application of QLO modulation to improve operation of a quadrature amplitude modulation (QAM) system, the application of QLO modulation will also improve the spectral efficiency of other legacy modulation schemes.

The weighted signals are not subcarriers, but rather are sublayers of a modulated carrier, and are combined, superimposed in both frequency and time, using summers 2512 and 2516, without mutual interference in each of the I and Q dimensions, due to the signal orthogonality. Summers 2512 and 2516 act as signal combiners to produce composite signals 2513 and 2517. The weighted orthogonal signals are used for both I and Q channels, which have been processed equivalently by system 2500, and are summed before the QAM signal is transmitted. Therefore, although new orthogonal functions are used, some embodiments additionally use QAM for transmission. Because of the tapering of the signals in the time domain, as will be shown in FIGS. 29A through 29K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 2513 and 2517 are converted to analogue signals 2515 and 2519 using digital to analogue converters 2514 and 2518, and are then used to modulate a carrier signal at the frequency of local oscillator (LO) 2520, using modulator 2521. Modulator 2521 comprises mixers 2522 and 2524 coupled to DACs 2514 and 2518, respectively. Ninety degree phase shifter 2523 converts the signals from LO 2520 into a Q component of the carrier signal. The output of mixers 2522 and 2524 are summed in summer 2525 to produce output signals 2526.

MLO can be used with a variety of transport mediums, such as wire, optical, and wireless, and may be used in conjunction with QAM. This is because MLO uses spectral overlay of various signals, rather than spectral overlap. Bandwidth utilization efficiency may be increased by an order of magnitude, through extensions of available spectral resources into multiple layers. The number of orthogonal signals is increased from 2, cosine and sine, in the prior art, to a number limited by the accuracy and jitter limits of generators used to produce the orthogonal polynomials. In this manner, MLO extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. MLO may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to twisted pair, coaxial cable, fiber optic, RF satellite, RF broadcast, RF point-to-point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Figure 26:
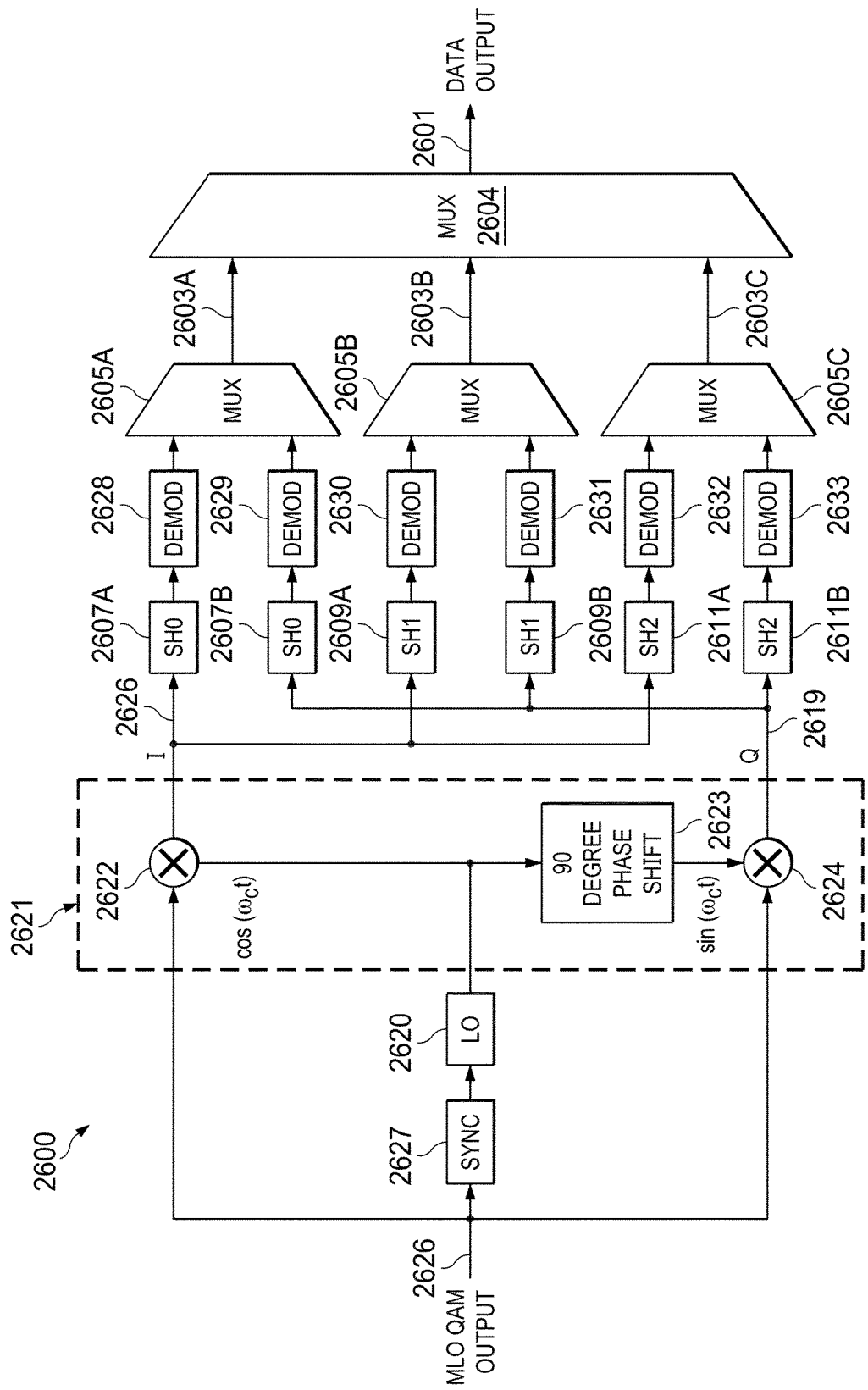
FIG. 26 illustrates a multiple level overlay demodulator.

Referring now to FIG. 26, an MLO demodulator 2600 is illustrated, although it should be understood that the term MLO and the illustrated system 2600 are examples of embodiments. The modulator 2600 takes as input an MLO signal 2626 which may be similar to output signal 2626 from system 2500. Synchronizer 2627 extracts phase information, which is input to local oscillator 2620 to maintain coherence so that the modulator 2621 can produce base band to analogue I signal 2615 and Q signal 2619. The modulator 2621 comprises mixers 2622 and 2624, which, coupled to OL 2620 through 90 degree phase shifter 2623. I signal 2615 is input to each of signal filters 2607A, 2609A, and 2611A, and Q signal 2619 is input to each of signal filters 2607B, 2609B, and 2611B. Since the orthogonal functions are known, they can be separated using correlation or other techniques to recover the modulated data. Information in each of the I and Q signals 2615 and 2619 can be extracted from the overlapped functions which have been summed within each of the symbols because the functions are orthogonal in a correlative sense.

In some embodiments, signal filters 2607A-2607B, 2609A-2609B, and 2611A-2611B use locally generated replicas of the polynomials as known signals in match filters. The outputs of the match filters are the recovered data bits, for example, equivalence of the QAM symbols 2606A-2606B, 2608A-2608B, and 2610A-2610B of system 2600. Signal filters 2607A-2607B, 2609A-2609B, and 2611A-2611B produce 2n streams of n, I, and Q signal pairs, which are input into demodulators 2628-2633. Demodulators 2628-2633 integrate the energy in their respective input signals to determine the value of the QAM symbol, and hence the logical is and Os data bit stream segment represented by the determined symbol. The outputs of the modulators 2628-2633 are then input into multiplexers (MUXs) 2605A-2605C to generate data streams 2603A-2603C. If system 2600 is demodulating a signal from system 2500, data streams 2603A-2603C correspond to data streams 2503A-2503C. Data streams 2603A-2603C are multiplexed by MUX 2604 to generate data output stream 2601. In summary, MLO signals are overlayed (stacked) on top of one another on transmitter and separated on receiver.

MLO may be differentiated from CDMA or OFDM by the manner in which orthogonality among signals is achieved. MLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 27:
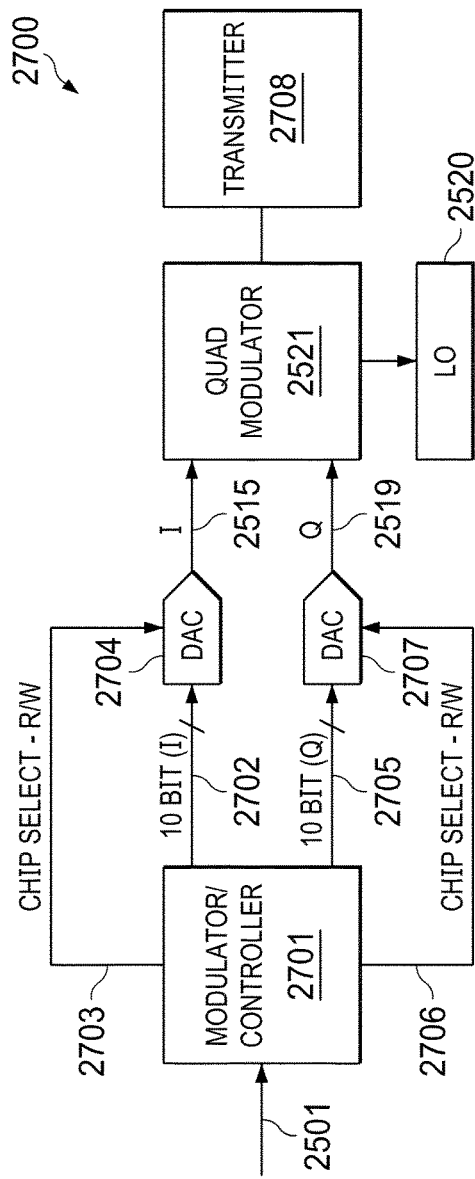
FIG. 27 illustrates a multiple level overlay transmitter system.

FIG. 27 illustrates an embodiment of an MLO transmitter system 2700, which receives input data stream 2701. System 2700 represents a modulator/controller, which incorporates equivalent functionality of DEMUX 2704, QAM symbol mappers 2505A-C, function generators 2507A-2507B, 2509A-2509B, and 2511A-2511B, and summers 2512 and 2516 of system 2500, shown in FIG. 25. However, it should be understood that modulator/controller 2701 may use a greater or lesser quantity of signals than the three illustrated in system 2500. Modulator/controller 2701 may comprise an application specific integrated circuit (ASIC), a field programmable gate array (FPGA), and/or other components, whether discrete circuit elements or integrated into a single integrated circuit (IC) chip.

Modulator/controller 2701 is coupled to DACs 2704 and 2707, communicating a 10 bit I signal 2702 and a 10 bit Q signal 2705, respectively. In some embodiments, I signal 2702 and Q signal 2705 correspond to composite signals 2513 and 2517 of system 2500. It should be understood, however, that the 10 bit capacity of I signal 2702 and Q signal 2705 is merely representative of an embodiment. As illustrated, modulator/controller 2701 also controls DACs 2704 and 2707 using control signals 2703 and 2706, respectively. In some embodiments, DACs 2704 and 2707 each comprise an AD 5433, complementary metal oxide semiconductor (CMOS) 10 bit current output DAC. In some embodiments, multiple control signals are sent to each of DACs 2704 and 2707.

DACs 2704 and 2707 output analogue signals 2515 and 2519 to quadrature modulator 2521, which is coupled to LO 2520. The output of modulator 2520 is illustrated as coupled to a transmitter 2708 to transmit data wirelessly, although in some embodiments, modulator 2521 may be coupled to a fiber-optic modem, a twisted pair, a coaxial cable, or other suitable transmission media.

Figure 28:
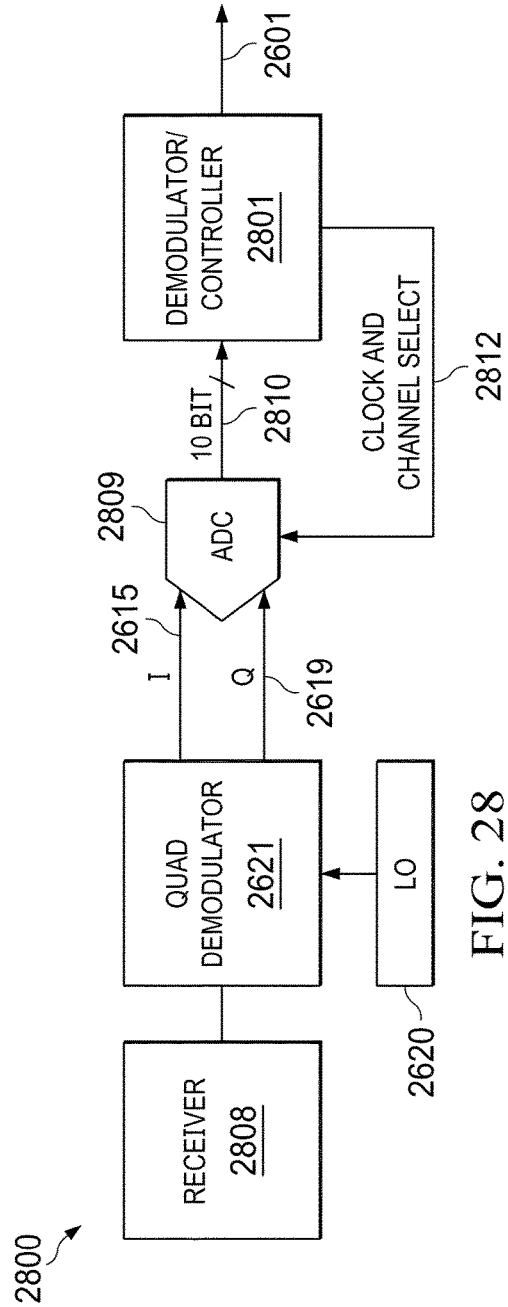
FIG. 28 illustrates a multiple level overlay receiver system.

FIG. 28 illustrates an embodiment of an MLO receiver system 2800 capable of receiving and demodulating signals from system 2700. System 2800 receives an input signal from a receiver 2808 that may comprise input medium, such as RF, wired or optical. The modulator 2621 driven by LO 2620 converts the input to baseband I signal 2415 and Q signal 2419. I signal 2615 and Q signal 2619 are input to analogue to digital converter (ADC) 2809.

ADC 2809 outputs 10 bit signal 2810 to demodulator/controller 2801 and receives a control signal 2812 from demodulator/controller 2801. Demodulator/controller 1701 may comprise an application specific integrated circuit (ASIC), a field programmable gate array (FPGA), and/or other components, whether discrete circuit elements or integrated into a single integrated circuit (IC) chip. Demodulator/controller 2801 correlates received signals with locally generated replicas of the signal set used, in order to perform demodulation and identify the symbols sent. Demodulator/controller 2801 also estimates frequency errors and recovers the data clock, which is used to read data from the ADC 2809. The clock timing is sent back to ADC 2809 using control signal 2812, enabling ADC 2809 to segment the digital I and Q signals 2615 and 2619. In some embodiments, multiple control signals are sent by demodulator/controller 2601 to ADC 2809. Demodulator/controller 2801 also outputs data signal 2601.

Hermite-Gaussian polynomials are a classical orthogonal polynomial sequence, which are the Eigenstates of a quantum harmonic oscillator. Signals based on Hermite-Gaussian polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, and Laguerre-Gaussian polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when $n=0$, the optimal baseband signal will have a time-bandwidth product of ½, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO system uses functions based on modified Hermite polynomials, 4n, and are defined by:

$$\psi_n(t, \xi) = \frac{(\tanh\xi)^{n/2}}{2^{n/2}(n!\cosh\xi)^{1/2}} e^{\frac{1}{2}t^2[1-\tanh\xi]} H_n\left(\frac{t}{\sqrt{2\cosh\xi\sinh\xi}}\right)$$

where t is time, and 5 is a bandwidth utilization parameter. Plots of $\Psi_n$ for n ranging from 0 to 9, along with their Fourier transforms (amplitude squared), are shown in FIGS. 29A-29K. The orthogonality of different orders of the functions may be verified by integrating:

$$\iint \psi_n(t,\xi)\psi_m(t,\xi)dtd\xi$$

The Hermite polynomial is defined by the contour integral:

$$H_n(z) = \frac{n!}{2\pi!} \oint e^{-t^2+2tz} t^{-n-1} dt$$

where the contour encloses the origin and is traversed in a counterclockwise direction. Hermite polynomials are described in Mathematical Methods for Physicists, by George Arfken, for example on page 416, the disclosure of which is incorporated by reference.

Figure 29A:
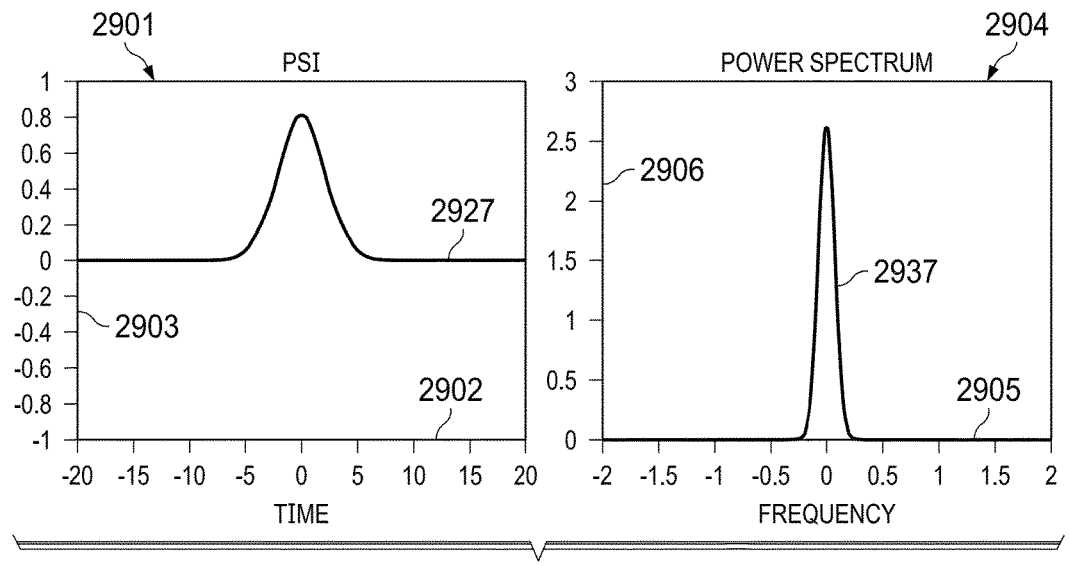
FIGS. 29A-29K illustrate representative multiple level overlay signals and their respective spectral power densities.
Figure 29B:
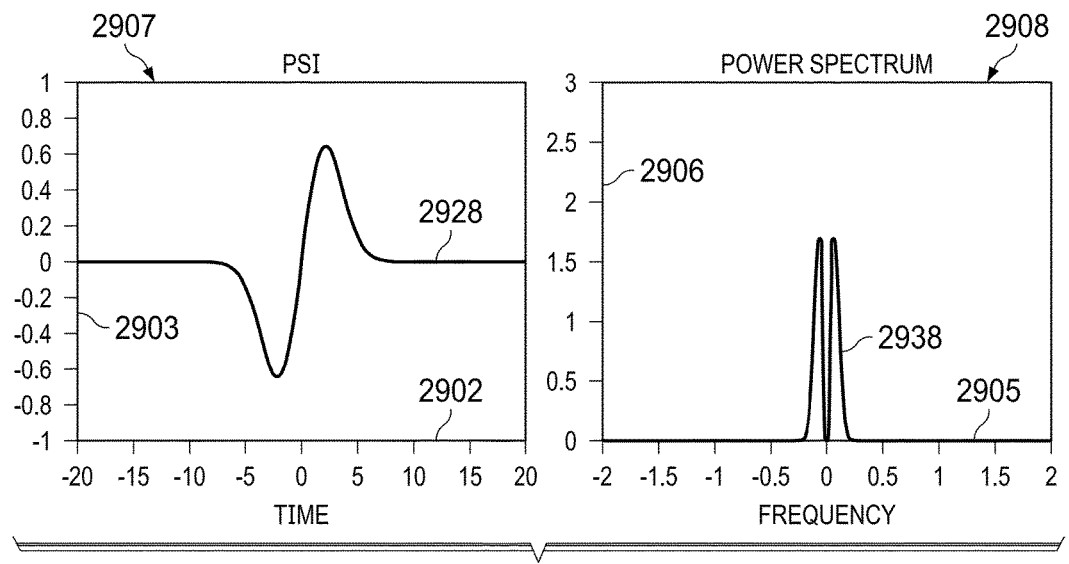
Figure 29C:
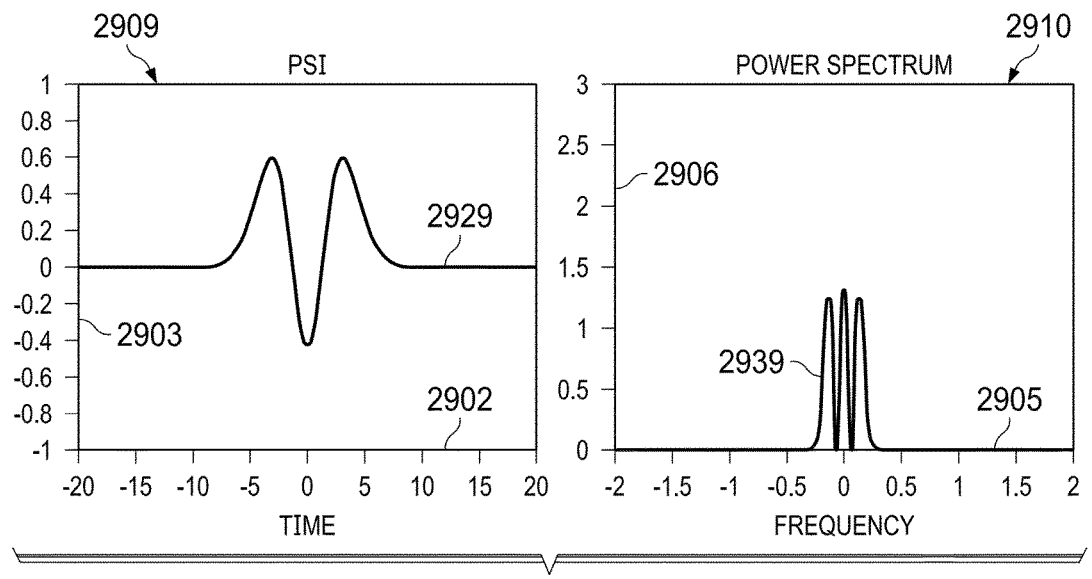
Figure 29D:
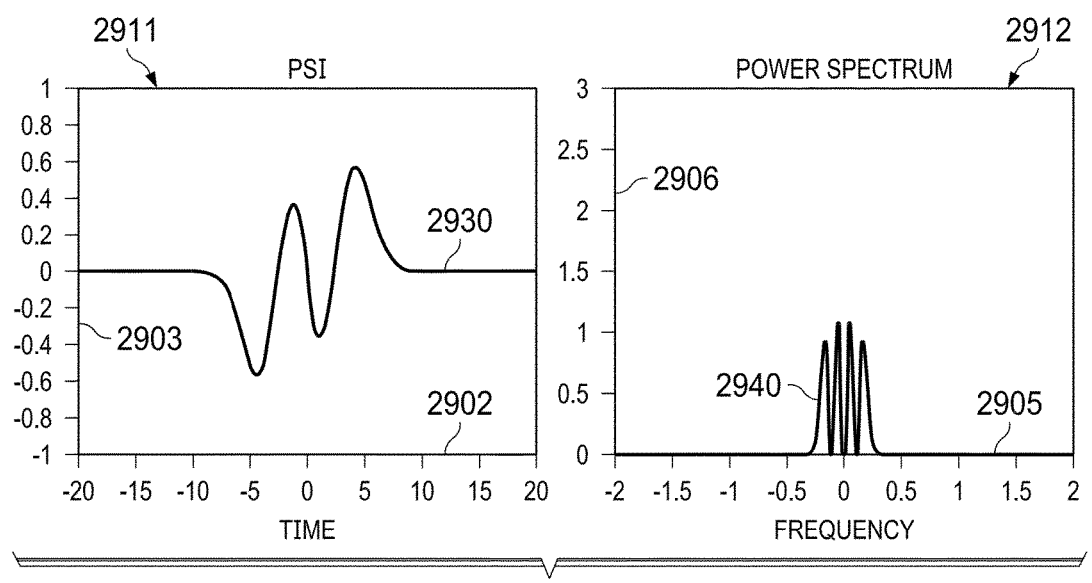
Figure 29E:
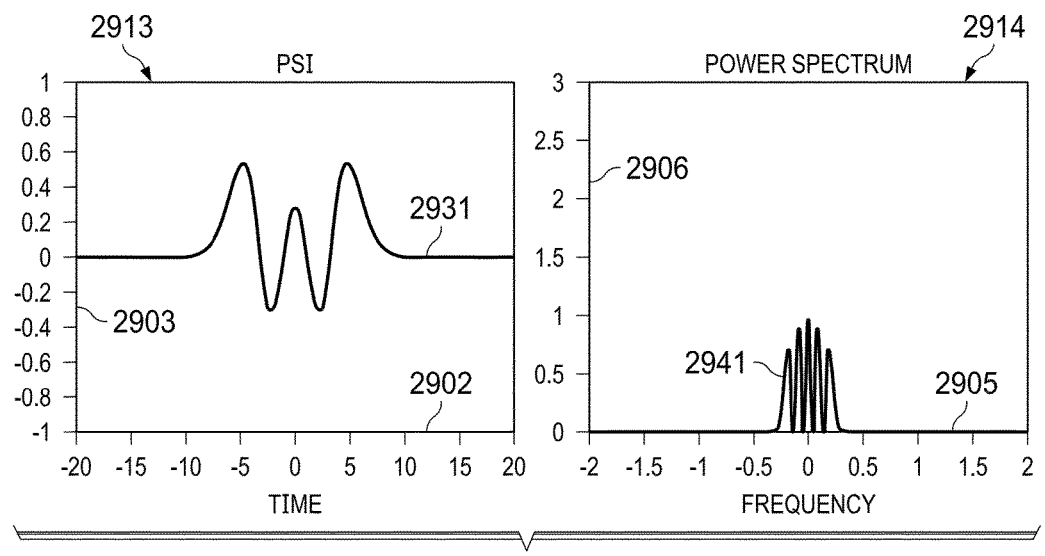
Figure 29F:
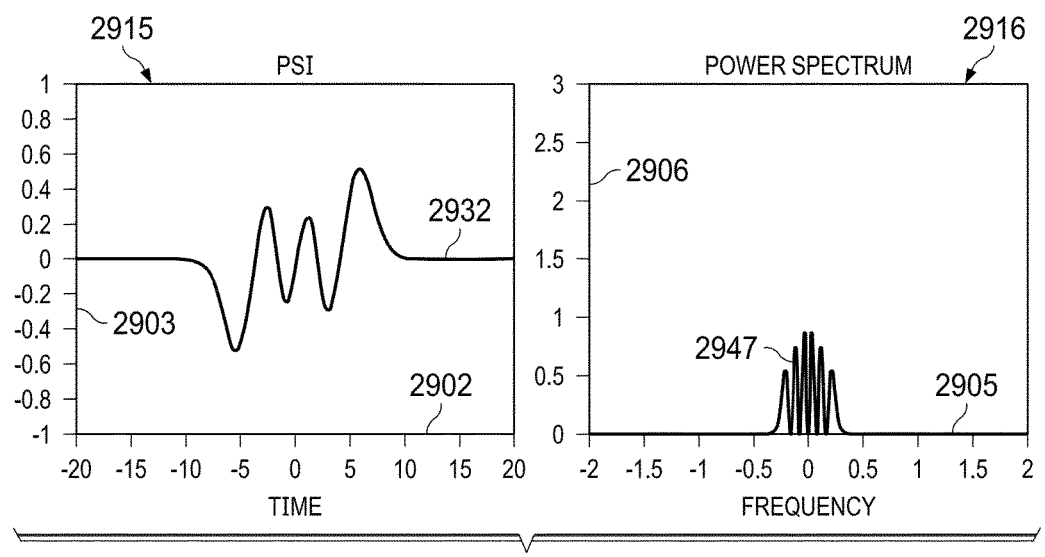
Figure 29G:
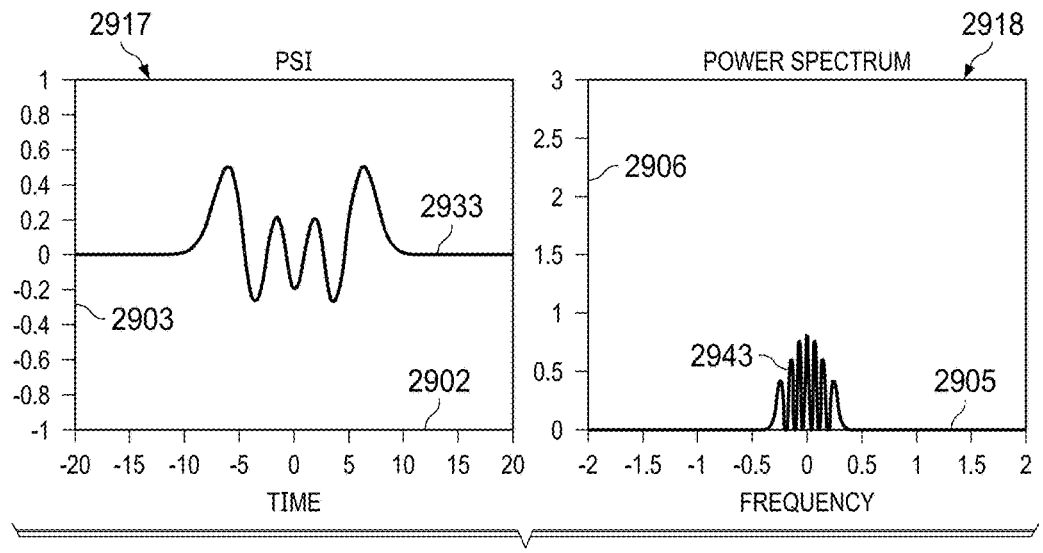
Figure 29H:
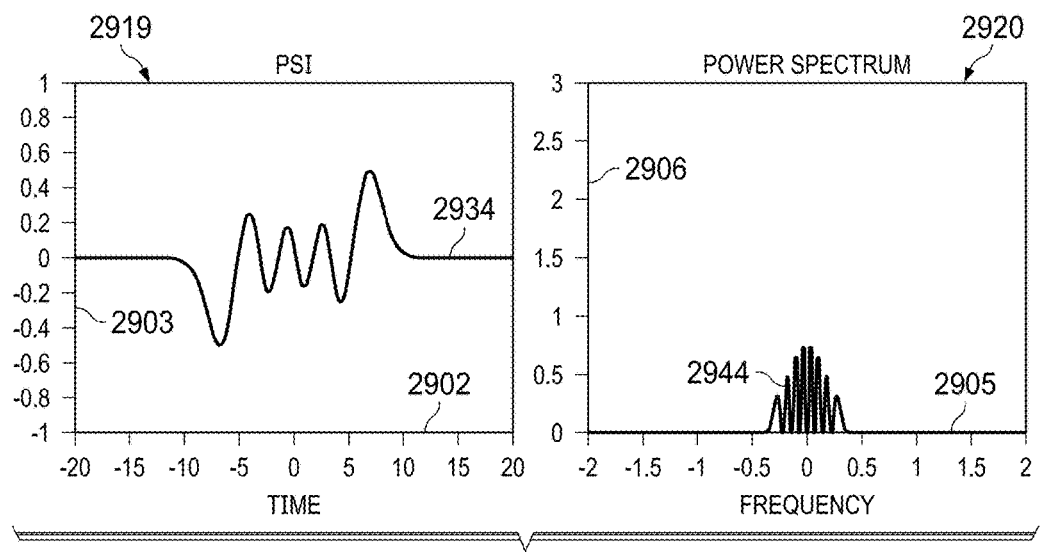
Figure 29I:
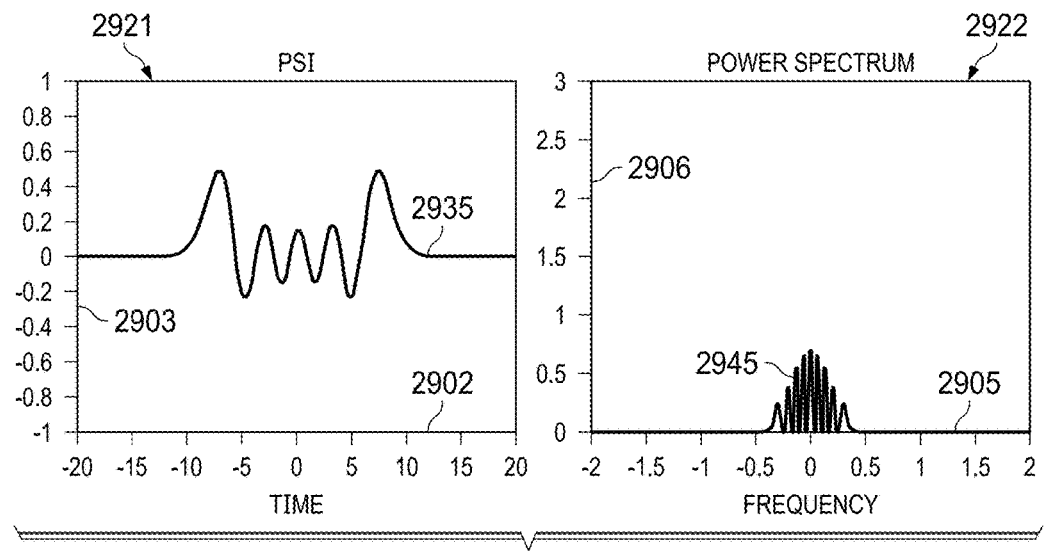
Figure 29J:
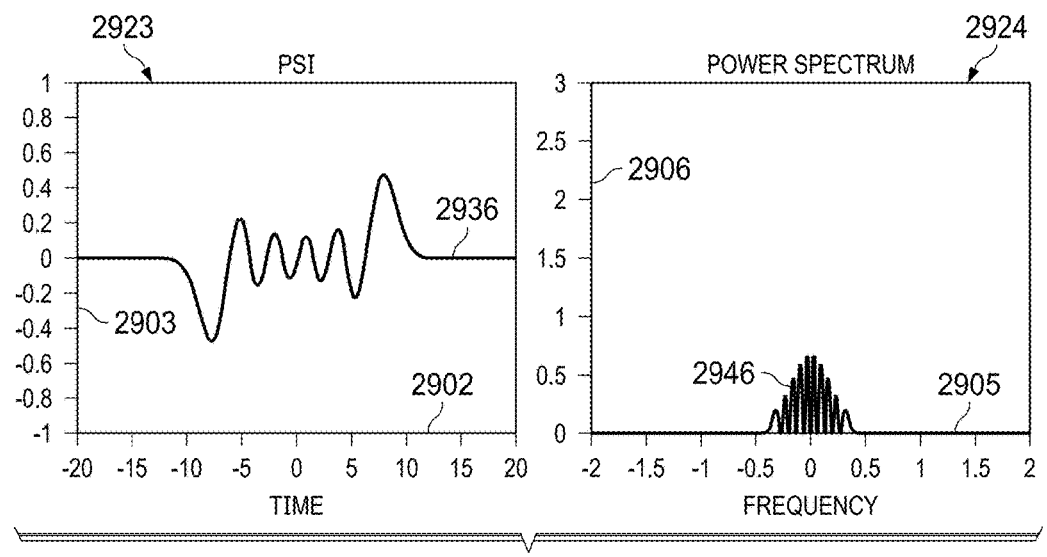

FIGS. 29A-29K illustrate representative MLO signals and their respective spectral power densities based on the modified Hermite polynomials $\Psi_n$ for n ranging from 0 to 9. FIG. 29A shows plots 2901 and 2904. Plot 2901 comprises a curve 2927 representing $\Psi_0$ plotted against a time axis 2902 and an amplitude axis 2903. As can be seen in plot 2901, curve 2927 approximates a Gaussian curve. Plot 2904 comprises a curve 2937 representing the power spectrum of $\Psi_0$ plotted against a frequency axis 2905 and a power axis 2906. As can be seen in plot 2904, curve 2937 also approximates a Gaussian curve. Frequency domain curve 2907 is generated using a Fourier transform of time domain curve 2927. The units of time and frequency on axis 2902 and 2905 are normalized for baseband analysis, although it should be understood that since the time and frequency units are related by the Fourier transform, a desired time or frequency span in one domain dictates the units of the corresponding curve in the other domain. For example, various embodiments of MLO systems may communicate using symbol rates in the megahertz (MHz) or gigahertz (GHz) ranges and the non-0 duration of a symbol represented by curve 2927, i.e., the time period at which curve 2927 is above 0 would be compressed to the appropriate length calculated using the inverse of the desired symbol rate. For an available bandwidth in the megahertz range, the non-0 duration of a time domain signal will be in the microsecond range.

FIGS. 29B-29J show plots 2907-2924, with time domain curves 2928-2936 representing $\Psi_1$ through $\Psi_9$, respectively, and their corresponding frequency domain curves 2938-2946. As can be seen in FIGS. 29A-29J, the number of peaks in the time domain plots, whether positive or negative, corresponds to the number of peaks in the corresponding frequency domain plot. For example, in plot 2923 of FIG. 29J, time domain curve 2936 has five positive and five negative peaks. In corresponding plot 2924 therefore, frequency domain curve 2946 has ten peaks.

Figure 29K:
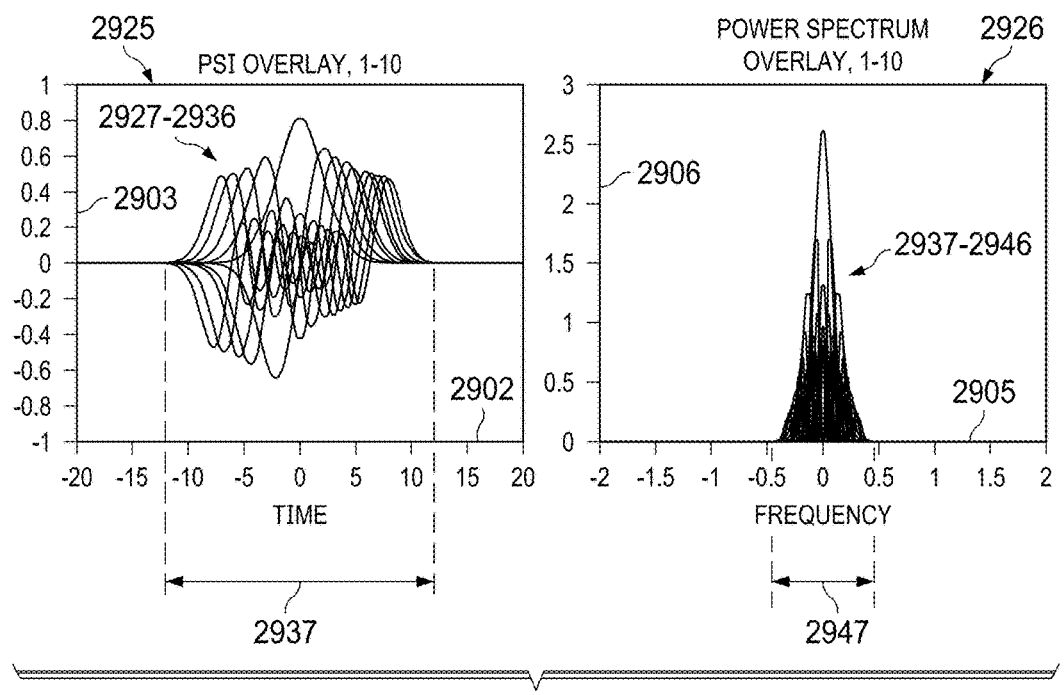

FIG. 29K shows overlay plots 2925 and 2926, which overlay curves 2927-2936 and 2937-2946, respectively. As indicated in plot 2925, the various time domain curves have different durations. However, in some embodiments, the non-zero durations of the time domain curves are of similar lengths. For an MLO system, the number of signals used represents the number of overlays and the improvement in spectral efficiency. It should be understood that, while ten signals are disclosed in FIGS. 29A-29K, a greater or lesser quantity of signals may be used, and that further, a different set of signals, rather than the $\Psi_n$ signals plotted, may be used.

MLO signals used in a modulation layer have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents ISI and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

Embodiments of MLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

Figure 30:
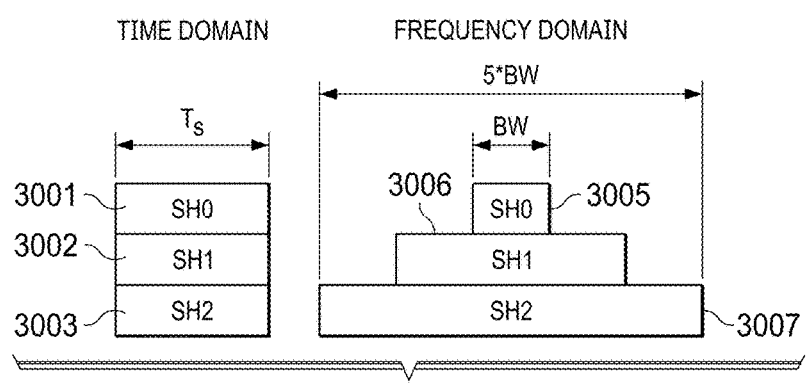
FIG. 30 illustrates comparisons of multiple level overlay signals within the time and frequency domain.

FIG. 30 illustrates a comparison of MLO signal widths in the time and frequency domains. Time domain envelope representations 3001-3003 of signals SH0-SH3 are illustrated as all having a duration Ts. SH0-SH3 may represent $PSI_0$-$PSI_2$, or may be other signals. The corresponding frequency domain envelope representations are 3005-3007, respectively. SH0 has a bandwidth BW, SH1 has a bandwidth three times BW, and SH2 has a bandwidth of 5BW, which is five times as great as that of SH0. The bandwidth used by an MLO system will be determined, at least in part, by the widest bandwidth of any of the signals used. The highest order signal must set within the available bandwidth. This will set the parameters for each of the lower order signals in each of the layers and enable the signals to fit together without interference. If each layer uses only a single signal type within identical time windows, the spectrum will not be fully utilized, because the lower order signals will use less of the available bandwidth than is used by the higher order signals.

FIG. 20A illustrates a spectral alignment of MLO signals that accounts for the differing bandwidths of the signals, and makes spectral usage more uniform, using SH0-SH3. Blocks 2001-2004 are frequency domain blocks of an OFDM signal with multiple subcarriers. Block 2003 is expanded to show further detail. Block 2003 comprises a first layer 2003$x$ comprised of multiple SH0 envelopes 2003$a$-2003$o$. A second layer 2003$y$ of SH1 envelopes 2003$p$-2003$t$ has one third the number of envelopes as the first layer. In the illustrated example, first layer 2003$x$ has 15 SH0 envelopes, and second layer 2003$y$ has five SH1 envelopes. This is because, since the SH1 bandwidth envelope is three times as wide as that of SH0, 15 SH0 envelopes occupy the same spectral width as five SH1 envelopes. The third layer 2003$z$ of block 2003 comprises three SH2 envelopes 2003$u$-2003$w$, because the SH2 envelope is five times the width of the SH0 envelope.

The total required bandwidth for such an implementation is a multiple of the least common multiple of the bandwidths of the MLO signals. In the illustrated example, the least common multiple of the bandwidth required for SH0, SH1, and SH2 is 15BW, which is a block in the frequency domain. The OFDM-MLO signal can have multiple blocks, and the spectral efficiency of this illustrated implementation is proportional to (15+5+3)/15.

FIGS. 31B-31C illustrate a situation wherein the frequency domain envelopes 3120-3124 are each located in a separate layer within a same physical band width 3125. However, each envelope rather than being centered on a same center frequency as shown in FIG. 30 has its own center frequency 3126-3130 shifted in order to allow a slided overlay. The purposed of the slided center frequency is to allow better use of the available bandwidth and insert more envelopes in a same physical bandwidth.

Since each of the layers within the MLO signal comprises a different channel, different service providers may share a same bandwidth by being assigned to different MLO layers within a same bandwidth. Thus, within a same bandwidth, service provider one may be assigned to a first MLO layer, service provider two may be assigned to a second MLO layer and so forth.

Figure 31:
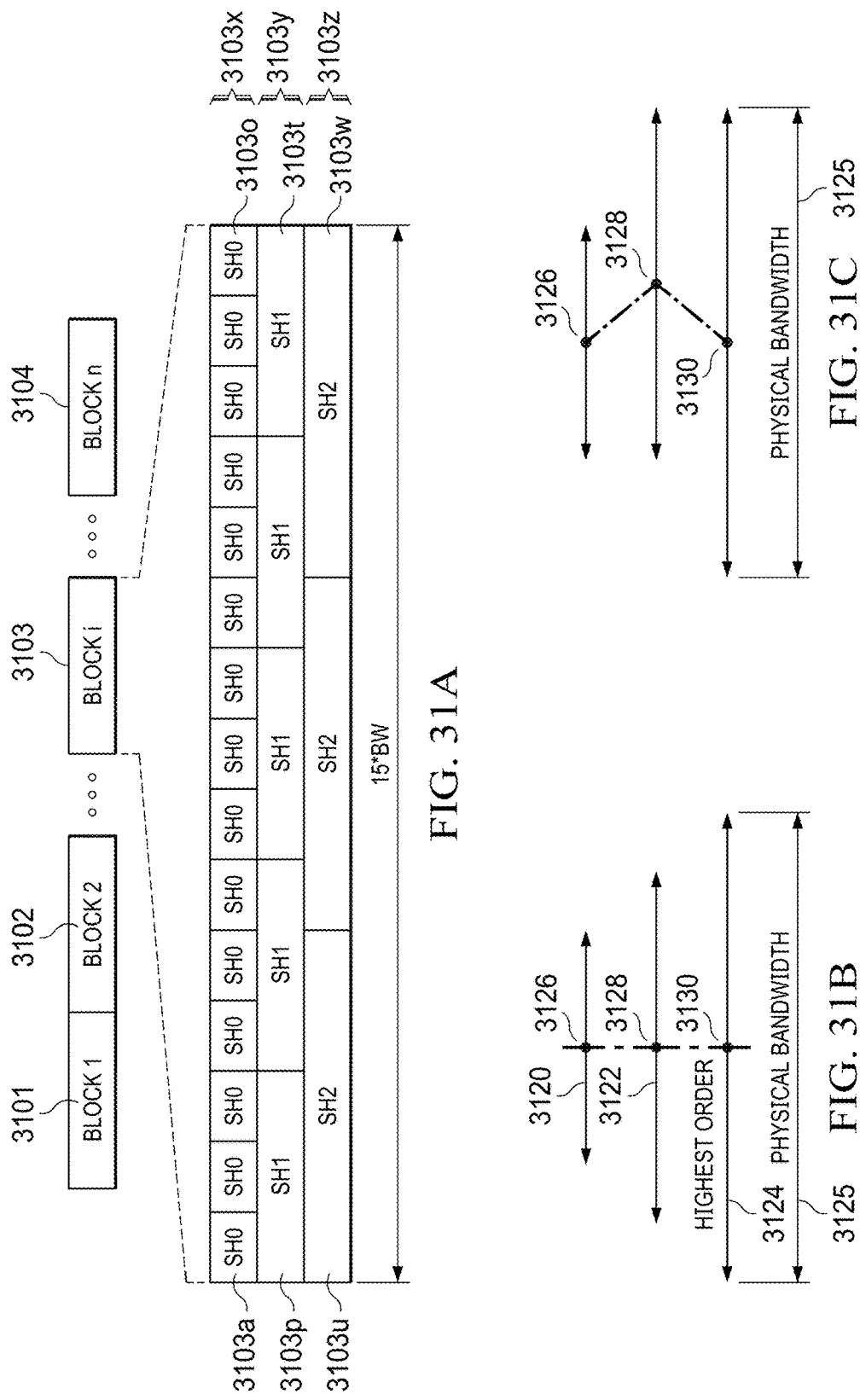
FIG. 31A illustrates a spectral alignment of multiple level overlay signals for differing bandwidths of signals.
FIG. 31B-31C illustrate frequency domain envelopes located in separate layers within a same physical bandwidth.
Figure 32:
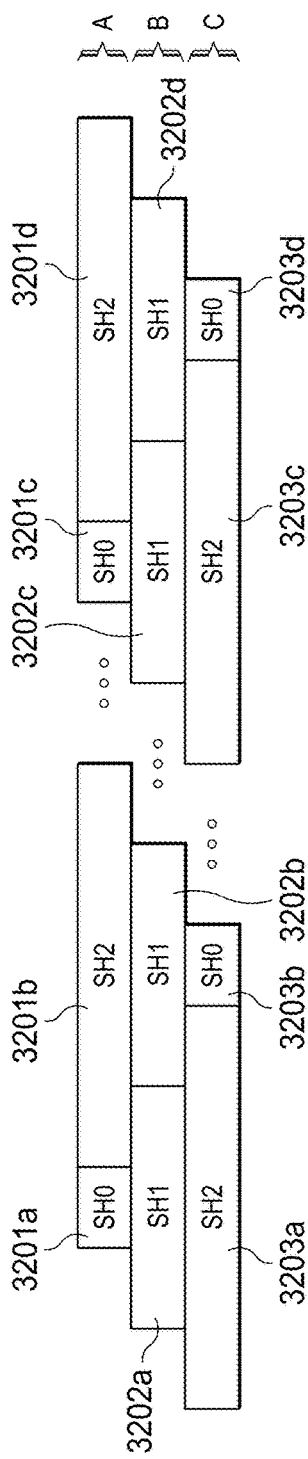
FIG. 32 illustrates an alternative spectral alignment of multiple level overlay signals.

FIG. 32 illustrates another spectral alignment of MLO signals, which may be used alternatively to alignment scheme shown in FIG. 31. In the embodiment illustrated in FIG. 32, the OFDM-MLO implementation stacks the spectrum of SH0, SH1, and SH2 in such a way that the spectrum in each layer is utilized uniformly. Layer 3200A comprises envelopes 3201A-3201D, which includes both SH0 and SH2 envelopes. Similarly, layer 3200C, comprising envelopes 3203A-3203D, includes both SH0 and SH2 envelopes. Layer 3200B, however, comprising envelopes 3202A-3202D, includes only SH1 envelopes. Using the ratio of envelope sizes described above, it can be easily seen that BW+5BW=3BW+3BW. Thus, for each SH0 envelope in layer 3200A, there is one SH2 envelope also in layer 3200C and two SH1 envelopes in layer 3200B.

Three Scenarios Compared:
1) MLO with 3 Layers defined by:

$$f_0(t) = W_0 e^{-\frac{t^2}{4}}, \quad W_0 = 0.6316$$

$$f_1(t) = W_1 t e^{-\frac{t^2}{4}}, \quad W_1 \approx 0.6316$$

$$f_2(t) = W_2(t^2-1)e^{-\frac{t^2}{4}}, \quad W_2 \approx 0.4466$$

(The current FPGA implementation uses the truncation interval of [−6, 6].)
2) Conventional scheme using rectangular pulse
3) Conventional scheme using a square-root raised cosine (SRRC) pulse with a roll-off factor of 0.5

For MLO pulses and SRRC pulse, the truncation interval is denoted by [−t1, t1] in the following figures. For simplicity, we used the MLO pulses defined above, which can be easily scaled in time to get the desired time interval (say micro-seconds or nano-seconds). For the SRRC pulse, we fix the truncation interval of [−3T, 3T] where T is the symbol duration for all results presented in this document.

Bandwidth Efficiency

The X-dB bounded power spectral density bandwidth is defined as the smallest frequency interval outside which the power spectral density (PSD) is X dB below the maximum value of the PSD. The X-dB can be considered as the out-of-band attenuation.

The bandwidth efficiency is expressed in Symbols per second per Hertz. The bit per second per Hertz can be obtained by multiplying the symbols per second per Hertz with the number of bits per symbol (i.e., multiplying with log 2 M for M-ary QAM).

Figure 33:
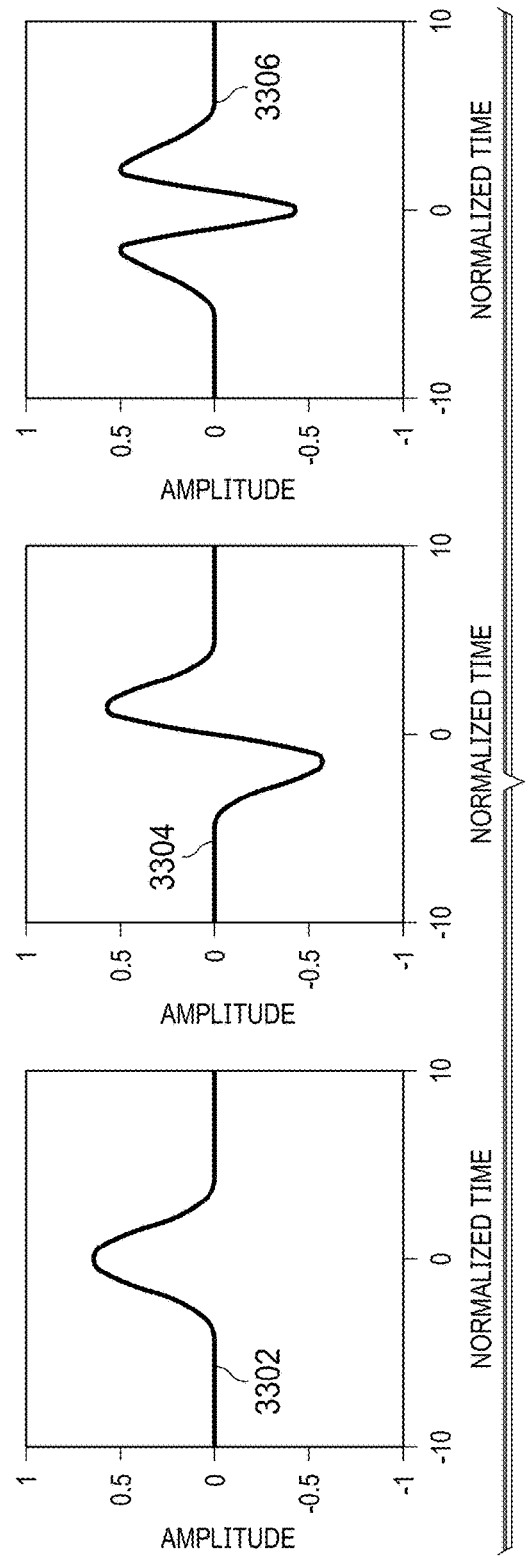
FIG. 33 illustrates three different super QAM signals.
Figures 34, 37:
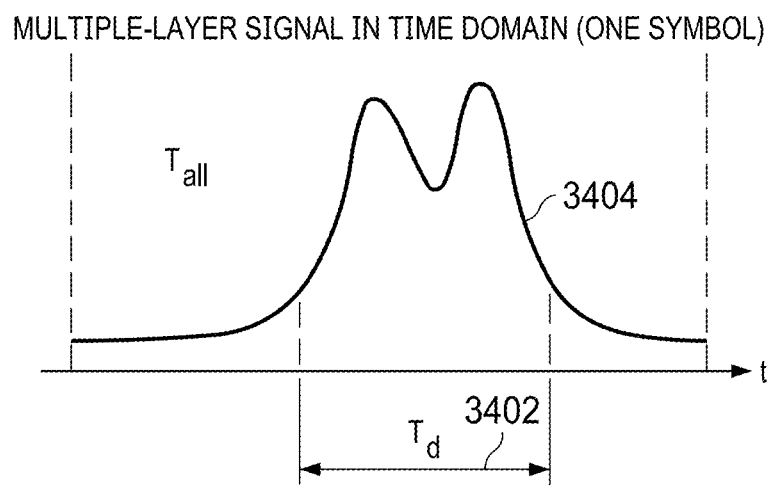
FIG. 34 illustrates the creation of inter-symbol interference in overlapped multilayer signals.
FIG. 37 illustrates truncated orthogonal functions.

Truncation of MLO pulses introduces inter-layer interferences (ILI). However, the truncation interval of [−6, 6] yields negligible ILI while [−4, 4] causes slight tolerable ILI. Referring now to FIG. 33, there is illustrated the manner in which a signal, for example a superQAM signal, may be layered to create ILI. FIG. 33 illustrates 3 different superQAM signals 3302, 3304 and 3306. The superQAM signals 3302-3306 may be truncated and overlapped into multiple layers using QLO in the manner described herein above. However, as illustrated in FIG. 34, the truncation of the superQAM signals 3302-3306 that enables the signals to be layered together within a bandwidth $T_d$ 3402 creates a single signal 3404 having the interlayer interference between each of the layers containing a different signal produced by the QLO process. The ILI is caused between a specific bit within a specific layer having an effect on other bits within another layer of the same symbol.

Figure 35:
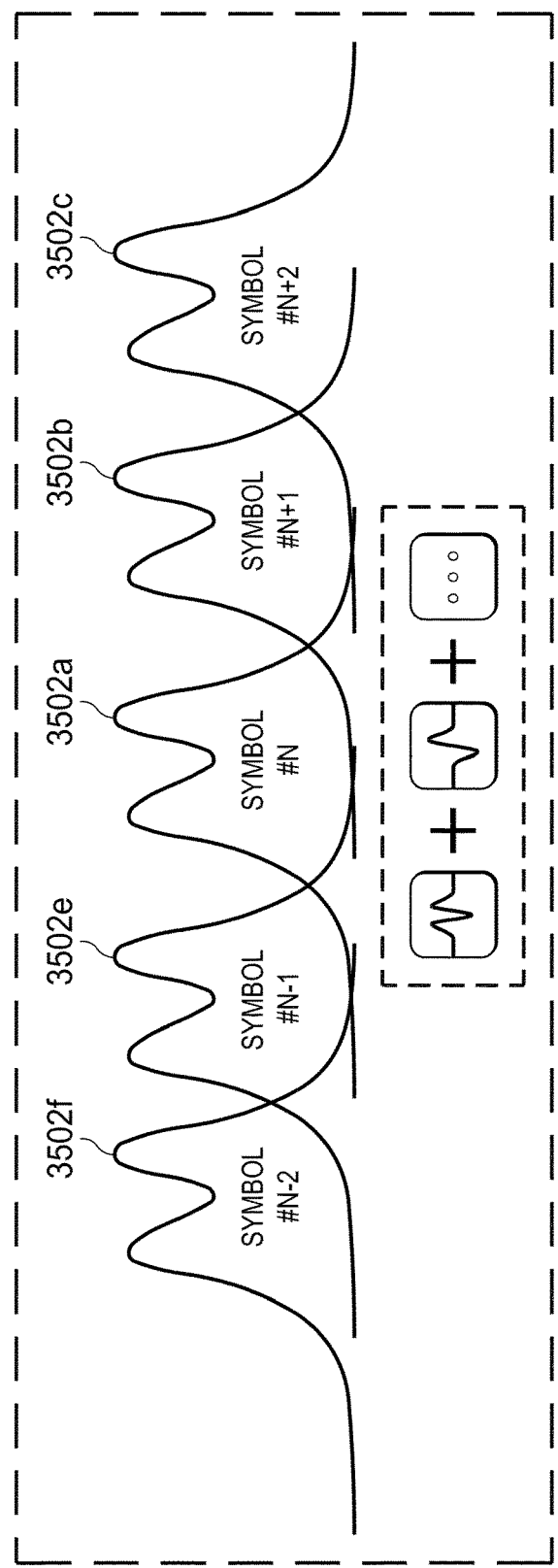
FIG. 35 illustrates overlapped multilayer signals.

The bandwidth efficiency of MLO may be enhanced by allowing inter-symbol interference (ISI). To realize this enhancement, designing transmitter side parameters as well as developing receiver side detection algorithms and error performance evaluation can be performed. One manner in which ISI may be created is when multilayer signals such as that illustrated in FIG. 34 are overlapped with each other in the manner illustrated in FIG. 35. Multiple signal symbols 3502 are overlapped with each other in order to enable to enable more symbols to be located within a single bandwidth. The portions of the signal symbols 3502 that are overlapping cause the creation of ISI. Thus, a specific bit at a specific layer will have an effect on the bits of nearby symbols.

The QLO transmission and reception system can be designed to have a particular known overlap between symbols. The system can also be designed to calculate the overlaps causing ISI (symbol overlap) and ILI (layer overlay). The ISI and ILI can be expressed in the format of a NM*NM matrix derived from a N*NM matrix. N comprises the number of layers and M is the number of symbols when considering ISI. Referring now to FIG. 36, there is illustrated a fixed channel matrix $H_x$ which is a N*NM matrix. From this we can calculate another matrix which is $H_{yx}$ which is a NM*NM matrix. The ISI and ILI can be canceled by (a) applying a filter of $H_{yx}^{-1}$ to the received vector or (b) pre-distorting the transmitted signal by the SVD (singular value decomposition) of $H_{yx}^{-1}$. Therefore, by determining the matrix $H_{xy}$ of the fixed channel, the signal may be mathematically processed to remove ISL and ILI.

When using orthogonal functions such as Hermite Guassian (HG) functions, the functions are all orthogonal for any permutations of the index if infinitely extended. However, when the orthogonal functions are truncated as discussed herein above, the functions become pseudo-orthogonal. This is more particularly illustrated in FIG. 37. In this case, orthogonal functions are represented along each of the axes. At the intersection of the same orthogonal functions, functions are completely correlated and a value of "1" is indicated. Thus, a diagonal of "1" exists with each of the off diagonal elements comprising a "0" since these functions are completely orthogonal with each other. When truncated HG choose functions are used the 0 values will not be exactly 0 since the functions are no longer orthogonal but are pseudo-orthogonal.

However, the HG functions can be selected in a manner that the functions are practically orthogonal. This is achieved by selecting the HG signals in a sequence to achieve better orthogonality. Thus, rather than selecting the initial three signals in a three signal HG signal sequence (P0 P1 P2), various other sequences that do not necessarily comprise the first three signals of the HG sequence may be selected as shown below.

P0 P1 P4 P0 P3 P6
P0 P1 P6 P0 P4 P5
P0 P2 P3 P0 P5 P6
P0 P2 P5 P1 P3 P6
P0 P3 P4 P2 P5 P6

Similar selection of sequences may be done to achieve better orthogonality with two signals, four signals, etc.

The techniques described herein are applicable to a wide variety of communication band environments. They may be applied across the visible and invisible bands and include RF, Fiber, Freespace optical and any other communications bands that can benefit from the increased bandwidth provided by the disclosed techniques.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of l 1 and l 2, respectively:

$$U_1(r,\theta,z) = A_1(r,z) \exp(il_1\theta) \quad (12)$$

where r and z refers to the radial position and propagation distance respectively, one can quickly conclude that these two beams are orthogonal in the sense that:

$$\int_0^{2\pi} U_1 U_2^* \, d\theta = \begin{cases} 0 & \text{if } l_1 \neq l_2 \\ A_1 A_2^* & \text{if } l_1 = l_2 \end{cases} \quad (13)$$

There are two different ways to take advantage of the distinction between OAM beams with different l states in communications. In the first approach, N different OAM states can be encoded as N different data symbols representing "0", "1", . . . , "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

Figure 38:
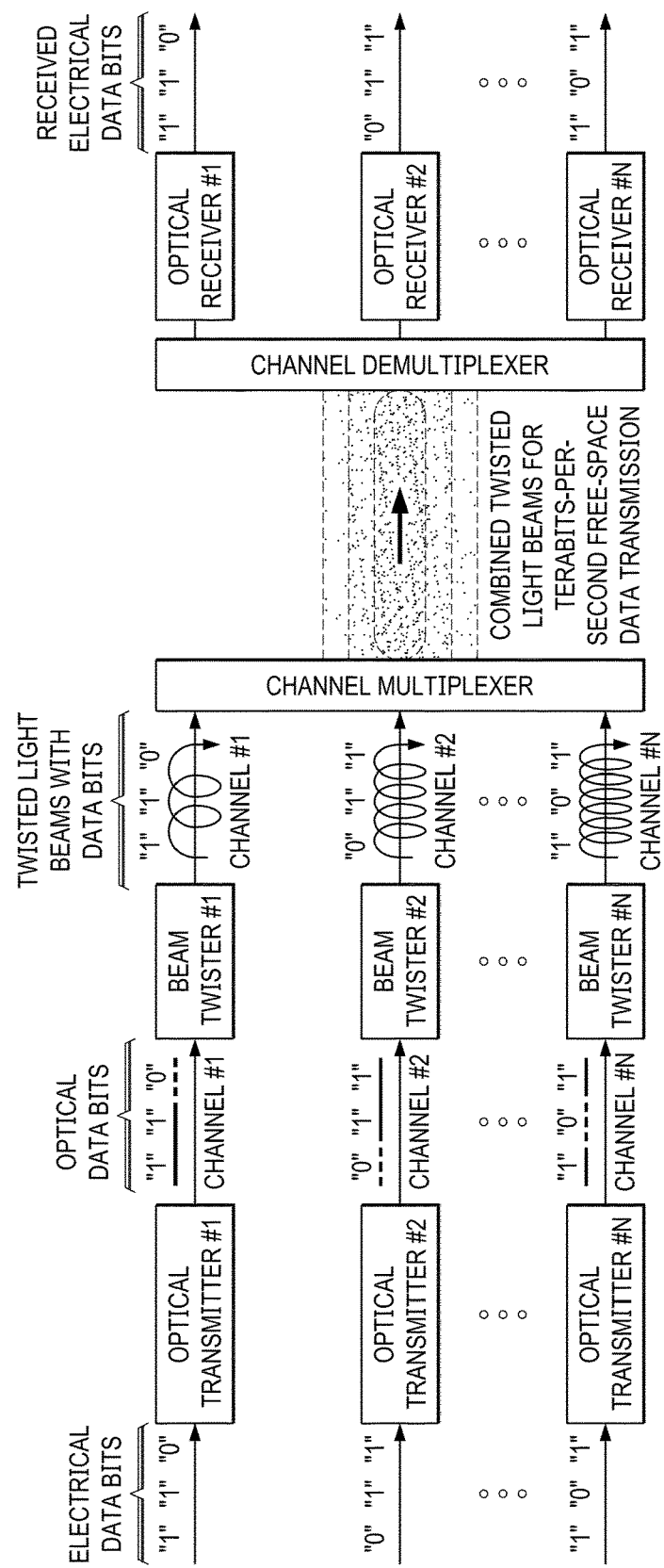
FIG. 38 illustrates a typical OAM multiplexing scheme.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 38. An obvious benefit of OAM multiplexing is the improvement in system spectral efficiency, since the same bandwidth can be reused for additional data channels.

OAM Beam Generation and Detection

Many approaches for creating OAM beams have been proposed and demonstrated. One could obtain a single or multiple OAM beams directly from the output of a laser cavity, or by converting a fundamental Gaussian beam into an OAM beam outside a cavity. The converter could be a spiral phase plate, diffractive phase holograms, metalmaterials, cylindrical lens pairs, q-plates or fiber structures. There are also different ways to detect an OAM beam, such as using a converter that creates a conjugate helical phase, or using a plasmonic detector.

Mode Conversion Approaches

Figure 39:
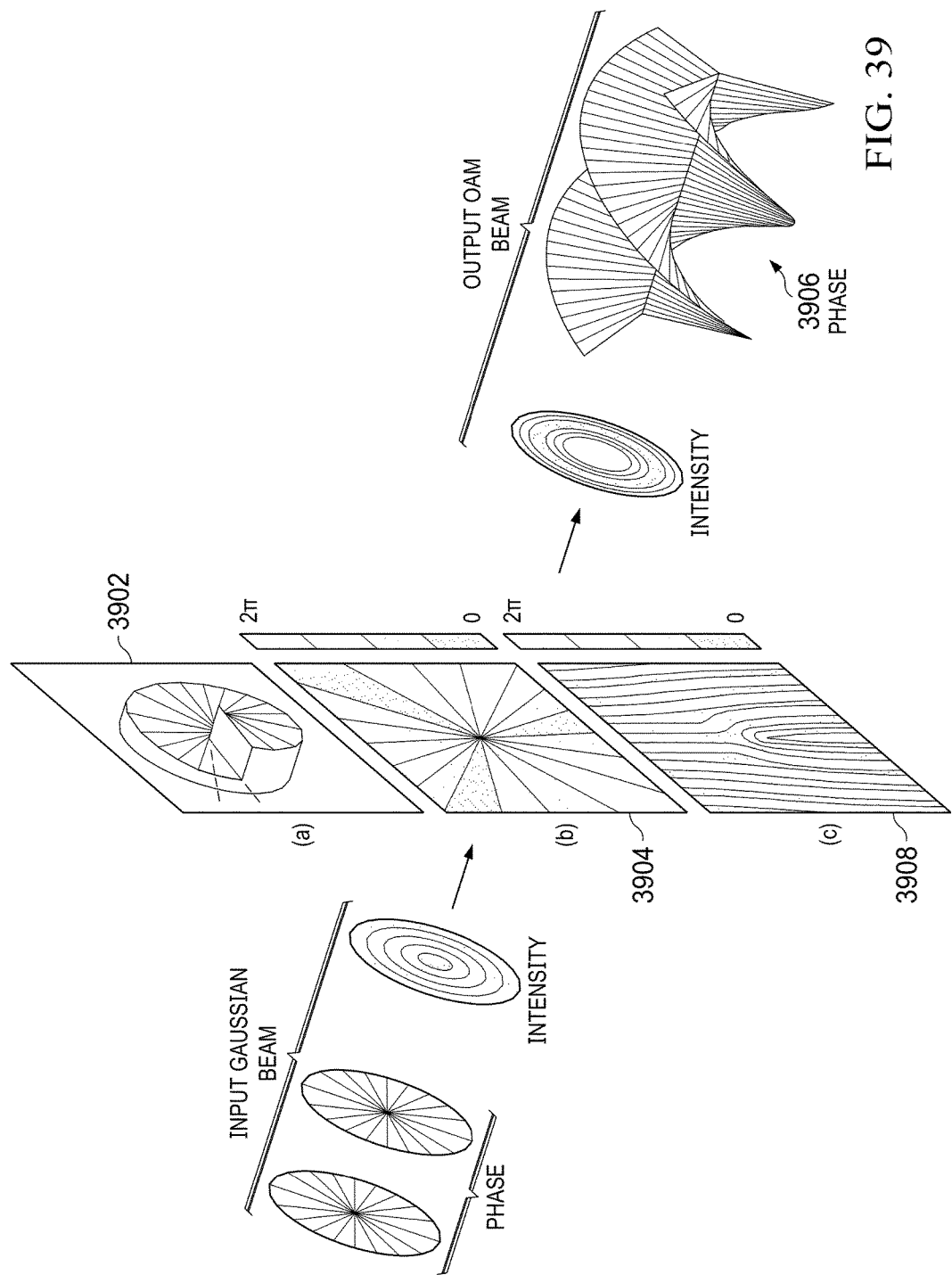
FIG. 39 illustrates various manners for converting a Gaussian beam into an OAM beam.

Referring now to FIG. 39, among all external-cavity methods, perhaps the most straightforward one is to pass a Gaussian beam through a coaxially placed spiral phase plate (SPP) 3902. An SPP 3902 is an optical element with a helical surface, as shown in FIG. 12E. To produce an OAM beam with a state of l, the thickness profile of the plate should be machined as $l\lambda\theta/2\pi(n-1)$, where n is the refractive index of the medium. A limitation of using an SPP 3902 is that each OAM state requires a different specific plate. As an alternative, reconfigurable diffractive optical elements, e.g., a pixelated spatial light modulator (SLM) 3904, or a digital micro-mirror device can be programmed to function as any refractive element of choice at a given wavelength. As mentioned above, a helical phase profile exp(ilθ) converts a linearly polarized Gaussian laser beam into an OAM mode, whose wave front resembles an f-fold corkscrew 3906, as shown at 3904. Importantly, the generated OAM beam can be easily changed by simply updating the hologram loaded on the SLM 3904. To spatially separate the phase-modulated beam from the zeroth-order non-phase-modulated reflection from the SLM, a linear phase ramp is added to helical phase code (i.e., a "fork"-like phase pattern 3908 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase-only SLM with a more complex phase hologram.

Figure 40A:
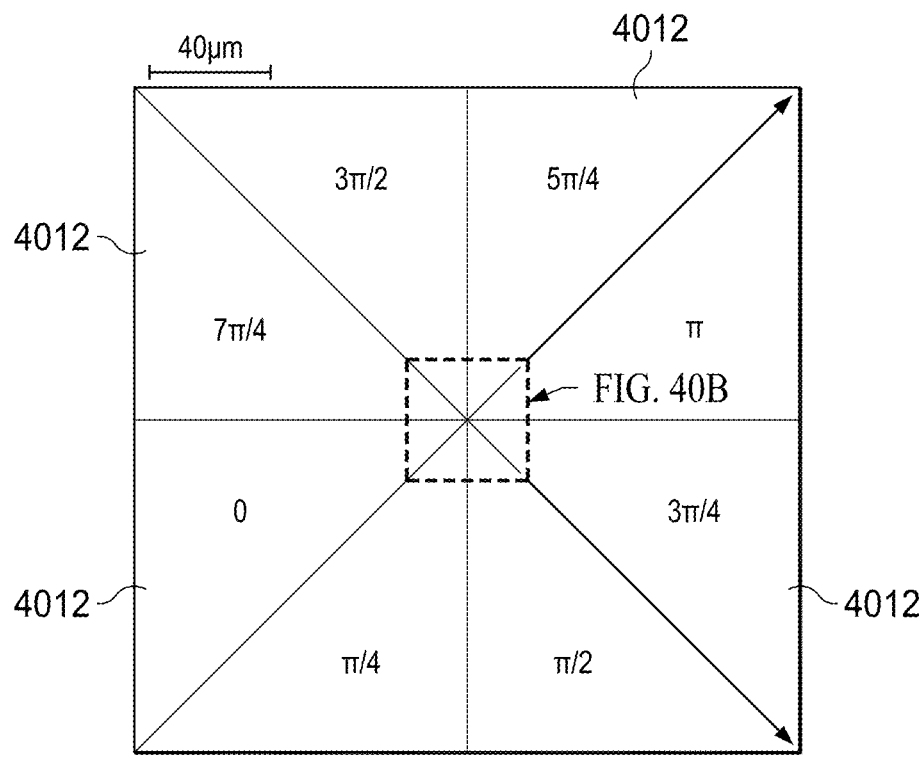
FIG. 40A illustrates a fabricated metasurface phase plate.
Figure 40B:
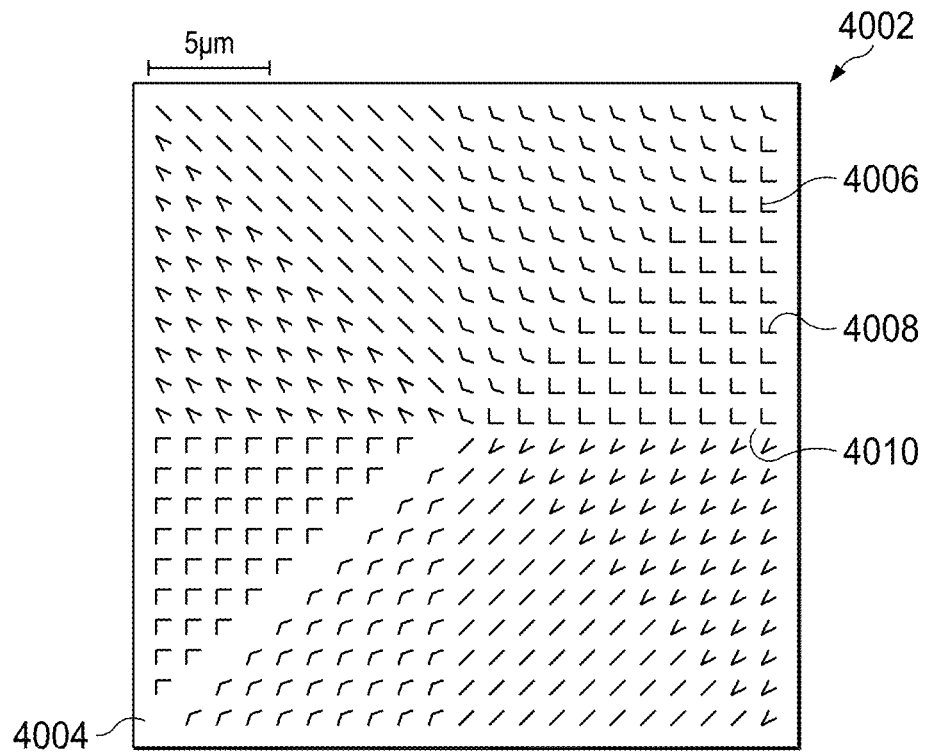
FIG. 40B illustrates a magnified structure of the metasurface phase plate.
Figure 40C:
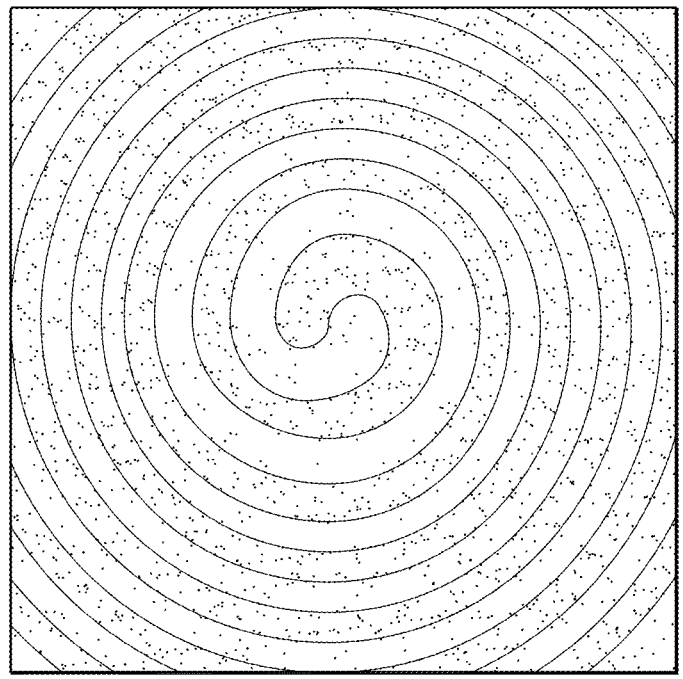
FIG. 40C illustrates an OAM beam generated using the phase plate with l=+1.

Some novel material structures, such as metal-surface, can also be used for OAM generation. A compact metal-surface could be made into a phase plate by manipulation of the structure caused spatial phase response. As shown in FIGS. 40A and 40B, a V-shaped antenna array 4002 is fabricated on the metal surface 4004, each of which is composed of two arms 4006, 4008 connected at one end 4010. A light reflected by this plate would experience a phase change ranging from 0 to 2π, determined by the length of the arms and angle between two arms. To generate an OAM beam, the surface is divided into 8 sectors 4012, each of which introduces a phase shift from 0 to 7π/4 with a step of π/4. The OAM beam with l=+1 is obtained after the reflection, as shown in FIG. 40C.

Figure 41:
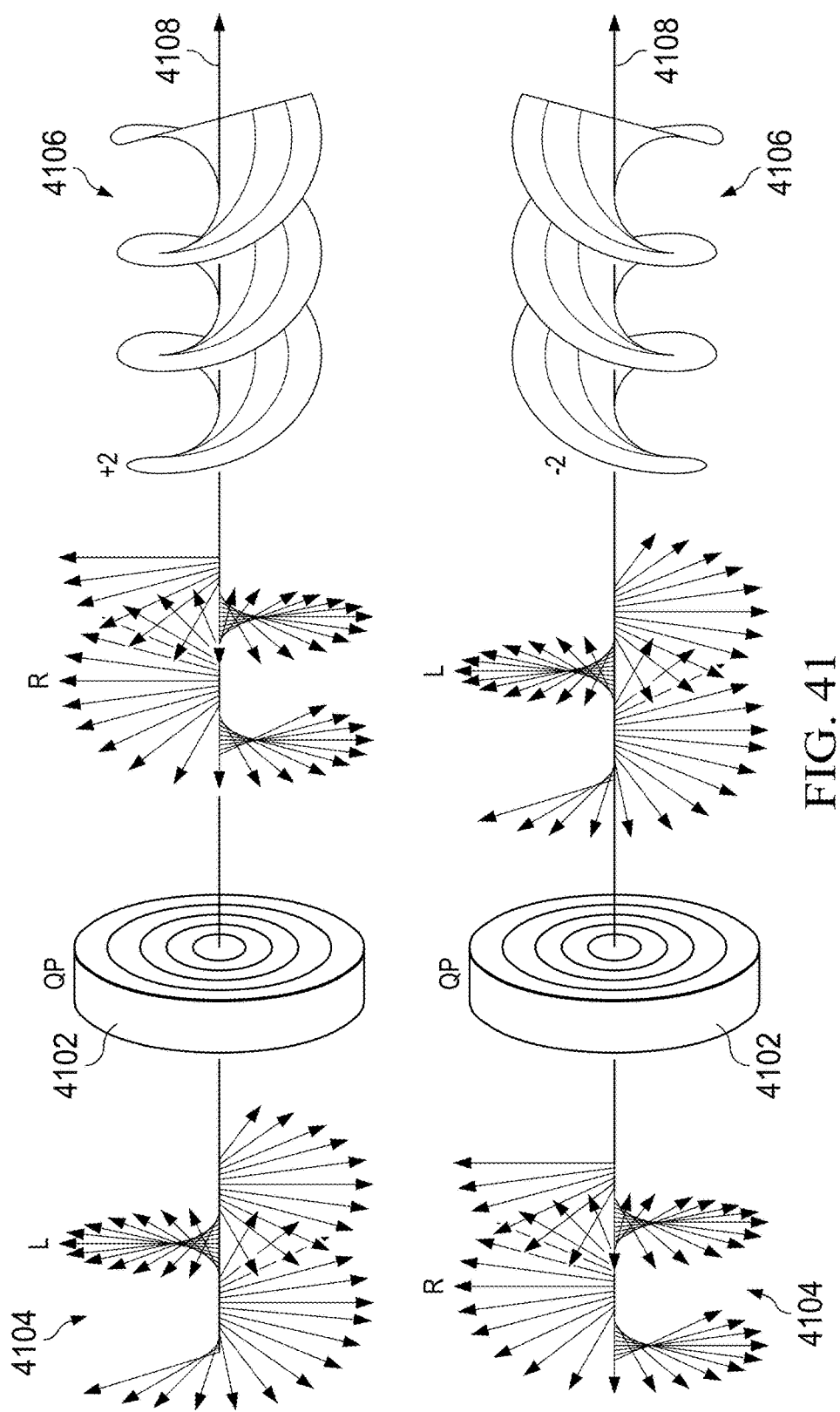
FIG. 41 illustrates the manner in which a q-plate can convert a left circularly polarized beam into a right circular polarization or vice-versa.

Referring now to FIG. 41, another interesting liquid crystal-based device named "q-plate" 4102 is also used as a mode converter which converts a circularly polarized beam 4104 into an OAM beam 4106. A q-plate is essentially a liquid crystal slab with a uniform birefringent phase retardation of π and a spatially varying transverse optical axis 4108 pattern. Along the path circling once around the center of the plate, the optical axis of the distributed crystal elements may have a number of rotations defined by the value of q. A circularly polarized beam 4104 passing through this plate 4102 would experience a helical phase change of exp (ilθ) with l=2q, as shown in FIG. 41.

Note that almost all the mode conversion approaches can also be used to detect an OAM beam. For example, an OAM beam can be converted back to a Gaussian-like non-OAM beam if the helical phase front is removed, e.g., by passing the OAM beam through a conjugate SPP or phase hologram.

Intra-Cavity Approaches

Figure 42:
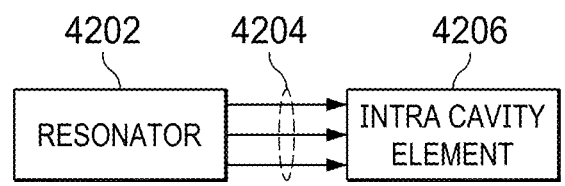
FIG. 42 illustrates the use of a laser resonator cavity for producing an OAM beam.

Referring now to FIG. 42, OAM beams are essentially higher order modes and can be directly generated from a laser resonator cavity. The resonator 4200 supporting higher order modes usually produce the mixture of multiple modes 4204, including the fundamental mode. In order to avoid the resonance of fundamental Gaussian mode, a typical approach is to place an intra-cavity element 4206 (spiral phase plate, tiled mirror) to force the oscillator to resonate on a specific OAM mode. Other reported demonstrations include the use of an annular shaped beam as laser pump, the use of thermal lensing, or by using a defect spot on one of the resonator mirrors.

OAM Beams Multiplexing and Demultiplexing

One of the benefits of OAM is that multiple coaxially propagating OAM beams with different f states provide additional data carriers as they can be separated based only on the twisting wavefront. Hence, one of the critical techniques is the efficient multiplexing/demultiplexing of OAM beams of different f states, where each carries an independent data channel and all beams can be transmitted and received using a single aperture pair. Several multiplexing and demultiplexing techniques have been demonstrated, including the use of an inverse helical phase hologram to down-convert the OAM into a Gaussian beam, a mode sorter, free-space interferometers, a photonic integrated circuit, and q-plates. Some of these techniques are briefly described below.

Beam Splitter and Inverse Phase Hologram

Figure 43:
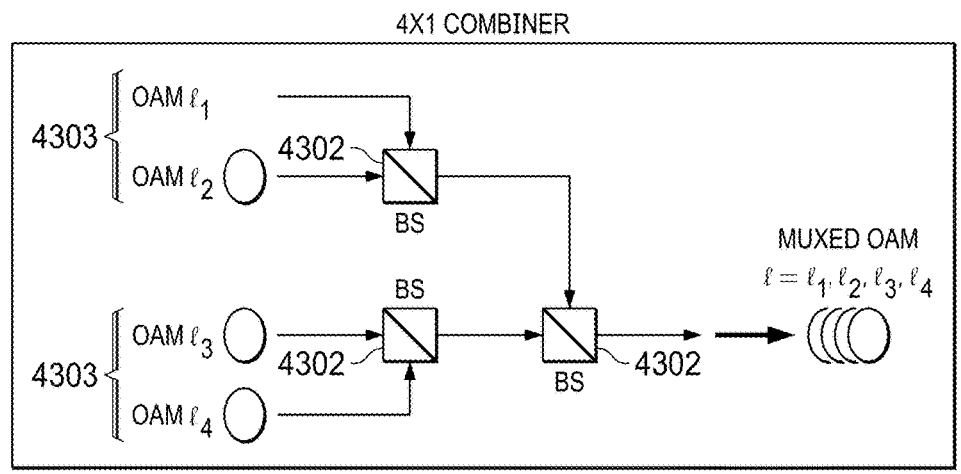
FIG. 43 illustrates spatial multiplexing using cascaded beam splitters.
Figure 44:
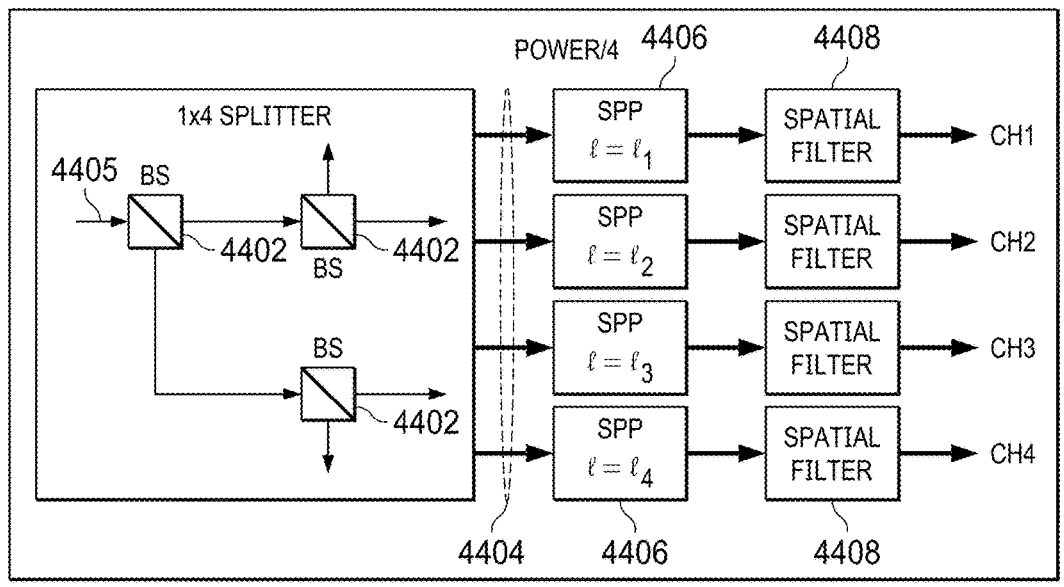
FIG. 44 illustrated de-multiplexing using cascaded beam splitters and conjugated spiral phase holograms.

Referring now to FIG. 43, a straightforward way of multiplexing is simply to use cascaded 3-dB beam splitters (BS) 4302. Each BS 4302 can coaxially multiplex two beams 4303 that are properly aligned, and cascaded N BSs can multiplex N+1 independent OAM beams at most, as shown in FIG. 43. Similarly, at the receiver end, the multiplexed beam 4305 is divided into four copies 4304 by BS 4302. To demultiplex the data channel on one of the beams (e.g., with l=l_i), a phase hologram 4306 with a spiral charge of 〖-1〗 is applied to all the multiplexed beams 4304. As a result, the helical phase on the target beam is removed, and this beam evolves into a fundamental Gaussian beam, as shown in FIG. 44. The down-converted beam can be isolated from the other beams, which still have helical phase fronts by using a spatial mode filter 4408 (e.g., a single mode fiber only couples the power of the fundamental Gaussian mode due to the mode matching theory). Accordingly, each of the multiplexed beams 4404 can be demultiplexed by changing the spiral phase hologram 4406. Although this method is very power-inefficient since the BSs 4402 and the spatial mode filter 4406 cause a lot of power loss, it was used in the initial lab demonstrations of OAM multiplexing/demultiplexing, due to the simplicity of understanding and the reconfigurability provided by programmable SLMs.

Optical Geometrical Transformation-Based Mode Sorter

Figure 45:
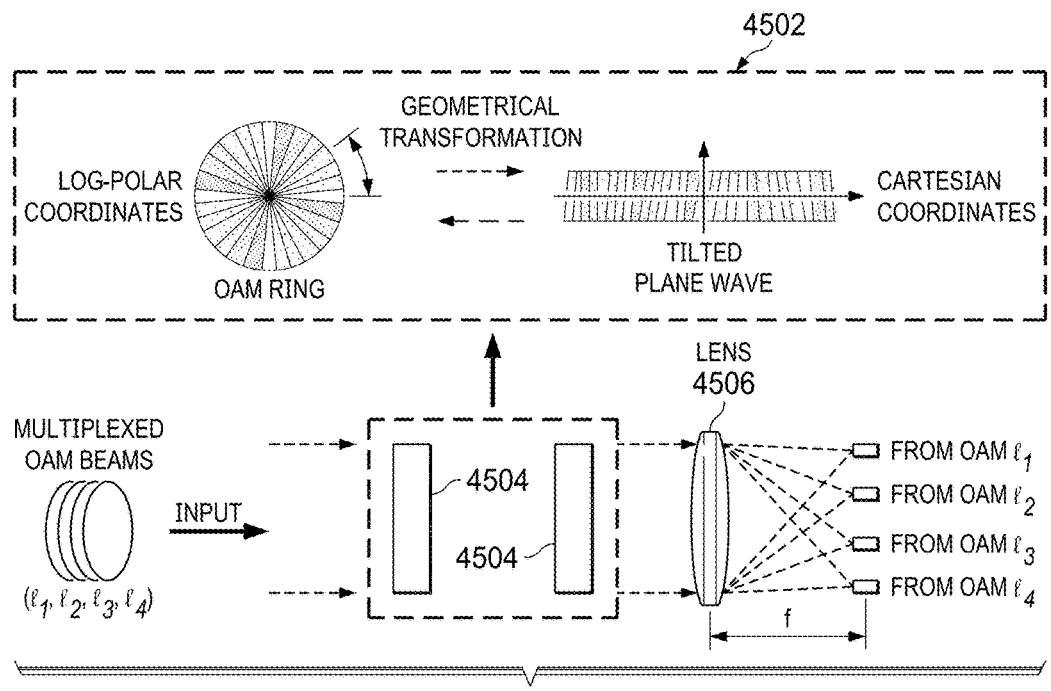
FIG. 45 illustrates a log polar geometrical transformation based on OAM multiplexing and de-multiplexing.

Referring now to FIG. 45, another method of multiplexing and demultiplexing, which could be more power-efficient than the previous one (using beam splitters), is the use of an OAM mode sorter. This mode sorter usually comprises three optical elements, including a transformer 4502, a corrector 4504, and a lens 4506, as shown in FIG. 45. The transformer 4502 performs a geometrical transformation of the input beam from log-polar coordinates to Cartesian coordinates, such that the position (x,y) in the input plane is mapped to a new position (u,v) in the output plane, where $$u = -a \ln\left(\frac{\sqrt{x^2 + y^2}}{b}\right),$$

and v=a arctan(y/x). Here, a and b are scaling constants. The corrector 4504 compensates for phase errors and ensures that the transformed beam is collimated. Considering an input OAM beam with a ring-shaped beam profile, it can be unfolded and mapped into a rectangular-shaped plane wave with a tilted phase front. Similarly, multiple OAM beams having different l states will be transformed into a series of plane waves each with a different phase tilt. A lens 4506 focuses these tilted plane waves into spatially separated spots in the focal plane such that all the OAM beams are simultaneously demultiplexed. As the transformation is reciprocal, if the mode sorter is used in reverse it can become a multiplexer for OAM. A Gaussian beam array placed in the focal plane of the lens 4506 is converted into superimposed plane waves with different tilts. These beams then pass through the corrector and the transformer sequentially to produce properly multiplexed OAM beams.

Free Space Communications

The first proof-of-concept experiment using OAM for free space communications transmitted eight different OAM states each representing a data symbol one at a time. The azimuthal index of the transmitted OAM beam is measured at the receiver using a phase hologram modulated with a binary grating. To effectively use this approach, fast switching is required between different OAM states to achieve a high data rate. Alternatively, classic communications using OAM states as data carriers can be multiplexed at the transmitter, co-propagated through a free space link, and demultiplexed at a receiver. The total data rate of a free space communication link has reached 100 Tbit/s or even beyond by using OAM multiplexing. The propagation of OAM beams through a real environment (e.g., across a city) is also under investigation.

Basic Link Demonstrations

Figure 46:
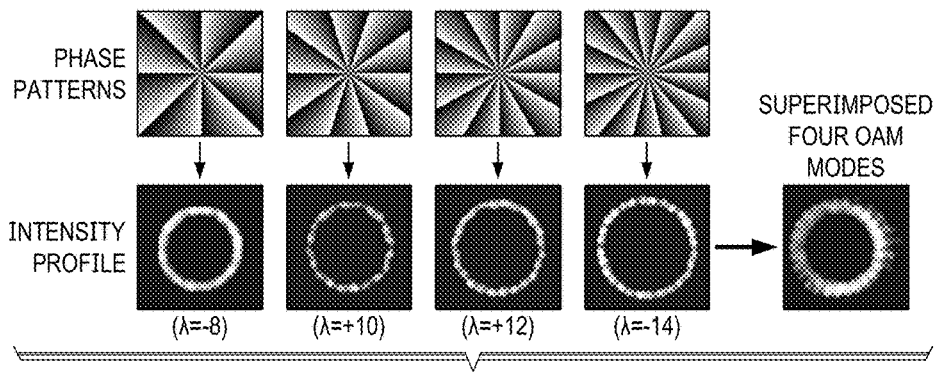
FIG. 46 illustrates an intensity profile of generated OAM beams and their multiplexing.
Figure 47A:
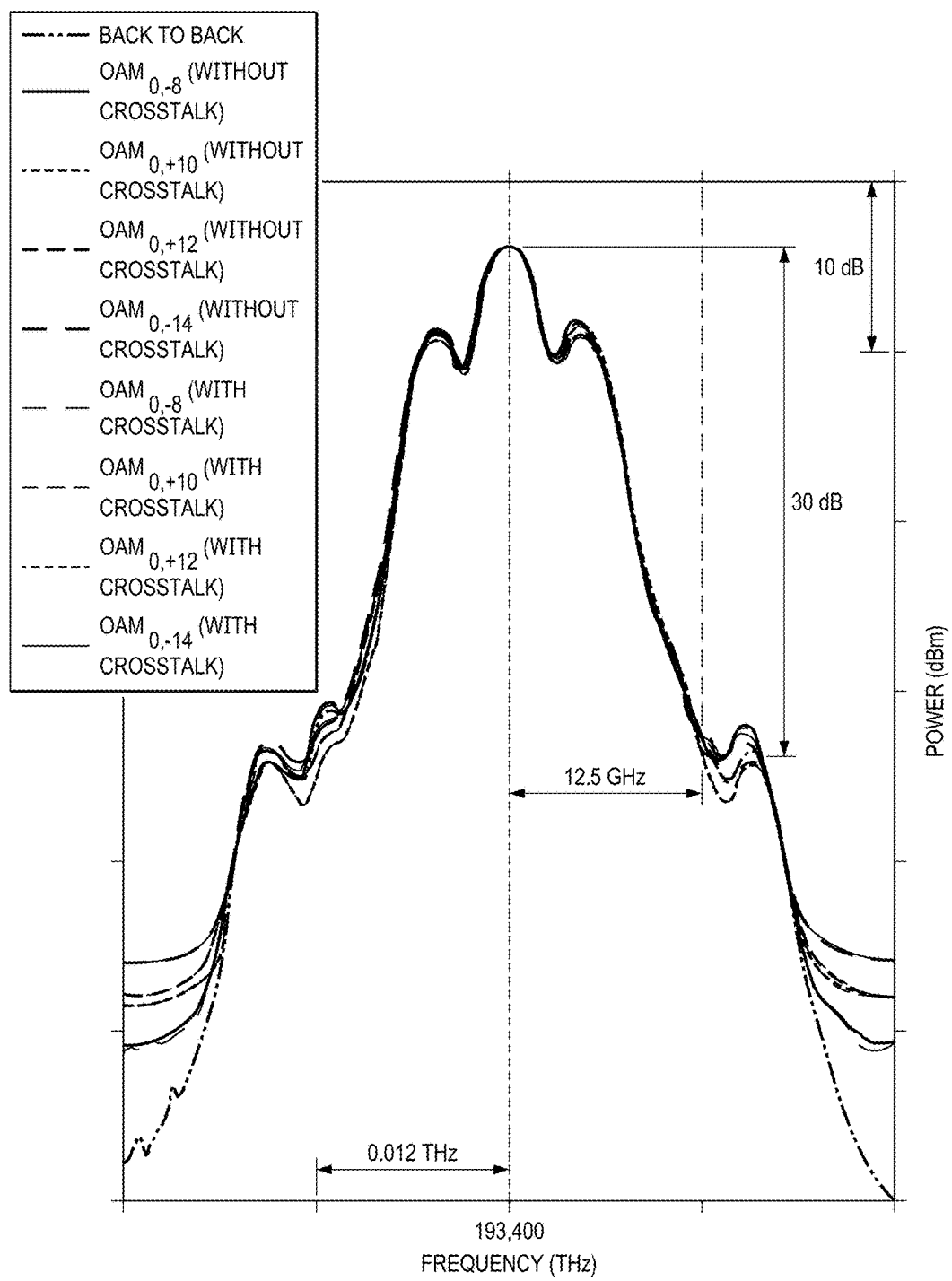
FIG. 47A illustrates the optical spectrum of each channel after each multiplexing for the OAM beams of FIG. 21A.
Figure 47B:
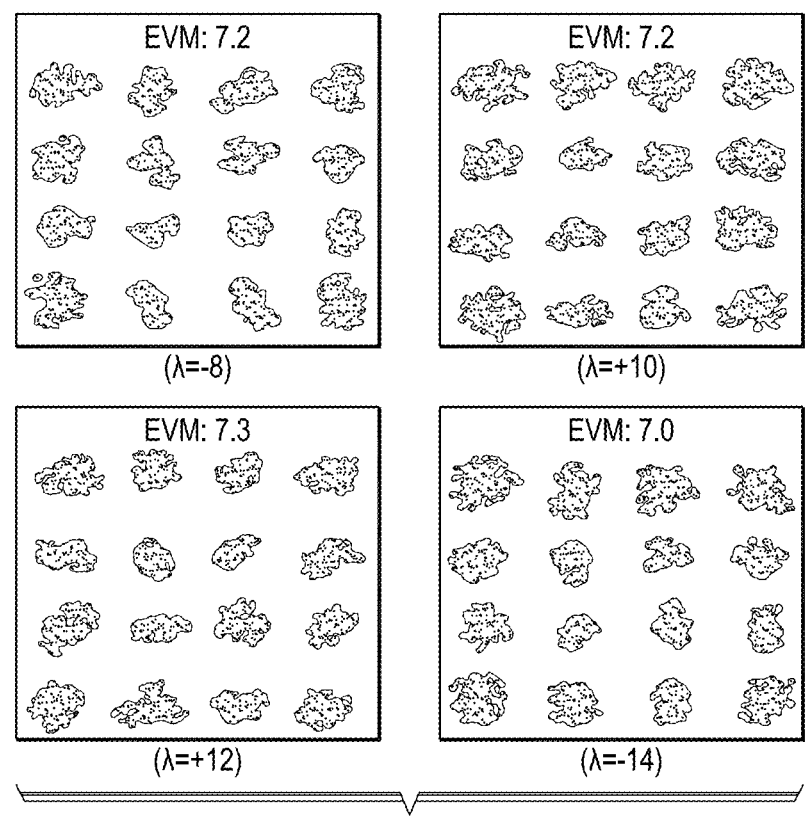
FIG. 47B illustrates the recovered constellations of 16-QAM signals carried on each OAM beam.

Referring now to FIGS. 46-47B, initial demonstrates of using OAM multiplexing for optical communications include free space links using a Gaussian beam and an OAM beam encoded with OOK data. Four monochromatic Gaussian beams each carrying an independent 50.8 Gbit/s (4×12.7 Gbit/s) 16-QAM signal were prepared from an IQ modulator and free-space collimators. The beams were converted to OAM beams with l=−8, +10, +12 and −14, respectively, using 4 SLMs each loaded with a helical phase hologram, as shown in FIG. 30A. After being coaxially multiplexed using cascaded 3 dB-beam splitters, the beams were propagated through ~1 m distance in free-space under lab conditions. The OAM beams were detected one at a time, using an inverse helical phase hologram and a fiber collimator together with a SMF. The 16-QAM data on each channel was successfully recovered, and a spectral efficiency of 12.8 bit/s/Hz in this data link was achieved, as shown in FIGS. 47A and 47B.

A following experiment doubled the spectral efficiency by adding the polarization multiplexing into the OAM-multiplexed free-space data link. Four different OAM beams (l=+4, +8, −8, +16) on each of two orthogonal polarizations (eight channels in total) were used to achieve a Terabit/s transmission link. The eight OAM beams were multiplexed and demultiplexed using the same approach as mentioned above. The measured crosstalk among channels carried by the eight OAM beams is shown in Table 1, with the largest crosstalk being ~−18.5 dB. Each of the beams was encoded with a 42.8 Gbaud 16-QAM signal, allowing a total capacity of ~1.4 (42.8×4×4×2) Tbit/s.

TABLE 1

| Measured Crosstalk | | OAM+4 X- | OAM+4 Y- | OAM+8 X- | OAM+8 Y- | OAM-8 X- | OAM-8 Y- | OAM+16 X- | OAM+16 Y- |
|---|---|---|---|---|---|---|---|---|---|
| OAM+4 (dB) | X-Pol. | | −23.2 | −26.7 | −30.8 | −30.5 | −27.7 | −24.6 | −30.1 |
| | Y-Pol. | −25.7 | | | | | | | |
| OAM+8 (dB) | X-Pol. | −26.6 | −23.5 | | −21.6 | −18.9 | −25.4 | −23.9 | −28.8 |
| | Y-Pol. | | | −25.0 | | | | | |
| OAM-8 (dB) | X-Pol. | −27.5 | −33.9 | −27.6 | −30.8 | | −20.5 | −26.5 | −21.6 |
| | Y-Pol. | | | | | −26.8 | | | |
| OAM+16 (dB) | X-Pol. | −24.5 | −31.2 | −23.7 | −23.3 | −25.8 | −26.1 | | −30.2 |
| | Y-Pol. | | | | | | | −24.0 | |
| Total from other OAMs * | | −21.8 | −21.0 | −21.2 | −21.4 | −18.5 | −21.2 | −22.2 | −20.7 |

Figure 48A:
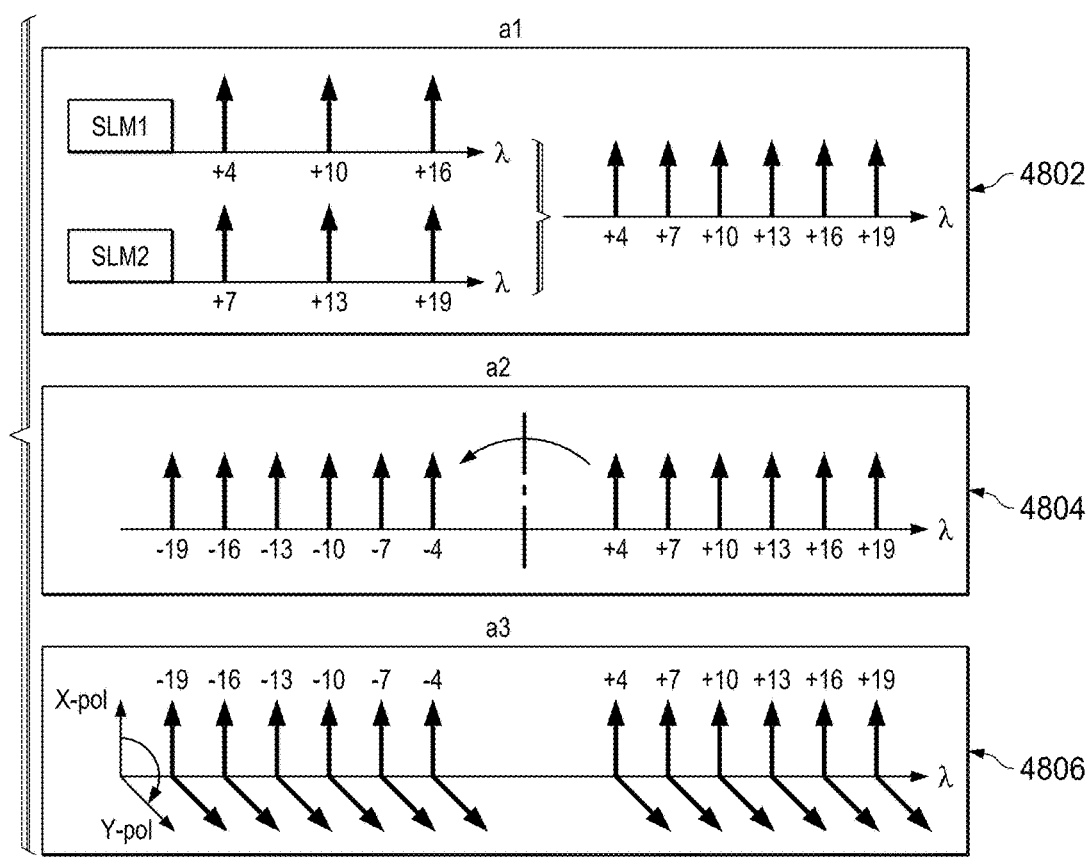
FIG. 48A illustrates the steps to produce 24 multiplex OAM beams.
Figure 48B:
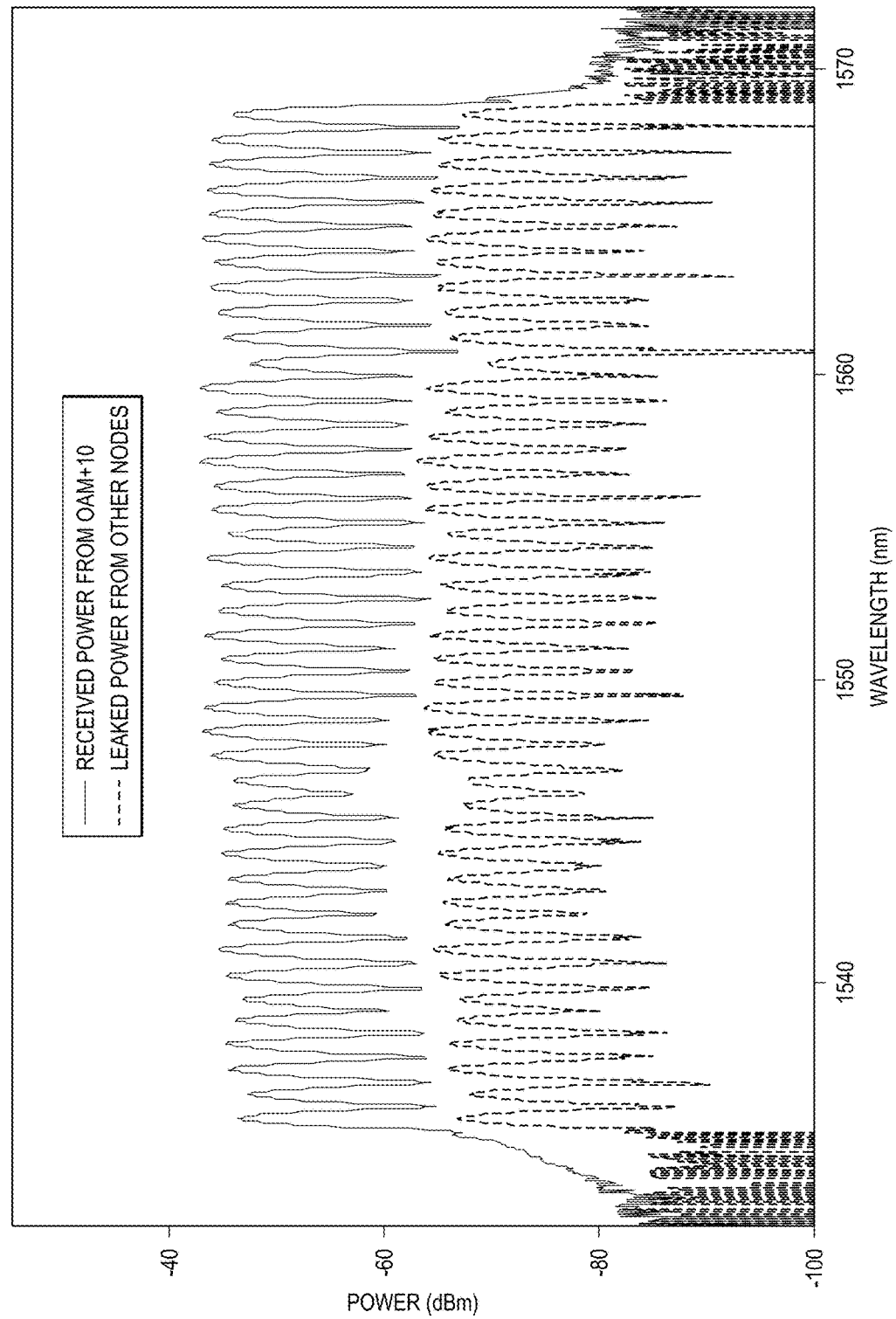
FIG. 48B illustrates the optical spectrum of a WDM signal carrier on an OAM beam.

The capacity of the free-space data link was further increased to 100 Tbit/s by combining OAM multiplexing with PDM (phase division multiplexing) and WDM (wave division multiplexing). In this experiment, 24 OAM beams (l=+4, +7, +10, +13, +16, and +19, each with two polarizations) were prepared using 2 SLMs, the procedures for which are shown in FIG. 48A at 4802-4806. Specifically, one SLM generated a superposition of OAM beams with l=+4, +10, and +16, while the other SLM generated another set of three OAM beams with l=+7, +13, and +19 (FIG. 48A). These two outputs were multiplexed together using a beam splitter, thereby multiplexing six OAM beams: l=+4, +7, +10, +13, +16, and +19 (FIG. 48A). Secondly, the six multiplexed OAM beams were split into two copies. One copy was reflected five times by three mirrors and two beam splitters, to create another six OAM beams with inverse charges (FIG. 48B). There was a differential delay between the two light paths to de-correlate the data. These two copies were then combined again to achieve 12 multiplexed OAM beams with l=+4, +7, +10, +13, +16, and +19 (FIG. 48B). These 12 OAM beams were split again via a beam splitter. One of these was polarization-rotated by 90 degrees, delayed by ~33 symbols, and then recombined with the other copy using a polarization beam splitter (PBS), finally multiplexing 24 OAM beams (with l=+4, +7, +10, +13, +16, and +19 on two polarizations). Each of the beam carried a WDM signal comprising 100 GHz-spaced 42 wavelengths (1,536.34-1,568.5 nm), each of which was modulated with 100 Gbit/s QPSK data. The observed optical spectrum of the WDM signal carried on one of the demultiplexed OAM beams (l=+10).

Atmospheric Turbulence Effects on OAM Beams

One of the critical challenges for a practical free-space optical communication system using OAM multiplexing is atmospheric turbulence. It is known that inhomogeneities in the temperature and pressure of the atmosphere lead to random variations in the refractive index along the transmission path, and can easily distort the phase front of a light beam. This could be particularly important for OAM communications, since the separation of multiplexed OAM beams relies on the helical phase-front. As predicted by simulations in the literature, these refractive index inhomogeneities may cause inter-modal crosstalk among data channels with different OAM states.

Figure 49A:
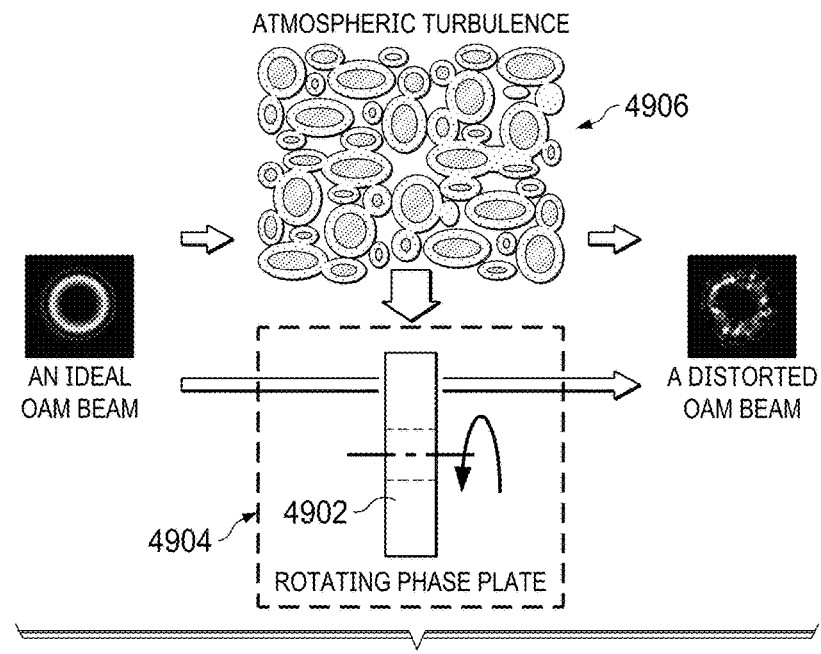
FIG. 49A illustrates a turbulence emulator.
Figure 49B:
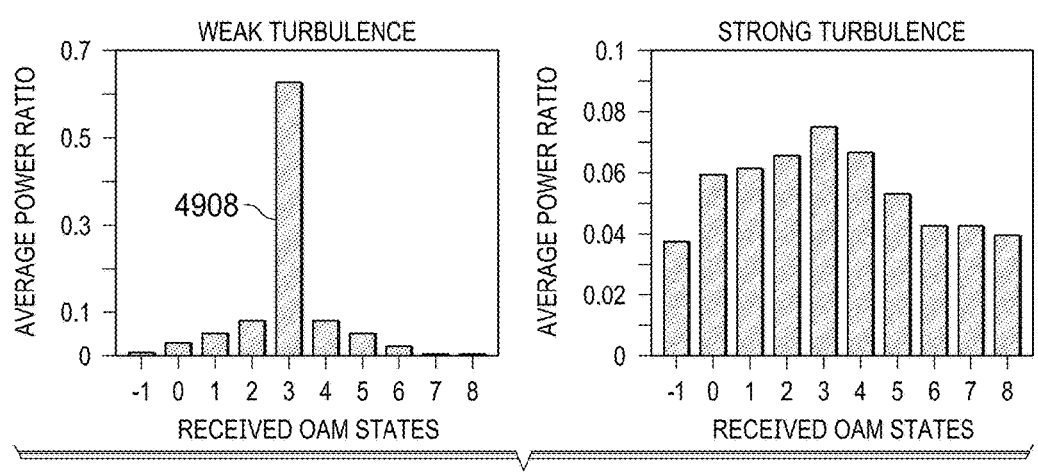
FIG. 49B illustrates the measured power distribution of an OAM beam after passing through turbulence with a different strength.

The effect of atmospheric turbulence is also experimentally evaluated. For the convenience of estimating the turbulence strength, one approach is to emulate the turbulence in the lab using an SLM or a rotating phase plate. FIG. 49A illustrates an emulator built using a thin phase screen plate 4902 that is mounted on a rotation stage 4904 and placed in the middle of the optical path. The pseudo-random phase distribution machined on the plate 4902 obeys Kolmogorov spectrum statistics, which are usually characterized by a specific effective Fried coherence length r0. The strength of the simulated turbulence 4906 can be varied either by changing to a plate 4902 with a different r0, or by adjusting the size of the beam that is incident on the plate. The resultant turbulence effect is mainly evaluated by measuring the power of the distorted beam distributed to each OAM mode using an OAM mode sorter. It was found that, as the turbulence strength increases, the power of the transmitted OAM mode would leak to neighboring modes and tend to be equally distributed among modes for stronger turbulence. As an example, FIG. 49B shows the measured average power (normalized) l=3 beam under different emulated turbulence conditions. It can be seen that the majority of the power is still in the transmitted OAM mode 4908 under weak turbulence, but it spreads to neighboring modes as the turbulence strength increases.

Turbulence Effects Mitigation Techniques

Figure 50A:
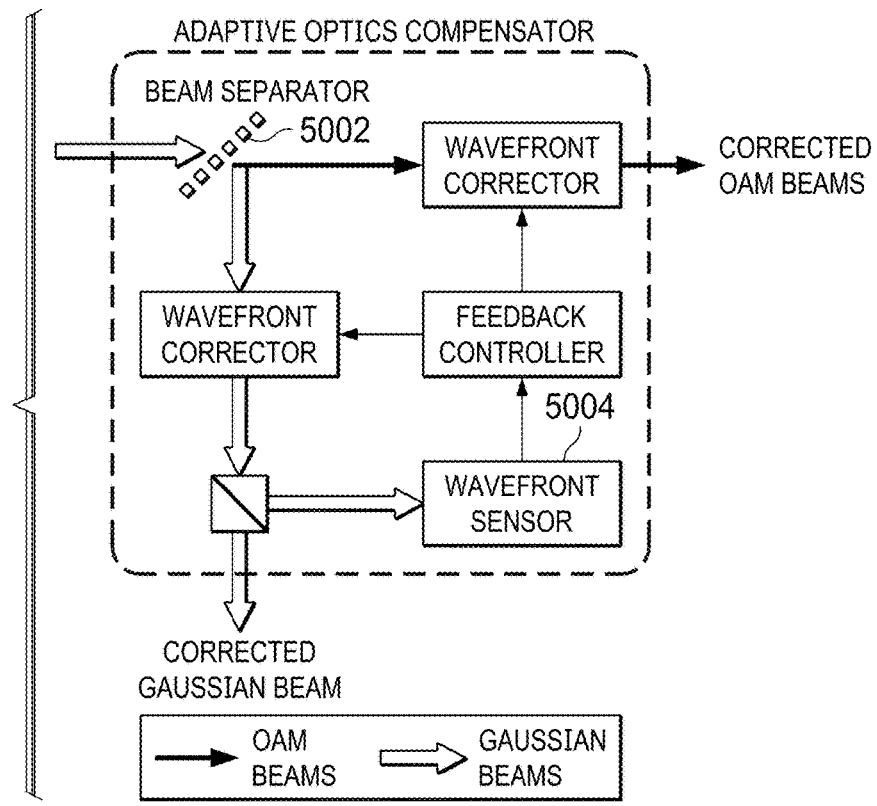
FIG. 50A illustrates how turbulence effects mitigation using adaptive optics.
Figure 50B:
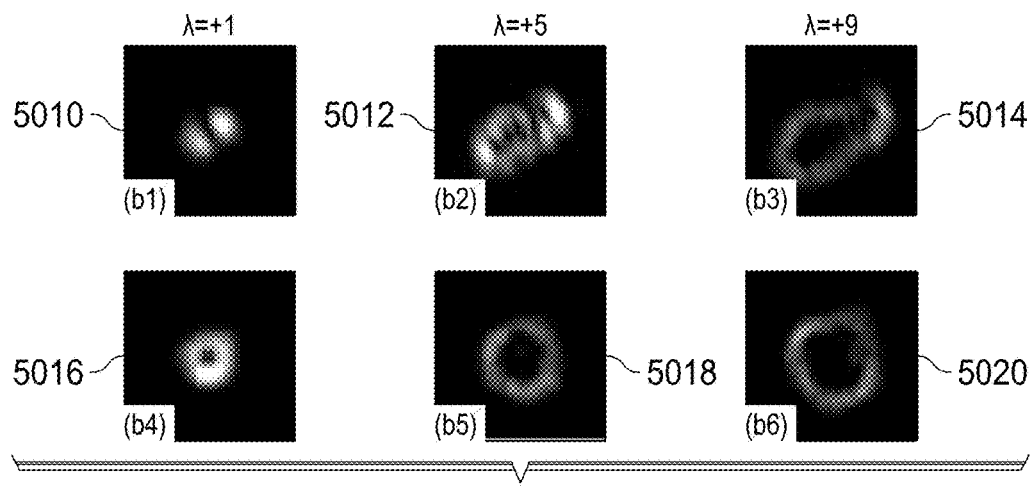
FIG. 50B illustrates experimental results of distortion mitigation using adaptive optics.

One approach to mitigate the effects of atmospheric turbulence on OAM beams is to use an adaptive optical (AO) system. The general idea of an AO system is to measure the phase front of the distorted beam first, based on which an error correction pattern can be produced and can be applied onto the beam transmitter to undo the distortion. As for OAM beams with helical phase fronts, it is challenging to directly measure the phase front using typical wavefront sensors due to the phase singularity. A modified AO system can overcome this problem by sending a Gaussian beam as a probe beam to sense the distortion, as shown in FIG. 39A. Due to the fact that turbulence is almost independent of the light polarization, the probe beam is orthogonally polarized as compared to all other beams for the sake of convenient separation at beam separator 3902. The correction phase pattern can be derived based on the probe beam distortion that is directly measured by a wavefront sensor 4904. It is noted that this phase correction pattern can be used to simultaneously compensate multiple coaxially propagating OAM beams. FIG. 50 at 5010-5080 illustrate the intensity profiles of OAM beams with l=1, 5 and 9, respectively, for a random turbulence realization with and without mitigation. From the far-field images, one can see that the distorted OAM beams (upper), up to l=9, were partially corrected, and the measured power distribution also indicates that the channel crosstalk can be reduced.

Another approach for combating turbulence effects is to partially move the complexity of optical setup into the electrical domain, and use digital signal processing (DSP) to mitigate the channel crosstalk. A typical DSP method is the multiple-input-multiple-output (MIMO) equalization, which is able to blindly estimate the channel crosstalk and cancel the interference. The implementation of a 4×4 adaptive MIMO equalizer in a four-channel OAM multiplexed free space optical link using heterodyne detection may be used. Four OAM beams (l=+2, +4, +6 and +8), each carrying 20 Gbit/s QPSK data, were collinearly multiplexed and propagated through a weak turbulence emulated by the rotating phase plate under laboratory condition to introduce distortions. After demultiplexing, four channels were coherently detected and recorded simultaneously. The standard constant modulus algorithm is employed in addition to the standard procedures of coherent detection to equalize the channel interference. Results indicate that MIMO equalization could be helpful to mitigate the crosstalk caused by either turbulence or imperfect mode generation/detection, and improve both error vector magnitude (EVM) and the bit-error-rate (BER) of the signal in an OAM-multiplexed communication link. MIMO DSP may not be universally useful as outage could happen in some scenarios involving free space data links. For example, the majority power of the transmitted OAM beams may be transferred to other OAM states under a strong turbulence without being detected, in which case MIMO would not help to improve the system performance.

OAM Free Space Link Design Considerations

Figure 51:
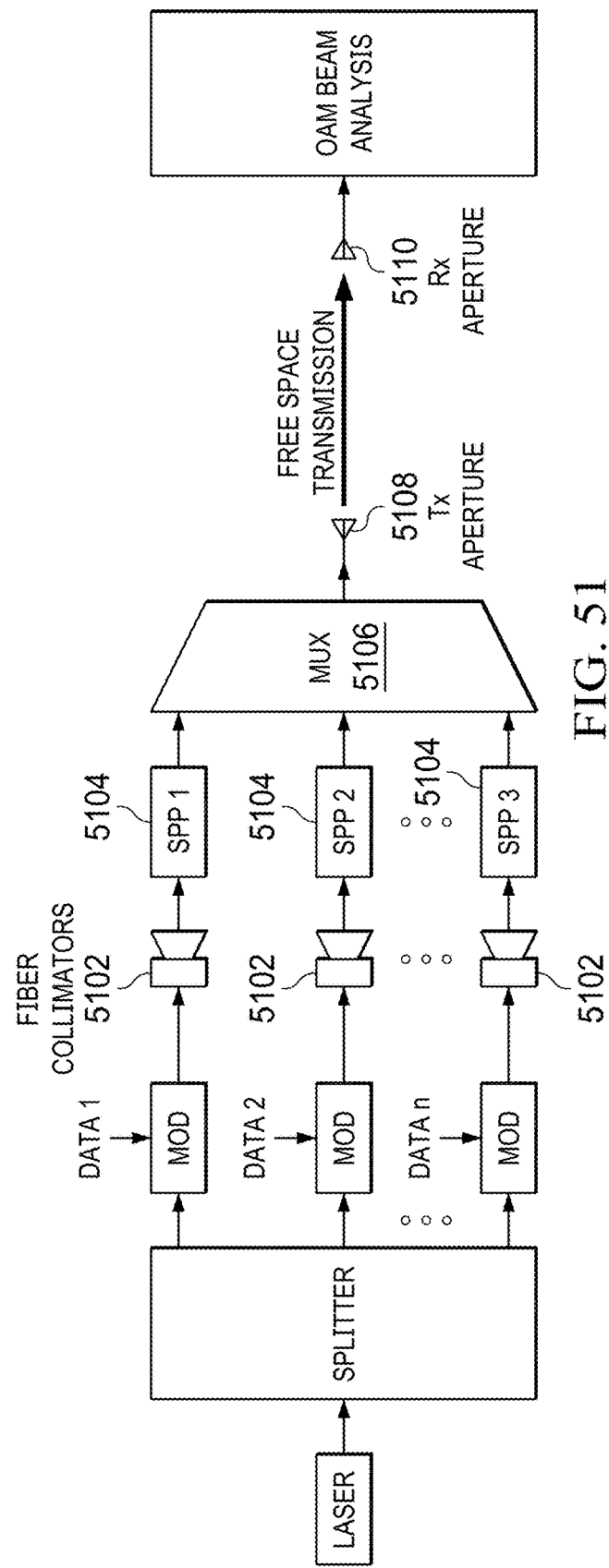
FIG. 51 illustrates a free-space optical data link using OAM.

To date, most of the experimental demonstrations of optical communication links using OAM beams took place in the lab conditions. There is a possibility that OAM beams may also be used in a free space optical communication link with longer distances. To design such a data link using OAM multiplexing, several important issues such as beam divergence, aperture size and misalignment of two transmitter and receiver, need to be resolved. To study how those parameters affect the performance of an OAM multiplexed system, a simulation model was described by Xie et al, the schematic setup of which is shown in FIG. 51. Each of the different collimated Gaussian beams 5102 at the same wavelength is followed by a spiral phase plate 5104 with a unique order to convert the Gaussian beam into a data-carrying OAM beam. Different orders of OAM beams are then multiplexed at multiplexor 5106 to form a concentric-ring-shape and coaxially propagate from transmitter 5108 through free space to the receiver aperture located at a certain propagation distance. Propagation of multiplexed OAM beams is numerically propagated using the Kirchhoff-Fresnel diffraction integral. To investigate the signal power and crosstalk effect on neighboring OAM channels, power distribution among different OAM modes is analyzed through a modal decomposition approach, which corresponds to the case where the received OAM beams are demultiplexed without power loss and the power of a desired OAM channel is completely collected by its receiver 5110. Various problems associated OAM freespace optical communications are more fully described in Willner et. al, *Design challenges and guidelines for freespace optical communications links using orbital-angular-momentum multiplexing of multiple beams*, Journal of Optics 18 (2016), which is incorporated herein by reference in its entirety.

Beam Divergence

Figure 52A:
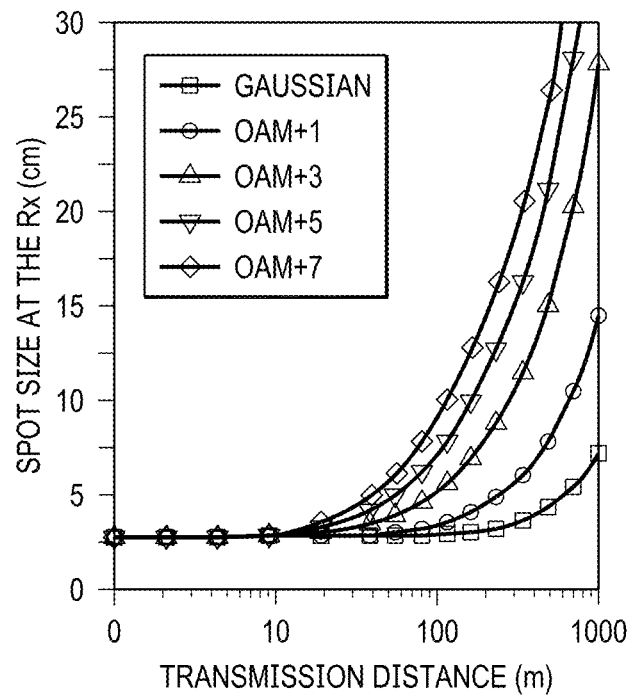
FIG. 52A illustrates simulated spot sized of different orders of OAM beams as a function of transmission distance for a 3 cm transmitted beam.
Figure 52B:
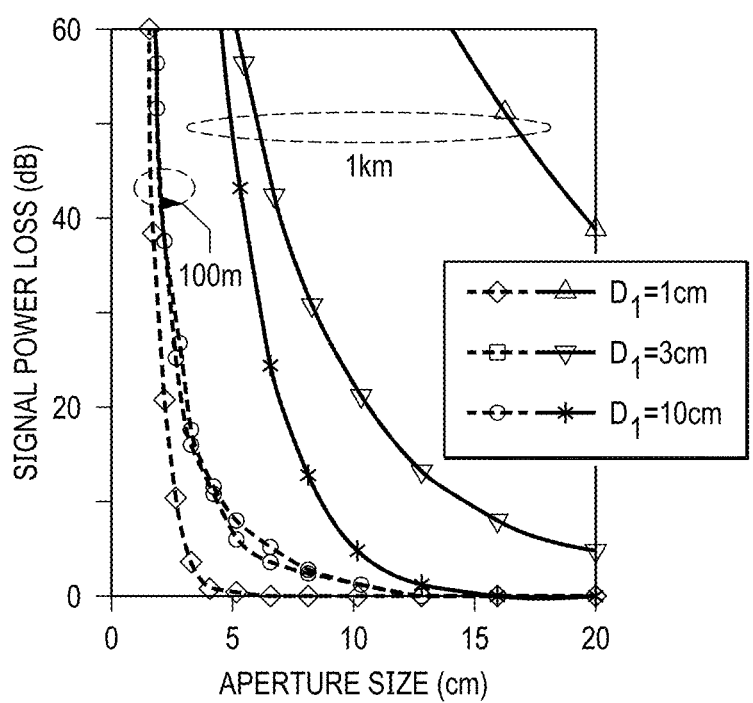
FIG. 52B illustrates simulated power loss as a function of aperture size.

For a communication link, it is generally preferable to collect as much signal power as possible at the receiver to ensure a reasonable signal-to-noise ratio (SNR). Based on the diffraction theory, it is known that a collimated OAM beam diverges while propagating in free space. Given the same spot size of three cm at the transmitter, an OAM beam with a higher azimuthal index diverges even faster, as shown in FIG. 52A. Spot size may vary at a receiver as a function of transmission distance for different OAM helicities. On the other hand, the receiving optical element usually has a limited aperture size and may not be able to collect all of the beam power. The calculated link power loss as a function of receiver aperture size is shown in FIG. 52B, with different transmission distances and various transmitted beam sizes. Unsurprisingly, the power loss of a 1-km link is higher than that of a 100-m link under the same transmitted beam size due to larger beam divergence. It is interesting to note that a system with a transmitted beam size of 3 cm suffers less power loss than that of 1 cm and 10 cm over a 100-m link.

The 1-cm transmitted beam diverges faster than the 3 cm beam due to its larger diffraction. However, when the transmitted beam size is 10 cm, the geometrical characteristics of the beam dominate over the diffraction, thus leading larger spot size at the receiver than the 3 cm transmitted beam. A trade-off between the diffraction, geometrical characteristics and the number of OAMs of the beam therefore needs to be carefully considered in order to achieve a proper-size received beam when designing a link. Transmissions using Hermite-Gaussian wavefronts minimize divergence of a transmitted beam to enable longer propagation distances.

Misalignment Tolerance

Figure 53A:
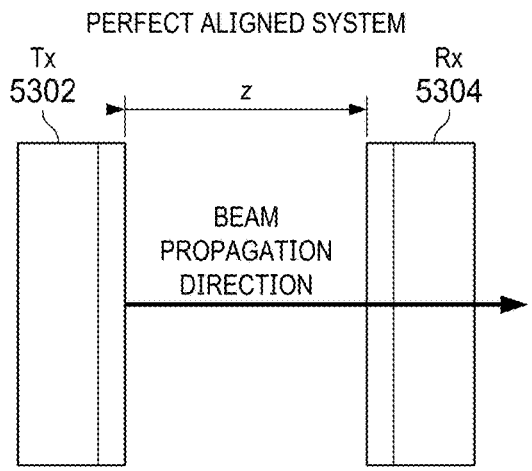
FIG. 53A illustrates a perfectly aligned system between a transmitter and receiver.
Figure 53B:
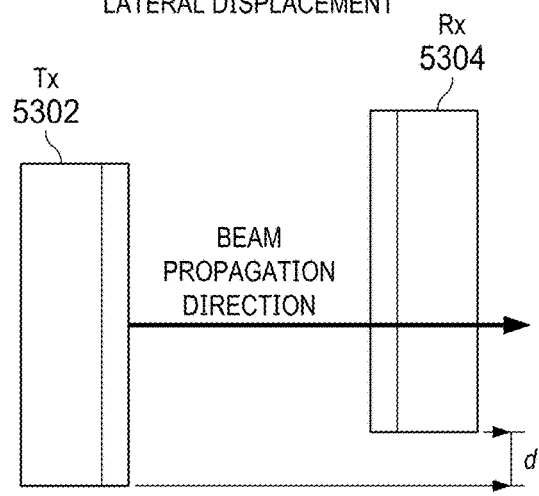
FIG. 53B illustrates a system with lateral displacement of alignment between a transmitter and receiver.
Figure 53C:
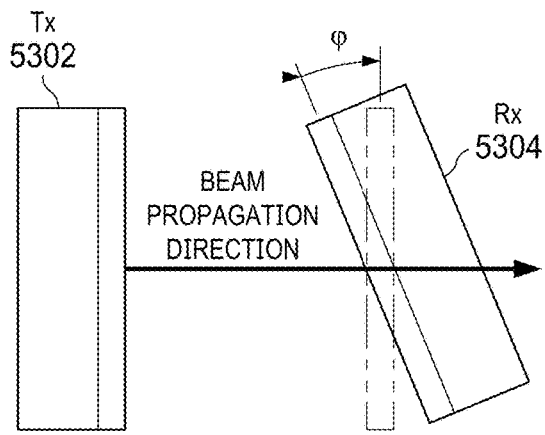
FIG. 53C illustrates a system with receiver angular error for alignment between a transmitter and receiver.

Referring now to FIGS. 53A-53C, besides the power loss due to limited-size aperture and beam divergence, another issue that needs further discussion is the potential misalignment between the transmitter and the receiver. In an ideal OAM multiplexed communication link, transmitter and receiver would be perfectly aligned, (i.e., the center of the receiver would overlap with the center of the transmitted beam 5302, and the receiver plane 5304 would be perpendicular to the line connecting their centers, as shown in FIG. 53A). However, due to difficulties in aligning because of substrate distances, and jitter and vibration of the transmitter/receiver platform, the transmitter and receiver may have relative lateral shift (i.e., lateral displacement) (FIG. 53B) or angular shift (i.e., receiver angular error) (FIG. 53C). Both types of misalignment may lead to degradation of system performance.

Figure 54A:
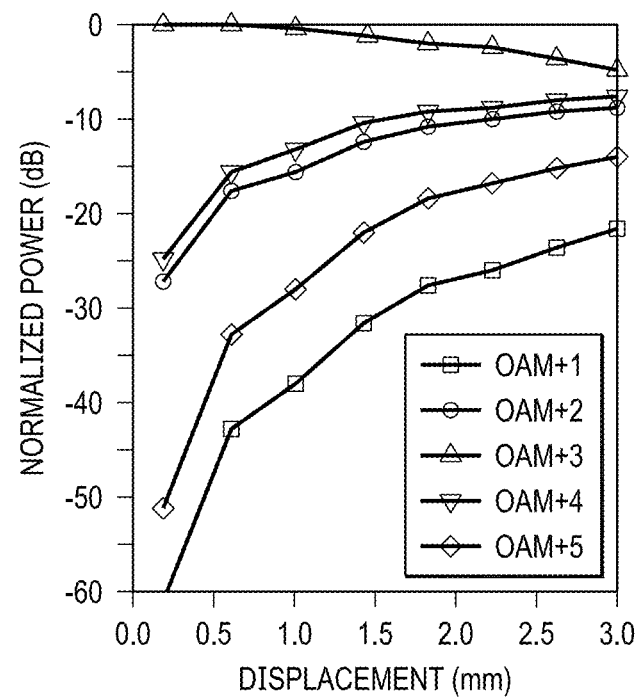
FIG. 54A illustrates simulated power distribution among different OAM modes with a function of lateral displacement.
Figure 54B:
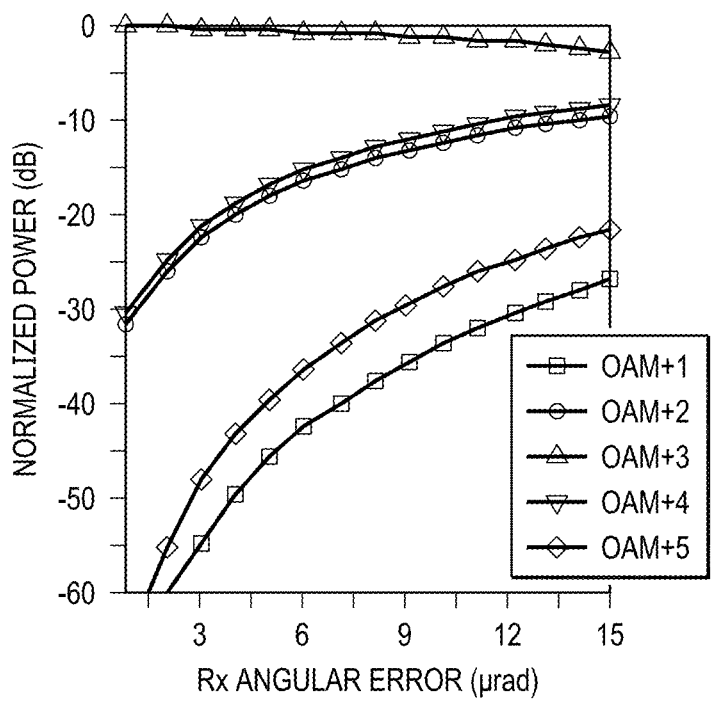
FIG. 54B illustrates simulated power distribution among different OAM modes as a function of receiver angular error.
Figure 55:
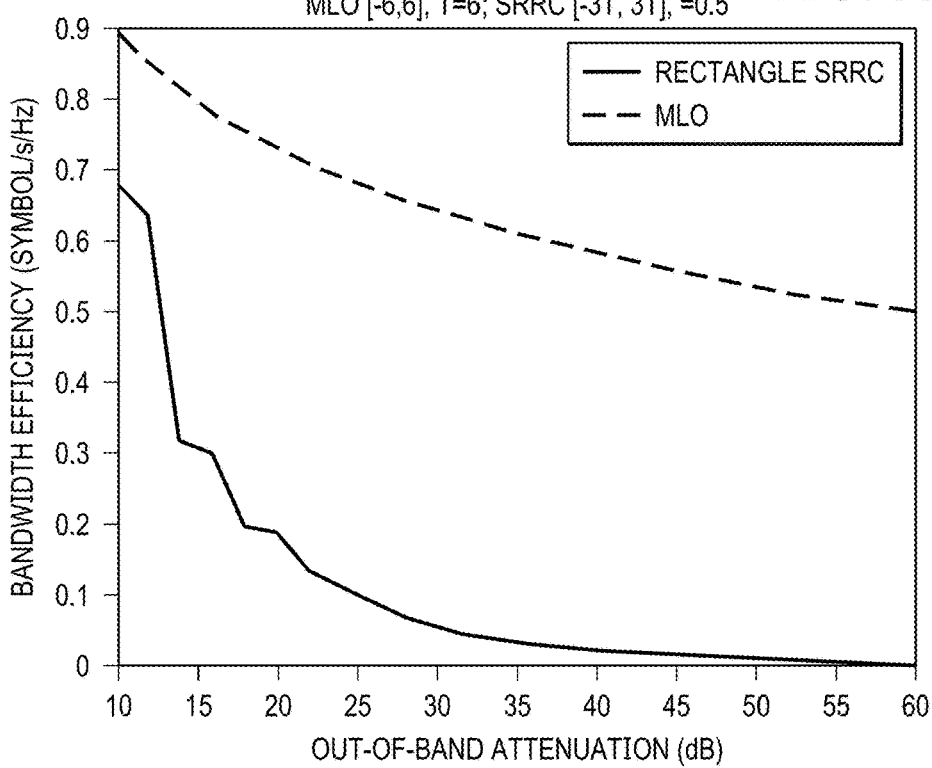
FIG. 55 illustrates a bandwidth efficiency comparison for square root raised cosine versus multiple layer overlay for a symbol rate of 1/6.

Focusing on a link distance of 100 m, FIGS. 54A and 54B show the power distribution among different OAM modes due to lateral displacement and receiver angular error when only l=+3 is transmitted with a transmitted beam size of 3 cm. In order to investigate the effect of misalignment, the receiver aperture size is chosen to be 10 cm, which could cover the whole OAM beam at the receiver. As the lateral displacement or receiver angular error increases, power leakage to other modes (i.e., channel crosstalk) increases while the power on l=+3 state decreases. This provides various receiver angular error characteristics as a function of power for differing OAM helicities. This is because larger lateral displacement or receiver angular causes larger phase profile mismatch between the received OAM beams and receiver. The power leakage to l=+1 and l=+5 is greater than that of l=+2 and l=+3 due to their larger mode spacing with respect to l=+3. Therefore, a system with larger mode spacing (which also uses higher order OAM states suffers less crosstalk. However, such a system may also have a larger power loss due to the fast divergence of higher order OAM beams, as discussed above. Clearly, this trade-off between channel crosstalk and power loss shall be considered when choosing the mode spacing in a specific OAM multiplexed link.

Figure 56:
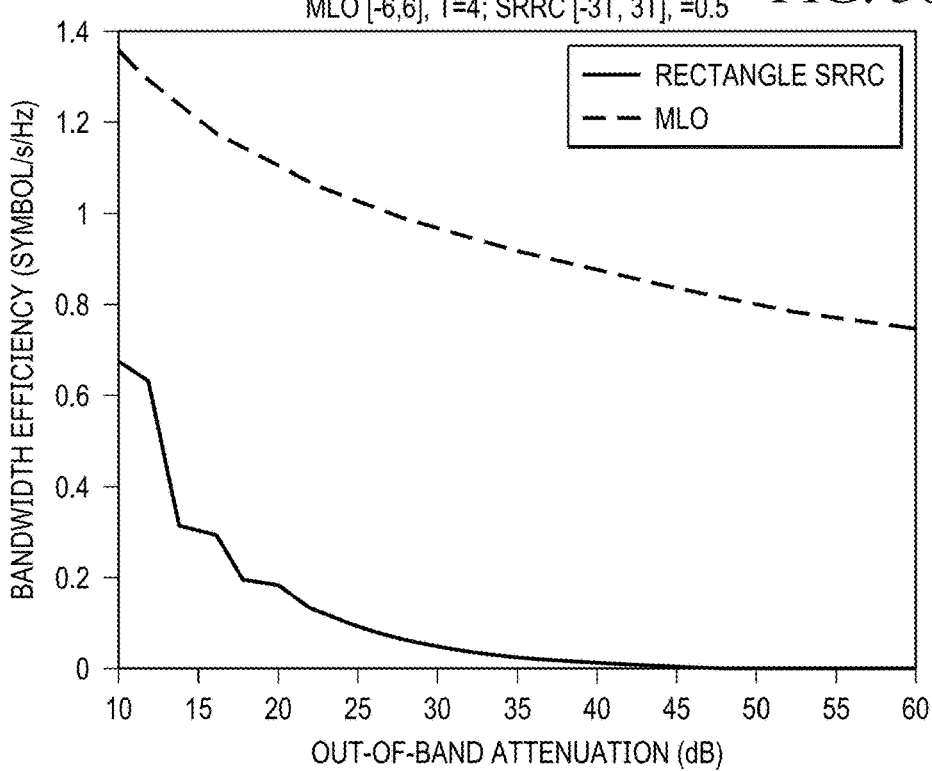
FIG. 56 illustrates a bandwidth efficiency comparison between square root raised cosine and multiple layer overlay for a symbol rate of 1/4.

Referring now to FIG. 45, there is a bandwidth efficiency comparison versus out of band attenuation (X-dB) where quantum level overlay pulse truncation interval is [−6,6] and the symbol rate is 1/6. Referring also to FIG. 56, there is illustrated the bandwidth efficiency comparison versus out of band attenuation (X-dB) where quantum level overlay pulse truncation interval is [−6,6] and the symbol rate is 1/4.

The QLO signals are generated from the Physicist's special Hermite functions:

$$f_n(t, \alpha) = \sqrt{\frac{\alpha}{\sqrt{\pi}\, n!\, 2^n}}\, H_n(\alpha t) e^{-\frac{\alpha^2 t^2}{2}}, \alpha > 0$$

Note that the initial hardware implementation is using $$\alpha = \frac{1}{\sqrt{2}}$$

and for consistency with his part, $$\alpha = \frac{1}{\sqrt{2}}$$

is used in all figures related to the spectral efficiency.

Let the low-pass-equivalent power spectral density (PSD) of the combined QLO signals be X(f) and its bandwidth be B. Here the bandwidth is defined by one of the following criteria.

ACLR1 (First Adjacent Channel Leakage Ratio) in dBc equals:

$$ACLR1 = \frac{\int_{B/2}^{3B/2} X(f)\, df}{\int_{-\infty}^{\infty} X(f)\, df}$$

ACLR2 (Second Adjacent Channel Leakage Ratio) in dBc equals:

$$ACLR2 = \frac{\int_{3B/2}^{5B/2} X(f)\, df}{\int_{-\infty}^{\infty} X(f)\, df}$$

Out-of-Band Power to Total Power Ratio is:

$$\frac{2\int_{B/2}^{\infty} X(f)\, df}{\int_{-\infty}^{\infty} X(f)\, df}$$

The Band-Edge PSD in dBc/100 kHz equals:

$$\frac{\int_{B/2}^{\frac{B}{2}+10^5} X(f)\, df}{\int_{-\infty}^{\infty} X(f)\, df}$$

Figure 57:
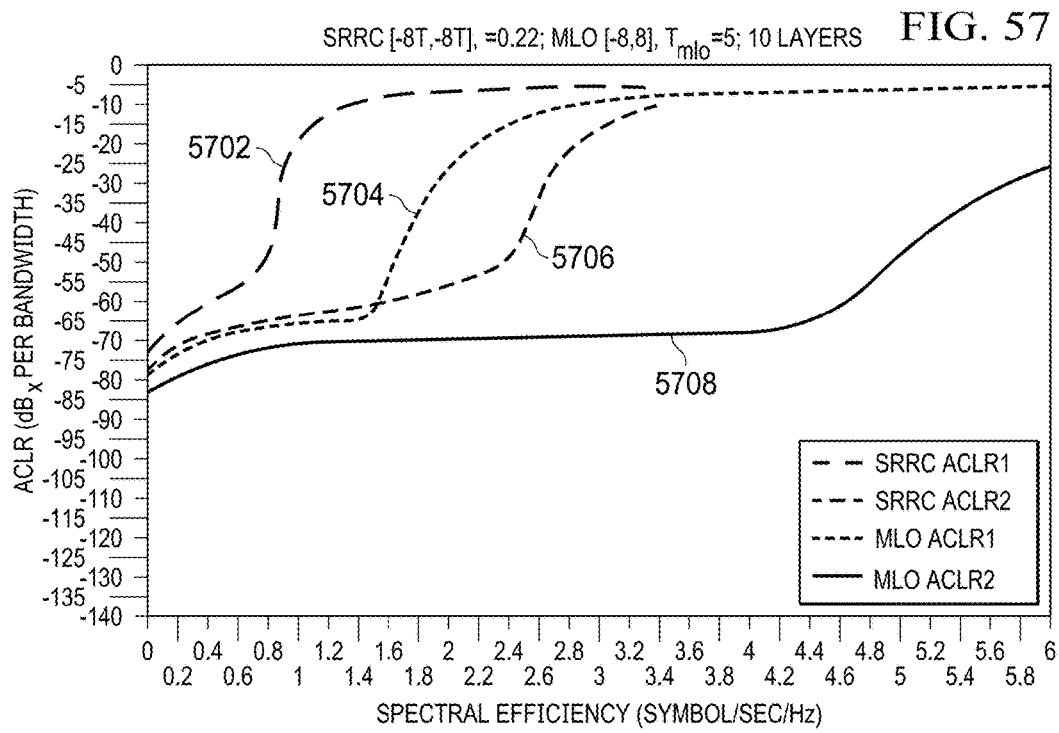
FIG. 57 illustrates a performance comparison between square root raised cosine and multiple level overlay using ACLR.

Referring now to FIG. 57 there is illustrated a performance comparison using ACLR1 and ACLR2 for both a square root raised cosine scheme and a multiple layer overlay scheme. Line 5702 illustrates the performance of a square root raised cosine 5702 using ACLR1 versus an MLO 5704 using ACLR1. Additionally, a comparison between a square root raised cosine 5706 using ACLR2 versus MLO 5708 using ACLR2 is illustrated. Table 2 illustrates the performance comparison using ACLR.

TABLE 2

| | Criteria<br>ACLR1 ≤ −30 dBc per bandwidth<br>ACLR1 ≤ −43 dBc per bandwidth | | Spectral<br>Efficiency<br>(Symbol/sec/Hz) | Gain |
|---|---|---|---|---|
| | SRRC [−8T, 8T] β = 0.22 | | 0.8765 | 1.0 |
| QLO | N Layers | Symbol Duration | | |
| [−8, 8] | N = 3 | Tmol = 4 | 1.133 | 1.2926 |
| | N = 4 | Tmol = 5 | 1.094 | 1.2481 |
| | | Tmol = 4 | 1.367 | 1.5596 |
| | N = 10 | Tmol = 8 | 1.185 | 1.3520 |
| | | Tmol = 7 | 1.355 | 1.5459 |
| | | Tmol = 6 | 1.580 | 1.8026 |
| | | Tmol = 5 | 1.896 | 2.1631 |
| | | Tmol = 4 | 2.371 | 2.7051 |

Figure 58:
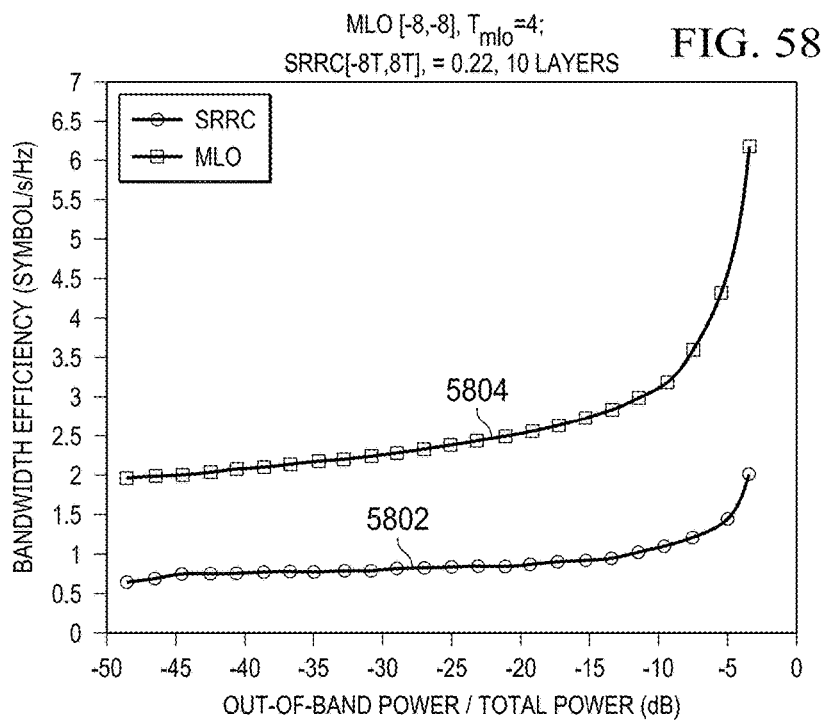
FIG. 58 illustrates a performance comparison between square root raised cosine and multiple lever overlay using out of band power.

Referring now to FIG. 58, there is illustrated a performance comparison between a square root raised cosine 5802 and a MLO 5804 using out-of-band power. Referring now also to Table 3, there is illustrated a more detailed comparison of the performance using out-of-band power.

TABLE 3

Performance Comparison using Out-of-Band Power

| | Criterion:<br>Out-of-band Power/Total Power ≤ −30 dB | | Spectral<br>Efficiency<br>(Symbol/sec/Hz) | Gain |
|---|---|---|---|---|
| | SRRC [−8T, 8T] β = 0.22 | | 0.861 | 1.0 |
| QLO | | Symbol Duration | | |
| [−8, 8] | N Layers | (Tmol) | | |
| | N = 3 | Tmol = 4 | 1.080 | 1.2544 |
| | N = 4 | Tmol = 5 | 1.049 | 1.2184 |
| | | Tmol = 4 | 1.311 | 1.5226 |
| | N = 10 | Tmol = 8 | 1.152 | 1.3380 |
| | | Tmol = 7 | 1.317 | 1.5296 |
| | | Tmol = 6 | 1.536 | 1.7840 |
| | | Tmol = 5 | 1.844 | 2.1417 |
| | | Tmol = 4 | 2.305 | 2.6771 |

Figure 59:
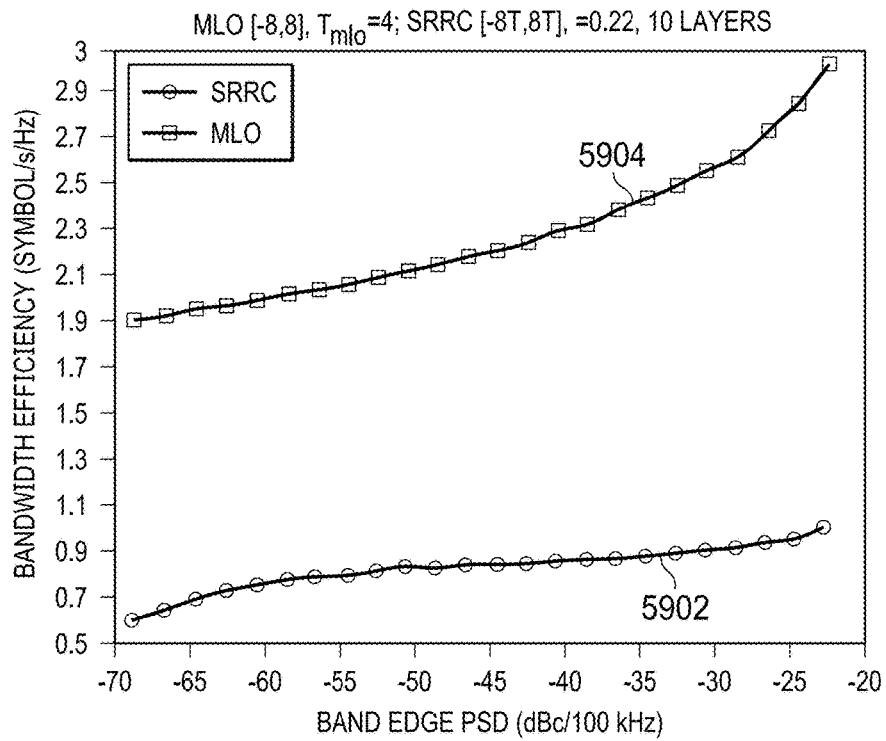
FIG. 59 illustrates a performance comparison between square root raised cosine and multiple lever overlay using band edge PSD.

Referring now to FIG. 59, there is further provided a performance comparison between a square root raised cosine 5902 and a MLO 5904 using band-edge PSD. A more detailed illustration of the performance comparison is provided in Table 4.

TABLE 4

Performance Comparison using Band-Edge PSD

| | Criterion:<br>Band-Edge PSD = 50 dBc/100 kHz | | Spectral<br>Efficiency<br>(Symbol/sec/Hz) | Gain |
|---|---|---|---|---|
| | SRRC [TABLE 58T, 8T] β = 0.22 | | 0.810 | 1.0 |
| QLO | | Symbol Duration | | |
| [−8, 8] | N Layers | (Tmol) | | |
| | N = 3 | Tmol = 4 | 0.925 | 1.1420 |
| | N = 4 | Tmol = 5 | 0.912 | 1.1259 |
| | | Tmol = 4 | 1.14 | 1.4074 |
| | N = 10 | Tmol = 8 | 1.049 | 1.2951 |
| | | Tmol = 7 | 1.198 | 1.2951 |
| | | Tmol = 6 | 1.398 | 1.7259 |
| | | Tmol = 5 | 1.678 | 2.0716 |
| | | Tmol = 4 | 2.097 | 2.5889 |

Figure 60:
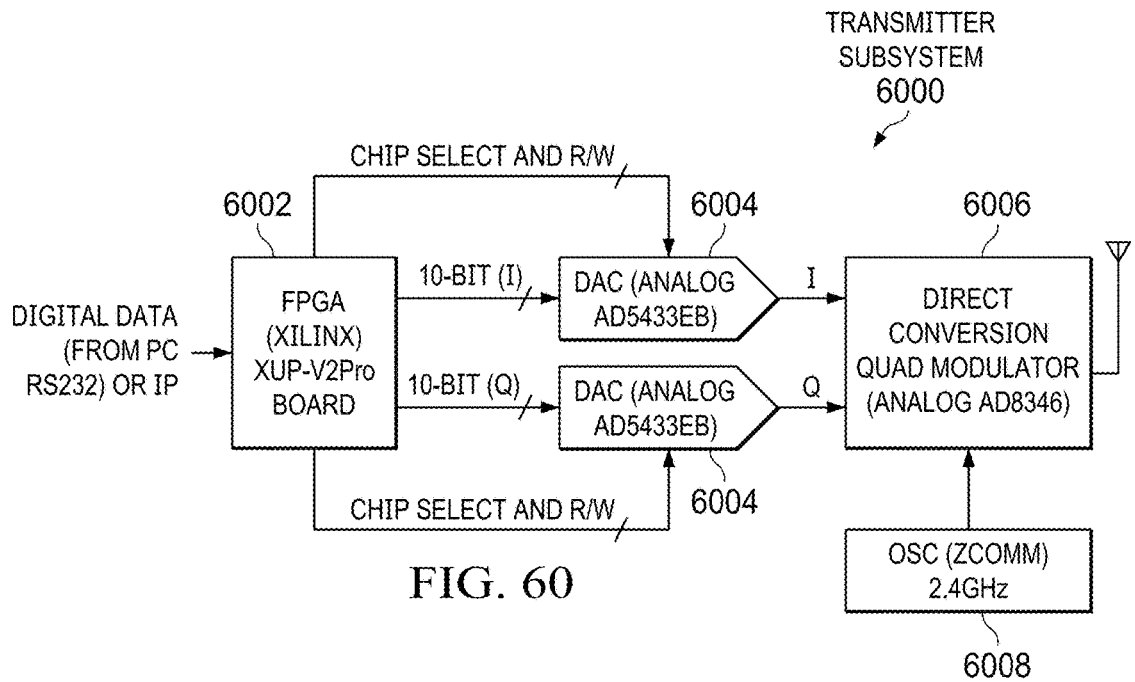
FIG. 60 is a block diagram of a transmitter subsystem for use with multiple level overlay.
Figure 61:
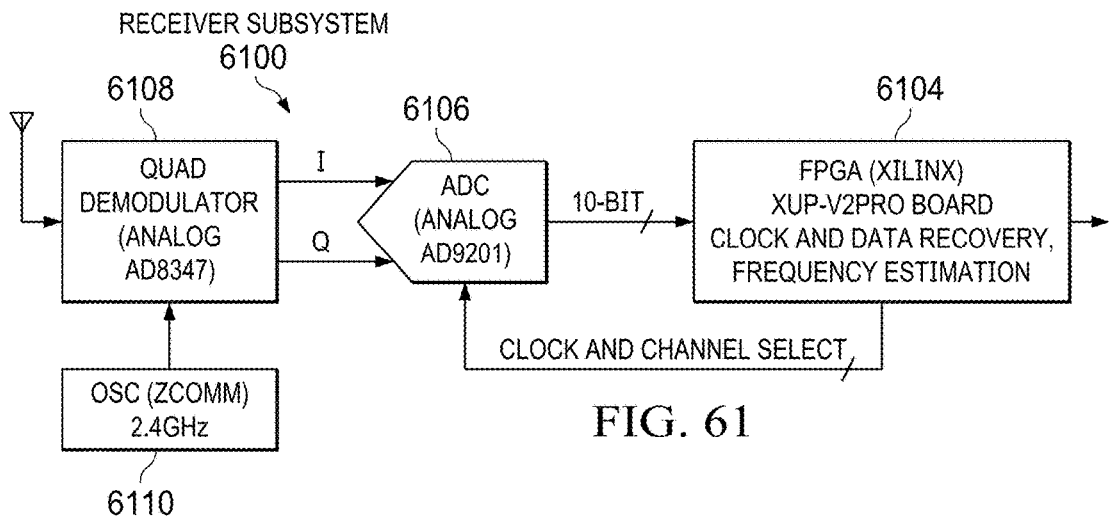
FIG. 61 is a block diagram of a receiver subsystem using multiple level overlay.

Referring now to FIGS. 60 and 61, there are more particularly illustrated the transmit subsystem (FIG. 60) and the receiver subsystem (FIG. 61). The transceiver is realized using basic building blocks available as Commercially Off The Shelf products. Modulation, demodulation and Special Hermite correlation and de-correlation are implemented on a FPGA board. The FPGA board 6102 at the receiver 6100 estimated the frequency error and recovers the data clock (as well as data), which is used to read data from the analog-to-digital (ADC) board 6106. The FGBA board 6100 also segments the digital I and Q channels.

On the transmitter side 6000, the FPGA board 6002 realizes the special hermite correlated QAM signal as well as the necessary control signals to control the digital-to-analog (DAC) boards 6004 to produce analog I&Q baseband channels for the subsequent up conversion within the direct conversion quad modulator 6006. The direct conversion quad modulator 6006 receives an oscillator signal from oscillator 6108.

The ADC 6106 receives the I&Q signals from the quad demodulator 6108 that receives an oscillator signal from 6110.

Neither power amplifier in the transmitter nor an LNA in the receiver is used since the communication will take place over a short distance. The frequency band of 2.4-2.5 GHz (ISM band) is selected, but any frequency band of interest may be utilized.

MIMO uses diversity to achieve some incremental spectral efficiency. Each of the signals from the antennas acts as an independent orthogonal channel. With QLO, the gain in spectral efficiency comes from within the symbol and each QLO signal acts as independent channels as they are all orthogonal to one another in any permutation. However, since QLO is implemented at the bottom of the protocol stack (physical layer), any technologies at higher levels of the protocol (i.e. Transport) will work with QLO. Therefore one can use all the conventional techniques with QLO. This includes RAKE receivers and equalizers to combat fading, cyclical prefix insertion to combat time dispersion and all other techniques using beam forming and MIMO to increase spectral efficiency even further.

When considering spectral efficiency of a practical wireless communication system, due to possibly different practical bandwidth definitions (and also not strictly bandlimited nature of actual transmit signal), the following approach would be more appropriate.

Figure 62:
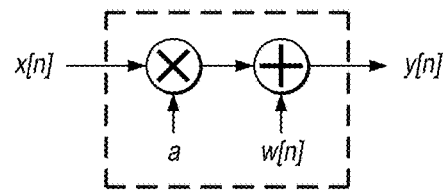
FIG. 62 illustrates an equivalent discreet time orthogonal channel of modified multiple level overlay.

Referring now to FIG. 62, consider the equivalent discrete time system, and obtain the Shannon capacity for that system (will be denoted by Cd). Regarding the discrete time system, for example, for conventional QAM systems in AWGN, the system will be:

$$y[n] = a\, x[n] + w[n]$$

where a is a scalar representing channel gain and amplitude scaling, x[n] is the input signal (QAM symbol) with unit average energy (scaling is embedded in a), y[n] is the demodulator (matched filter) output symbol, and index n is the discrete time index.

The corresponding Shannon capacity is:

$$C_d = \log_2(1 + |a|^2/\sigma^2)$$

where σ2 is the noise variance (in complex dimension) and $|a|2/\sigma 2$ is the SNR of the discrete time system.

Second, compute the bandwidth W based on the adopted bandwidth definition (e.g., bandwidth defined by −40 dBc out of band power). If the symbol duration corresponding to a sample in discrete time (or the time required to transmit $C_d$ bits) is T, then the spectral efficiency can be obtained as:

$$C/W = C_d/(TW) \text{ bps/Hz}$$

In discrete time system in AWGN channels, using Turbo or similar codes will give performance quite close to Shannon limit $C_d$. This performance in discrete time domain will be the same regardless of the pulse shape used. For example, using either SRRC (square root raised cosine) pulse or a rectangle pulse gives the same $C_d$ (or $C_d/T$). However, when we consider continuous time practical systems, the bandwidths of SRRC and the rectangle pulse will be different. For a typical practical bandwidth definition, the bandwidth for a SRRC pulse will be smaller than that for the rectangle pulse and hence SRRC will give better spectral efficiency. In other words, in discrete time system in AWGN channels, there is little room for improvement. However, in continuous time practical systems, there can be significant room for improvement in spectral efficiency.

Figure 63:
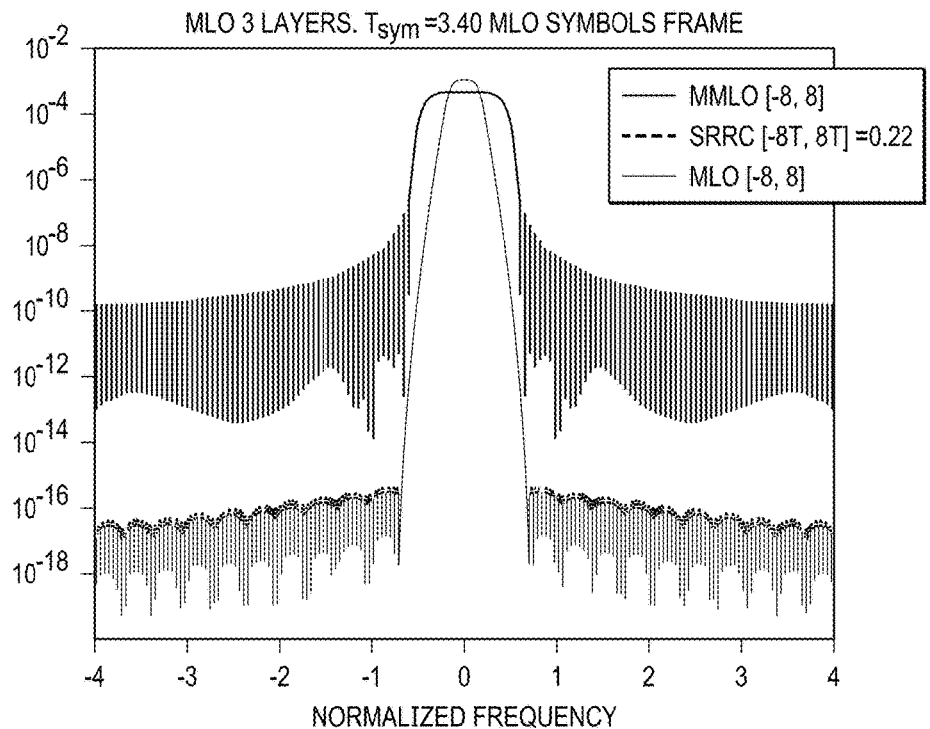
FIG. 63 illustrates the PSDs of multiple layer overlay, modified multiple layer overlay and square root raised cosine.
Figure 64:
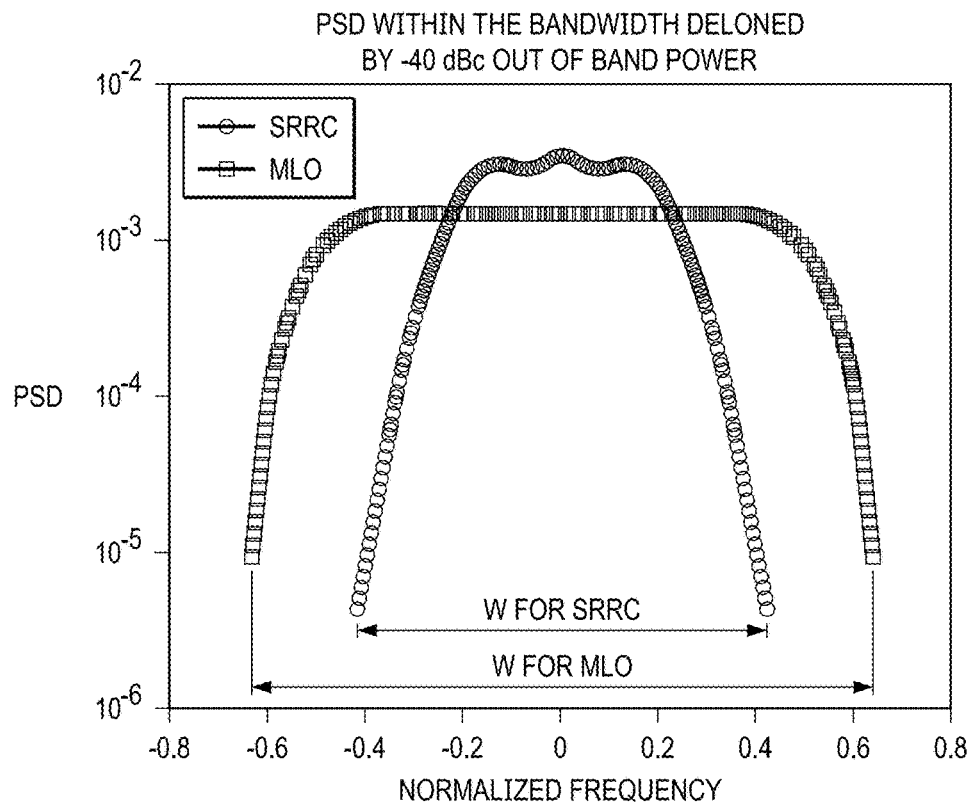
FIG. 64 illustrates a bandwidth comparison based on −40 dBc out of band power bandwidth between multiple layer overlay and square root raised cosine.

Referring now to FIG. 63, there is illustrated a PSD plot (BLANK) of MLO, modified MLO (MMLO) and square root raised cosine (SRRC). From the illustration in FIG. 52, demonstrates the better localization property of MLO. An advantage of MLO is the bandwidth. FIG. 63 also illustrates the interferences to adjacent channels will be much smaller for MLO. This will provide additional advantages in managing, allocating or packaging spectral resources of several channels and systems, and further improvement in overall spectral efficiency. If the bandwidth is defined by the −40 dBc out of band power, the within-bandwidth PSDs of MLO and SRRC are illustrated in FIG. 64. The ratio of the bandwidths is about 1.536. Thus, there is significant room for improvement in spectral efficiency.

Figure 65:
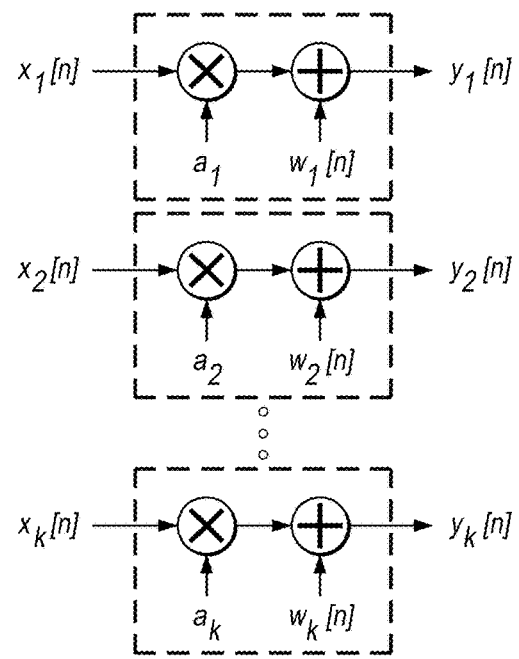
FIG. 65 illustrates equivalent discrete time parallel orthogonal channels of modified multiple layer overlay.

Modified MLO systems are based on block-processing wherein each block contains N MLO symbols and each MLO symbol has L layers. MMLO can be converted into parallel (virtual) orthogonal channels with different channel SNRs as illustrated in FIG. 65. The outputs provide equivalent discrete time parallel orthogonal channels of MMLO.

Figure 66:
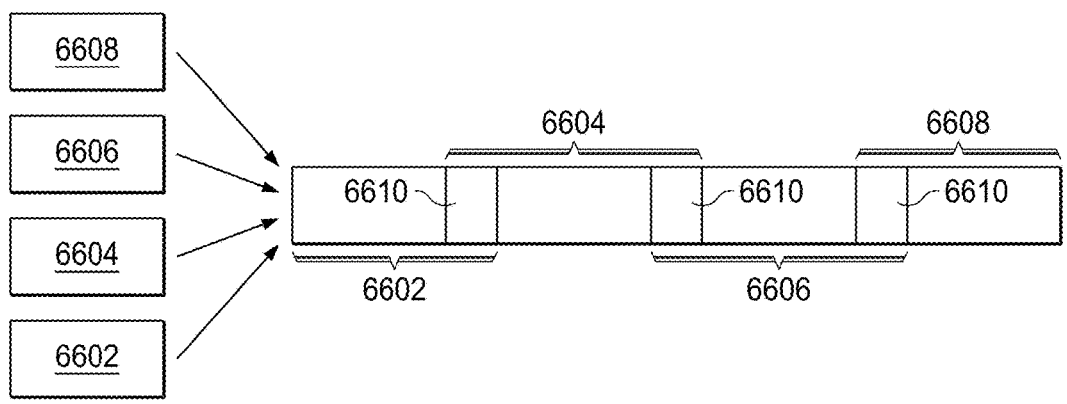
FIG. 66 illustrates four MLO symbols that are included in a single block.
Figure 67:
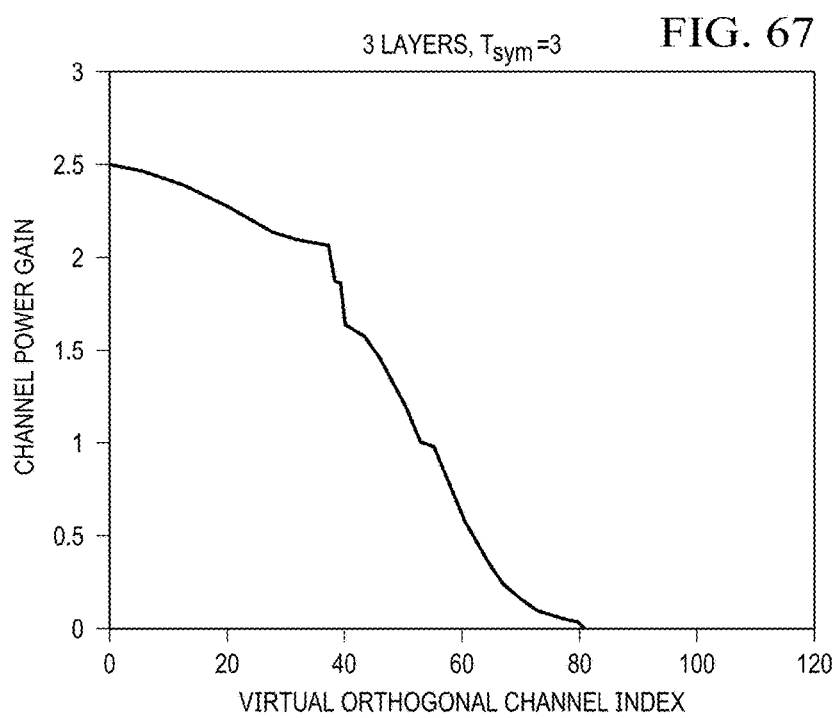
FIG. 67 illustrates the channel power gain of the parallel orthogonal channels of modified multiple layer overlay with three layers and $T_{sym}=3$.

Referring now to FIG. 66, there are illustrated four MLO symbols that are included in a single block 6600. The four symbols 6602-6608 are combined together into the single block 6600. The adjacent symbols 6602-6608 each have an overlapping region 6610. This overlapping region 6610 causes intersymbol interference between the symbols which must be accounted for when processing data streams.

Note that the intersymbol interference caused by pulse overlapping of MLO has been addressed by the parallel orthogonal channel conversion. As an example, the power gain of a parallel orthogonal virtual channel of MMLO with three layers and 40 symbols per block is illustrated in FIG. 57. FIG. 57 illustrates the channel power gain of the parallel orthogonal channels of MMLO with three layers and $T_{sim}=3$. By applying a water filling solution, an optimal power distribution across the orthogonal channels for a fixed transmit power may be obtained. The transmit power on the $k^{th}$ orthogonal channel is denoted by $P_k$. Then the discrete time capacity of the MMLO can be given by:

$$C_d = \sum_{k=1}^{k} \log_2\left(1 + \frac{P_k|a_k|^2}{\sigma_k^2}\right) \text{bits per block}$$

Note that K depends on the number of MLO layers, the number of MLO symbols per block, and MLO symbol duration.

For MLO pulse duration defined by $[-t_1, t_1]$, and symbol duration $T_{mlo}$, the MMLO block length is:

$$T_{block} = (N-1)T_{mlo} + 2t_1$$

Suppose the bandwidth of MMLO signal based on the adopted bandwidth definition (ACLR, OBP, or other) is $W_{mmlo}$, then the practical spectral efficiency of MMLO is given by:

$$\frac{C_d}{W_{mmlo}T_{block}} = \frac{1}{W_{mmlo}\{(N-1)T_{mlo}+2t_1\}} \sum_{k=1}^{K} \log_2\left(1 + \frac{P_k|a_k|^2}{\sigma_k^2}\right)\frac{bps}{Hz}$$

Figure 68:
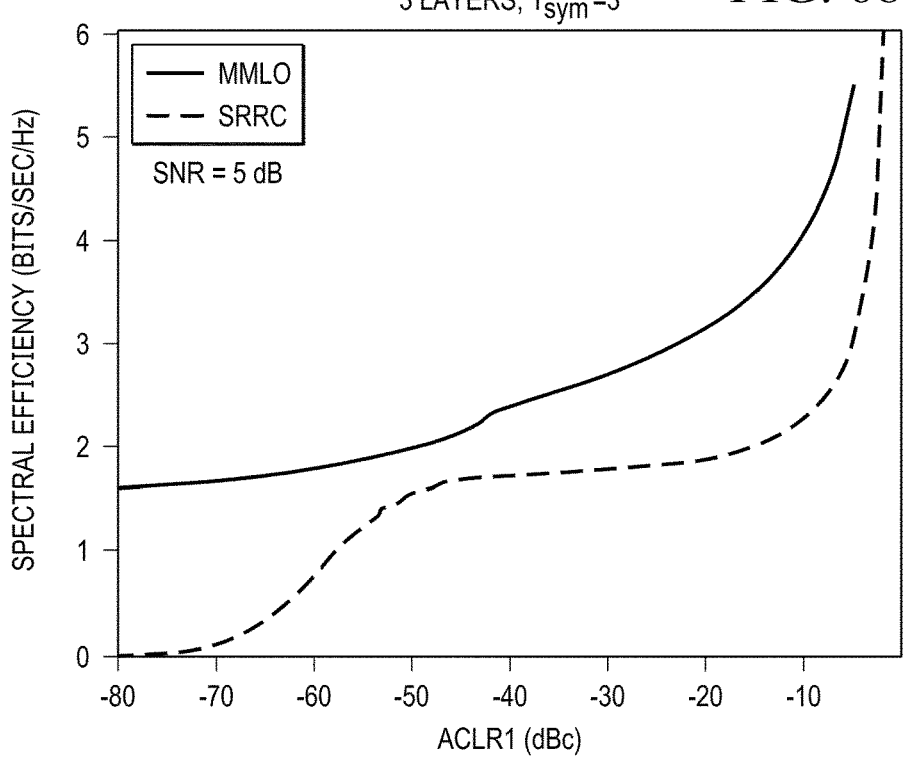
FIG. 68 illustrates a spectral efficiency comparison based on ACLR1 between modified multiple layer overlay and square root raised cosine.
Figure 69:
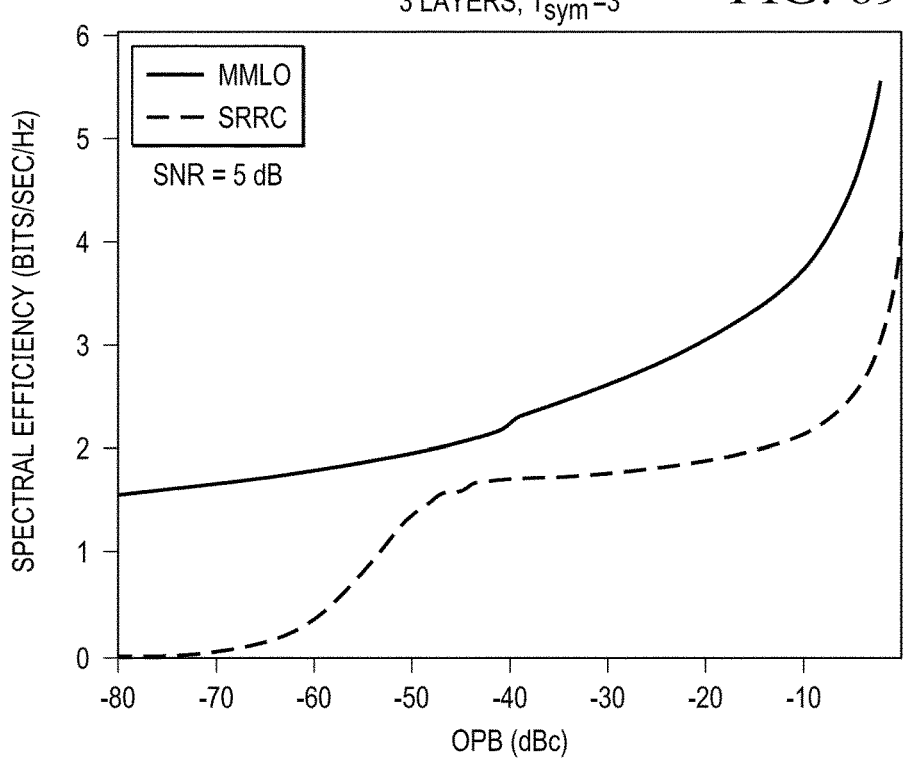
FIG. 69 illustrates a spectral efficiency comparison between modified multiple layer overlay and square root raised cosine based on OBP.

FIGS. 68-69 show the spectral efficiency comparison of MMLO with N=40 symbols per block, L=3 layers, $T_{mlo}=3$, $t_1=8$, and SRRC with duration $[-8T, 8T]$, T=1, and the roll-off factor $\beta=0.22$, at SNR of 5 dB. Two bandwidth definitions based on ACLR1 (first adjacent channel leakage power ratio) and OBP (out of band power) are used.

Figure 70:
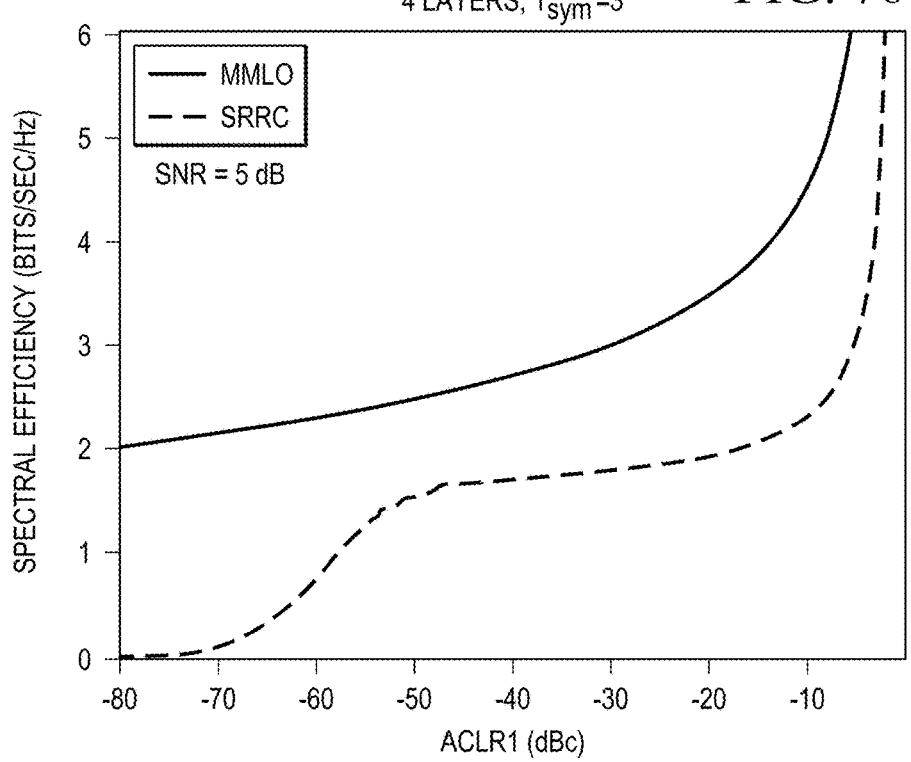
FIG. 70 illustrates a spectral efficiency comparison based on ACLR1 between modified multiple layer overlay and square root raised cosine.
Figure 71:
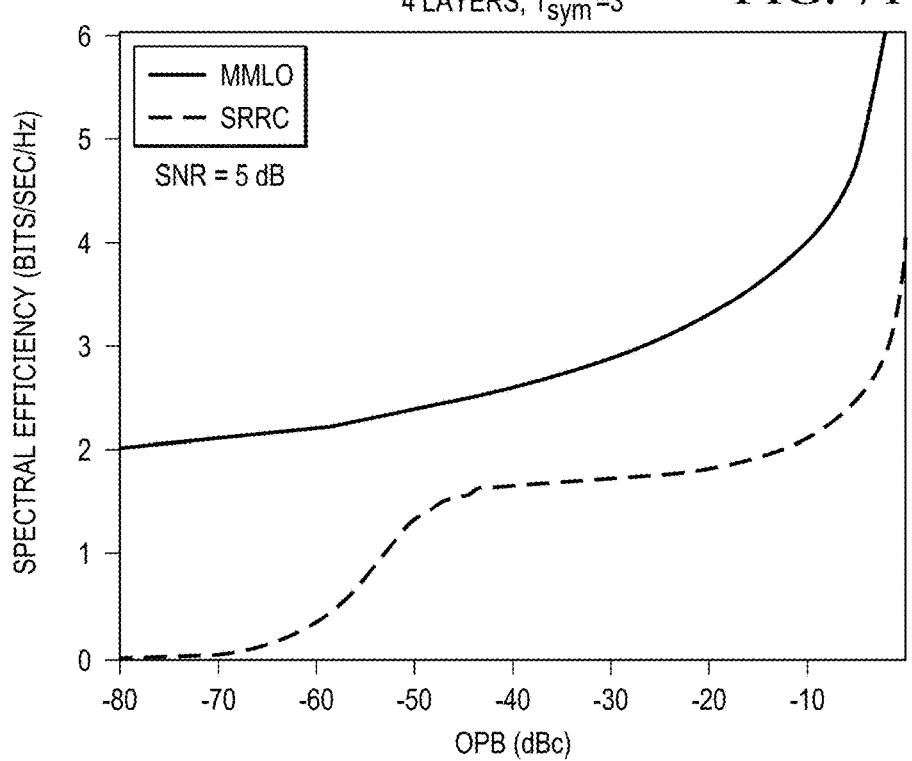
FIG. 71 illustrates a spectral efficiency comparison based on OBP between modified multiple layer overlay and square root raised cosine.

FIGS. 70-71 show the spectral efficiency comparison of MMLO with L=4 layers. The spectral efficiencies and the gains of MMLO for specific bandwidth definitions are shown in the following tables.

TABLE 5

|  | Spectral Efficiency (bps/Hz) based on ACLR1 ≤30 dBc per bandwidth | Gain with reference to SRRC |
|---|---|---|
| SRRC | 1.7859 | 1 |
| MMLO (3 layers, Tmlo = 3) | 2.7928 | 1.5638 |
| MMLO (4 layers, Tmlo = 3) | 3.0849 | 1.7274 |

TABLE 6

|  | Spectral Efficiency (bps/Hz) based on OBP ≤ −40 dBc | Gain with reference to SRRC |
|---|---|---|
| SRRC | 1.7046 | 1 |
| MMLO (3 layers, Tmlo = 3) | 2.3030 | 1.3510 |
| MMLO (4 layers, Tmlo = 3) | 2.6697 | 1.5662 |

Figure 72:
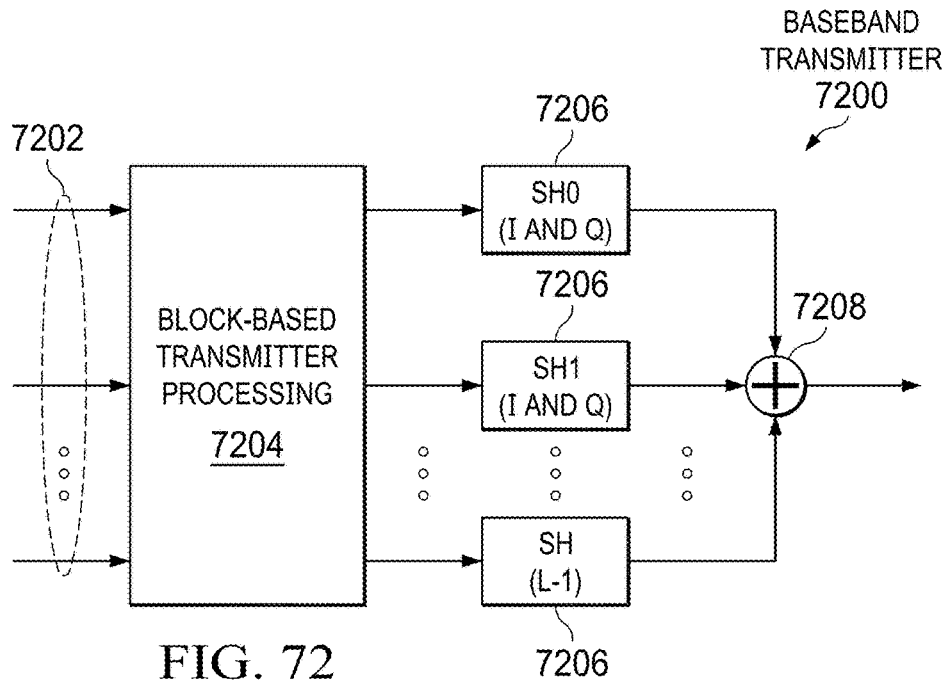
FIG. 72 illustrates a block diagram of a baseband transmitter for a low pass equivalent modified multiple layer overlay system.
Figure 73:
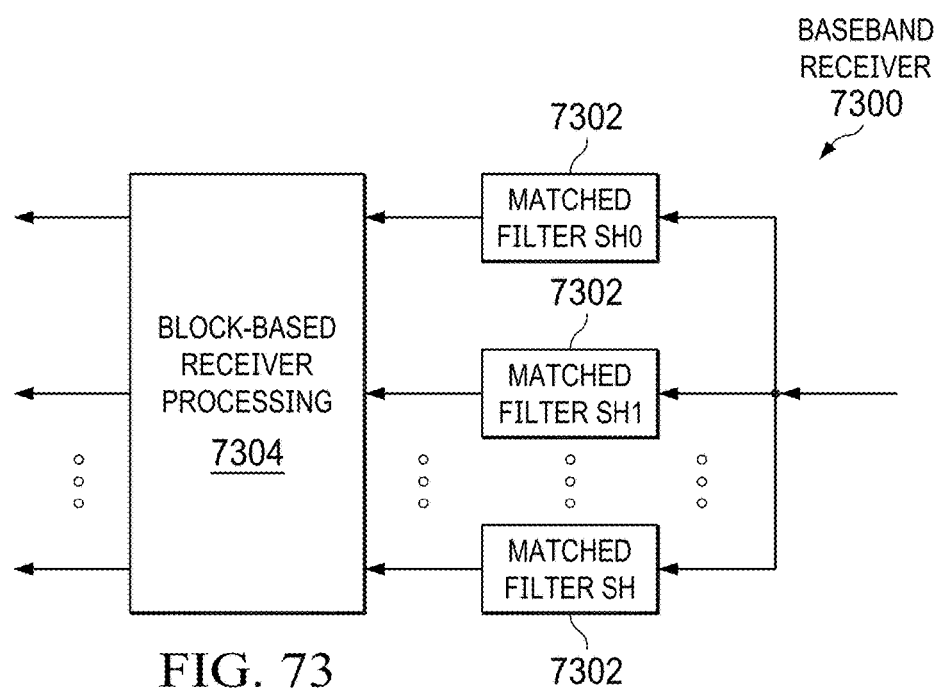
FIG. 73 illustrates a block diagram of a baseband receiver for a low pass equivalent modified multiple layer overlay system.

Referring now to FIGS. 72 and 73, there are provided basic block diagrams of low-pass-equivalent MMLO transmitters (FIG. 72) and receivers (FIG. 73). The low-pass-equivalent MMLO transmitter 7200 receives a number of input signals 7202 at a block-based transmitter processing 7204. The transmitter processing outputs signals to the SH(L−1) blocks 7206 which produce the I&Q outputs. These signals are then all combined together at a combining circuit 6108 for transmission.

Within the baseband receiver (FIG. 73) 7300, the received signal is separated and applied to a series of match filters 7302. The outputs of the match filters are then provided to the block-based receiver processing block 7304 to generate the various output streams.

Consider a block of N MLO-symbols with each MLO symbol carrying L symbols from L layers. Then there are NL symbols in a block. Define c(m, n)=symbol transmitted by the m-th MLO layer at the n-th MLO symbol. Write all NL symbols of a block as a column vector as follows: c=[c(0,0), c(1,0), . . . , c(L−1, 0), c(0,1), c(1,1), . . . , c(L−1, 1), . . . , c(L−1, N−1)]T. Then the outputs of the receiver matched filters for that transmitted block in an AWGN channel, defined by the column vector y of length NL, can be given as y=H c+n, where H is an NL×NL matrix representing the equivalent MLO channel, and n is a correlated Gaussian noise vector.

By applying SVD to H, we have H=U D VH where D is a diagonal matrix containing singular values. Transmitter side processing using V and the receiver side processing UH, provides an equivalent system with NL parallel orthogonal channels, (i.e., y=H Vc+n and UH y=Dc+UH n). These parallel channel gains are given by diagonal elements of D. The channel SNR of these parallel channels can be computed. Note that by the transmit and receive block-based processing, we obtain parallel orthogonal channels and hence the ISI issue has be resolved.

Since the channel SNRs of these parallel channels are not the same, we can apply the optimal Water filling solution to compute the transmit power on each channel given a fixed total transmit power. Using this transmit power and corresponding channel SNR, we can compute capacity of the equivalent system as given in the previous report.

Issues of Fading, Multipath, and Multi-Cell Interference

Techniques used to counteract channel fading (e.g., diversity techniques) in conventional systems can also be applied in MMLO. For slowly-varying multi-path dispersive channels, if the channel impulse response can be fed back, it can be incorporated into the equivalent system mentioned above, by which the channel induced ISI and the intentionally introduced MMLO ISI can be addressed jointly. For fast time-varying channels or when channel feedback is impossible, channel equalization needs to be performed at the receiver. A block-based frequency-domain equalization can be applied and an oversampling would be required.

If we consider the same adjacent channel power leakage for MMLO and the conventional system, then the adjacent cells' interference power would be approximately the same for both systems. If interference cancellation techniques are necessary, they can also be developed for MMLO.

Channel fading can be another source of intersymbol interference (ISI) and interlayer interference (ILI). One manner for representing small-scale signal fading is the use of statistical models. White Gaussian noise may be used to model system noise. The effects of multipath fading may be modeled using Rayleigh or Rician probability density functions. Additive white Gaussian noise (AWGN) may be represented in the following manner. A received signal is:

$$r(t) = s(t) + n(t)$$

where: r(t)=a received signal; s(t)=a transmitted signal; and n(t)=random noise signal Rayleigh fading functions are useful for predicting bit error rate (BER) any multipath environment. When there is no line of sight (LOS) or dominate received signal, the power the transmitted signal may be represented by:

$$P_r(r) = \begin{cases} \frac{r}{\sigma^2} e^{\frac{-r^2}{2\sigma^2}}, & r \geq 0 \\ 0, & r < 0 \end{cases}$$

where: σ=rms value of received signal before envelope detection,
σ=time average power of the received signal before envelope detection.

Figure 74:
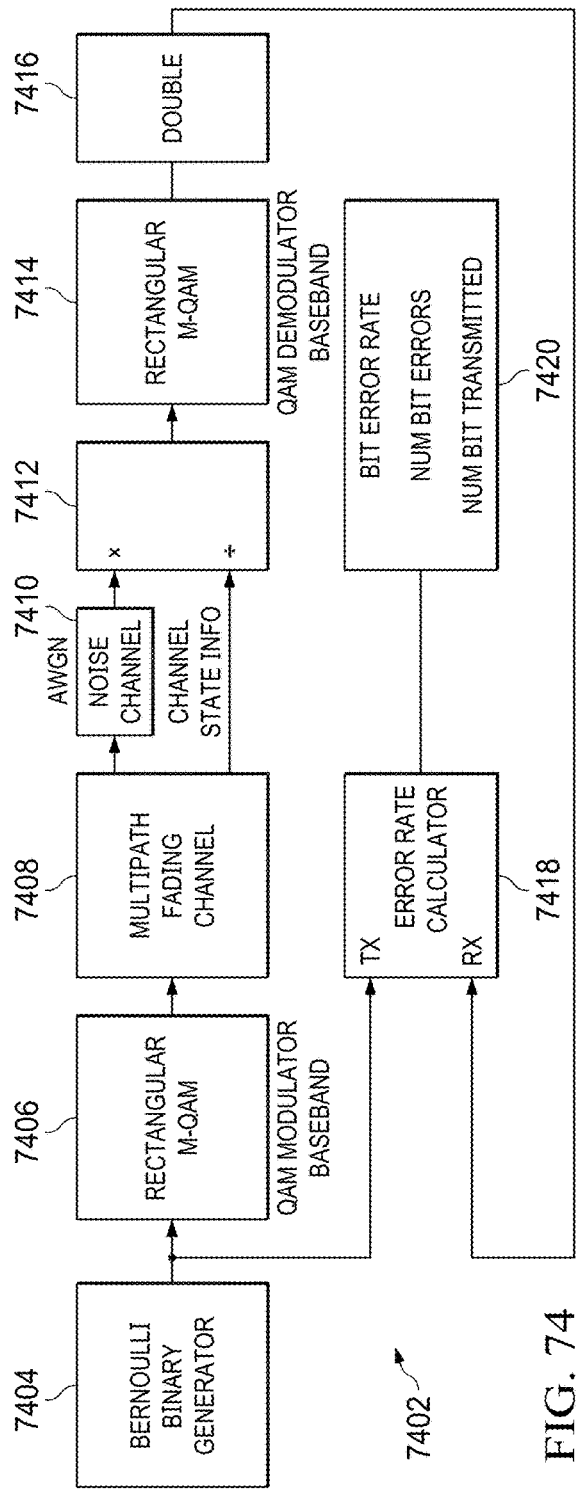
FIG. 74 illustrates a channel simulator.

In a similar manner, Rician functions may be used in situations where there is a line of sight or dominant signal within a transmitted signal. In this case, the power of the transmitted signal can be represented by:

$$P_r(r) = \begin{cases} \frac{r}{\sigma^2} e^{\frac{-(r^2+A^2)}{2\sigma^2}} II_0\left(\frac{A_r}{\sigma^2}\right), & A \geq r \geq 0 \\ 0, & r < 0 \end{cases}$$

where A=peak amplitude of LOS component
$II_0$=modified Bessel Function of the first kind and zero-order These functions may be implemented in a channel simulation to calculate fading within a particular channel using a channel simulator such as that illustrated in FIG. 74. The channel simulator 7402 includes a Bernoulli binary generator 7404 for generating an input signal that is provided to a rectangular M-QAM modulator 7406 that generates a QAM signal at baseband. Multipath fading channel block 7408 uses the Rician equations to simulate multipath channel fading. The simulated multipath fading channel is provided to a noise channel simulator 7410. The noise channel simulator 7410 simulates AWGN noise. The multipath fading channel simulator 7408 further provides channel state information to arithmetic processing block 7412 which utilizes the simulated multipath fading information and the AWGN information into a signal that is demodulated at QAM demodulator block 7414. The demodulated simulated signal is provided to the doubler block 7416 which is input to a receive input of an error rate calculator 7418. The error rate calculator 7418 further receives at a transmitter input, the simulated transmission signal from the Bernoulli binary generator 7404. The error rate calculator 7418 uses the transmitter input and the received input to provide in error rate calculation to a bit error rate block 7420 that determines the channel bit error rate. This type of channel simulation for determining bit error rate will enable a determination of the amount of QLO that may be applied to a signal in order to increase throughput without overly increasing the bit error rate within the channel.

Scope and System Description

This report presents the symbol error probability (or symbol error rate) performance of MLO signals in additive white Gaussian noise channel with various inter-symbol interference levels. As a reference, the performance of the conventional QAM without ISI is also included. The same QAM size is considered for all layers of MLO and the conventional QAM.

The MLO signals are generated from the Physicist's special Hermite functions:

$$f_n(t, \alpha) = \sqrt{\frac{\alpha}{\sqrt{\pi} n! 2^n}} H_n(\alpha t) e^{-\frac{\alpha^2 t^2}{2}}$$

where $H_n(\alpha t)$ is the $n^{th}$ order Hermite polynomial. Note that the functions used in the lab setup correspond to $$\alpha = \frac{1}{\sqrt{2}}$$

and, for consistency, $$\alpha = \frac{1}{\sqrt{2}}$$

is used in this report.

MLO signals with 3, 4 or 10 layers corresponding to n=0~2, 0~3, or 0~9 are used and the pulse duration (the range of t) is [−8, 8] in the above function.

AWGN channel with perfect synchronization is considered.

The receiver consists of matched filters and conventional detectors without any interference cancellation, i.e., QAM slicing at the matched filter outputs.

$$\% \text{ pulse-overlapping} = \frac{T_p - T_{sym}}{T_p} \times 100\%$$

where Tp is the pulse duration (16 in the considered setup) and Tsym is the reciprocal of the symbol rate in each MLO layer. The considered cases are listed in the following table.

TABLE 7

| % of Pulse Overlapping | $T_{sym}$ | $T_p$ |
|---|---|---|
| 0% | 16 | 16 |
| 12.5% | 14 | 16 |
| 18.75% | 13 | 16 |
| 25% | 12 | 16 |
| 37.5% | 10 | 16 |
| 43.75% | 9 | 16 |
| 50% | 8 | 16 |
| 56.25% | 7 | 16 |
| 62.5% | 6 | 16 |
| 75% | 4 | 16 |

Derivation of the Signals Used in Modulation

To do that, it would be convenient to express signal amplitude s(t) in a complex form close to quantum mechanical formalism. Therefore the complex signal can be represented as:

$$\psi(t) = s(t) + j\sigma(t) \text{ where } s(t) \equiv \text{real signal}$$

$$\sigma(t) = \text{imaginary signal (quadrature)}$$

$$\sigma(t) = \frac{1}{\pi}\int_{-\infty}^{\infty} s(\tau)\frac{d\tau}{\tau - 1}$$

$$s(t) = -\frac{1}{\pi}\int_{-\infty}^{\infty} \sigma(t)\frac{d\tau}{\tau - t}$$

Where s(t) and σ(t) are Hilbert transforms of one another and since σ(t) is qudratures of s(t), they have similar spectral components. That is if they were the amplitudes of sound waves, the ear could not distinguish one form from the other.

Let us also define the Fourier transform pairs as follows:

$$\psi(t) = \frac{1}{\pi}\int_{-\infty}^{\infty} \varphi(f)e^{j\omega t}df$$

$$\varphi(f) = \frac{1}{\pi}\int_{-\infty}^{\infty} \psi(t)e^{-j\omega t}dt$$

$$\psi^*(t)\psi(t) = [s(t)]^2 + [\sigma(t)]^2 + \ldots \equiv \text{signal power}$$

Let's also normalize all moments to $M_0$:

$$M_0 = \int_0^\tau s(t)\,dt$$

$$M_0 = \int_0^\tau \varphi^*\varphi\,df$$

Then the moments are as follows:

$$M_0 = \int_0^\tau s(t)\,dt$$

$$M_1 = \int_0^\tau ts(t)\,dt$$

$$M_2 = \int_0^\tau t^2 s(t)\,dt$$

$$M_{N-1} = \int_0^\tau t^{N-1} s(t)\,dt$$

In general, one can consider the signal s(t) be represented by a polynomial of order N, to fit closely to s(t) and use the coefficient of the polynomial as representation of data. This is equivalent to specifying the polynomial in such a way that its first N "moments" $M_j$ shall represent the data. That is, instead of the coefficient of the polynomial, we can use the moments. Another method is to expand the signal s(t) in terms of a set of N orthogonal functions $\varphi_k(t)$, instead of powers of time. Here, we can consider the data to be the coefficients of the orthogonal expansion. One class of such orthogonal functions are sine and cosine functions (like in Fourier series).

Therefore we can now represent the above moments using the orthogonal function y with the following moments:

$$\bar{t} = \frac{\int \psi^*(t)t\psi(t)\,dt}{\int \psi^*(t)\psi(t)\,dt} \quad \overline{t^2} = \frac{\int \psi^*(t)t^2\psi(t)\,dt}{\int \psi^*(t)\psi(t)\,dt}$$

$$\overline{t^n} = \frac{\int \psi^*(t)t^n\psi(t)\,dt}{\int \psi^*(t)\psi(t)\,dt}$$

Similarly, $$\bar{f} = \frac{\int \varphi^*(f)f\varphi(f)\,df}{\int \varphi^*(f)\varphi(f)\,df} \quad \overline{f^2} = \frac{\int \varphi^*(f)f^2\varphi(f)\,df}{\int \varphi^*(f)\varphi(f)\,df}$$

$$\overline{f^n} = \frac{\int \varphi^*(f)f^n\varphi(f)\,df}{\int \varphi^*(f)\varphi(f)\,df}$$

If we did not use complex signal, then:

$$\bar{f}=0$$

To represent the mean values from time to frequency domains, replace:

$$\varphi(f) \to \psi(t)$$

$$f \to \frac{1}{2\pi j}\frac{d}{dt}$$

These are equivalent to somewhat mysterious rule in quantum mechanics where classical momentum becomes an operator:

$$P_x \to \frac{h}{2\pi j}\frac{\partial}{\partial x}$$

Therefore using the above substitutions, we have:

$$\bar{f} = \frac{\int \varphi^*(f) f \varphi(f) df}{\int \varphi^*(f) \varphi(f) df} = \frac{\int \psi^*(t)\left(\frac{1}{2\pi j}\right)\frac{d\psi(t)}{dt} dt}{\int \psi^*(t)\psi(t) dt} = \left(\frac{1}{2\pi j}\right)\frac{\int \psi^* \frac{d\psi}{dt} dt}{\int \psi^* \psi \, dt}$$

And:

$$\bar{f}^2 = \frac{\int \varphi^*(f) f^2 \varphi(f) df}{\int \varphi^*(f) \varphi(f) df} = \frac{\int \psi^* \left(\frac{1}{2\pi j}\right)^2 \frac{d^2}{dt^2}\psi \, dt}{\int \psi^* \psi \, dt} = -\left(\frac{1}{2\pi}\right)^2 \frac{\int \psi^* \frac{d^2}{dt^2}\psi \, dt}{\int \psi^* \psi \, dt} \bar{t}^2 = \frac{\int \psi^* t^2 \psi \, dt}{\int \psi^* \psi \, dt}$$

We can now define an effective duration and effective bandwidth as:

$$\Delta t = \sqrt{2\pi \overline{(t-\bar{t})^2}} = 2\pi \cdot \text{rms in time}$$

$$\Delta f = \sqrt{2\pi \overline{(f-\bar{f})^2}} = 2\pi \cdot \text{rms in frequency}$$

But we know that:

$$\overline{(t-\bar{t})^2} = \overline{t^2} - (\bar{t})^2$$

$$\overline{(f-\bar{f})^2} = \overline{f^2} - (\bar{f})^2$$

We can simplify if we make the following substitutions:

$$\tau = t - \bar{t}$$

$$\Psi(\tau) = \psi(t) e^{-\bar{\omega}\tau}$$

$$\omega_0 = \bar{\omega} = 2\pi\bar{f} = 2\pi f_0$$

We also know that:

$$(\Delta t)^2 (\Delta f)^2 = (\Delta t \Delta f)^2$$

And therefore:

$$(\Delta t \Delta f)^2 = \frac{1}{4}\left[4\frac{\int \Psi^*(\tau)\tau^2 \Psi(\tau) d\tau \int \frac{d\Psi^*}{d\tau}\frac{d\Psi}{d\tau} d\tau}{\left(\int \Psi^*(\tau)\psi(\tau) d\tau\right)^2}\right] \geq \left(\frac{1}{4}\right)$$

$$(\Delta t \Delta f) \geq \left(\frac{1}{2}\right)$$

Now instead of $$(\Delta t \Delta f) \geq \left(\frac{1}{2}\right)$$

we are interested to force the equality $$(\Delta t \Delta f) = \left(\frac{1}{2}\right)$$

and see what signals satisfy the equality. Given the fixed bandwidth $\Delta f$, the most efficient transmission is one that minimizes the time-bandwidth product $$(\Delta t \Delta f) = \left(\frac{1}{2}\right)$$

For a given bandwidth $\Delta f$, the signal that minimizes the transmission in minimum time will be a Gaussian envelope. However, we are often given not the effective bandwidth, but always the total bandwidth $f_2 - f_1$. Now, what is the signal shape which can be transmitted through this channel in the shortest effective time and what is the effective duration?

$$\Delta t = = \frac{\frac{1}{(2\pi)^2}\int_{f_1}^{f_2} \frac{d\varphi^*}{df}\frac{d\varphi}{df}}{\int_{f_1}^{f_2} \varphi^* \varphi \, df} \to \min$$

Where $\varphi(f)$ is zero outside the range $f_2 - f_1$.

To do the minimization, we would use the calculus of variations (Lagrange's Multiplier technique). Note that the denominator is constant and therefore we only need to minimize the numerator as:

$$\Delta t \to \min \to \delta \int_{f_1}^{f_2} \left(\frac{d\varphi^*}{df}\frac{d\varphi}{df} + \Lambda \varphi^* \varphi\right) df = 0$$

First Trem $$\delta \int_{f_1}^{f_2} \frac{d\varphi^*}{df}\frac{d\varphi}{df} df =$$

$$\int \left(\frac{d\varphi^*}{df}\delta\frac{d\varphi}{df} + \frac{d\varphi}{df}\delta\frac{d\varphi^*}{df}\right) df = \int \left(\frac{d\varphi^*}{df}\frac{d\delta\varphi}{df} + \frac{d\varphi}{df}\frac{d\delta\varphi^*}{df}\right) df =$$

$$\left[\frac{d\varphi^*}{df}\delta\varphi + \frac{d\varphi}{df}\delta\varphi^*\right]_{f_1}^{f_2} - \int \left(\frac{d^2\varphi^*}{df^2}\delta\varphi + \frac{d^2\varphi}{df^2}\delta\varphi^*\right) df =$$

$$\int \left(\frac{d^2\varphi}{df^2}\delta\varphi + \frac{d^2\varphi}{df^2}\delta\varphi^*\right) df$$

-continued

Second Trem $$\delta \int_{f_1}^{f_2} (\Lambda \varphi^* \varphi) df = \Lambda \int_{f_1}^{f_2} (\varphi^* \delta \varphi + \varphi \delta \varphi^*) df$$

$$\text{Both Trems} = \int \left[ \left( \frac{d^2\varphi^*}{df^2} + \Lambda \varphi^* \right) \delta \varphi + \left( \frac{d^2\varphi}{df^2} + \Lambda \varphi \right) \delta \varphi^* \right] df = 0$$

This is only possible if and only if:

$$\left( \frac{d^2\varphi}{df^2} + \Lambda \varphi \right) = 0$$

The solution to this is of the form $$\varphi(f) = \sin k\pi \left( \frac{f - f_1}{f_2 - f_1} \right)$$

Now if we require that the wave vanishes at infinity, but still satisfy the minimum time-bandwidth product:

$$(\Delta t \Delta f) = \left( \frac{1}{2} \right)$$

Then we have the wave equation of a Harmonic Oscillator:

$$\frac{d^2 \Psi(\tau)}{d\tau^2} + (\lambda - \alpha^2 \tau^2) \Psi(\tau) = 0$$

which vanishes at infinity only if:

$$\lambda = \alpha(2n + 1)$$

$$\psi_n = e^{-\frac{1}{2}\omega^2 \tau^2} \frac{d^n}{d\tau^n} e^{-\alpha^2 \tau^2} \propto H_n(\tau)$$

Where $H_n(\tau)$ is the Hermit functions and:

$$(\Delta t \Delta f) = \frac{1}{2}(2n + 1)$$

So Hermit functions $H_n(\tau)$ occupy information blocks of ½, 3/2, 5/2, . . . with ½ as the minimum information quanta.

Squeezed States

Here we would derive the complete Eigen functions in the most generalized form using quantum mechanical approach of Dirac algebra. We start by defining the following operators:

$$b = \sqrt{\frac{m\omega'}{2\hbar}} \left( x + \frac{ip}{m\omega'} \right)$$

$$b^+ = \sqrt{\frac{m\omega'}{2\hbar}} \left( x - \frac{ip}{m\omega'} \right)$$

$$[b, b^+] = 1$$

$$a = \lambda b - \mu b^+$$

$$a^+ = \lambda b^+ - \mu b$$

Now we are ready to define $\Delta x$ and $\Delta p$ as:

$$(\Delta x)^2 = \frac{\hbar}{2m\omega} \left( \frac{\omega}{\omega'} \right) = \frac{\hbar}{2m\omega} (\lambda - \mu)^2$$

$$(\Delta p)^2 = \frac{\hbar m \omega}{2} \left( \frac{\omega'}{\omega} \right) = \frac{\hbar m \omega}{2} (\lambda + \mu)^2$$

$$(\Delta x)^2 (\Delta p)^2 = \frac{\hbar^2}{4} (\lambda^2 - \mu^2)^2$$

$$\Delta x \Delta p = \frac{\hbar}{2} (\lambda^2 - \mu^2) = \frac{\hbar}{2}$$

Now let parameterize differently and instead of two variables $\lambda$ and $\mu$, we would use only one variable $\tau$ as follows:

$\lambda$=sin $h\xi$ $\mu$=cos $h\xi$ $\lambda+\mu=e^{\xi}$ $\lambda-\mu=-e^{-\xi}$ Now the Eigen states of the squeezed case are:

$b|\beta\rangle = \beta|\beta\rangle$ $(\lambda a + \mu a^+)|\beta\rangle = \beta|\beta\rangle$ $b = UaU^+$ $$U = e^{\xi/2(a^2 - a^{+2})}$$

$U^+(\xi)aU(\xi)=a \cos h\xi - a^+ \sin h\xi$ $U^+(\xi)a^+U(\xi)=a^+ \cos h\xi - a \sin h\xi$ We can now consider the squeezed operator:

$|\alpha, \xi\rangle = U(\xi)D(\alpha)|0\rangle$ $$D(\alpha) = e^{-\frac{|\alpha|^2}{2}} e^{\alpha a^+} e^{-\alpha^* a}$$

$$|\alpha\rangle = \sum_{n=0}^{\infty} \frac{\alpha^n}{\sqrt{n!}} e^{-\frac{|\alpha|^2}{2}} |n\rangle$$

$$|\alpha\rangle = e^{-\frac{|\alpha|^2}{2} + \alpha a^+} |0\rangle$$

For a distribution P(n) we would have:

$$P(n) = |\langle n||\beta, \xi\rangle|^2$$

$$\langle \alpha||\beta, \xi\rangle = \sum_{n=0}^{\infty} \frac{\alpha^n}{\sqrt{n!}} e^{\frac{-|\alpha|^2}{2}} \langle n||\beta, \xi\rangle$$

$$e^{2zt-t^2} = \sum_{n=0}^{\infty} \frac{H_n(z)t^n}{n!}$$

Therefore the final result is:

$$\langle n||\beta, \xi\rangle = \frac{(\tanh\xi)^{n/2}}{2^{n/2}(n!\cosh\xi)^2} e^{-1/2(|\beta|^2-\beta^2\tanh\xi)} H_n\left(\frac{\beta}{2\sinh\xi\cosh\xi}\right)$$

Figure 75:
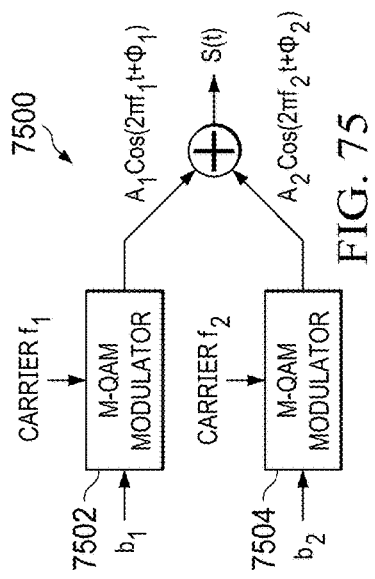
FIG. 75 illustrates the generation of bit streams for a QAM modulator.

Another issue of concern with the use of QLO with QAM is a desire to improve bit error rate (BER) performance without impacting the information rate or bandwidth requirements of the queue a low signal. One manner for improving BER performance utilizes two separate oscillators that are separated by a known frequency $\Delta f$. Signals generated in this fashion will enable a determination of the BER. Referring now to FIG. 75, there is illustrated the generation of two bit streams b1 and B2 that are provided to a pair of QAM modulators 7502 and 7504 by a transmitter 7500. Modulator 7502 receives a first carrier frequency F1 and modulator 7504 receives a second carrier frequency F2. The frequencies F1 and at two are separated by a known value $\Delta f$. The signals for each modulator are generated and combined at a summing circuit 7506 to provide the output s(t). The variables in the outputs of the QAM modulators are $A_1$ (amplitude), $f_i$ (frequency) and $\phi_i$ (phase).

Therefore, each constituent QAM modulation occupies a bandwidth:

$$BW = r_s = \frac{r_b}{\log_2 m} \text{ symbols/sec}$$

where $r_s$ equals the symbol rate of each constituent QAM signal.

The total bandwidth of signal s(t) is:

$$W = r_s\left(1 + \frac{\Delta f}{r_s}\right) = r_s + \Delta f H_z$$

Therefore, the spectral efficiency $\eta$ of this two oscillator system is:

$$\eta = \frac{2r_b}{W}$$

but $$r_b = r_2 \log_2 m$$

$$\eta = \frac{2r_b}{W} = \frac{2r_s \log_2 m}{r_s\left(1 + \frac{\Delta f}{r_s}\right)} = \frac{2\log_2 m}{1 + \frac{\Delta f}{r_s}} \text{ bits/sec/Hz}$$

The narrowband noise over the signal s(t) is:

$$n(t) = n_I(t)\cos(2\pi f_0 t) - n_q(t)\sin(2\pi f_0 t)$$

Where: $n_I(t)$=noise in I $N_q(t)$=noise in Q

Each noise occupies a bandwidth of W [Hz] and the average power of each component is $N_0 W$. $N_0$ is the noise power spectral density in Watts/Hz. The value of $f_0$ is the mean value of $f_1$ and $f_2$.

Figure 76:
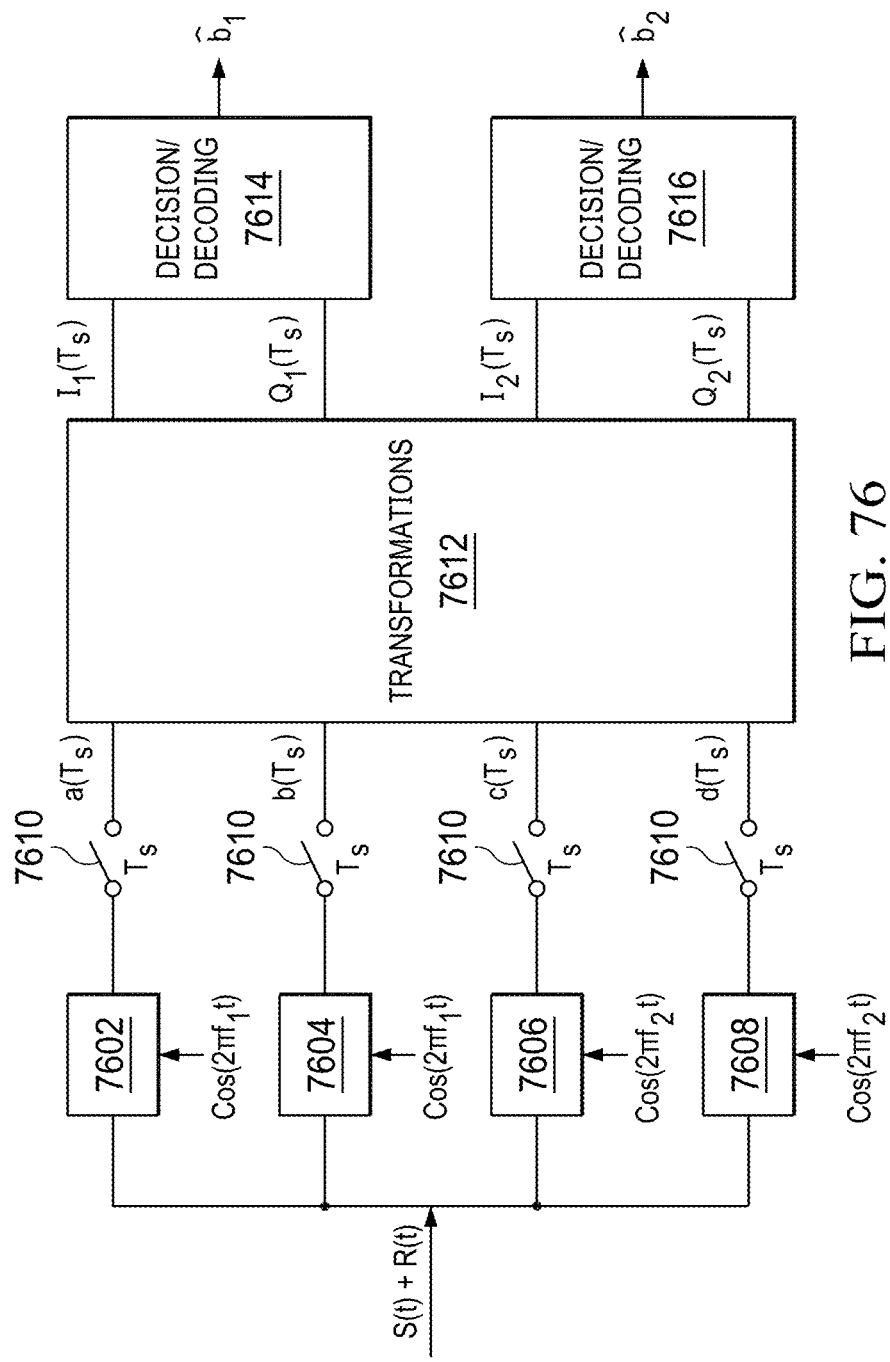
FIG. 76 illustrates a block diagram of a receiver.

Referring now to FIG. 76, there is illustrated a receiver side block diagram for demodulating the signal generated with respect to FIG. 76. The received signal s(t)+n(t) is provided to a number of cosine filters 7602-7608. Cosine filters 7602 and 7604 filter with respect to carrier frequency $f_1$ and cosine filters 7606 and 7608 filter the received signal for carrier frequency $f_2$. Each of the filters 7602-7608 provide an output to a switch 7610 that provides a number of output to a transformation block 7612. Transformation block 7612 provides two output signals having a real portion and an imaginary portion. Each of the real and imaginary portions associated with a signal are provided to an associated decoding circuit 7614, 7616 to provide the decoded signals $b_1$ and $b_2$.

$$\begin{bmatrix} a(T_s) \\ b(T_s) \\ c(T_s) \\ d(T_s) \end{bmatrix} = T_s \begin{bmatrix} 1 & 0 & K_1 & K_2 \\ 0 & 1 & -K_2 & K_1 \\ K_1 & -K_2 & 1 & 0 \\ K_2 & K_1 & 0 & 1 \end{bmatrix} \begin{bmatrix} A_1(\cos\varphi_1) \\ A_1(\sin\varphi_1) \\ A_2(\cos\varphi_2) \\ A_2(\sin\varphi_2) \end{bmatrix} + \begin{bmatrix} N_{I1}(T_s) \\ N_{Q1}(T_s) \\ N_{I2}(T_s) \\ N_{Q2}(T_s) \end{bmatrix}$$

$|A\rangle$ $\mathbb{M}$ $|S\rangle$ $|N\rangle$ (nonsingular so it has $\mathbb{M}^{-1}$)

$|A\rangle = T_s \mathbb{M} |S\rangle + |N\rangle$ Where $$N_{I\frac{1}{2+}}(T_s) = \int_0^{T_s} \eta_s(t)\cos\left(\frac{2\eta\Delta f}{2}t\right) \mp \eta_G(t)\sin\left(\frac{2\eta\Delta f}{2}t\right) dt$$

$$N_{Q\frac{1}{2+}}(T_s) = \int_0^{T_s} \eta_I(t)\dim\left(\frac{2\eta\Delta f}{2}t\right) \mp \eta_Q(t)\sin\left(\frac{2\eta\Delta f}{2}t\right) dt$$

$|A\rangle = T_s \mathbb{M} |S\rangle + |N\rangle$

Multiply by $\frac{1}{T_s}\mathbb{M}^{-1}$ $\frac{1}{T_s}\mathbb{M}^{-1}|A\rangle = |S\rangle + \frac{1}{T_s}\mathbb{M}^{-1}|N\rangle = |S\rangle + |\tilde{N}\rangle$ Output $|\mathcal{O}\rangle$ $|\tilde{N}\rangle$ $$\begin{bmatrix} I_1(T_s) \\ Q_1(T_s) \\ I_2(T_s) \\ Q_2(T_s) \end{bmatrix} = \begin{bmatrix} A_1(\cos\varphi_1) \\ A_1(\sin\varphi_1) \\ A_2(\cos\varphi_2) \\ A_2(\sin\varphi_2) \end{bmatrix} + \begin{bmatrix} \tilde{N}_{I1}(T_s) \\ \tilde{N}_{Q1}(T_s) \\ \tilde{N}_{I2}(T_s) \\ \tilde{N}_{Q2}(T_s) \end{bmatrix}$$

$|\mathcal{O}\rangle$ $|S\rangle$ $|\tilde{N}\rangle$

Then the probability of correct decision $P_e$ is $$P_e \approx (1-P_e)^4 \approx 1-4P_e \text{ for } P_e \ll 1$$

$P_e$=well known error probability in one dimension for each consistuent m-QAM modulation.

Therefore, one can calculate BER.

$P_e$ comprises the known error probability in one dimension for each constituent member of the QAM modulation. Using the known probability error the bit error rate for the channel based upon the known difference between frequencies $f_1$ and $f_2$ may be calculated.

Adaptive Processing

Figure 77:
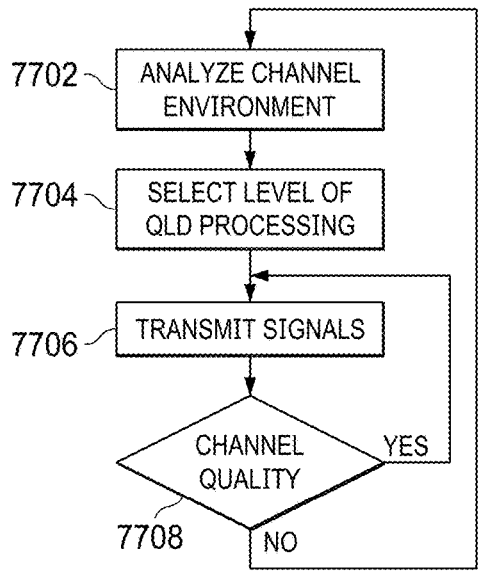
FIG. 77 is a flow diagram illustrating an adaptive QLO process.

The processing of signals using QLO may also be adaptively selected to combat channel impairments and interference. The process for adaptive QLO is generally illustrated in FIG. 77. First at step 7702 an analysis of the channel environment is made to determine the present operating environment. The level of QLO processing is selected at step 7704 based on the analysis and used to configure communications. Next, at step 7706, the signals are transmitted at the selected level of QLO processing. Inquiry step 7708 determines if sufficient channel quality has been achieved. If so, the system continues to transmit and the selected QLO processing level at step 7706. If not, control passes back to step 7702 to adjust the level of QLO processing to achieve better channel performance.

Figure 78:
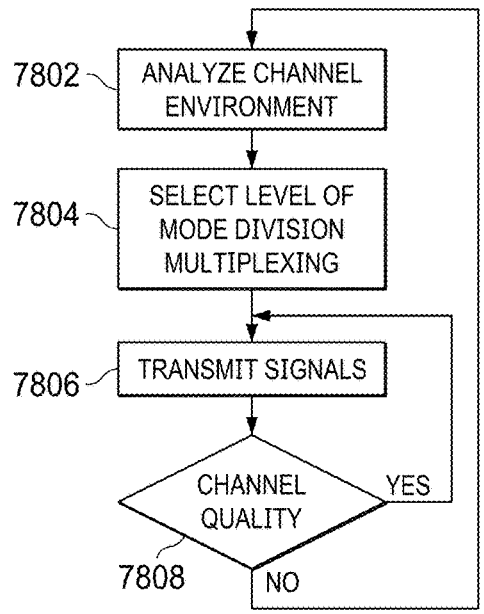
FIG. 78 is a flow diagram illustrating an adaptive MDM process.

The processing of signals using mode division multiplexing (MDM) may also be adaptively selected to combat channel impairments and interference and maximize spectral efficiency. The process for adaptive MDM is generally illustrated in FIG. 78. First at step 7802 an analysis of the channel environment is made to determine the present operating environment. The level of MDM processing is selected at step 7804 based on the analysis and used to configure communications. Next, at step 7806, the signals are transmitted at the selected level of MDM processing. Inquiry step 7808 determines if sufficient channel quality has been achieved. If so, the system continues to transmit and the selected MDM processing level at step 7806. If not, control passes back to step 7802 to adjust the level of MDM processing to achieve better channel performance.

Figure 79:
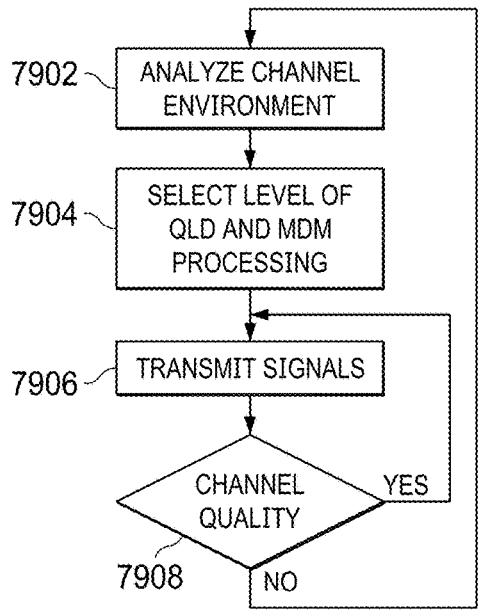
FIG. 79 is a flow diagram illustrating an adaptive QLO and MDM process

The processing of signals using an optimal combination of QLO and MDM may also be adaptively selected to combat channel impairments and interference and maximize spectral efficiency. The process for adaptive QLO and MDM is generally illustrated in FIG. 79. First at step 7902 an analysis of the channel environment is made to determine the present operating environment. A selected combination of a level of QLO process and a level of MDM processing are selected at step 7904 based on the analysis and used to configure communications. Next, at step 7906, the signals are transmitted at the selected level of QLO and MDM processing. Inquiry step 7908 determines if sufficient channel quality has been achieved. If so, the system continues to transmit and the selected combination of QLO and MDM processing levels at step 7906. If not, control passes back to step 7902 to adjust the levels of QLO and MDM processing to achieve better channel performance. Adjustments through the steps continue until a most optimal combination of QLO and MDM processing is achieved to maximize spectral efficiency using a 2-dimensional optimization.

Figure 80:
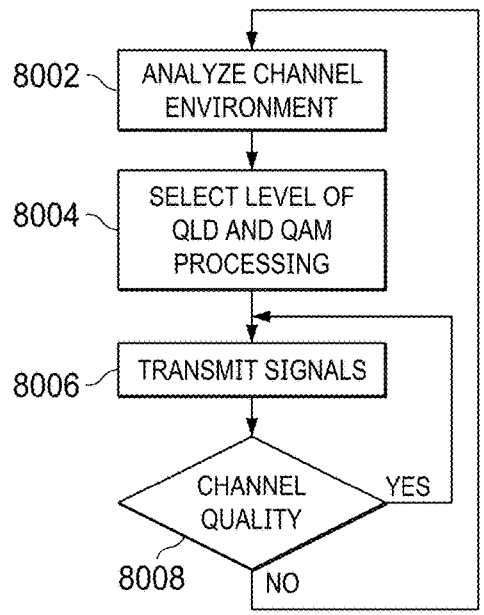
FIG. 80 is a flow diagram illustrating an adaptive QLO and QAM process.

The processing of signals using an optimal combination of QLO and QAM may also be adaptively selected to combat channel impairments and interference and maximize spectral efficiency. The process for adaptive QLO and QAM is generally illustrated in FIG. 80. First at step 8002 an analysis of the channel environment is made to determine the present operating environment. A selected combination of a level of QLO process and a level of QAM processing are selected at step 8004 based on the analysis and used to configure communications. Next, at step 8006, the signals are transmitted at the selected level of QLO and QAM processing. Inquiry step 8008 determines if sufficient channel quality has been achieved. If so, the system continues to transmit and the selected combination of QLO and QAM processing levels at step 8006. If not, control passes back to step 8002 to adjust the levels of QLO and QAM processing to achieve better channel performance. Adjustments through the steps continue until a most optimal combination of QLO and QAM processing is achieved to maximize spectral efficiency using a 2-dimensional optimization.

Figure 81:
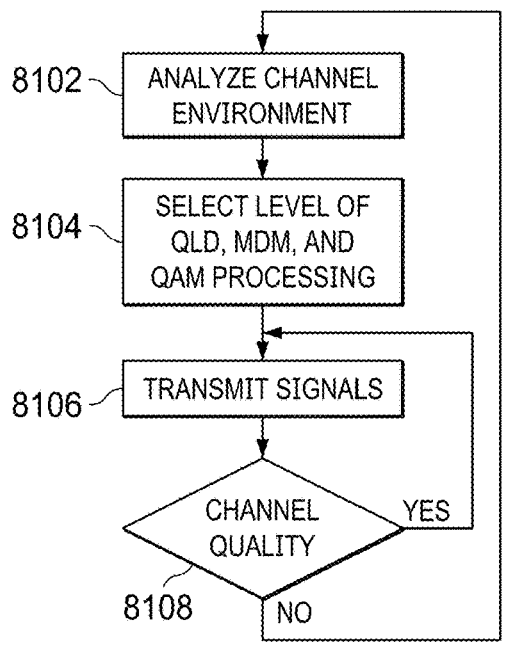
FIG. 81 is a flow diagram illustrating an adaptive QLO, MDM and QAM process.

The processing of signals using an optimal combination of QLO, MDM and QAM may also be adaptively selected to combat channel impairments and interference and maximize spectral efficiency. The process for adaptive QLO, MDM and QAM is generally illustrated in FIG. 81. First at step 8102 an analysis of the channel environment is made to determine the present operating environment. A selected combination of a level of QLO processing, a level of MDM processing and a level of QAM processing are selected at step 8104 based on the analysis and used to configure communications. Next, at step 8106, the signals are transmitted at the selected level of QLO, MDM and QAM processing. Inquiry step 8108 determines if sufficient channel quality has been achieved. If so, the system continues to transmit and the selected combination of QLO, MDM and QAM processing levels at step 8106. If not, control passes back to step 8102 to adjust the levels of QLO, MDM and QAM processing to achieve better channel performance. Adjustments through the steps continue until a most optimal combination of QLO, MDM and QAM processing is achieved to maximize spectral efficiency using a 3-dimensional optimization.

The adaptive approaches described herein above may be used with any combination of QLO, MDM and QAM processing in order to achieve optimal channel efficiency. In another application distinct modal combinations may also be utilized.

Improvement of Pilot Signal Modulation

Figure 82:
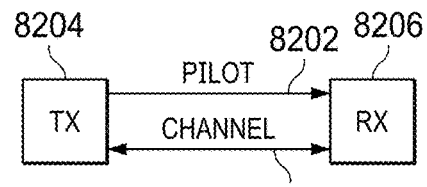
FIG. 82 illustrates the use of a pilot signal to improve channel impairments.

The above described QLO, MDM and QAM processing techniques may also be used to improve the manner in which a system deals with noise, fading and other channel impairments by the use of pilot signal modulation techniques. A pilot signal is used to specify channel characteristics. The pilot signal may be used to detect and correct channel characteristics (i.e. turbulence and channel impairments) for higher order spatial modes (HG and LG). As illustrated in FIG. 82, a pilot signal 8202 is transmitted between a transmitter 8204 to a receiver 8206. The pilot signal includes an impulse signal that is received, detected and processed at the receiver 8206. Using the information received from the pilot impulse signal, the channel 8208 between the transmitter 8204 and receiver 8206 may be processed to remove noise, fading and other channel impairment issues from the channel 7208.

Figure 83:
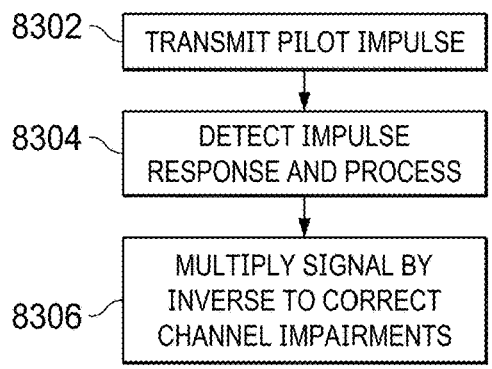
FIG. 83 is a flowchart illustrating the use of a pilot signal to improve channel impairment.

This process is generally described with respect to the flowchart of FIG. 83. The pilot impulse signal is transmitted at 8302 over the transmission channel. The impulse response is detected at step 8304 and processed to determine the impulse response over the transmission channel. Effects of channel impairments such as noise and fading may be countered by multiplying signals transmitted over the transmission channel by the inverse of the impulse response at step 8306 in order to correct for the various channel impairments that may be up on the transmission channel. In this way the channel impairments are counteracted and improved signal quality and reception may be provided over the transmission channel.

Power Control

Figure 84:
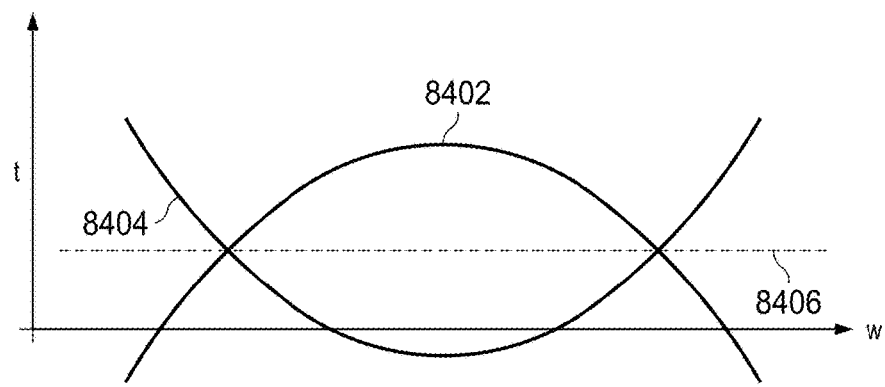
FIG. 84 illustrates a channel response and the effects of amplifier nonlinearities.

Adaptive power control may be provided on systems utilizing QLO, MDM and QAM processing to also improve channel transmission. Amplifier nonlinearities within the transmission circuitry and the receiver circuitry will cause impairments in the channel response as more particularly illustrated in FIG. 84. As can be seen the channel impairments and frequency response increase and decrease over frequency as illustrated generally at 8402. By adaptively controlling the power of a transmitting unit or a receiving unit and inverse frequency response such as that generated at 8404 may be generated. Thus, when the normal frequency response 8402 and the inverse frequency response 8404 are combined, a consistent response 8406 is provided by use of the adaptive power control.

Backward and Forward Channel Estimation

Figure 85:
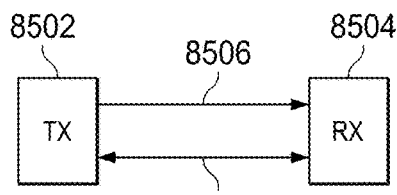
FIG. 85 illustrates the use of QLO in forward and backward channel estimation processes.

QLO techniques may also be used with forward and backward channel estimation processes when communications between a transmitter 8502 and a receiver 8504 do not have the same channel response over both the forward and backward channels. As shown in FIG. 85, the forward channel 8506 and backward channel 8508 between a transmitter 8502 and receiver 8504 me each be processed to determine their channel impulse responses. Separate forward channel estimation response and backward channel estimation response may be used for processing QLO signals transmitted over the forward channel 8506 and backward channel 8508. The differences in the channel response between the forward channel 8506 and the backward channel 8508 may arise from differences in the topography or number of buildings located within the area of the transmitter 8502 and the receiver 8504. By treating each of the forward channel 8506 and a backward channel 8508 differently better overall communications may be achieved.

Using MIMO Techniques with QLO

MIMO techniques may be used to improve the performance of QLO-based transmission systems. MIMO (multiple input and multiple output) is a method for multiplying the capacity of a radio link using multiple transmit and receive antennas to exploit multipath propagation. MIMO uses multiple antennas to transmit a signal instead of only a single antenna. The multiple antennas may transmit the same signal using modulation with the signals from each antenna modulated by different orthogonal signals such as that described with respect to the QLO modulation in order to provide an improved MIMO based system.

Diversions within OAM beams may also be reduced using phased arrays. By using multiple transmitting elements in a geometrical configuration and controlling the current and phase for each transmitting element, the electrical size of the antenna increases as does the performance of the antenna. The antenna system created by two or more individual intended elements is called an antenna array. Each transmitting element does not have to be identical but for simplification reasons the elements are often alike. To determine the properties of the electric field from an array the array factor (AF) is utilized.

The total field from an array can be calculated by a superposition of the fields from each element. However, with many elements this procedure is very unpractical and time consuming. By using different kinds of symmetries and identical elements within an array, a much simpler expression for the total field may be determined. This is achieved by calculating the so-called array factor (AF) which depends on the displacement (and shape of the array), phase, current amplitude and number of elements. After calculating the array factor, the total field is obtained by the pattern multiplication rule which is such that the total field is the product of the array factor in the field from one single element.

$$E_{total} = E_{single\ element} \times AF$$

This formula is valid for all arrays consisting of identical elements. The array factor does not depend on the type of elements used, so for calculating AF it is preferred to use point sources instead of the actual antennas. After calculating the AF, the equation above is used to obtain the total field. Arrays can be 1D (linear), 2D (planar) or 3D. In a linear array, the elements are placed along the line and in a planar they are situated in a plane.

Figure 86:
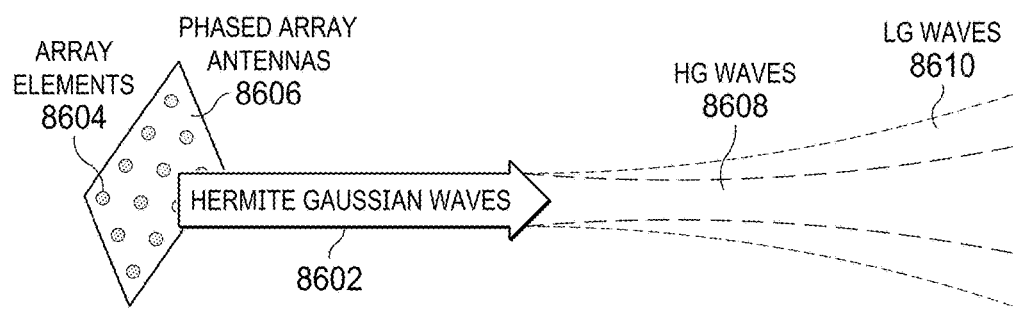
FIG. 86 illustrates the manner in which Hermite Gaussian beams and Laguerre Gaussian beams diverge when transmitted from phased array antennas.

Referring now to FIG. 86, there is illustrated in the manner in which Hermite Gaussian beams and Laguerre Gaussian beams will diverge when transmitted from a phased array of antennas. For the generation of Laguerre Gaussian beams a circular symmetry over the cross-section of the phased antenna array is used, and thus, a circular grid will be utilized. For the generation of Hermite Gaussian beams 8602, a rectangular array 8604 of array elements 8606 is utilized. As can be seen with respect to FIG. 86, the Hermite Gaussian waves 8608 provide a more focused beam front then the Laguerre Gaussian waves 8610.

Reduced beam divergence may also be accomplished using a pair of lenses. As illustrated in FIG. 87A, a Gaussian wave 8702 passing through a spiral phase plate 8704 generates an output Laguerre Gaussian wave 8706. The Laguerre Gaussian wave 8706 when passing from a transmitter aperture 8708 to a receiver aperture 8710 diverges such that the entire Laguerre Gaussian beam does not intersect the receiver aperture 8710. This issue may be addressed as illustrated in FIG. 87B. As before the Gaussian waves 8702 pass through the spiral phase plate 8704 generating Laguerre Gaussian waves 8706. Prior to passing through the transmitter aperture 8708 the Laguerre Gaussian waves 8706 pass through a pair of lenses 8714. The pair of lenses 8714 have an effective focal length 8716 that focuses the beam 8718 passing through the transmitter aperture 8708. Due to the focusing lenses 8714, the focused beam 8718 fully intersects the receiver aperture 8712. By providing the lenses 8714 separated by an effective focal length 8716, a more focused beam 8718 may be provided at the receiver aperture 8712 preventing the loss of data within the transmission of the Laguerre Gaussian wave 8706.

Application of OAM to Optical Communication

Utilization of OAM for optical communications is based on the fact that coaxially propagating light beams with different OAM states can be efficiently separated. This is certainly true for orthogonal modes such as the LG beam. Interestingly, it is also true for general OAM beams with cylindrical symmetry by relying only on the azimuthal phase. Considering any two OAM beams with an azimuthal index of l 1 and l 2, respectively:

$$U_1(r,\theta,z) = A_1(r,z)\exp(il_1\theta) \quad (12)$$

where r and z refers to the radial position and propagation distance respectively, one can quickly conclude that these two beams are orthogonal in the sense that:

$$\int_0^{2\pi} U_1 U_2^* d\theta = \begin{cases} 0 & \text{if } \ell_1 \neq \ell_2 \\ A_1 A_2^* & \text{if } \ell_1 = \ell_2 \end{cases} \quad (13)$$

There are two different ways to take advantage of the distinction between OAM beams with different ℓ states in communications. In the first approach, N different OAM states can be encoded as N different data symbols representing "0", "1", ..., "N−1", respectively. A sequence of OAM states sent by the transmitter therefore represents data information. At the receiver, the data can be decoded by checking the received OAM state. This approach seems to be more favorable to the quantum communications community, since OAM could provide for the encoding of multiple bits (log 2(N)) per photon due to the infinitely countable possibilities of the OAM states, and so could potentially achieve a higher photon efficiency. The encoding/decoding of OAM states could also have some potential applications for on-chip interconnection to increase computing speed or data capacity.

The second approach is to use each OAM beam as a different data carrier in an SDM (Spatial Division Multiplexing) system. For an SDM system, one could use either a multi-core fiber/free space laser beam array so that the data channels in each core/laser beam are spatially separated, or use a group of orthogonal mode sets to carry different data channels in a multi-mode fiber (MMF) or in free space. Greater than 1 petabit/s data transmission in a multi-core fiber and up to 6 linearly polarized (LP) modes each with two polarizations in a single core multi-mode fiber has been reported. Similar to the SDM using orthogonal modes, OAM beams with different states can be spatially multiplexed and demultiplexed, thereby providing independent data carriers in addition to wavelength and polarization. Ideally, the orthogonality of OAM beams can be maintained in transmission, which allows all the data channels to be separated and recovered at the receiver. A typical embodiments of OAM multiplexing is conceptually depicted in FIG. 38. An obvious benefit of OAM multiplexing is the improvement in system spectral efficiency, since the same bandwidth can be reused for additional data channels.

RF Communications with OAM

As a general property of electromagnetic waves, OAM can also be carried on other ways with either a shorter wavelength (e.g., x-ray), or a longer wavelength (millimeter waves and terahertz waves) than an optical beam. Focusing on the RF waves, OAM beams at 90 GHz were initially generated using a spiral phase plate made of Teflon. Different approaches, such as a phase array antenna and a helicoidal parabolic antenna have also been proposed. RF OAM beams have been used as data carriers for RF communications. A Gaussian beam and an OAM beam with l=+1 at approximately 2.4 GHz have been transmitted by a Yagi-Uda antenna and a spiral parabolic antenna, respectively, which are placed in parallel. These two beams were distinguished by the differential output of a pair of antennas at the receiver side. The number of channels was increased to three (carried on OAM beams with l=−1, 0 and +1) using a similar apparatus to send approximately 11 Mb/s signal at approximately 17 GHz carrier. Note that in these two demonstrations different OAM beams propagate along different spatial axes. There are some potential benefits if all of the OAM beams are actually multiplexed and propagated through the same aperture. In a recent demonstration eight polarization multiplexed (pol-muxed) RF OAM beams (for OAM beams on each of two orthogonal polarizations) our coaxially propagated through a 2.5 m link.

The herein described RF techniques have application in a wide variety of RF environments. These include RF Point to Point/Multipoint applications, RF Point to Point Backhaul applications, RF Point to Point Fronthaul applications (these provide higher throughput CPRI interface for cloudification and virtualization of RAN and future cloudified HetNet), RF Sattellite applications, RF Wifi (LAN) applications, RF Bluetooth (PAN) applications, RF personal device cable replacement applications, RF Radar applications and RF electromagnet tag applications. The techniques could also be used in a RF and FSO hybrid system that can provide communications in an RF mode or an FSO mode depending on which mode of operation is providing the most optimal or cost effective communications link at a particular point in time.

Figure 88:
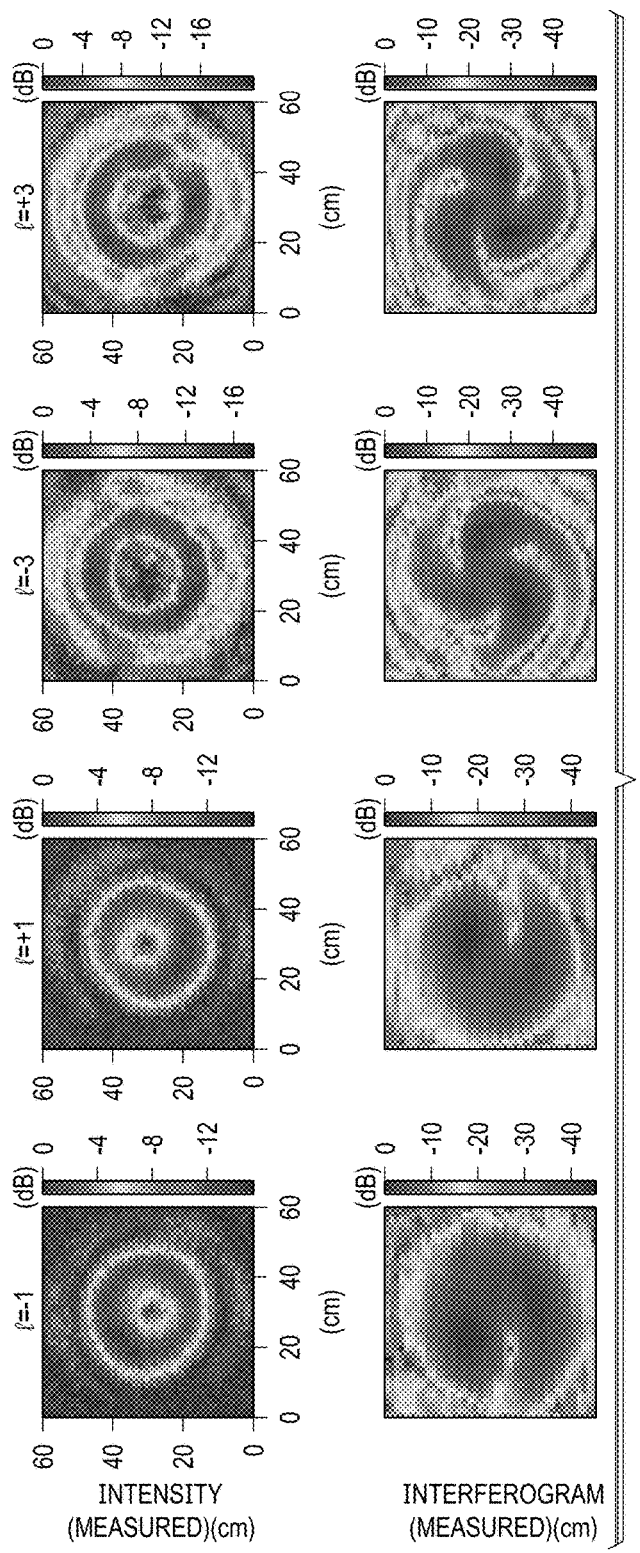
FIG. 88 illustrates intensity profiles and interferograms of OAM beams.

The four different OAM beams with l=−3, −1, +1 and +3 on each of 2 orthogonal polarizations are generated using customized spiral phase plates specifically for millimeter wave at 28 GHz. The observed intensity profile for each of the beams and their interferograms are shown in FIG. 88. These OAM beams were coaxially multiplexed using designed beam splitters. After propagation, the OAM channels were multiplexed using an inverse spiral phase plate and a spatial filter (the receiver antenna). The measured crosstalk it 28 GHz for each of the demultiplexed channels is shown in Table 8. It can be seen that the cross talk is low enough for 16-QAM data transmission without the assistance of extra DSPs to reduce the channel interference.

TABLE 8

CROSSTALK OF THE OAM CHANNELS MEASURED AT F = 28 GHZ (CW)

| | $\ell = -3$ | $\ell = -1$ | $\ell = +1$ | $\ell = +3$ |
|---|---|---|---|---|
| Single-pol (Y-pol) | −25 dB | −23 dB | −25 dB | −26 dB |
| Dual-pol (X-pol) | −17 dB | −16.5 dB | −18.1 dB | −19 dB |
| Dual-pol (Y-pol) | −18 dB | −16.5 dB | −16.5 dB | −24 dB |

Considering that each beam carries a 1 Gbaud 16-QAM signal, a total link capacity of 32 Gb/s at a single carrier frequency of 28 GHz and a spectral efficiency of 16 Gb/s/Hz may be achieved. In addition, an RF OAM beam demultiplexer ("mode sorter") was also customize for a 28 GHz carrier and is implemented in such a link to simultaneously separate multiple OAM beams. Simultaneously demultiplexing for OAM beams at the single polarization has been demonstrated with a cross talk of less than −14 dB. The cross talk is likely to be further reduced by optimizing the design parameters.

Free Space Communications

Figure 89:
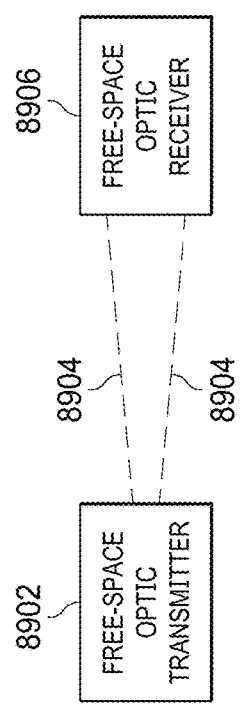
FIG. 89 illustrates a free-space communication system.

An additional configuration in which the optical angular momentum processing and multi-layer overlay modulation technique described herein above may prove useful within the optical network framework is use with free-space optics communications. Free-space optics systems provide a number of advantages over traditional UHF RF based systems from improved isolation between the systems, the size and the cost of the receivers/transmitters, lack of RF licensing laws, and by combining space, lighting, and communication into the same system. Referring now to FIG. 89 there is illustrated an example of the operation of a free-space communication system. The free-space communication system utilizes a free-space optics transmitter 8902 that transmits a light beam 8904 to a free-space optics receiver 8906. The major difference between a fiber-optic network and a free-space optic network is that the information beam is transmitted through free space rather than over a fiber-optic cable. This causes a number of link difficulties, which will be more fully discussed herein below. Free-space optics is a line of sight technology that uses the invisible beams of light to provide optical bandwidth connections that can send and receive up to 2.5 Gbps of data, voice, and video communications between a transmitter 8902 and a receiver 8906. Free-space optics uses the same concepts as fiber-optics, except without the use of a fiber-optic cable. Free-space optics systems provide the light beam 8904 within the infrared (IR) spectrum, which is at the low end of the light spectrum. Specifically, the optical signal is in the range of 300 Gigahertz to 1 Terahertz in terms of wavelength.

Presently existing free-space optics systems can provide data rates of up to 10 Gigabits per second at a distance of up to 2.5 kilometers. In outer space, the communications range of free space optical communications is currently on the order of several thousand kilometers, but has the potential to bridge interplanetary distances of millions of kilometers, using optical telescopes as beam expanders. In January of 2013, NASA used lasers to beam an image of the Mona Lisa to the Lunar Reconnaissance Orbiter roughly 240,000 miles away. To compensate for atmospheric interference, an error correction code algorithm, similar to that used within compact discs, was implemented.

The distance records for optical communications involve detection and emission of laser light by space probes. A two-way distance record for communication was established by the Mercury Laser Altimeter instrument aboard the MESSENGER spacecraft. This infrared diode neodymium laser, designed as a laser altimeter for a Mercury Orbiter mission, was able to communicate across a distance of roughly 15,000,000 miles (24,000,000 kilometers) as the craft neared Earth on a fly by in May of 2005. The previous record had been set with a one-way detection of laser light from Earth by the Galileo Probe as two ground based lasers were seen from 6,000,000 kilometers by the outbound probe in 1992. Researchers used a white LED based space lighting system for indoor local area network communications.

Figure 90:
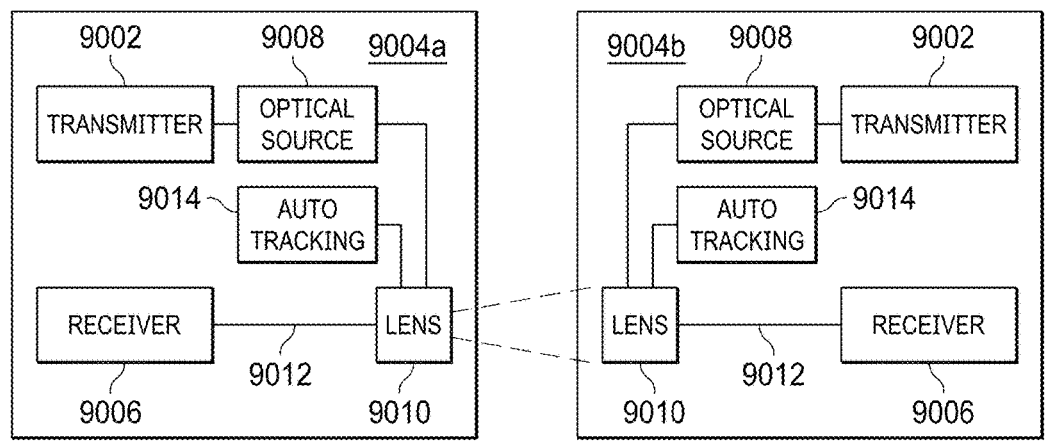
FIG. 90 illustrates a block diagram of a free-space optics system using orbital angular momentum and multi-level overlay modulation.

Referring now to FIG. 90, there is illustrated a block diagram of a free-space optics system using orbital angular momentum and multilevel overlay modulation according to the present disclosure. The OAM twisted signals, in addition to being transmitted over fiber, may also be transmitted using free optics. In this case, the transmission signals are generated within transmission circuitry 9002 at each of the FSO transceivers 9004. Free-space optics technology is based on the connectivity between the FSO based optical wireless units, each consisting of an optical transceiver 9004 with a transmitter 9002 and a receiver 9006 to provide full duplex open pair and bidirectional closed pairing capability. Each optical wireless transceiver unit 9004 additionally includes an optical source 9008 plus a lens or telescope 9010 for transmitting light through the atmosphere to another lens 9010 receiving the information. At this point, the receiving lens or telescope 9010 connects to a high sensitivity receiver 9006 via optical fiber 9012. The transmitting transceiver 9004a and the receiving transceiver 9004b have to have line of sight to each other. Trees, buildings, animals, and atmospheric conditions all can hinder the line of sight needed for this communications medium. Since line of sight is so critical, some systems make use of beam divergence or a diffused beam approach, which involves a large field of view that tolerates substantial line of sight interference without significant impact on overall signal quality. The system may also be equipped with auto tracking mechanism 9014 that maintains a tightly focused beam on the receiving transceiver 3404b, even when the transceivers are mounted on tall buildings or other structures that sway. The auto tracking mechanism may apply specific alignment characteristics with the auto tracking for transmissions between a transmitter and a receiver.

The modulated light source used with optical source 9008 is typically a laser or light emitting diode (LED) providing the transmitted optical signal that determines all the transmitter capabilities of the system. Only the detector sensitivity within the receiver 9006 plays an equally important role in total system performance. For telecommunications purposes, only lasers that are capable of being modulated at 20 Megabits per second to 2.5 Gigabits per second can meet current marketplace demands. Additionally, how the device is modulated and how much modulated power is produced are both important to the selection of the device. Lasers in the 780-850 nm and 1520-1600 nm spectral bands meet frequency requirements.

Commercially available FSO systems operate in the near IR wavelength range between 750 and 1600 nm, with one or two systems being developed to operate at the IR wavelength of 10,000 nm. The physics and transmissions properties of optical energy as it travels through the atmosphere are similar throughout the visible and near IR wavelength range, but several factors that influence which wavelengths are chosen for a particular system.

The atmosphere is considered to be highly transparent in the visible and near IR wavelength. However, certain wavelengths or wavelength bands can experience severe absorption. In the near IR wavelength, absorption occurs primarily in response to water particles (i.e., moisture) which are an inherent part of the atmosphere, even under clear weather conditions. There are several transmission windows that are nearly transparent (i.e., have an attenuation of less than 0.2 dB per kilometer) within the 700-10,000 nm wavelength range. These wavelengths are located around specific center wavelengths, with the majority of free-space optics systems designed to operate in the windows of 780-850 nm and 1520-1600 nm.

Wavelengths in the 780-850 nm range are suitable for free-space optics operation and higher power laser sources may operate in this range. At 780 nm, inexpensive CD lasers may be used, but the average lifespan of these lasers can be an issue. These issues may be addressed by running the lasers at a fraction of their maximum rated output power which will greatly increase their lifespan. At around 850 nm, the optical source 9008 may comprise an inexpensive, high performance transmitter and detector components that are readily available and commonly used in network transmission equipment. Highly sensitive silicon (SI) avalanche photodiodes (APD) detector technology and advanced vertical cavity emitting laser may be utilized within the optical source 9008.

VCSEL technology may be used for operation in the 780 to 850 nm range. Possible disadvantage of this technology include beam detection through the use of a night vision scope, although it is still not possible to demodulate a perceived light beam using this technique.

Wavelengths in the 1520-1600 nm range are well-suited for free-space transmission, and high quality transmitter and detector components are readily available for use within the optical source block 9008. The combination of low attenuation and high component availability within this wavelength range makes the development of wavelength division multiplexing (WDM) free-space optics systems feasible. However, components are generally more expensive and detectors are typically less sensitive and have a smaller receive surface area when compared with silicon avalanche photodiode detectors that operator at the 850 nm wavelength. These wavelengths are compatible with erbium-doped fiber amplifier technology, which is important for high power (greater than 500 milliwatt) and high data rate (greater than 2.5 Gigabytes per second) systems. Fifty to 65 times as much power can be transmitted at the 1520-1600 nm wavelength than can be transmitted at the 780-850 nm wavelength for the same eye safety classification. Disadvantages of these wavelengths include the inability to detect a beam with a night vision scope. The night vision scope is one technique that may be used for aligning the beam through the alignment circuitry 9014. Class 1 lasers are safe under reasonably foreseeable operating conditions including the use of optical instruments for intrabeam viewing. Class 1 systems can be installed at any location without restriction.

Another potential optical source 9008 comprised Class 1M lasers. Class 1M laser systems operate in the wavelength range from 302.5 to 4000 nm, which is safe under reasonably foreseeable conditions, but may be hazardous if the user employs optical instruments within some portion of the beam path. As a result, Class 1M systems should only be installed in locations where the unsafe use of optical aids can be prevented. Examples of various characteristics of both Class 1 and Class 1M lasers that may be used for the optical source 4708 are illustrated in Table 9 below.

TABLE 9

| LASER CLASSIFICATION | Power (mW) | Aperture Size (mm) | Distance (m) | Power Density (mW/cm$^2$) |
|---|---|---|---|---|
| 850-nm Wavelength | | | | |
| Class 1 | 0.78 | 7 | 14 | 2.03 |
|  |  | 50 | 2000 | 0.04 |
| Class 1M | 0.78 | 7 | 100 | 2.03 |
|  | 500 | 7 | 14 | 1299.88 |
|  |  | 50 | 2000 | 25.48 |
| 1550-nm Wavelength | | | | |
| Class 1 | 10 | 7 | 14 | 26.00 |
|  |  | 25 | 2000 | 2.04 |
| Class 1M | 10 | 3.5 | 100 | 103.99 |
|  | 500 | 7 | 14 | 1299.88 |
|  |  | 25 | 2000 | 101.91 |

The 10,000 nm wavelength is relatively new to the commercial free space optic arena and is being developed because of better fog transmission capabilities. There is presently considerable debate regarding these characteristics because they are heavily dependent upon fog type and duration. Few components are available at the 10,000 nm wavelength, as it is normally not used within telecommunications equipment. Additionally, 10,000 nm energy does not penetrate glass, so it is ill-suited to behind window deployment.

Within these wavelength windows, FSO systems should have the following characteristics. The system should have the ability to operate at higher power levels, which is important for longer distance FSO system transmissions. The system should have the ability to provide high speed modulation, which is important for high speed FSO systems. The system should provide a small footprint and low power consumption, which is important for overall system design and maintenance. The system should have the ability to operate over a wide temperature range without major performance degradations such that the systems may prove useful for outdoor systems. Additionally, the mean time between failures should exceed 10 years. Presently existing FSO systems generally use VCSELS for operation in the shorter IR wavelength range, and Fabry-Pérot or distributed feedback lasers for operation in the longer IR wavelength range. Several other laser types are suitable for high performance FSO systems.

A free-space optics system using orbital angular momentum processing and multi-layer overlay modulation would provide a number of advantages. The system would be very convenient. Free-space optics provides a wireless solution to a last-mile connection, or a connection between two buildings. There is no necessity to dig or bury fiber cable. Free-space optics also requires no RF license. The system is upgradable and its open interfaces support equipment from a variety of vendors. The system can be deployed behind windows, eliminating the need for costly rooftop right. It is also immune to radiofrequency interference or saturation. The system is also fairly speedy. The system provides 2.5 Gigabits per second of data throughput. This provides ample bandwidth to transfer files between two sites. With the growth in the size of files, free-space optics provides the necessary bandwidth to transfer these files efficiently.

Free-space optics also provides a secure wireless solution. The laser beam cannot be detected with a spectral analyzer or RF meter. The beam is invisible, which makes it difficult to find. The laser beam that is used to transmit and receive the data is very narrow. This means that it is almost impossible to intercept the data being transmitted. One would have to be within the line of sight between the receiver and the transmitter in order to be able to accomplish this feat. If this occurs, this would alert the receiving site that a connection has been lost. Thus, minimal security upgrades would be required for a free-space optics system.

However, there are several weaknesses with free-space optics systems. The distance of a free-space optics system is very limited. Currently operating distances are approximately within 2 kilometers. Although this is a powerful system with great throughput, the limitation of distance is a big deterrent for full-scale implementation. Additionally, all systems require line of sight be maintained at all times during transmission. Any obstacle, be it environmental or animals can hinder the transmission. Free-space optic technology must be designed to combat changes in the atmosphere which can affect free-space optic system performance capacity.

Something that may affect a free-space optics system is fog. Dense fog is a primary challenge to the operation of free-space optics systems. Rain and snow have little effect on free-space optics technology, but fog is different. Fog is a vapor composed of water droplets which are only a few hundred microns in diameter, but can modify light characteristics or completely hinder the passage of light through a combination of absorption, scattering, and reflection. The primary answer to counter fog when deploying free-space optic based wireless products is through a network design that shortens FSO linked distances and adds network redundancies.

Absorption is another problem. Absorption occurs when suspended water molecules in the terrestrial atmosphere extinguish photons. This causes a decrease in the power density (attenuation) of the free space optics beam and directly affects the availability of the system. Absorption occurs more readily at some wavelengths than others. However, the use of appropriate power based on atmospheric conditions and the use of spatial diversity (multiple beams within an FSO based unit), helps maintain the required level of network availability.

Solar interference is also a problem. Free-space optics systems use a high sensitivity receiver in combination with a larger aperture lens. As a result, natural background light can potentially interfere with free-space optics signal reception. This is especially the case with the high levels of background radiation associated with intense sunlight. In some instances, direct sunlight may case link outages for periods of several minutes when the sun is within the receiver's field of vision. However, the times when the receiver is most susceptible to the effects of direct solar illumination can be easily predicted. When direct exposure of the equipment cannot be avoided, the narrowing of receiver field of vision and/or using narrow bandwidth light filters can improve system performance. Interference caused by sunlight reflecting off of a glass surface is also possible.

Scattering issues may also affect connection availability. Scattering is caused when the wavelength collides with the scatterer. The physical size of the scatterer determines the type of scattering. When the scatterer is smaller than the wavelength, this is known as Rayleigh scattering. When a scatterer is of comparable size to the wavelengths, this is known as Mie scattering. When the scattering is much larger than the wavelength, this is known as non-selective scattering. In scattering, unlike absorption, there is no loss of energy, only a directional redistribution of energy that may have significant reduction in beam intensity over longer distances.

Physical obstructions such as flying birds or construction cranes can also temporarily block a single beam free space optics system, but this tends to cause only short interruptions. Transmissions are easily and automatically resumed when the obstacle moves. Optical wireless products use multibeams (spatial diversity) to address temporary abstractions as well as other atmospheric conditions, to provide for greater availability.

The movement of buildings can upset receiver and transmitter alignment. Free-space optics based optical wireless offerings use divergent beams to maintain connectivity. When combined with tracking mechanisms, multiple beam FSO based systems provide even greater performance and enhanced installation simplicity.

Scintillation is caused by heated air rising from the Earth or man-made devices such as heating ducts that create temperature variations among different pockets of air. This can cause fluctuations in signal amplitude, which leads to "image dancing" at the free-space optics based receiver end. The effects of this scintillation are called "refractive turbulence." This causes primarily two effects on the optical beams. Beam wander is caused by the turbulent eddies that are no larger than the beam. Beam spreading is the spread of an optical beam as it propagates through the atmosphere.

Full Duplex Discription

In ($\rho$, $\phi$, z) cylindrical coordinates for mode radial index of zero:

$$E_l = \sqrt{\frac{1}{\pi |l|!}} \frac{1}{w(z)} \left[\frac{\sqrt{2}\rho}{w(z)}\right]^{|l|} e^{-\frac{\rho^2}{w^2(z)}} e^{-\frac{jk\rho^2}{2R(z)}} e^{j(l\phi - kz)}$$

OAM is demultiplexed by imposing a conjugate phase $e^{-jl\phi}$ to the incoming OAM beam centered at the beam, thus the power is:

$$P = \int_0^a \left| \int_0^{2\pi} \frac{1}{\sqrt{2\pi}} E_l e^{-jl\phi} d\phi \right|^2 \rho d\rho = \delta(l-k) P_k$$

where a is the receiver antenna radius.

The path difference between ($\rho$, $\phi$) and ($\rho$, 0) at the RX-plane:

$$\Delta z = \rho \sin\alpha \cos\phi$$

Figure 91:
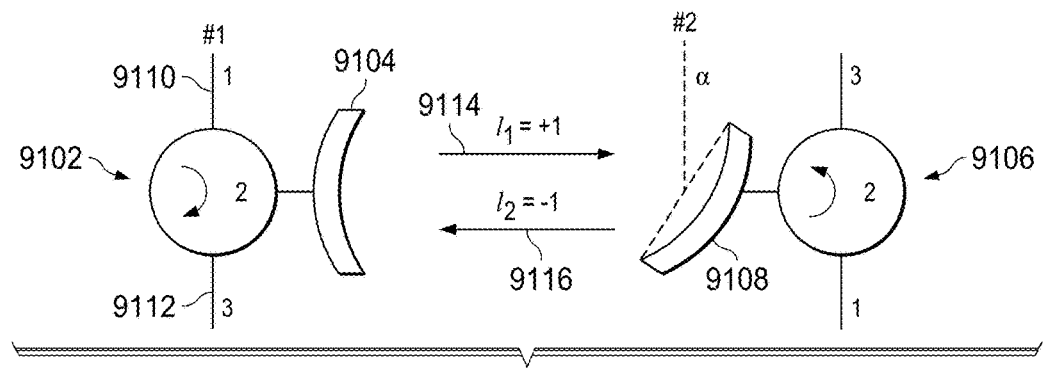
FIG. 91 illustrates full duplex communications between the first and second transceivers using parabolic antennas.

Thus, as shown in FIG. 91, transceiver 9102 combines signals from inputs 9110 and 9112 and transmits them from parabolic antenna 9104. Parabolic antenna 9104 also receive signals from transceiver 9106 and its parabolic antenna 9108. Signals 9114 transmitted from parabolic antenna 9104 have +1 angular momentum applied thereto while signals 9116 transmitted from parabolic antenna 9010 wait have −1 angular momentum applied thereto. The radius of the antennas 9108 and 9104 are a as described hereinabove.

Since $E_l^\alpha = E_l e^{-jk\Delta z}$, normalized power is:

$$E_l^\alpha \rightarrow E_l \quad \mathbb{P} = \frac{1}{2\pi \int_0^\infty \int_0^{2\pi} |E_l|^2 \rho d\phi} \int_0^a \left| \int_0^{2\pi} \frac{1}{\sqrt{2\pi}} E_l e^{-jl\phi} d\phi \right|^2 \rho d\rho$$

Thus the new capacity is $C_{l_1} + C_{l_2}$ that defines a power coefficient based on a modified Bessel equation:

$$\pi_{l_1 l_2} = e^{-x|l_1 - l_2|}(x)$$

$$x = \frac{r_0^2}{w_0^2} = \frac{k^2 w_0^2 \sin^2\gamma}{4} \quad \text{where } \gamma = \text{deflect angle}$$

$x = 0$ no misalignment as $\uparrow x \Rightarrow$ mode impurity

Assuming a same noise level $\sigma^2$ for the receiver and the transmitter, the intended OAM mode $l_1$ at transceiver 9106 has an effective power of $\pi_{l_1 l_1} \cdot P_{l_1}$, where $\pi_{l_1 l_1}$ is the radiated power of l from transceiver 9102 and $P_{l_1}$ is the power gain.

Also the Rx OAM mode $l_1$ at transceiver 9106 is interfered by parasitic harmonic $l_1$ within the output OAM of transceiver 9106 when it transmits OAM mode $l_2$ which results in interfering power $\pi_{l_2 l_1}$. Therefore, the received $$\frac{\text{signal}}{\text{interference} + \text{noise}} = SINR$$

at node 2 is $$\frac{\pi_{l_1 l_1} \mathbb{P}_{l_1}}{\pi_{l_2 l_1} + \sigma^2}.$$

Thus, the sum rate of the system for full duplex:

$$C = \log_2\left(1 + \frac{\pi_{l_1 l_1} \mathbb{P}_{l_1}}{\pi_{l_2 l_1} + \sigma^2}\right) + \log_2\left(1 + \frac{\pi_{l_2 l_2} \mathbb{P}_{l_2}}{\pi_{l_1 l_2} + \sigma^2}\right)$$

Figure 92:
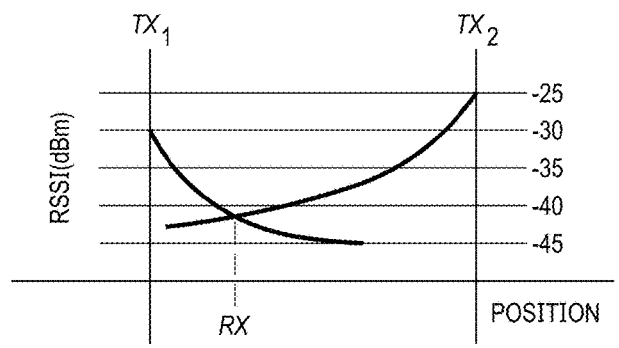
FIG. 92 illustrates a graph of receiver position versus RSSI for first and second transmitters.

Referring not to FIG. 92, C can be maximized by choosing the right OAM modes for $l_1$=+1 (9202) and $l_2$=−1 (9204).

The transmissions between the transceiver described herein above for a full duplex communications systems may be carried out using patch antennas such as those described in U.S. patent application Ser. No. 16/037,550, entitled PATCH ANTENNA ARRAY FOR TRANSMISSION OF HERMITE-GAUSSIAN AND LAGUERRE GAUSSIAN BEAMS, filed Jul. 17, 2018, which is incorporated herein by reference in its entirety. A more complete description of the patch antennas for use with full duplex communications is provided herein below.

Figure 93:
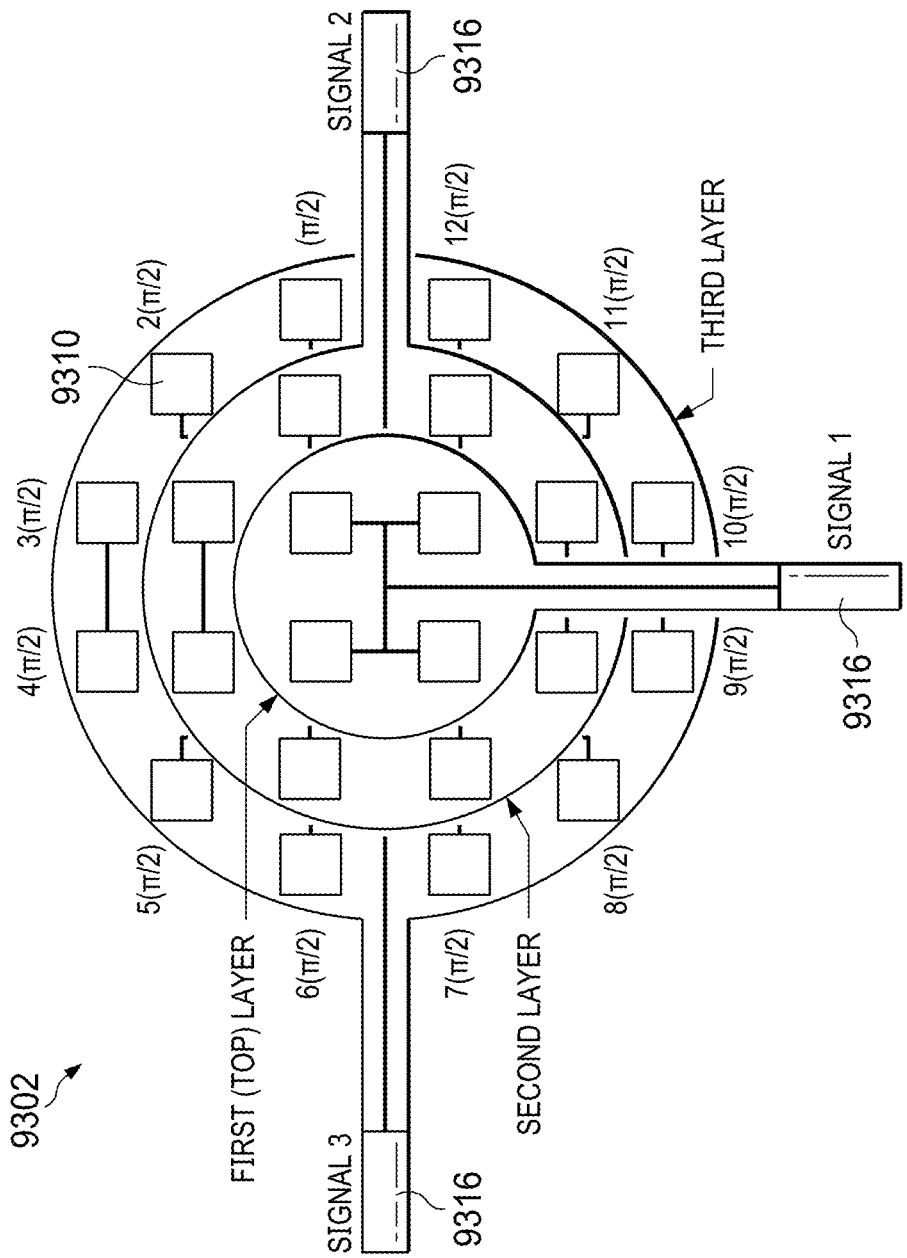
FIG. 93 illustrates a top view of a multilayer patch antenna array.

FIG. 93 illustrates a multilayer patch antenna array 9302. The multilayer patch antenna array 9302 includes a first antenna layer 9304 for transmitting a first ordered beam, a second antenna layer 9306 for transmitting a second ordered beam and a third layer 9308 for transmitting a third ordered beam. Each of the layers 9304, 9306 and 9308 are stacked on a same center. While the present embodiment is illustrated with respect to a multilayer patch antenna array 9302 including only three layers, it should be realized that either more or less layers may be implemented in a similar fashion as described herein. On the surface of each of the layers 9304, 9306 and 9308 are placed patch antennas 9310. Each of the patch antennas are placed such that they are not obscured by the above layer. The layers 9304, 9306 and 9308 are separated from each other by layer separator members 9312 that provide spacing between each of the layers 9304, 9306 and 9308. The configuration of the layers of the patch antenna may be in rectangular, circular or elliptical configurations to generate Hermite-Gaussian, Laguerre-Gaussian, Ince-Gaussian, Legendre, Bessel beams or any other orthogonal function beams.

The patch antennas 9310 used within the multilayer patch antenna array 9302 are made from FR408 (flame retardant 408) laminate that is manufactured by Isola Global, of Chandler Ariz. and has a relative permittivity of approximately 3.75. The antenna has an overall height of 125 µm. The metal of the antenna is copper having a thickness of approximately 12 m. The patch antenna is designed to have an operating frequency of 73 GHz and a free space wavelength of 4.1 mm. The dimensions of the input 50 Ohm line of the antenna is 280 µm while the input dimensions of the 100 Ohm line are 66 µm.

Each of the patch antennas 9310 are configured to transmit signals at a predetermined phase that is different from the phase of each of the other patch antenna 9310 on a same layer. Thus, as further illustrated in FIG. 95, there are four patch antenna elements 9310 included on a layer 9304. Each of the antenna elements 9304 have a separate phase associated there with as indicated in FIG. 95. These phases include $\pi/2$, $2(\pi/2)$, $3(\pi/2)$ and $4(\pi/2)$. Similarly, as illustrated in FIG. 96 layer 9306 includes eight different patch antenna elements 9310 including the phases $\pi/2$, $2(\pi/2)$, $3(\pi/2)$, $4(\pi/2)$, $5(\pi/2)$, $6(\pi/2)$, $7(\pi/2)$ and $8(\pi/2)$ as indicated. Finally, referring back to FIG. 93, there are included 12 patch antenna elements 9310 on layer 9308. Each of these patch antenna elements 9310 have a phase assigned thereto in the manner indicated in FIG. 93. These phases include $\pi/2$, $2(\pi/2)$, $3(\pi/2)$, $4(\pi/2)$, $5(\pi/2)$, $6(\pi/2)$, $7(\pi/2)$, $8(\pi/2)$, $9(\pi/2)$, $10(\pi/2)$, $11(\pi/2)$ and $12(\pi/2)$.

Each of the antenna layers 9304, 9306 and 9308 are connected to a coaxial end-launch connector 9316 to feed each layer of the multilayer patch antenna array 9302. Each of the connectors 9316 are connected to receive a separate signal that allows the transmission of a separate ordered antenna beam in a manner similar to that illustrated in FIG. 94. The emitted beams are multiplexed together by the multilayered patch antenna array 9302. The orthogonal wavefronts transmitted from each layer of the multilayered patch antenna array 9302 in a spatial manner to increase capacity as each wavefront will act as an independent Eigen channel. The signals are multiplexed onto a single frequency and propagate without interference or crosstalk between the multiplexed signals. While the illustration with respect to FIG. 9 illustrates the transmission of OAM beams at OAM 1, OAM 2 and OAM 3 ordered levels.

It should be understood that other types of Hermite Gaussian and Laguerre Gaussian beams can be transmitted using the multilayer patch antenna array 9302 illustrated. Hermite-Gaussian polynomials and Laguerre-Gaussian polynomials are examples of classical orthogonal polynomial sequences, which are the Eigenstates of a quantum harmonic oscillator. However, it should be understood that other signals may also be used, for example orthogonal polynomials or functions such as Jacobi polynomials, Gegenbauer polynomials, Legendre polynomials and Chebyshev polynomials. Legendre functions, Bessel functions, prolate spheroidal functions and Ince-Gaussian functions may also be used. Q-functions are another class of functions that can be employed as a basis for orthogonal functions.

The feeding network 9318 illustrated on each of the layers 9304, 9306, 9308 uses delay lines of differing lengths in order to establish the phase of each patch antenna element 9310. By configuring the phases as illustrated in FIGS. 93-96, the OAM beams of different orders are generated and multiplexed together. By applying different phases to each component of the patch antenna a plurality of orthogonal Eigen-channels are produced. Each mode from the patch antenna array is a new Eigen channel that are orthogonal to each other making them non-interfering.

Figure 97:
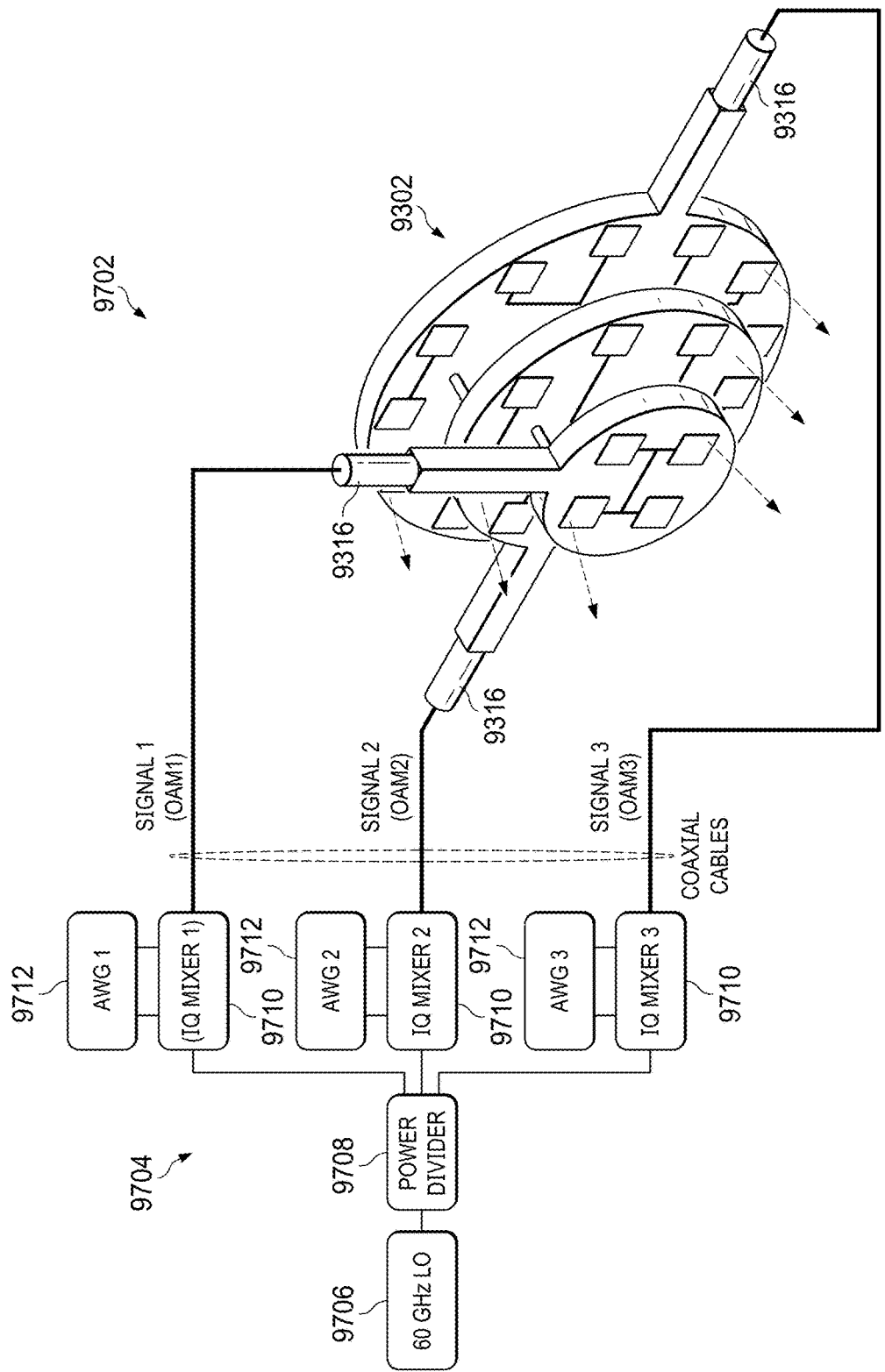
FIG. 97 illustrates a transmitter for use with a multilayer patch antenna array.

Referring now to FIG. 97, there is illustrated a transmitter 9702 for generating a multiplexed beam for transmission. As discussed previously, the multilayered patch antenna array 9302 includes a connector 9316 associated with each layer 9304, 9306, 9308 of the multilayer patch antenna array 9302. Each of these connectors 9316 are connected with signal generation circuitry 9704. The signal generation circuitry 9704 includes, in one embodiment, a 60 GHz local oscillator 9706 for generating a 60 GHz carrier signal. The signal generation circuit 9704 may also work with other frequencies, such as 70/80 GHz. The 60 GHz signal is output from the local oscillator 9706 to a power divider circuit 9708 which separates the 60 GHz signal into three separate transmission signals. Each of these separated transmission signals are provided to an IQ mixer 9710 that are each connected to one of the layer input connectors 9316. The IQ mixer circuits 9710 are connected to an associated additive white gaussian noise circuit 9712 for inserting a noise element into the generated transmission signal. The AWG circuit 9712 may also generate SuperQAM signals for insertion in to the transmission signals. The IQ mixer 9710 generates signals in a manner such as that described in U.S. patent application Ser. No. 14/323,082, filed on Jul. 3, 2014, now U.S. Pat. No. 9,331,875, issued on May 3, 2016, entitled SYSTEM AND METHOD FOR COMMUNICATION USING ORBITAL ANGULAR MOMENTUM WITH MULTIPLE LAYER OVERLAY MODULATION, which is incorporated herein by reference in its entirety.

Figure 98:
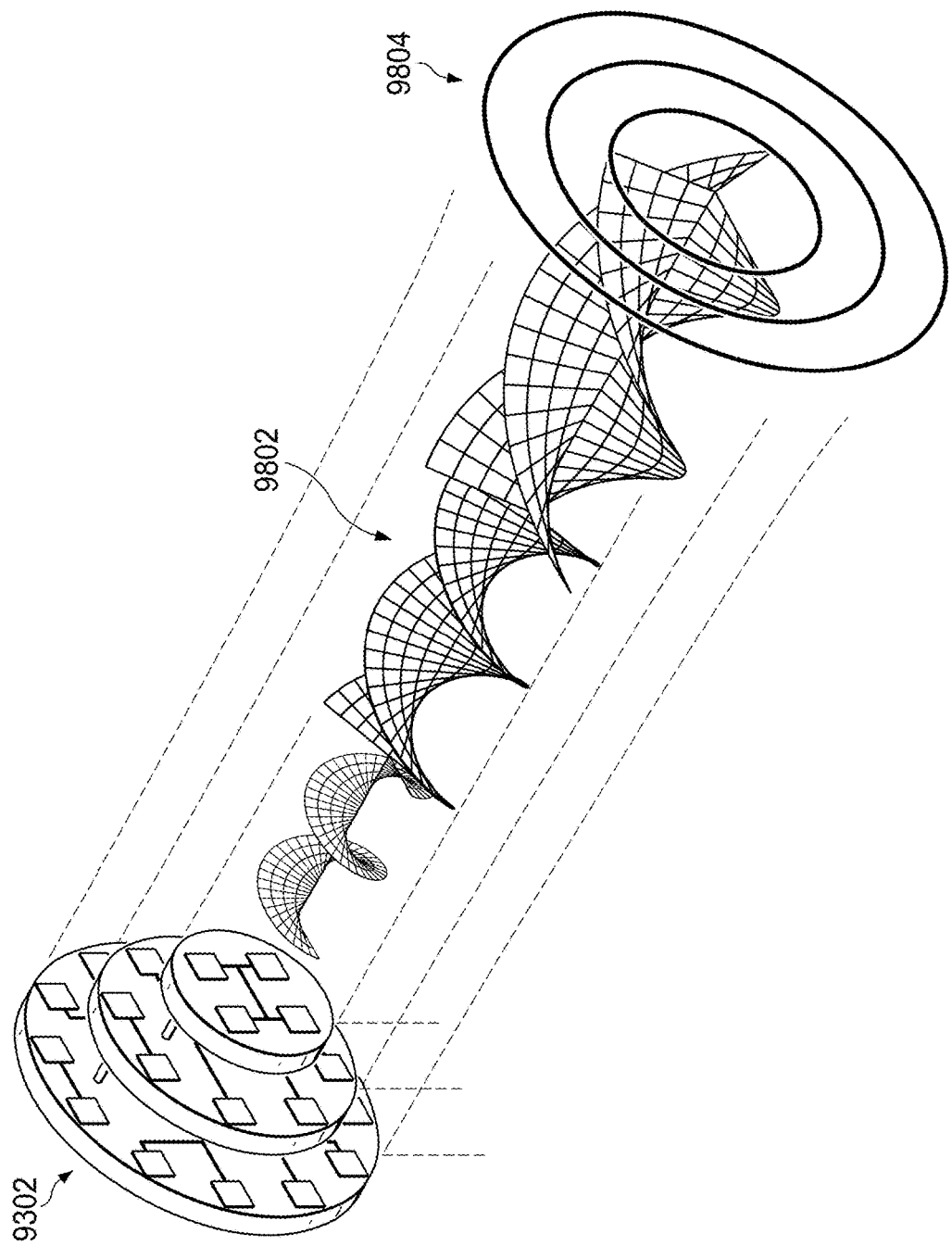
FIG. 98 illustrates a multiplexed OAM signal transmitted from a multilayer patch antenna array.

Using the transmitter 9702 illustrated in FIG. 97. A multiplexed beam (Hermite Gaussian, Laguerre Gaussian, etc.) can be generated as illustrated in FIG. 98. As illustrated, the multilayered patch antenna array 9302 will generate a multiplexed beam 9802 for transmission. In the present example, there is illustrated a multiplex OAM beam that has twists for various order OAM signals in a manner similar to that disclosed in U.S. patent application Ser. No. 14/323, 082. An associated receiver detector would detect the various OAM rings 9804 as illustrated each of the rings associated with a separate OAM processed signal.

When signals are transmitted in free space (vacuum), the signals are transmitted as plane waves. They may be represented as described herein below. Free space comprises a nonconducting medium ($\sigma$=0) and thus J=$\sigma$E=0.

From experimental results Ampere's law and Faraday's law are represented as:

$$\vec{B} = \mu\vec{H} \quad \nabla \times H = \frac{\partial D}{\partial t} + J \quad \text{Ampere's}$$

$$\vec{D} = \epsilon\vec{E}$$

$$\vec{J} = \sigma\vec{E} \quad \nabla \times E = \frac{-\partial B}{\partial t} \quad \text{Faraday's}$$

If there is propagation in the z direction and therefore E and H are in the xy plane.

Without the loss of any generality E may be oriented in the x-direction and H may be oriented in the y-direction thus providing propagation in the z-direction. From Ampere's-Maxwell equation, the following equations are provided:

$$\nabla \times H = \frac{\partial D}{\partial t} \quad \nabla \times H = \begin{vmatrix} \hat{x} & \hat{y} & \hat{z} \\ \frac{\partial}{\partial x} & \frac{\partial}{\partial y} & \frac{\partial}{\partial z} \\ H_x & H_y & H_z \end{vmatrix}$$

$$\left(\frac{\partial Hz}{\partial y} - \frac{\partial Hy}{\partial z}\right)\hat{x} + \left(\frac{\partial Hz}{\partial z} - \frac{\partial Hz}{\partial x}\right)\hat{y} + \left(\frac{\partial Hy}{\partial x} - \frac{\partial Hx}{\partial y}\right)\hat{z} = \frac{\partial}{\partial t}\epsilon E$$

Next, the vectorial wave equations may be represented as:

$$\nabla \times H = \frac{\partial D}{\partial t} + J \quad \nabla \times H = \epsilon\frac{\partial E}{\partial t}$$

$$\nabla \times E = \frac{-\partial B}{\partial t} \quad \nabla \times E = -\mu\frac{\partial G}{\partial t}$$

$$\nabla \times B = 0 \quad \nabla \times E = S$$

$$\nabla \times \nabla \times H = \nabla(\nabla H) - \nabla^2 H = -\nabla^2 H$$

$$\nabla \times \nabla \times E = \nabla(\nabla E) - \nabla^2 E = -\nabla^2 E$$

$$\nabla \times (\nabla \times H) = \nabla \times \left(\epsilon\frac{\partial E}{\partial t}\right) = \epsilon\frac{\partial}{\partial t}(\nabla \times E)$$

$$= -\epsilon\mu\frac{\partial}{\partial t}\left(\frac{\partial}{\partial t}H\right)$$

$$\nabla^2 H = +\epsilon\mu\frac{\partial^2}{\partial t^2}H$$

$$\nabla^2 H - \epsilon\mu\frac{\partial^2}{\partial t^2}H = 0$$

$$\nabla \times (\nabla \times E) = \nabla \times \left(-\mu\frac{\partial}{\partial t}H\right)$$

$$= -\mu\frac{\partial}{\partial t}(\nabla \times H)$$

$$= -\mu\frac{\partial}{\partial t}\left(\epsilon\frac{\partial E}{\partial t}\right)$$

$$+\nabla^2 E = +\mu\epsilon\frac{\partial^2}{\partial t^2}E$$

$$\nabla^2 E - \mu\epsilon\frac{\partial^2}{\partial t^2} = 0$$

Therefore in general:

$$\vec{\nabla}\vec{E} + \vec{K}^2\vec{E} = 0 \quad E(\vec{r},t)$$

$$\vec{E}(r,t) = \vec{E}(\vec{r})e^{-j\omega t}e^{jkz} \quad \text{Propagating in z-direction}$$

Therefore:

$$\left(\frac{\partial^2}{\partial x^2} + \frac{\partial^2}{\partial y^2} + \frac{\partial^2}{\partial z^2}\right)\vec{E}(\vec{r})e^{-j\omega t}e^{jkz} + \frac{W^2}{y^2}\vec{E}(\vec{r})e^{-j\omega t}e^{jkz} = 0$$

In free space $$w = \frac{1}{\sqrt{\mu\epsilon}} = \to c = \frac{1}{\sqrt{\mu\epsilon_o}} \quad k^2 = \frac{w^2}{c^2}$$

Now:

$$\frac{\partial}{\partial z}\vec{E}(\vec{r})e^{jkz} = e^{jkz}\left[\frac{\partial \vec{E}(\vec{r})}{\partial z} + jk\vec{E}(\vec{r})\right]$$

$$\frac{\partial}{\partial z^2}\vec{E}(\vec{r})e^{jkz} = e^{jkz}\left[\frac{\partial \vec{E}(\vec{r})}{\partial z} + jk\vec{E}(\vec{r})\right] + e^{jkz}\left[\frac{\partial^2 \vec{E}(\vec{r})}{\partial z^2} + jk\frac{\partial \vec{E}(\vec{r})}{\partial z}\right]$$

$$= e^{jkz}\left[jk\frac{\partial \vec{E}}{\partial z} - k^2\vec{E}(\vec{r})\right] + e^{jkz}\left[\frac{\partial^2 \vec{E}}{\partial z^2} + jk\frac{\partial \vec{E}}{\partial z}\right]$$

Because $$\left|2k\frac{\partial E}{\partial z}\right| \gg \left|\frac{\partial^2 E(r)}{\partial z^2}\right|$$

Paraxial assumption $$\frac{\partial^2 \vec{E}(\vec{r})e^{jkz}}{\partial z^2} = e^{jkz}\left[2jk\frac{\partial^2 \vec{E}(\vec{r})}{\partial z} - k^2\vec{E}(\vec{r})\right]$$

Then:

$$\left(\frac{\partial^2}{\partial x^2} + \frac{\partial^2}{\partial y^2} + 2jk\frac{\partial^2}{\partial z}\right)E(x,y,z) = 0$$

Which may be represented in cylindrical coordinates as:

$$\frac{\partial^2}{\partial x^2} + \frac{\partial^2}{\partial y^2} = \frac{1}{q}\frac{\partial}{\partial q}\left(q\frac{\partial}{\partial q}\right) + \frac{1}{q^2}\frac{\partial^2}{\partial \Phi^2}$$

This provides a paraxial wave equation in cylindrical coordinates:

$$\frac{1}{q}\frac{\partial}{\partial q}\left(q\frac{\partial}{\partial q}\right)E(q,\Phi,z) + \frac{1}{q^2}\frac{\partial^2}{\partial \Phi^2}E(q,\Phi,z) + 2jk\frac{\partial E}{\partial z}(q,\Phi,z) = o$$

$P(z), q(z)$

Then:

$$E_0 \sim e^{-j\left[p+\frac{k}{2q}(x^2+y^2)\right]}$$

In general $E_o$ can rotate on the xy-plane and the wave still propagates in the z-direction.

$$\frac{\partial q}{\partial z} = 1$$
$$\frac{\partial P}{\partial z} = -\frac{j}{q}$$

q~Curvature of the phase front near the optical axis.

$$q_2 = q_1 + z$$

where $q_2$ is the output plane and $q_1$ is the input plane.∞∞

$$\frac{1}{q} = \frac{1}{R} - j\frac{\lambda}{\pi W^2}$$

where 1/R is the curvature of the wavefront intersecting the z-axis.

Thus for a complete plane wave R=∞, the equation becomes:

$$\frac{1}{q} = \frac{1}{R \to \infty} - j\frac{\lambda}{\pi W^2}$$
$$q_0 = \frac{\pi W^2}{-j\lambda} = \frac{j\pi W_0^2}{\lambda}$$

where $W_o$ is the beam waist.

$$q = q_0 + z = \frac{j\pi W_0^2}{\lambda} + z$$
$$w(z) = w_0\sqrt{1 + \left(\frac{z}{z_r}\right)^2}$$
$$W^2(z) = W_0^2\left[1 + \left(\frac{\lambda z}{\pi W_0^2}\right)^2\right]$$
$$R(z) = z\left[1 + \left(\frac{\pi W_0^2}{\lambda z}\right)^2\right]$$
$$R(z) = z\left[1 + \left(\frac{z_R}{z}\right)^2\right]$$
$$\Phi(z) = \tan^{-1}\left(\frac{z}{z_R}\right)$$
$$\theta = \frac{\lambda}{\pi w_0}$$
$$z = z_R$$
$$w(z) = \sqrt{2}\, w_0$$

The Rayleigh length is:

$$z_R = \frac{\pi n}{\lambda_0}$$

where n is the index of refraction.

$$w_0^2 = \frac{w^2}{1 + \left(\frac{\pi w^2}{\lambda R}\right)^2}$$

$$z = \frac{R}{1 + \left(\frac{\lambda R}{\pi w^2}\right)^2}$$

The complex phase shift is represented by:

$$jP(z) = \text{Ln}\left[1 - j\left(\frac{\lambda z}{\pi w_0^2}\right)\right] = \text{Ln}\sqrt{1 + \left(\frac{\lambda z}{\pi w_0^2}\right)^2} - j\tan^{-1}\frac{\lambda z}{\pi w_0^2}$$

The real part of P(z) represents a phase shift difference between the Gaussian beam and an ideal plane wave. Thus the fundamental mode is provided:

$$E_0(x, y, z) = E_0(r, z)\frac{w_0}{w}e^{-j(jz-\phi)}e^{-r^2\left(\frac{1}{w^2} + \frac{jk}{2R}\right)}$$

where:

$$\phi = \tan^{-1}\frac{\lambda z}{\pi w_0^2}$$

Higher order modes may also provide other solutions. The solution of rectangular equation:

$$\left(\frac{\partial^2}{\partial x^2} + \frac{\partial^2}{\partial y^2} + 2jk\frac{\partial}{\partial z}\right)E(x, y, z) = 0$$

Can be determined in rectangular coordinates to be:

$$E(x, y, z) = \sum_{mn} C_{nm} E_0 \frac{w_0}{w(z)} H_m\left[\frac{\sqrt{2}\,x}{w(z)}\right]$$
$$H_n\left[\frac{\sqrt{2}\,y}{w(z)}\right] e^{\frac{-(x^2+y^2)}{w(t)^2}} e^{-j(m+m+1)\tan^{-1}\frac{z}{z_0}} e^{j\frac{k(x^2+y^2)}{2R(z)}}$$
$$z_0 = \frac{kw_0^2}{2}$$
$$w(z) = w_0\sqrt{1 + \frac{z^2}{z_0^2}}$$
$$C_{60} \Rightarrow TEM_{OD}$$
$$R(z) = z + \frac{z_0^2}{z} = \frac{z_0^2}{z}\left(1 + \frac{z^2}{z_0^2}\right) = \frac{z_0^2}{zw_0^2}w^2(z) = \frac{kz_0}{2z}w^2(z)$$

The solution of cylindrical coordinates of equation:

$$\frac{1}{\rho}\frac{\partial}{\partial\rho}\left(\rho\frac{\partial}{\partial\rho}\right)E(\rho, \phi, z) + \frac{1}{\rho^2}\frac{\partial^2 E(\rho, \phi, z)}{\delta\phi^2} + 2jk\frac{\partial E(\rho, \phi, z)}{\partial z} = 0$$

Can be determined in cylindrical coordinates to be:

$$E(\rho, \phi, z) = \sum_{\ell p} C_{\ell p} E_0 \frac{w_0}{w(z)} \left(\frac{\sqrt{2}\rho}{w(z)}\right)^{\ell} L_\ell^p\left(\frac{\sqrt{2}\rho}{w(z)}\right) e^{-\frac{\rho^2}{w^2(t)}} e^{-j(2p+\ell+1)\tan^{-1}\frac{z}{z_0}} e^{j\ell\phi} e^{j\frac{k\rho^2}{2R(z)}}$$

The equation $$L_\ell^p\left(\frac{\sqrt{2}\rho}{w(z)}\right)$$

may also be shown as $$L_\ell^p\left[\frac{2\rho^2}{w^2(t)}\right].$$

The lowest mode is the most important mode and in fact this transverse mode is identical for both rectangular and cylindrical coordinates.

$$\varphi(\ell, P; z) = (2P + \ell + 1)\tan^{-1}\frac{z}{z_0}$$

$$TEM_{00}^{rect} = TEM_{00}^{Cyl}$$

$$C_{00} = 1 \; H_0 = l \; L_0^0 = 1$$

then $$TEM_{00} \Rightarrow E(\rho, z) \sim E_0 \frac{w_0}{w(z)} e^{-\frac{\rho^2}{w^2(t)}} e^{-j\tan^{-1}\frac{z}{z_0}} e^{jk\frac{\rho^2}{2R(z)}}$$

Figure 99:
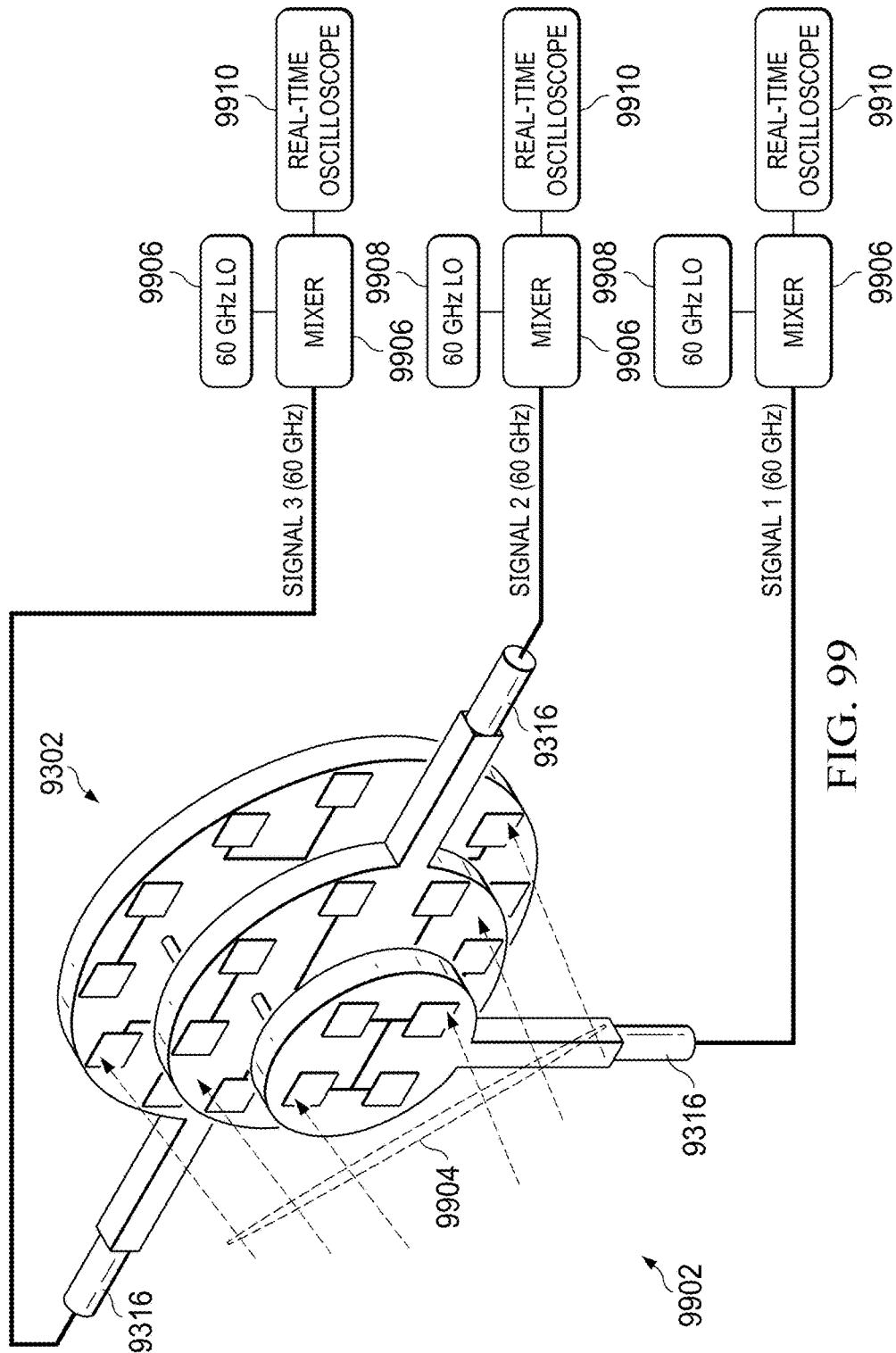
FIG. 99 illustrates a receiver for use with a multilayer patch antenna array.

Referring now to FIG. 99, there is illustrated a receiver 9902 for demultiplexing signals received from a multiplexed signal generated using the transmitter 9702 of FIG. 97. The receiver 9902 includes a multilayer patch antenna array 9302 such as that described herein above. The multilayer patch antenna array 9302 receives the incoming multiplexed signal 9904 and each layer 9304, 9306, 9308 of the antenna array 9302 will extract a particular order of the received multiplexed signal from each of the connector outputs 9316 of a particular layer. The signals from each of the connectors 9316 are applied to a mixer circuit 9906 that demultiplexes the received signal in a manner similar to that discussed with respect to U.S. patent application Ser. No. 14/323,082 using a 60 GHz local oscillator signal from oscillator 9908. The demultiplexed signal may then be read using, for example, a real-time oscilloscope 9910 or other signal reading device. Each of the three transmitted signals is thus decoded at the receiver 9902 that were transmitted in each of the ordered OAM signals received from the transmitters 602. In a further embodiment, a demultiplexing approach using SPP (spiral phase plate) may also be applied to detect OAM channels.

The signals transmitted by the transmitter 9702 or the receiver 9902 may be used for the transmission of information between two locations in a variety of matters. These include there use in both front haul communications and back haul communications within a telecommunications or data network.

Thus, the above equations can be summarized in the following manner. Maxwell's equations comprise:

Gauss' Laws $\quad \nabla \cdot D = \rho$ $\nabla \cdot B = 0$

Faraday's Law $\quad \nabla \times E = -\frac{\partial B}{\partial t}$

Ampere's Law $\quad \nabla \times H = J + \frac{\partial D}{\partial t}$

This provides the full wave equation:

$$\nabla^2 E + k^2 E = 0$$

That may be broken down into wave equations in rectangular format:

$$\frac{d^2 E}{dx^2} + \frac{d^2 E}{dy^2} + \frac{d^2 E}{dz^2} + k^2 E = 0$$

and in cylindrical format:

$$\frac{1}{\rho}\frac{d}{d\rho}\left(\rho \frac{d}{d\rho}\right)E + \frac{1}{\rho^2}\frac{d^2}{d\varphi^2}E - \frac{d^2 E}{dz^2} + k^2 E = 0$$

A paraxial approximation of the above full wave equations would comprise in the rectangular format:

$$\frac{d^2 E}{dx^2} + \frac{d^2 E}{dy^2} + \frac{2jkdE}{dz} = 0$$

And in the cylindrical format would comprise:

$$\frac{1}{\rho}\frac{d}{d\rho}\left(\rho \frac{d}{d\rho}\right)E - \frac{1}{\rho^2}\frac{d^2}{d\varphi^2}E - \frac{2jkdE}{dz} = 0$$

A new rectangular solution of the rectangular paraxial solution may be provided in the Hermite-Gaussian format:

$$E(x, y, z) = \sum_m \sum_n C_{cm} E_0 \frac{W_0}{W(Z)} H_m\left[\frac{\sqrt{2}x}{w(z)}\right] H_n\left[\frac{\sqrt{2}y}{w(z)}\right] e^{-\frac{(x^2+y^2)}{w^2(z)}} e^{j(m+n+1)\tan^{-1}\frac{z}{z_0}} e^{\frac{jk(x^2+y^2)}{2R(z)}}$$

A new cylindrical solution of the cylindrical paraxial solution may also be provided in Laguerre-Gaussian format:

$$E(\rho, \varphi, z) = \sum_\ell \sum_p C_{\ell p} E_0 \frac{W_0}{W(Z)}\left[\frac{\sqrt{2}\rho}{W(Z)}\right]^\ell$$

-continued $$L_\ell^p \left[\frac{\sqrt{2\rho}}{W(Z)}\right]^\ell e^{\frac{-\rho^2}{w^2(z)}} e^{-j(2p+\ell+1)\tan^{-1}\frac{z}{z_0}} e^{j\ell\varphi} e^{\frac{jk(\rho^2)}{2R(z)}}$$

Figure 100:
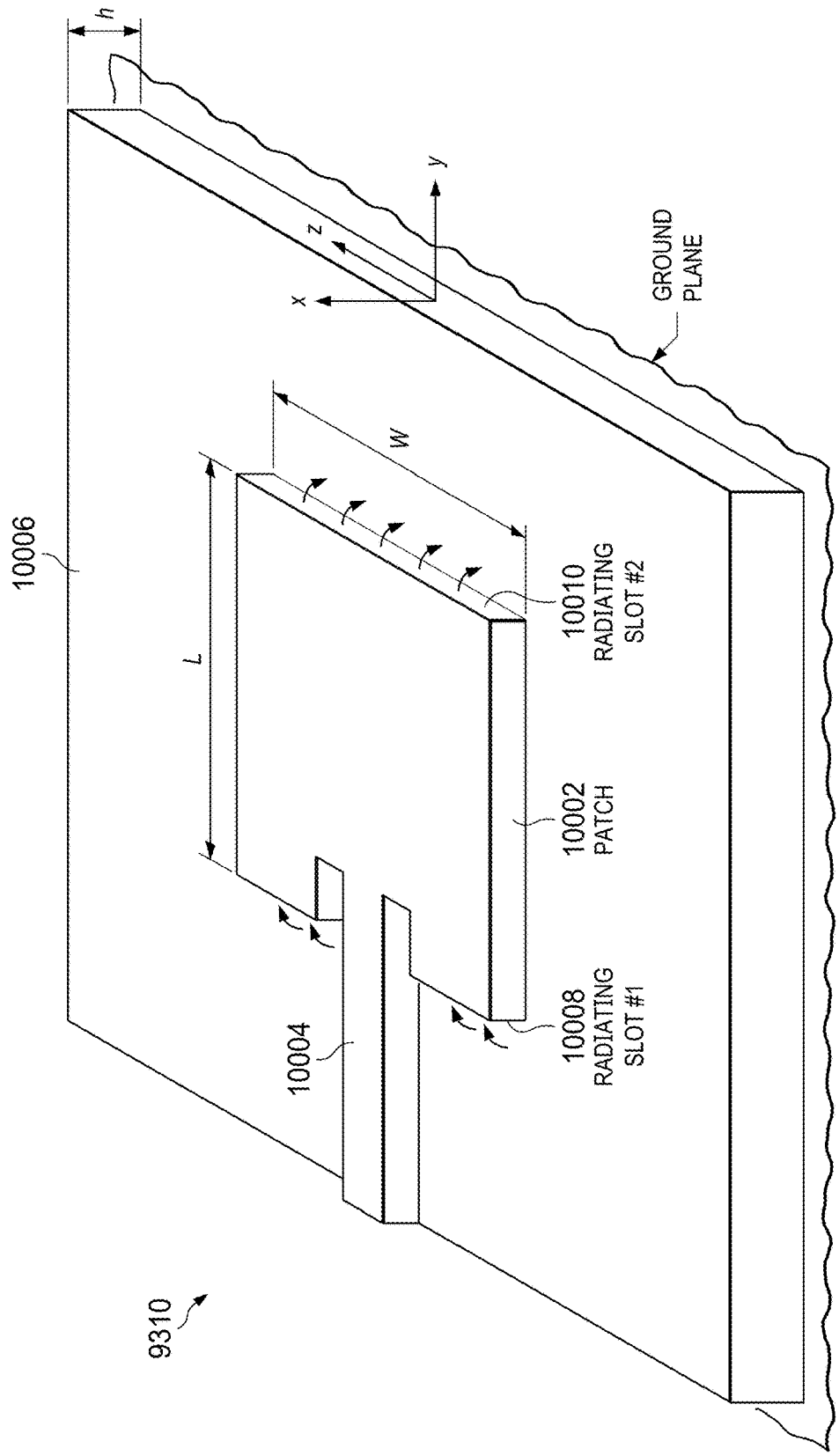
Figure 101:
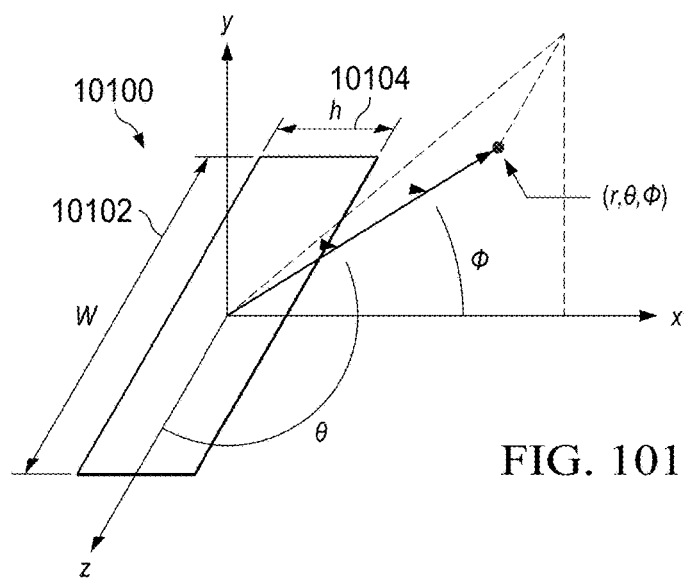

Referring now more particularly to FIG. 100, there is illustrated a patch antenna element 9310. Multiple ones of these patch antenna elements 9310 our located upon the multilayer patch antenna array 9302 as discussed hereinabove. The antenna element 9310 includes a patch 10002 having a length L and a width W. The patch 10002 is fed from an input transmission line 10004 that is connected with the feed network 9304 (FIG. 93) and is resting upon a substrate 10006 having a height h. The microstrip patch antenna includes a first radiating slot 10008 along a first edge of the patch 10002 and a second radiating slot 10010 along a second edge of the patch 10002. The electronic field at the aperture of each slot can be decomposed into X and Y components as illustrated in FIG. 101. The Y components are out of phase and cancel out because of the half wavelength transmission line 10004. The radiating fields can be determined by treating the antenna as an aperture 10100 as shown in FIG. 101 having a width W 10102 and a height h 10104.

The transmission line model can be further analyzed in the following manner. $G_r$ is the slot conductance and $B_r$ is the slot susceptance. They may be determined according to the equations:

$$G_r = \begin{cases} \frac{W^2}{90\lambda_0^2} & \text{for } W < \lambda_0 \\ \frac{W}{120\lambda_0} & \text{for } W > \lambda_0 \end{cases}$$

$$B_r = \frac{2\pi\Delta\ell\sqrt{\varepsilon_{\mathit{eff}}}}{\lambda_0 Z_0}$$

The input admittance of the patch antenna 9310 can be approximated as:

$$Y_{in} = Y_{slot} + Y_0 \frac{Y_{slot} + jY_0\tan(\beta(L+2\Delta\ell))}{Y_0 + jY_{slot}\tan(\beta(L+2\Delta\ell))}$$

where $\Delta l$ is the end effect of the microstrip.

The rectangular patch antenna 9310 will resonate when the imaginary part of the input admittance goes to zero.

The end effect may be calculated according to the equation:

$$\Delta\ell = 0.412h\left(\frac{\varepsilon_{\mathit{eff}}+0.3}{\varepsilon_{\mathit{eff}}-0.258}\right)\frac{(W/h)+0.264}{(W/h)+0.8}$$

$$L+2\Delta\ell = \frac{\lambda_g}{2} = \frac{\lambda_0}{2\sqrt{\varepsilon_{\mathit{eff}}}}$$

$$\varepsilon_{\mathit{eff}} = \frac{\varepsilon_r+1}{2} + \frac{\varepsilon_r-1}{2}\left(1+\frac{10h}{W}\right)^{-0.5}$$

The resonant frequency of the patch antenna 9310 is given by:

$$f_r = \frac{c}{2\sqrt{\varepsilon_{\mathit{eff}}}\,(L+2\Delta\ell)}$$

Typically the width W of the aperture is given by:

$$W = \frac{c}{2f_r}\left(\frac{\varepsilon_r+1}{2}\right)^{-1/2}$$

The multilayered patch antenna array 9302 may transmit both Hermite Gaussian beams using the processing discussed with respect to U.S. patent application Ser. No. 14/323,082 or Laguerre Gaussian beams. When transmitting Laguerre Gaussian beams information may be transmitted in a number of fashions. A spiral phase plate and beam splitter approach may be used, a dual OAM mode antenna approach may be used or the patched antenna described herein may be utilized. These implementations would be beneficial in both fronthaul and backhaul applications.

In order to transmit several OAM modes of order l and amplitude $a_l^{OAM}$, the antenna elements must be fed by an input signal according to the equation:

$$a_n^{feed} \frac{1}{\sqrt{N}}\sum_{l=0}^{N-1} a_l^{OAM} e^{-j2\pi\frac{ln}{N}}, n \in \{0, \ldots, N-1\},$$

Note that the number of elements in the multilayer patch antenna array 9302 limits the number of possible OAM modes due to sampling. Due to aliasing, modes of order greater than N/2 are actually modes of negative orders.

$$b_{l'}^{OAM} = \frac{1}{\sqrt{N}}\sum_{p=0}^{N-1} b_p^{feed} e^{j2\pi\frac{pl'}{N}}, \; p \in \{0, \ldots, N-1\},$$

$$h_{pn} = \beta e^{-jkr_{np}}\frac{\lambda}{4\pi r_{np}},$$

$$r_{pn} = \sqrt{D^2 + R_t^2 + R_r^2 - 2R_t R_r \cos(\theta_{np})},$$

$$\theta_{pn} = 2\pi\left(\frac{n-P}{N}\right),$$

$$\beta = \sqrt{g_t g_r}$$

Single Mode Link Budget $$H_{tot} = U^H H U$$

$$b^{OAM} = H_{tot} a^{OAM}$$

$$\frac{P_r}{P_t}(l) = \left|\frac{b_l^{OAM}}{a_l^{OAM}}\right|^2 = \left|\sum_{p=0}^{N-1}\sum_{n=0}^{N-1}\frac{\beta}{N}e^{-jl\theta_{np}}e^{-jkr_{np}}\frac{\lambda}{4\pi r_{np}}\right|^2$$

Asymptotic Formulation

The object is to determine an asymptotic formulation of the Link budget at large distances, i.e. when D→+(∞), we seek the leading term for each value of l Link budget −l are the same.

The link budget is asymptotically given by:

$$\frac{P_r}{P_t}(|l|) = \left| \frac{\lambda \beta}{4\pi |l|!} \left( \frac{kR_t R_r}{2} \right)^{|l|} \frac{1}{D^{|l|+1}} \right|^2$$

From the Fraunhofer distance 2 $(2\max(R_t, R_r))^2/\lambda = 200\lambda$, the link budget asymptotically tends to straight lines of slope $-20 \ (|l|+1)$ dB per decade, which is consistent with an attenuation in $1/D^{2|l|+2}$.

Asymptotic Expressions with Gains and Free Space Losses

Gains and free space losses may be determined by:

$$\frac{P_r}{P_t}(|l|) = \frac{Ng_t}{|l|!} \left( \frac{4\pi(\pi R_t^2)}{\lambda^2} \right)^{|l|} \frac{Ng_r}{|l|!} \left( \frac{4\pi(\pi R_r^2)}{\lambda^2} \right)^{|l|} \left( \frac{\lambda}{4\pi D} \right)^{2|l|+2}$$

$$L_{FS_{eq}}(l) = \left( \frac{4\pi D}{\lambda} \right)^{2|l|+2}$$

$$G_{eq}(l) = \frac{Ng}{|l|!} \left( \frac{4\pi(\pi R^2)}{\lambda^2} \right)^{|l|}$$

For a fixed value of $|l|$, each equivalent gain increases $R^{2|l|}$ So that the link budget improves by a factor of $R^{4|l|}$. On the contrary, for a fixed value of R, when $|l|$ increases, the link budget decreases since asymptotically the effect of D is greater than those of $R_t$ and $R_r$.

Figure 102:
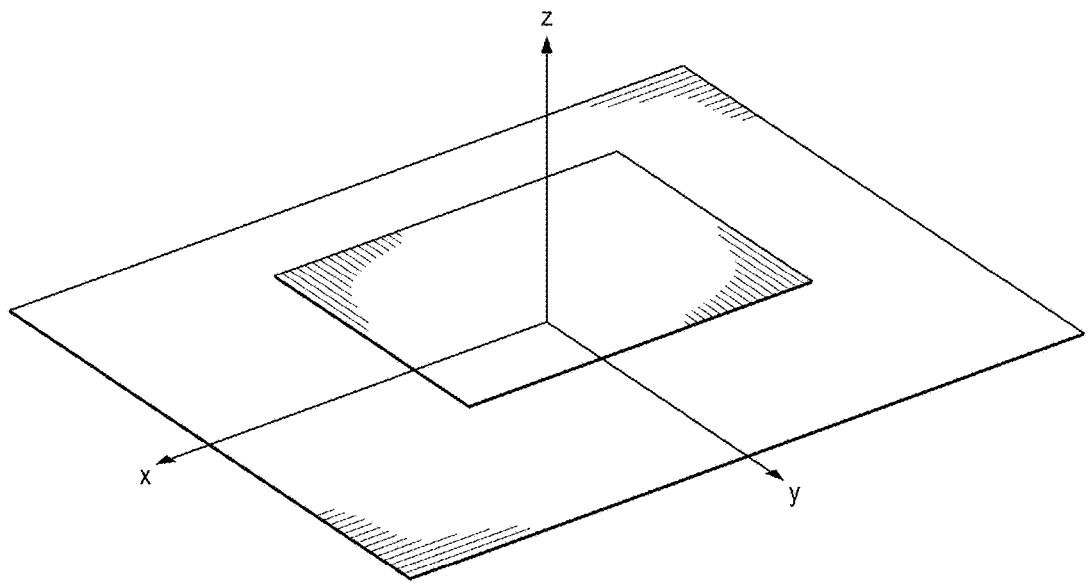
Figure 103:
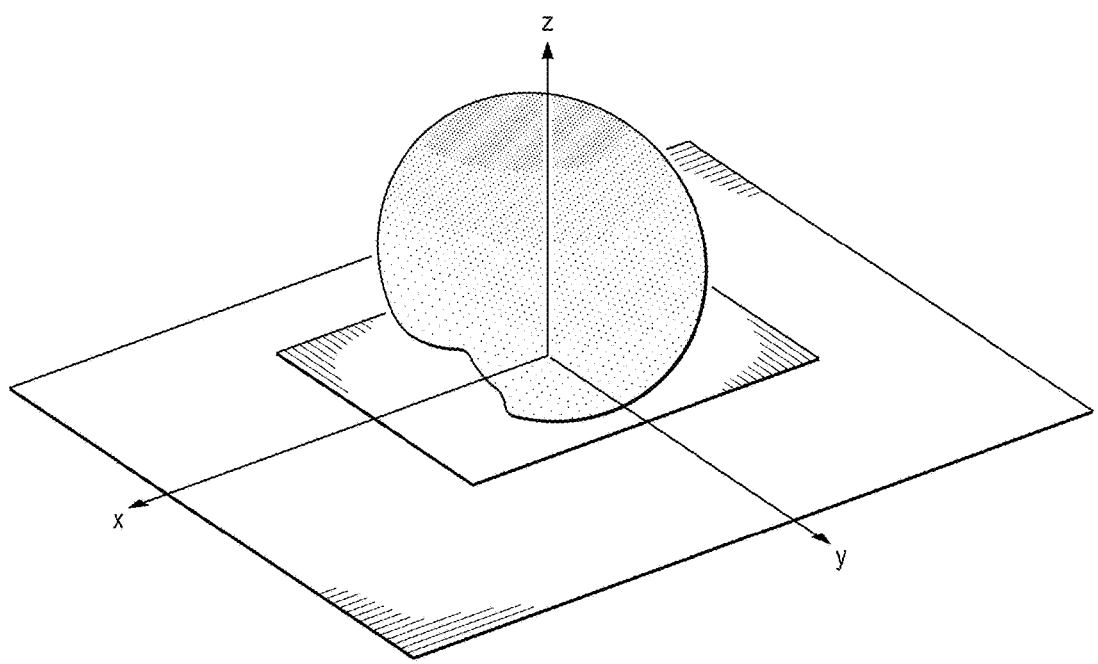

Referring now to FIG. 102, there is illustrated a 3-D model of a single rectangular patch antenna designed for 2.42 GHz and only one linear polarization. The radiation pattern for this antenna is illustrated in FIG. 103.

Figure 104A:
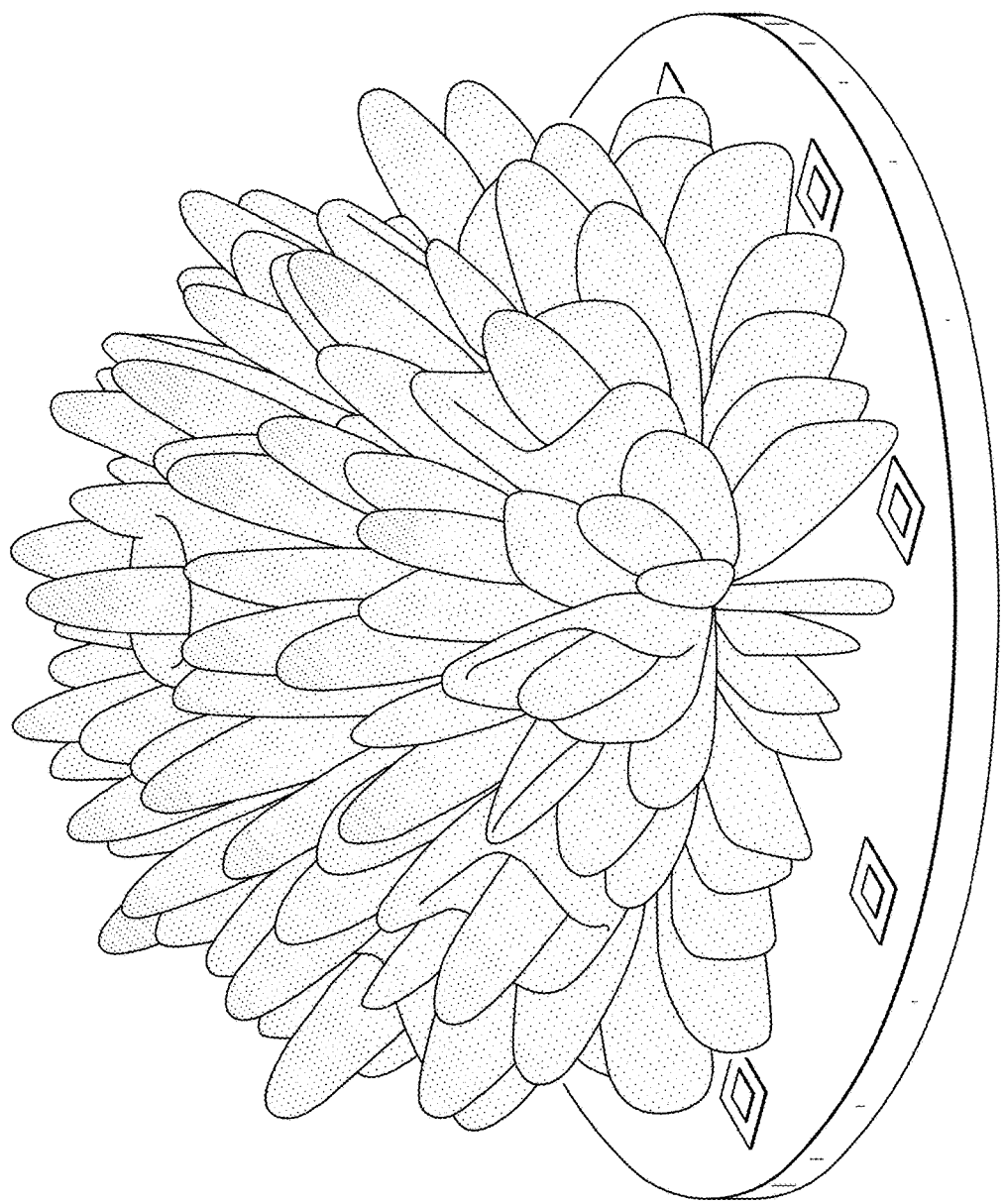
Figure 104B:
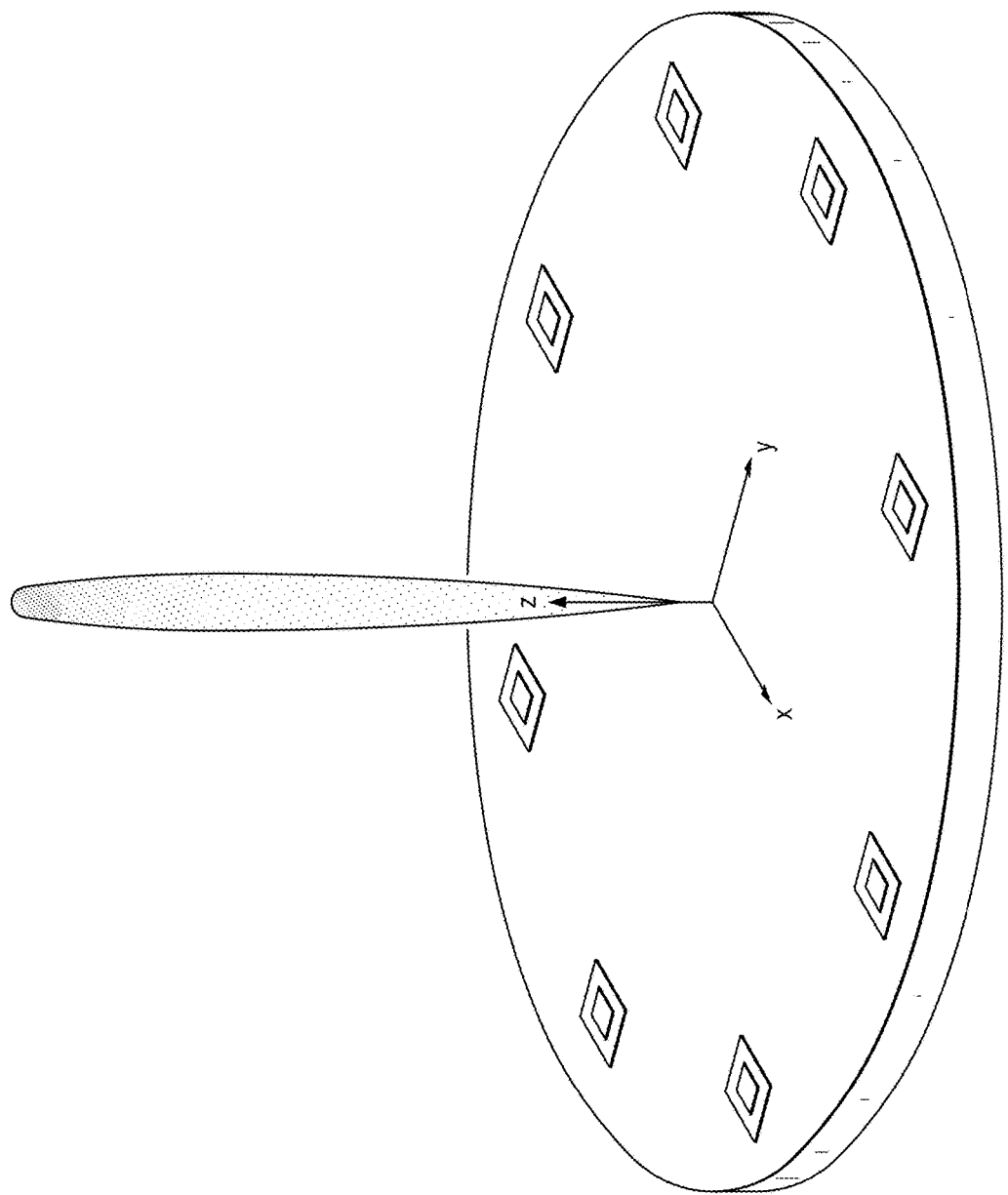
Figure 104C:
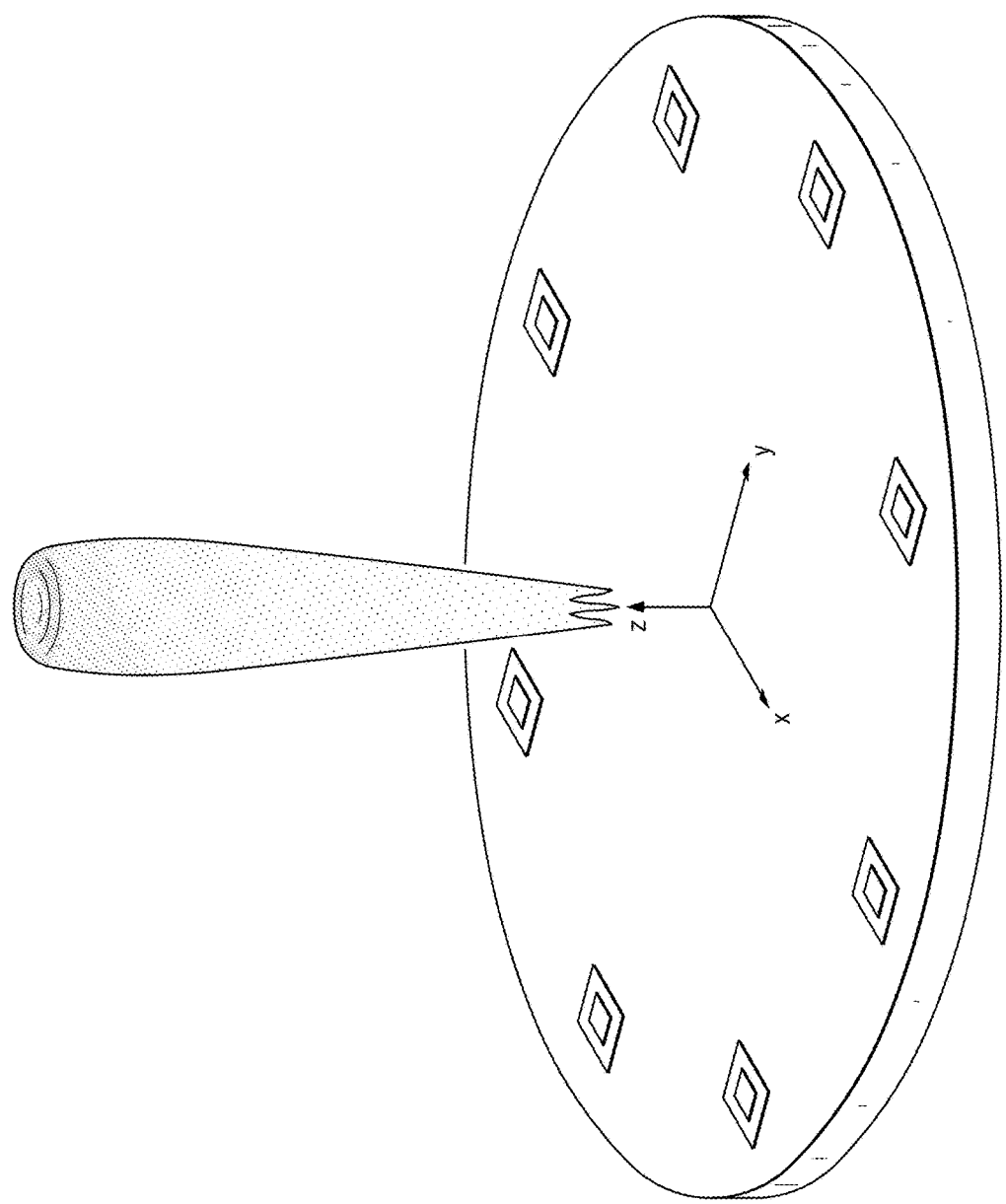
Figure 104D:
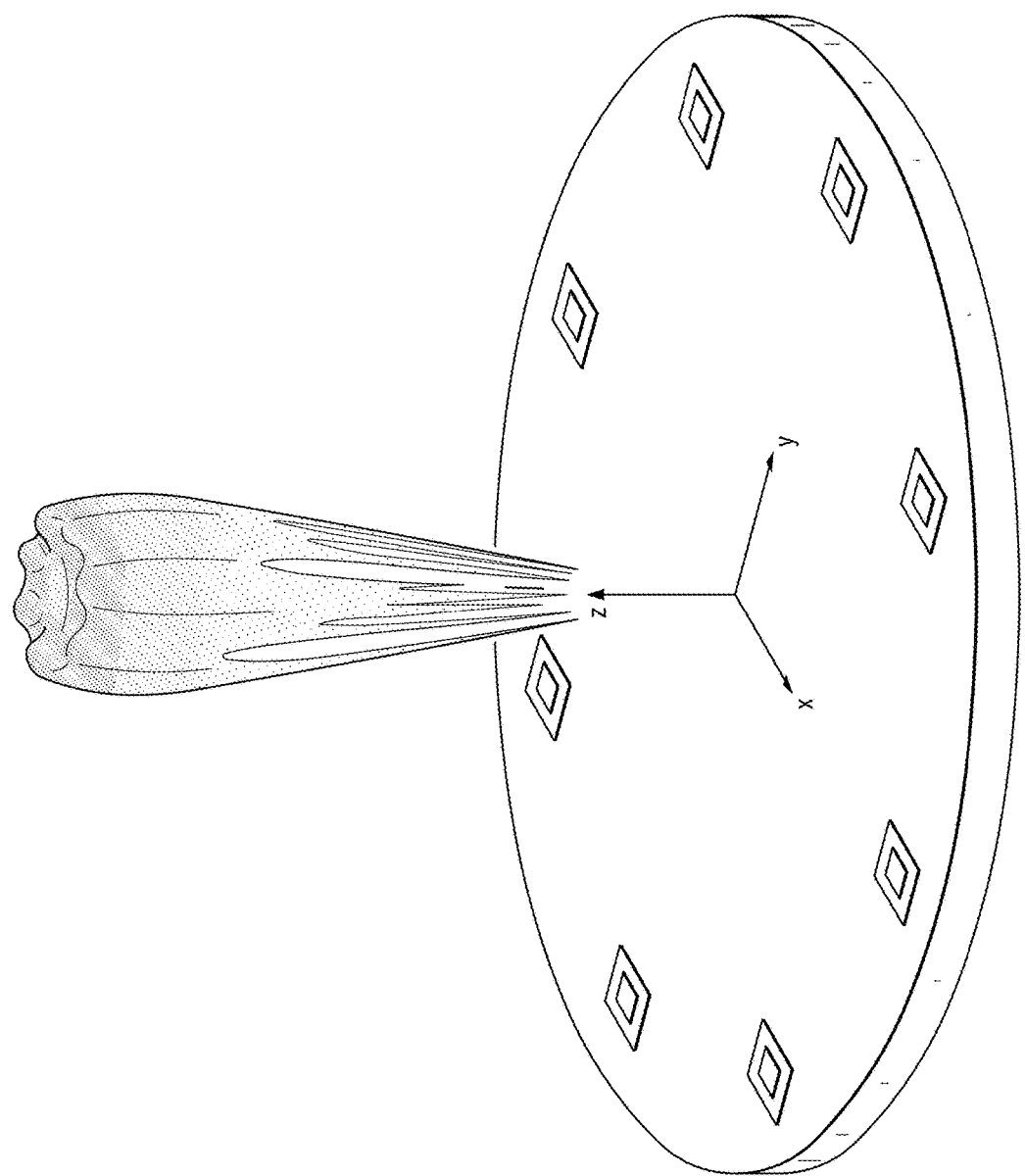

FIG. 104a illustrates the radiation patterns of the circular array for an OAM mode order l=0 due to the higher grating lobes. FIGS. 104b, 104c and 104d illustrate the radiation patterns for the OAM mode orders in l=0 (FIG. 104b), l=1 (FIG. 104c), and l=2 (FIG. 104d) in the vicinity of the array axis.

Asymptotic OAM path loss is illustrated by:

$$\frac{P_r}{P_t}(|l|) = \frac{Ng_t}{|l|!} \left( \frac{4\pi(\pi R_t^2)}{\lambda^2} \right)^{|l|} \frac{Ng_r}{|l|!} \left( \frac{4\pi(\pi R_r^2)}{\lambda^2} \right)^{|l|} \left( \frac{\lambda}{4\pi D} \right)^{2|l|+2}$$

When assuming e-band frequencies, a distance of 1000 m and a reasonable patch antenna element gains, other parameters may be calculated including the diameter for the transmitter and receiver array rings, number of antennas, etc.

Figure 105:
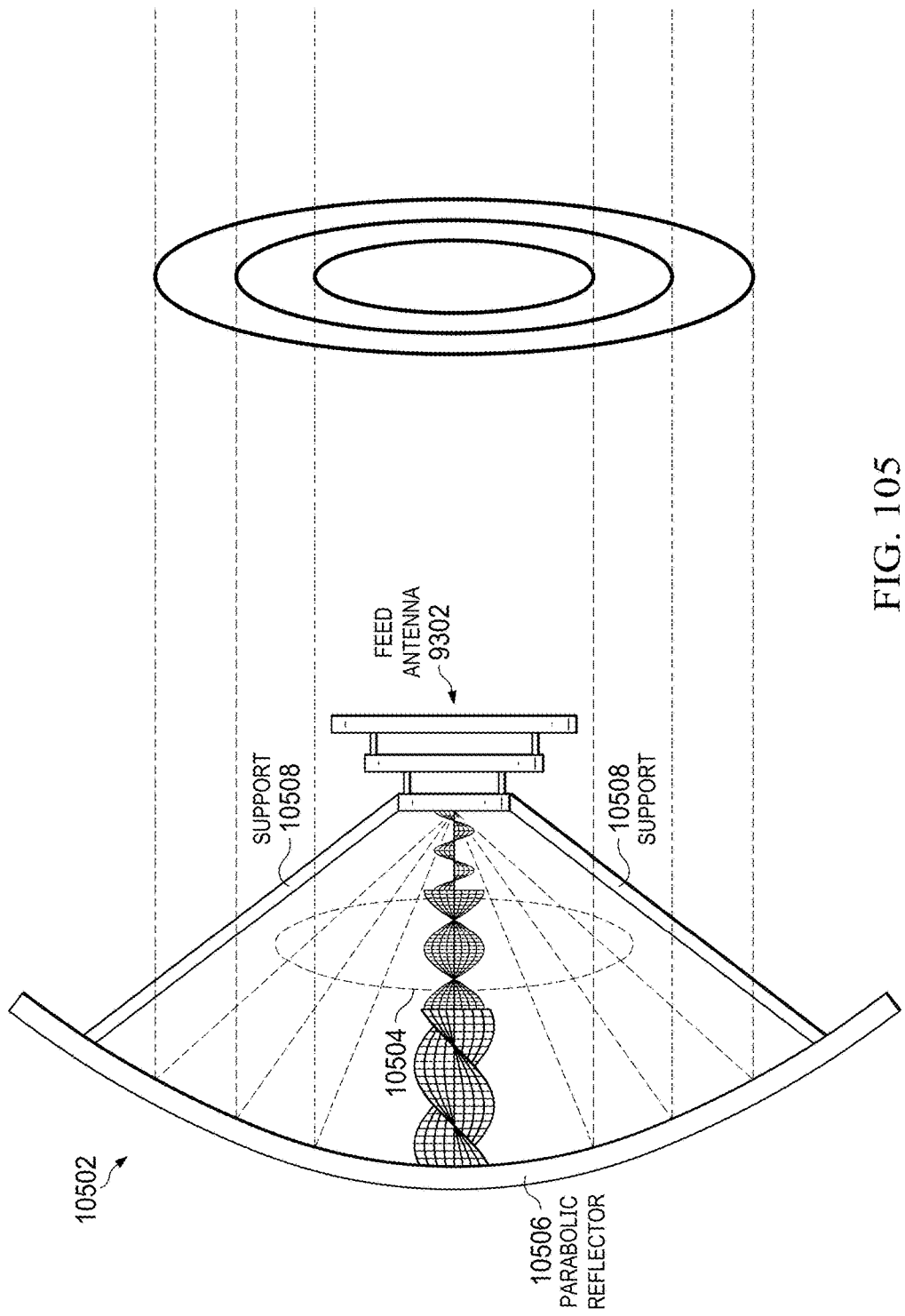

FIG. 105 illustrates the use of a multilevel patch antenna array in a parabolic antenna 10502. The multilevel patch antenna array 9302 is positioned at the focus point of a parabolic reflector 10506 to radiate its output signal 10504 to reflect off of the parabolic reflector 10506. The patch antenna array 9302 is mounted to the parabolic reflector 10502 via structural support members 10508. The parabolic reflector 10506 reflects the multiplexed beam that may then be detected at some type of receiving antenna. The approach has been shown to provide a higher gain output for the antenna over one only including a multilevel patch antenna array 9302 without a parabolic reflector 10506.

Figure 106:
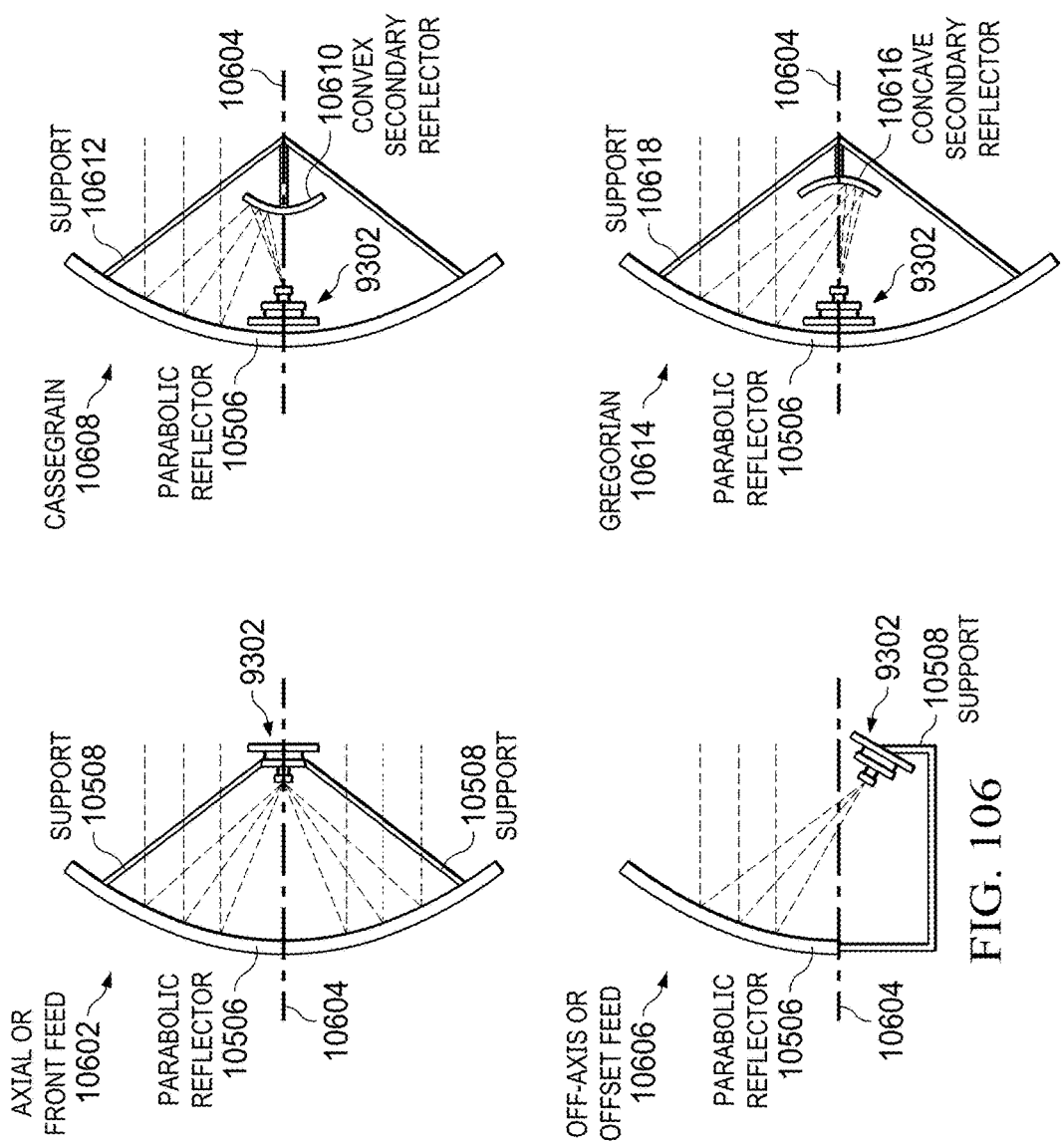

Referring now to FIG. 106, there are illustrated a number of implementations using the multilevel patch antenna array 9302 and parabolic reflector 1306. In the axial or FriendFeed implementation 10602, the patch antenna array 9302 is positioned at the focal point of the parabolic reflector 1306 by the supports 1308 to radiate signals directly into the parabolic reflector 1306 along a central axis 10604. The reflected beam will then come straight off of the parabolic reflector 1306 and parallel to each other. If the patch antenna array is moved by an offset O form the focal point away from the parabolic reflector 1306, the reflected beam from the parabolic reflector will focus at a particular point. In this manner by moving the array along the axis of the focus point the reflected beam can be focused at desired points along the axis. The off axis or offset feed approach 10606 positions the patch antenna array 9302 off of the central axis 10604 to radiate the beam at an angle to the central axis 10604 to reflect off of the parabolic reflector 1306. The patch antenna array 9302 is held in its off axis position by support member 1308.

In the Cassegrain configuration 10608, the multilevel patch antenna array 9302 is positioned on the primary parabolic reflector 1306 and reflects outward toward a convex secondary reflector 10610 held in place by secondary reflector support members 10612. The radiated signal reflects off of the convex reflector 10610 at an angle similar to the off axis reflection of implementation 10606 and reflects a second time off the surface of the parabolic reflector 1306.

Finally, the Gregorian implementation 10614 mounts the multilevel patch antenna array 9302 on the surface of the parabolic reflector 1306 to project outward toward a concave secondary reflector 10616. The secondary reflector 10616 is supported by secondary reflector supports 10618. The signal radiated by the multilevel patch antenna array 9302 reflects off of the secondary reflector 10616, and a second time off of the primary parabolic reflector 1306. Each of these cases direct the Hermite Gaussian, Laguerre Gaussian, orthogonal function multiplexed beam outward toward a receiver.

The asymptotic OAM path loss using a parabolic antenna revises the previous loss equations in the following manner:

$$\frac{P_r}{P_t}(|l|) = \frac{Ng_t}{|l|!} \left( \frac{4\pi(\pi R_t^2)}{\lambda^2} \right)^{|l|} \frac{Ng_r}{|l|!} \left( \frac{4\pi(\pi R_r^2)}{\lambda^2} \right)^{|l|} \left( \frac{\lambda}{4\pi D} \right)^{2|l|+2} G_{New}$$

The term $G_{New}$ comprises the new variable arising due to the parabolic antenna. As previously discussed, assuming e-band frequencies, a distance of 1000 m and a reasonable patch antenna element gains, other parameters may be calculated including the diameter for the transmitter and receiver array rings, number of antennas, etc.

The new loss equation may be further solved in the following manner:

$$\frac{P_r}{P_t}(|l|) = \frac{Ng_t}{|l|!} \left( \frac{4\pi(\pi R_t^2)}{\lambda^2} \right)^{|l|} \frac{Ng_r}{|l|!} \left( \frac{4\pi(\pi R_r^2)}{\lambda^2} \right)^{|l|} \left( \frac{\lambda}{4\pi D} \right)^{2|l|+2} G_{New}$$

$$G_{New} = \frac{4\pi(\pi R_A^2)}{\lambda^2} e_A$$

$$\frac{P_r}{P_t}(|l|) = \frac{Ng_t}{|l|!} \left( \frac{4\pi(\pi R_t^2)}{\lambda^2} \right)^{|l|} \frac{Ng_r}{|l|!} \left( \frac{4\pi(\pi R_r^2)}{\lambda^2} \right)^{|l|} \left( \frac{\lambda}{4\pi D} \right)^{2|l|+2} \frac{4\pi(\pi R_A^2)}{\lambda^2} e_A$$

Where R equals the radius of the parabolic antenna and $e_A$ is the aperture efficiency of the parabolic antenna 0.55 to 0.70.

Figure 107:
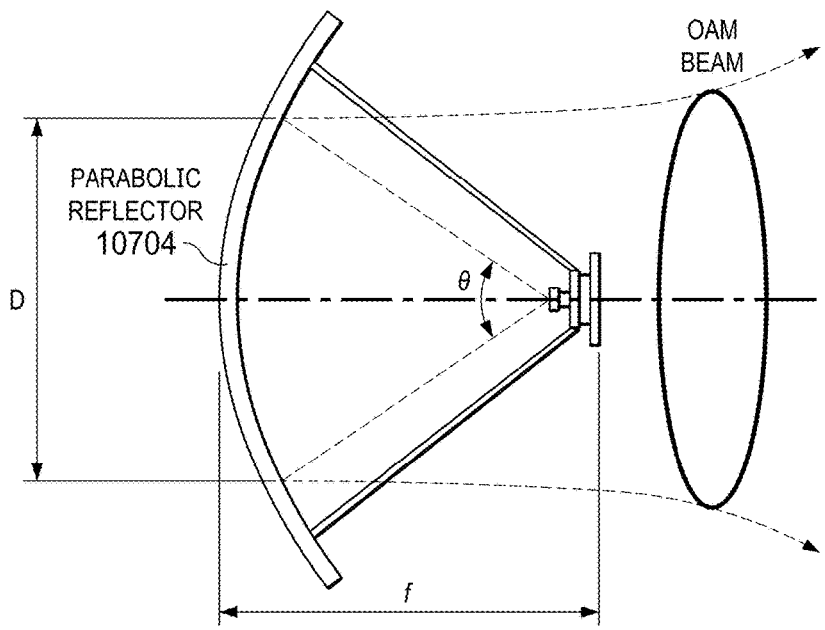
Figure 108:
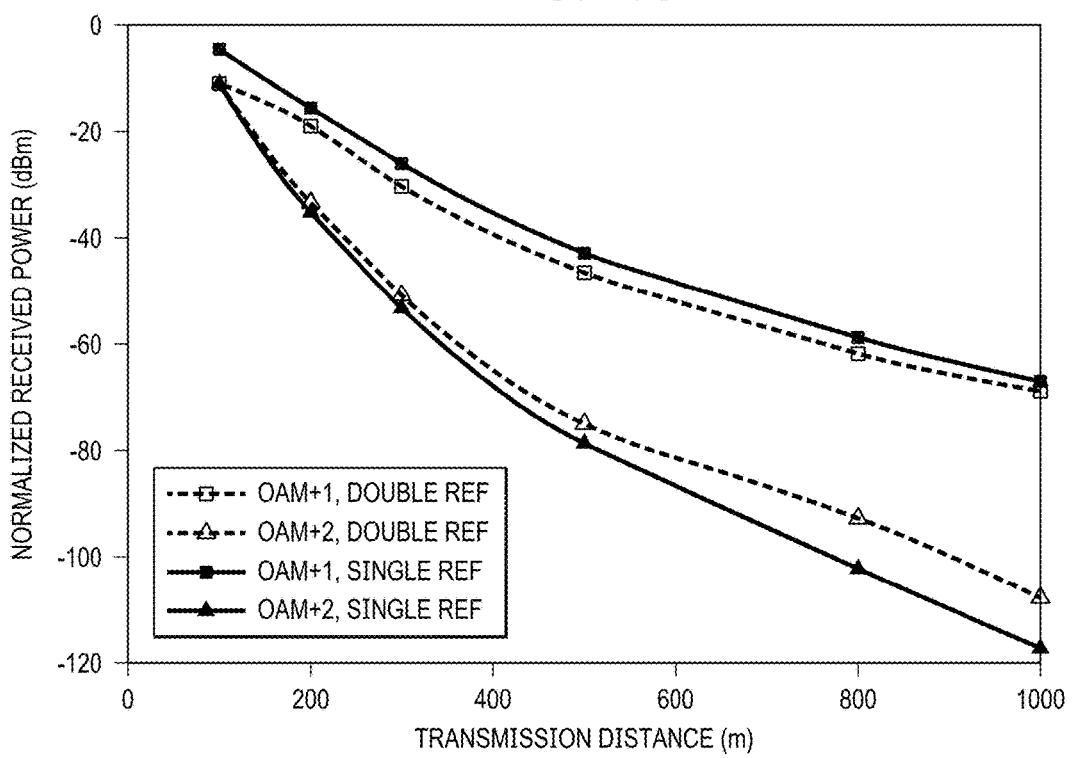

Referring now to FIG. 107, a hybrid patch antenna 10702 and parabolic reflector 10704 uses a single reflection to generate an OAM beam. Since Hermite-Gaussian, Laguerre-Gaussian, Ince-Gaussian and other orthogonal processed beam transmissions have large path losses, a hybrid patch and parabolic dish can enhance the gain and propagate the beams for longer distances. The patch antenna 10702 is placed at the focal point of the parabolic reflector 10704. As discussed previously, the case of double reflection wherein the patch antenna 10702 is placed at the feed of a Cassegrain antenna (see FIG. 106 reference number 10608 and 10614) and the generated OAM beams are reflected twice by a sub reflector and by the parabolic reflector. FIG. 108 illustrates simulated power as a function of a transmission distance considering both the OAM beam divergence as well as the blocking effect of a patch antenna. All the power in the example illustrated in FIG. 108 is normalized to the total power covered by the parabolic reflector. In the example illustrated in FIG. 108, the parabolic reflector is 4 feet in diameter.

The receiver sensitivities of commercially available millimeterwave communications systems have been reviewed as listed below in Table A. The potential transmission distance of using a hybrid patch antenna and parabolic dish as the transmitter taking into consideration the commercially available receiver sensitivities is illustrated.

turbulence or channel impairments) for the higher order spatial modes may be detected and corrected. FIG. 110 illustrates another hybrid patch parabolic antenna configuration that includes a hybrid patch and parabolic antenna for both the transmitter 11002 and receiver 11004 with no beam splitters. The configurations of FIGS. 109 and 110 will use 60 GHz millimeter wave data links to multiplex OAM +1 and OAM −2 using the hybrid patch and parabolic antennas. The system using the hybrid patch and parabolic antennas will provide kilometer transmission distances.

The production of the patch antennas 9310 are carried out through a design and layout process as generally illustrated in FIG. 111, a clean room procedure for production of the antenna as generally illustrated in FIG. 20 and a final testing process as illustrated in FIG. 21. Referring now to FIG. 111, the design and layout process is more particularly described. Initially, the patch antenna is designed and simulated at step 11102 using ANSYS HFSS with a microstrip feed structure. ANSYS HFSS comprises a high-frequency structural simulator. The software within the device stimulates 3-D full wave electromagnetic field. The ANSYS HFSS creates a GDSII file (graphic database system file used to control integrated circuit photomask plotting) from the HFSS simulation and exports the GDSII file to an AWR (Applied Wave

| Company | Model | Frequency | Highest data rate | Receiver sensitivity | Estimated distance of our approach in this commercial system (transmitter power, parabolic dish diameter) | | | |
|---|---|---|---|---|---|---|---|---|
| | | | | | 10 dBm, 4 feet | 30 dBm, 4 feet | 10 dBm, 8 feet | 30 dBm, 8 feet |
| Fujitsu | GX4000 | 70/80 GHz | 3 Gbps | −54 dBm | 1 km for OAM 1, 400 m for OAM 2 | 1.8 km for OAM 1, 700 m for OAM 2 | 1.8 km for OAM 1, 1.2 km for OAM 2 | >3 km for OAM 1, 2 km for OAM 2 |
| E-band communications | E-Link 1000Q | 70/80 GHz | 1.25 Gbps | −66 dBm | 1.4 km for OAM 1, 500 m for OAM 2 | 2.5 km for OAM 1, 800 m for OAM 2 | 2.5 km for OAM 1, 1.6 km for OAM 2 | >3 km for OAM 1, 2.5 km for OAM 2 |
| | E-Link Eagle | 70/80 GHz | 3 Gbps | −48 dBm (estimated) | 800 m for OAM 1, 350 m for OAM2 | 1.5 km for OAM 1, 500 m for OAM 2 | 1.5 km for OAM 1, 1 km for OAM 2 | 3 km for OAM 1, 1.7 km for OAM 2 |
| Bridge Wave | GE60 | 60 GHz | 1 Gbps | −60 dBm (estimated) | 1.2 km for OAM 1, 400 m for OAM 2 | 2.2 km for OAM 1, 700 m for OAM 2 | 2.2 km for OAM 1, 1.5 km for OAM 2 | >3 km for OAM 1, 2.2 km for OAM 2 |
| | AR60 | 60 GHz | 1 Gbps | −60 dBm (estimated) | 1.2 km for OAM 1, 400 m for OAM 2 | 2.2 km for OAM 1, 700 m for OAM 2 | 2.2 km for OAM 1, 1.5 km for OAM 2 | >3 km for OAM 1, 2.2 km for OAM 2 |
| | AR60X | 60 GHz | 1 Gbps | −70 dBm (estimated) | 1.6 km for OAM 1, 600 m for OAM 2 | 3 km for OAM 1, 900 m for OAM 2 | >3 km for OAM 1, 1.8 km for OAM 2 | >3 km for OAM 1, 3 km for OAM 2 |

FIG. 109 illustrates a configuration for an OAM multiplexed 60 GHz link using a hybrid patch and parabolic antenna 10902. The receivers 10904 are configured with spiral phase plates 10906 and focusing lens 10908. The spiral phase plate 10906 demultiplexes the received OAM signals. The spiral phase plates 10906 enable the generation of higher order spatial modes for Hermite-gaussian and Laguerre-gaussian signal. The channel characteristics (i.e., Research Corporation) Microwave Office (MWO) layout at step 11104. In order to measure the antenna with ground signal ground probe feeding, a previously design conductor backed coplanar waveguide to microstrip transition design that has been fabricated using Agilent Momentum is also imported at step 11106 as a GDSII Agilent Momentum file into the AWR MWO Layout. The two designs are brought together at step 11108 and a weight and etch compensation of 12 μm is added to the lateral dimensions to account for isotropic wet etch used in the fabrication process. The final GDSII file for the layout is exported at step 11110 and provided to a clean room for fabrication at step 11112.

Referring now to FIG. 112, there is illustrated the clean room process for patterning a copper layer on the FR408 laminate. Initially, the double-sided Cu FR408 laminate is cut using scissors at step 11202 to an appropriate size (typically 1.5"×1.5"). The FR408 laminate is cleaned by rinsing the laminate at step 11204 with acetone, isopropanol (IPA) and nitrogen ($N_2$) and dried in a solvent hood or using program 2 of a CPK Solvent Spinner with the appropriate chuck. The laminate is dehydrate baked at 130° C. for two minutes on a hot plate (for example, a Cole Parmer digital hotplate) at step 11206. Next, at step 11208, hexamethyldisilizane (HMDS) is deposited on the laminate by a rain method using a Yield Engineering YES—310 vacuum hood oven. The laminate samples are placed in the HMDS oven for 20 minutes to improve resist adhesion. Next, at step 11210, the mask is cleaned using program 2 of a CPK Solvent Spinner with the appropriate chuck. The mask is further cleaned using an automated mask cleaner (Ultratech Mask Cleaner) using program 0 DIW only at step 11212.

The lithography process is performed at steps 11214-11234. First, Shipley S1813 photoresist is spun on to the backside of the laminate at step 1124 to protect the ground layer using for example a Brewer Science Cee Spin Coater System. In one embodiment, the spin coater system will operate at 3000 rpm with 3000 rpm/s for 60 seconds. The sample is soft baked at step 11216 at 115° C. for 90 seconds on a hot plate and hard baked at step 11218 at 130° C. for 60 seconds on the hotplate. S1813 resist is spun onto the top side pattern copper layer at step 11222. In one embodiment, this is carried out at 3000 rpm with 3000 rpm/s for 60 seconds. The sample is soft baked at 115° C. for 90 seconds on a hot plate at step 11222. The top side of the sample is exposed at step 11224 with 110 mJ/cm2 using Karl Suss MA6 BA6 Contact Aligner/Printer. Next, the circuit is developed at step 11226 with Microposit MF-319 for 60 seconds in a beaker. The sample is rinsed with deionized water (DIW) and $N_2$ in a base hood. A reactive ion etching process is performed at step 11232 to remove excess photoresist using Techniques Series 85 RIE. This is achieved by applying $0_2$ only at 180 mTorr with 50 W for 15 seconds. The sample is hard baked at step 11234 at 130° C. for 60 seconds on a hot plate. The lithography is checked at step 11236 under a Leica Inm Optical microscope to make sure the lithography is correct and that the gaps are defined and not overdeveloped.

The 12 μm copper layer is etched at steps 11238-11246. The copper is etched in one minute intervals at step 11238 by agitating the sample in a Cu etchant. Inquiry step 11240 determines if the Cu etching process is complete, and if not, the sample is rotated at step 11242 by 90° and returns to agitate the sample within the Cu etchant at step 11238. When inquiry step 11240 determines that the Cu etching process is completed control passes to step 11244 wherein the sample is rinsed with DIW and $N_2$ and dried within a base hood. The sample is checked at inquiry step 11246 using a microscope to determine if the Cu has been completely removed. If not, control passes back to step 11238 for further agitation within the Cu etchant. If all of the Cu has been removed control passes to the stripping of the photoresist process.

The stripping of the photoresist occurs by first rinsing the sample with acetone, IPA, DIW and $N_2$ and drying within a solvent hood or using program 2 in CPK Solvent Spinner with the appropriate chuck. The sample is dehydrate baked at step 11250 at 130° C. for five minutes on a hot plate. The etched laminate samples are examined at step 11252 under a microscope to make sure that gaps are etched with no over etching of areas within the sample.

The created patch antenna may be tested as illustrated in FIG. 113 to confirm operation of the antenna. Initially, at step 11302, a DC test is performed upon the antenna to make sure that the G-S-G feed is not shorted. An RF test is performed at step 11304 to measure the $S_{11}$-Return Loss across the frequency bands using Agilent VNA on Cascade M150 probe station. The radiation pattern of the antenna may then be measured at step 11306 at the appropriate frequencies using a NSI spherical near field scanner.

Referring now to FIG. 114, a transceiver dongle 11414 may be connected to a processing device via a USB or other connection means to provide full duplex communications capabilities. A dongle 11414 as described herein comprises a hardware interface for wirelessly communicating signals between transceivers and/or other functionalities. The dongle 11414 may comprise a circuit, peripheral device, ect. that connects with a processor at a transmitting or receiving point to enable communication between the transceivers. FIG. 114 illustrates a top level block diagram of the embodiment of a transceiver dongle 11414. The Peraso chipset 11410 is implemented on a transceiver dongle 11414 as will be more fully described herein below. The Peraso chipset 11410 is used for generating signals that can be transmitted between transceiver dongles 11414 located at separate locations. The signals are transmitted from antennas 11430 that comprise a patch antenna array as described above and as will be more fully described herein below. In one embodiment, the transceiver processor circuitry 11408/11410 would be at least partially implemented using the RK 3399 processor 11432. The RK 3399 processor 11432 comprises a low power, high performance processor for computing, personal mobile Internet devices and other smart device applications. The RK 3399 processor 11432 and the Peraso chipset 11410 are powered by a power driver 11434. The power driver 11434 may comprise any of the power circuitry configurations such as laser charging or inductive charging such as those described in U.S. patent Ser. No. 15/926,087, filed Mar. 20, 2018, entitled RE-GENERATION AND RE-TRANSMISSION OF MILLIMETER WAVES FOR BUILIDNG PENETRATION, which is incorporated herein by reference. The power driver 11434 may comprise a single circuit that provides power to both the internal and external components of the communication system. Alternatively, each of the internal and external components may have separate power drivers 11434 to power the components.

FIG. 115A more particularly illustrates a block diagram of the RK 3399 processor 11532 and the Peraso chipset 11510. The RK 3399 processor 11532, which will be more fully described herein below includes a RAM memory 11533, a USB 3.0 interface 11535 for interfacing with the Peraso chipset 11510, a Linux/ARM 11537 port is used for connecting and ARM processor, a GPIO connection 11539, an Ethernet PHY connection 11541 and an RJ45 connection 11543.

The Peraso chipset 11510 is implemented on a pair of processing devices 11545 and 11547. Processing device 11545 includes a USB 3.0 interface 11549, an on-chip packet buffer 11551, connection circuitry 11553 including a SPI, I2C, PWM, UART and GPIO, and an interface 11555 comprising an IEEE 802.11ad SC MAC/PHY. The second processing device 11547 includes a TX/RX front-end, phase locked loop 11559, RX common 11561, TX common 11563, bias circuit 11565 and configuration and control 11567.

Connected to the second processing 11547 are first and second antenna arrays 11562.

Referring now to FIG. 115C, there is illustrated a functional block diagram of a further implementation of a transceiver dongle that may be used for transmitting full-duplex signals as described hereinabove. The transceivers may be implemented in the form of a dongle 11402 that may be inserted for example into a USB port of a device for implementing the full duplex transmission. However, other types of communication connection ports may also be utilized. The dongle 11502 would include transceiver circuitry 11504, BBU circuitry 11506 and a patch antenna array 11508. The transceiver circuitry 11504 in combination with the BBU circuitry 11506 is responsible for processing received data signals for transmission and processing received data signals into their individual signals as has been described hereinabove in a number of places with respect to the transmission of data using OAM or other types of signal processing.

The BBU 11506 implements PRS4601 WiGig baseband that is compliant with IEEE 802.11ad. The BBU 11506 includes a USB 2.0 and 3.0 device/host system interface 11512 supporting link speeds of up to 2.0 Gb/s, but it is possible to configure the PRS4601 as a multi-gigabit WiGig. The BBU 11506 can modulate/demodulate all control and carrier signals up to 16-QAM WiGig coding schemes (MCS0 to MCS12) up to a maximum rate of 4.62 Gb/s. The BBU 11506 also includes programmable IO subsystem 11514 consisting of GPIO, UART, SPI, TWI, PWM and JTAG.

The transceiver circuitry 11504 implements PRS1126 which is a highly integrated, low power, single-chip mm-wave radio transceiver compliant with the IEEE 802.11ad specification. The high performance allows the dongle 11502 to support all WiGig protocol application layers. The patch antenna array 11508 may in one embodiment comprises a group of concentric patch antennas in a multi-level array. The patch antenna array 11508 is a high efficiency, high bandwidth device with gain greater than 8 dB across all four channels. As a stand-alone antenna, it enables independent product design when used with Peraso radio transceiver PRS1126. In further embodiments, the patch antenna array 11508 may utilize the multilevel arrays described herein for the transmission of data. The patch antennas making up the patch antenna array 11508 operate in the unlicensed 57 to 66 GHz frequency band. The patch antennas have a gain of 8.5 dBi with plus/minus 0.5 dB gain variation over the entire frequency band. The overall size of the patch antennas are 7.5 mm×6.5 mm×0.95 mm. The patch antenna array 11508 generates beams in the H-plane having a beam width of 95° plus or minus 5° and in the E-plane of 90° plus or minus 10°. The patch antennas are designed to work with an amplifier dish or lens and as a stand-alone antenna.

The BBU 11506, TRX 11504 and Patch Antenna Array 11508 of are each implemented using the Peraso chipset 11510. The Peraso chipset is more fully described hereinbelow with respect to FIGS. 118A and 118B

FIG. 115C illustrates a block diagram of the RK 3399 processor 11532. The RK 3399 processor 11532 integrates dual core Coretex-A72 11540 and quad-core Cortex-A53 11542 with separate NEON coprocessor within a dual cluster core 11544. The RK 3399 processor 11532 also integrates a Mali T860 MP4 GPU (graphics processing unit) 11546 within a multi-media processor 11548. The RK 3399 processor 11532 includes a good Linux support including U-Boot, kernel, graphics 11550, video decoder 11552 and encoder 11554 within the multi-media processor 11548. The RK 3399 processor 11532 includes a CPU 11556 having a dual-core ARM Cortex-A72 MIPCore processor 12340 and a Quad-core ARM Cortex-A53 MPCore processor 11542. Both processors are high-performance, low-power and cached application processor. The two CPU clusters comprise big clusters with the dual-core Cortex-A72 11540 being optimized for high-performance and little cluster quad-core Cortex-A53 11542 being optimized for low power. The CPU 11556 provides full implementation of the ARM architecture v8-A instruction set. An ARM Neon Advanced SIMD (single instruction, multiple data) provides support for accelerating media and signal processing. CCI500 ensures the memory coherency between the two clusters 11540 and 11542. Each Cortex-A72 11540 integrates 48 KB L1 instruction cache and 32 KB L1 data cache with 4-way set associative. Each Cortex A53 11542 integrates 32 KB L1 instruction cache and 32 kB L1 data cache separately with 4-way set associative. The CPU 11556 further includes a 1 MB unified L2 cache 11558 for the big cluster 11540 and a 512 KB unified L2 cache 11560 for the little cluster 11542. The CPU 11556 further provides Trustzone technology support.

The multi-media processor 11548 comprises an ARM *Mali*-T860MP4 GPU 11546 that supports OpenGL ES1.1/2.0/3.0, OpenCL1.2, DirectX11.1 etc. The GPU of the multi-media processor 11548 further comprises embedded 4 shader cores with shared hierarchical tiler.

The systems memory comprises external memory interface 11562 and embedded memory components 11564. The external memory interface 11562 includes a dynamic memory interface (DDR3/DDP3L/LPDDR3/LPDDR4) 11566 that is compatible with JEDEC standard DDR3-1866/DDR3L-1866/LPDDR3-1866/LPDDR4 SDRAM. The dynamic memory interface 11566 supports two channels, wherein each channel has 16 or 32 bits data width. The dynamic memory interface also supports up to two ranks (chip selects) for each channel totaling 4 GB(max) address space. Maximum address space of one rank in a channel is also 4 GB, which is software-configurable. The eMMC Interface 11568 is fully compliant with JEDEC eMMC 5.1 and eMMC 5.0 specification. The interface 11568 supports HS400, HS200, DDR50 and legacy operating modes. SD/MMC Interface 11570 includes two MMC interfaces which can be configured as SD/MMC or SDIO. The SD/MMC interface 11570 is compatible with SD3.0, MMC ver4.51.

System peripherals 11572 include but are not limited to timers 11574 including 14 on-chip 64 bits timers in SoC with interrupt-based operation for non-secure application and 12 on-chip 64 bits Timers in SoC with interrupt-based operation for secure applications. PWM 11576 include four on-chip PWMs with interrupt-based operation. A WatchDog 11578 includes three Watchdogs in SoC with 32 bits counter widths.

The multi-media processor 11548 comprises an ARM *Mali*-T860MP4 GPU 11546 that supports OpenGL ES1.1/2.0/3.0, OpenCL1.2, DirectX11.1 etc. The GPU of the multi-media processor 11548 further comprises embedded 4 shader cores with shared hierarchical tiler.

Video components of the RK3399 processor 11532 include real-time video decoder of MPEG-1, MPEG-2, MPEG-4,H.263, H.264, H.265, VC-1, VP9, VP8, MVC; H.264 10 bit up to HP level 5.1: 2160p@60 fps (4096×2304); VP9: 2160p@60 fps(4096×2304); H.265/HEVC 10 bit: 2160p@60 fps(4096×2304); MPEG-4 up to ASP level 5: 1080p@60 fps (1920×1088); MPEG-2 up to MP: 1080p@60 fps (1920×1088); MPEG-1 up to MP:

1080p@60 fps (1920×1088); H.263: 576p@60 fps (720×576); VC-1 up to AP level 3: 1080p@30 fps (1920×1088); VP8: 1080p@60 fps (1920×1088); MVC: 1080p@60 fps (1920×1088); support video encoders for H.264, MVC and VP8.

The system display components include embedded two VOP, outputs from the following display interface: one or two MIPI-CSI port 11580, one eDP port 11581, one DPI port 11582, and one HDMI port 11583. The ports support AFBC function co-operation with the GPU. The HDMI interface 11584 comprises a single physical layer PHY with support for HDMI 1.4 and 2.0 operation as well as support HDCP 1.4/2.2. The MIPI interface includes embedded 3 MIPI PHY, MIPI0 only for DSI, MIPI1 for DSI or CSI, MIPI2 only for CSI. Each port has 4 data lanes that provide up to 6.0 Gbps data rate. The eDP interface is compliant with eDPTM specification, version 1.3 for up to 4 physical lanes of 2.7/1.62 Gbps/lane. A display port interface is compliant with display port specification, version 1.2 and is compliant with HDCP2.2 (and back compatible with HDCP1.3). There is only one display port controller built-in RK3399 which is shared by 2 Type-C.

Connectivity components 11585 include a camera interface and image processor that include one or two MIPI-CSI input interfaces and two embedded ISP (Image Sensor Processors). A maximum input resolution of one ISP is 13M pixels. Connectivity components include an embedded 2 Type-C PHY 11586. The connectivity components 11585 are compliant with USB Type-C Specification, revision 1.1 and with USB Power Delivery Specification, revision 2.0. Connection components 11585 have attach/detach detection and signaling as DFP, UFP and DRP as well as plug orientation/cable twist detection. The connections support USB3.0 Type-C and DisplayPort 1.2 Alt Mode on USB Type-C, two PMA TX-only lanes and two PMA half-duplex TX/RX lanes (can be configured as TX-only or RX-only). The connectivity components provide up to 5 Gbps data rate for USB3.0, up to 5.4 Gbps (HBR2) data rate for DP1.2, can support 1/2/4 lane modes.

Audio components of the RK 3399 processor 11532 include three I2S/PCM in SoC 11587. I2S0/I2S2 supports up to eight channels TX and eight channels RX. I2S1 supports up to two channels TX and two channels RX. I2S2 is connected to an HDMI and DisplayPort internally. I2S0 and I2S1 are exposed for peripherals. Audio components further include SPDIF 11588 that supports two 16-bit audio data store together in one 32-bit wide location. SPDIF 11588 also supports bi-phase format stereo audio data output and 16 to 31 bit audio data that is left or right justified in 32-bit wide sample data buffer. Finally, SPDIF 11588 supports 16, 20, 24 bits audio data transfer in a linear PCM mode.

Connectivity 11585 further includes an SDIO interface 11589 that is compatible with SDIO 3.0 protocol. A GMAC 10/100/1000M Ethernet controller supports 10/100/1000-Mbps data transfer rates with the RGMII interfaces and supports 10/100-Mbps data transfer rates with the RMII interfaces. A SPI controller 11590 includes six on-chip SPI controllers. A UART Controller 11591 includes five on-chip UART controllers. An I2C controller includes nine on-chip I2C controllers.

Connectivity components 11585 further include two embedded USB 2.0 Host interfaces 11594, two embedded USB OTG3.0 interfaces and one PCIe port compatible with PCI Express Base Specification Revision 2.1.

Other RK 3399 components include an embedded two channel TS-ADC temperature sensor 11595, 6-channel single-ended 10-bit successive approximation register analog-to-digital converter (SAR-ADC) 11596 that provides a conversion speed range up to 1 MS/s sampling rate and two 1024 bits(32×32) high-density electrical fuses (eFuse) that are integrated.

FIG. 116 more particularly illustrates a transceiver dongle 11602 and the multilevel patch antenna array 11604 for transmitting and receiving OAM signals. The transceiver dongle 11602 interfaces with other devices using a USB connector 11606. The transceiver dongle 11602 also includes the patch antenna array 13404 which includes a first layer of patch antennas 11608 in a circular array and a second level of patch antennas 11610 within a circular array. The first layer of patch antennas 11608 would transmit, for example, signals having an OAM function including an $l=+1$ helical beam and the second layer of patch antennas 11610 would receive signals having an OAM function including an $l=-1$ helical beam. Each of the first layer patch antennas 11608 and the second layer of patch antennas 11610 are at different level layers as described herein above with respect to FIGS. 93-100 to enable the full-duplex transmissions using OAM signals.

Referring now to FIG. 117 there is illustrated a block diagram of the modulation system. Signals to be transmitted are provided at input 11774 in a digital format and converted from digital to analog format at the digital to analog converter 11776 responsive to a clock signal from clock generator 11770. The analog signal is modulated within modulator 11778 responsive to the analog signal and control signals from the phase locked loop/local oscillator block 11766. The modulated signals are transmitted from antenna 11762B in one of the configurations described hereinbelow from the Peraso transceiver 11760. The Peraso chipset is more particularly described in the Peraso W110 WiGig Chipset Product Brief dated Dec. 18, 2015 which is incorporated herein by reference.

Referring now to FIGS. 118A and 118B, there is illustrated a more detailed application diagram of the Peraso chipset. While the Peraso chipset in the 60 GHz band has been described, it will be realized by one skilled in the art that the chipset may utilize any frequency where the repeater enables extension of signal transmission capabilities. Examples include, but are not limited to, millimeter bands, 28 GHz band, 39 GHz band, 2.5 GHz band, CBRS band (3.5 GHz) and Wi-Fi band (5 GHz). The Peraso chipset comprises the W110 chipset that is targeted for use with WiGig applications. The Peraso chipset employs a PRS1125 integrated circuit 11802 and PRS4001 integrated circuit 11804 to implement the IEEE 802.11ad functionality. The Peraso chipset implements a complete superspeed USB 3.0 to WiGig solution. The PRS4001 low power WiGig baseband integrated circuit 11802 incorporates the analog front end 11806 including digital to analogue converters 11808, analog-to-digital converters 11810 and a phase locked loop 11812. The PRS 4001 circuit 11802 further includes the baseband physical layer 11814, Mac layer 11816 and two RISC CPU cores. The PRS4001 circuit 11802 is IEEE 802.11ad compliant. A USB 2.0 and 3.0 interfaces 11824 enable USB communications. The PRS4001 circuit 11802 supports seamless connection to all Peraso radios.

The PRS1125 integrated circuit 11804 is a single chip direct conversion RF transceiver providing 60 GHz single ended receiver and transmit interfaces. The PRS1125 circuit 11804 provides a transmit output power of up to 14 dBm, better than −21 dB transmit EVM (16-QAM), receiver noise less than 5 dB and a receiver conversion gain of greater than 70 dB. Integrated single ended 60 GHz antenna interfaces include a transmit data path 11818 and a received data path

11820. A phase locked loop 11822 tunes to all channels of IEEE 802.11ad using an integrated controller. The Peraso chipset provides for wireless storage, wireless display and multi-gigabyte mobile wireless applications. The antennas 11826 comprise NA graded patch antennas with 8.5 dBi gain across the entire 60 GHz band.

Full-duplex communications between Peraso chipset transceivers may be carried out in a number of fashions in order to control throughput therebetween. As illustrated in FIG. 119, communications between the first Peraso transceiver 8502 and a second Peraso transceiver 8504 may be carried out in series over a single communications channel 11906. In this case, the data is transmitted serially one item after the other over the single communications channel 11906. FIG. 118 illustrates a parallel full-duplex transmission configuration. In this configuration, transmissions between transceiver 11802 and transceiver 11804 occur over multiple channels 11808 operating in parallel. In this configuration, different data streams may be transmitted at the same time over the parallel communication channels 11808 in order to increase data throughput. In the parallel configuration, a data stream is petitioned in two multiple sub-streams and sent on the separate parallel channels 11808. The results may then be combined together at the receiver 11804.

Communications between Peraso chipset transceivers may be carried out in a number of fashions in order to control throughput therebetween. As illustrated in FIG. 119, communications between the first Peraso transceiver 8502 and a second Peraso transceiver 8504 may be carried out in series over a single full-duplex communications channel 11906. In this case, the data is transmitted serially one item after the other over the single communications channel 11906. FIG. 120 illustrates a parallel transmission configuration. In this configuration, full-duplex transmissions between transceiver 12002 and transceiver 12004 occur over multiple channels 12008 operating in parallel. In this configuration, different data streams may be transmitted at the same time over the parallel communication channels 12008 in order to increase data throughput. In the parallel configuration, a data stream is partitioned into multiple sub streams and sent on the separate parallel channels 12008. The results may then be combined together at the receiver 12004.

FIG. 121 illustrates a side view of the transceiver dongle 12102. The side view illustrates the USB connector 12104 that is used for interconnecting the transceiver dongle 12102 with the processing units described with respect to FIG. 114. A baseband IC 12106 up/down converts signals between baseband levels and RF levels. The radio IC 12108 transmits and receives the RF signals received by antenna 12110. The antenna 12110 in a preferred embodiment comprises the multilevel patch antenna described herein above.

The operation of the transceiver dongles have been tested at various distances. When two transceiver dongles are spaced at a distance of 25 cm (approximately 10 inches), the transceiver dongles have been determined to have a throughput of approximately 1.53 Gb per second without glass in the open air and with a throughput of 734 Mb per second through glass. When two transceiver dongles are spaced at a distance of 15 cm (approximately 6 inches), the transceiver dongles have been determined to have a throughput of approximately 1.29 Gb per second without glass in the open air.

It will be appreciated by those skilled in the art having the benefit of this disclosure that this full duplex using OAM provides an improved manner for limiting interference in full duplex communications. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing full-duplex communications, comprising:
   a first transceiver for transmitting first signals on a first channel and receiving second signals on a second channel at a same time, the first transceiver further comprising:
      first signal processing circuitry for receiving first input data and modulating the first input data onto a first carrier signal for transmission and for demodulating a second carrier signal into first output data;
      first orthogonal function processing circuitry for applying a first orthogonal function of a plurality of orthogonal functions to the first carrier signal and for removing a second orthogonal function of the plurality of orthogonal functions from the second carrier signal;
      first full duplex processing circuitry for transmitting the first carrier signal having the first orthogonal function applied thereto on the first channel at the same time the second carrier signal including the second orthogonal function is being received on the second channel;
      a first patch antenna array for transmitting the first carrier signal on the first channel;
      a second patch antenna array for receiving the second carrier signal on the second channel;
      wherein each of the first and second patch antenna arrays comprise first and second multilevel patch antenna arrays respectively, each layer including a plurality of patch antennas thereon, each of the plurality of patch antennas on a layer having a different phase applied thereto;
   a second transceiver for transmitting the second signals on the second channel and receiving the first signals on the first channel at the same time, the second transceiver further comprising:
      second signal processing circuitry for receiving second input data and modulating the second input data onto the second carrier signal for transmission and for demodulating the first carrier signal into second output data;
      orthogonal function processing circuitry for applying the second orthogonal function of the plurality of orthogonal functions to the second carrier signal and for removing the first orthogonal function of the plurality of orthogonal functions from the first carrier signal;
      full duplex processing circuitry for transmitting the second carrier signal having the second orthogonal function applied thereto on the second channel at the same time the first carrier signal including the first orthogonal function is being received on the first channel;

a third patch antenna array for transmitting the second carrier signal on the second channel;

a fourth patch antenna array for receiving the first carrier signal on the first channel;

wherein each of the third and fourth patch antenna arrays comprise third and fourth multilevel patch antenna array respectively, each layer including a plurality of patch antennas thereon, each of the plurality of patch antennas on a layer having a different phase applied thereto; and wherein the first channel having the first orthogonal function applied thereto and the second channel having the second orthogonal function applied thereto do not interfere with each other enabling full duplex transmissions between the first transceiver and the second transceiver.

2. The system of claim 1, wherein the first and the second orthogonal functions further comprises at least one of orbital angular momentum functions and Laguerre-Gaussian functions implemented in a cylindrical coordinate system.

3. The system of claim 1, wherein the first and third patch antenna arrays generate the first carrier signal and the second carrier signal in a cylindrical coordinate system.

4. The system of claim 1, wherein each of the first, second, third and fourth patch antenna arrays further including a parabolic dish for transmitting and receiving on the first and second channels to increase signal propagation distance.

5. The system of claim 1, wherein each layer of the multilevel patch antenna arrays transmit signals on an independent Eigen channel.

6. The system of claim 1, wherein the first orthogonal function and the second orthogonal function comprise at least one of a Hermite-Gaussian function, a Laguerre-Gaussian function, an Ince-Gaussian function, a Legendre function, a Bessel function, a Jacobi polynomial function, Gegenbauer polynomial function, Legendre polynomial function, Chebyshev polynomial function and a prolate spheroidal function.

7. The system of claim 1, wherein the first transceiver and the second transceiver further include pilot signal generation circuitry for generating a pilot signal to measure channel characteristics for the first channel and the second channel.

8. A transceiver for transmitting and receiving full duplex communications, comprising:

signal processing circuitry for receiving input data and modulating the input data onto a first carrier signal for transmission for transmission by the transceiver and for demodulating a second carrier signal received by the transceiver into output data;

orthogonal function processing circuitry for applying a first orthogonal function of a plurality of orthogonal functions to the first carrier signal and for removing a second orthogonal function of the plurality of orthogonal functions from the second carrier signal;

full duplex processing circuitry for transmitting the first carrier signal having the first orthogonal function applied thereto on a first channel at a same time the second carrier signal including the second orthogonal function is being received on a second channel;

a first patch antenna array for transmitting the first carrier signal on the first channel;

a second patch antenna array for receiving the second carrier signal on the second channel;

wherein each of the first and second patch antenna arrays comprise first and second multilevel patch antenna array respectively, each layer including a plurality of patch antennas thereon, each of the plurality of patch antennas on a layer having a different phase applied thereto; and wherein the first channel having the first orthogonal function applied thereto and the second channel having the second orthogonal function applied thereto do not interfere with each other enabling full duplex transmissions from the transceiver.

9. The transceiver of claim 8, wherein the first and the second orthogonal functions further comprises at least one of orbital angular momentum functions and Laguerre-Gaussian functions implemented in a cylindrical coordinate system.

10. The transceiver of claim 8, wherein the first patch antenna array generates the first carrier signal in a cylindrical coordinate system.

11. The transceiver of claim 8, wherein each of the first and second patch antenna arrays further including a parabolic dish for transmitting and receiving on the first and second channels to increase signal propagation distance.

12. The transceiver of claim 8, wherein each layer of the multilevel patch antenna arrays transmit signals on an independent Eigen channel.

13. The transceiver of claim 8, wherein the first orthogonal function and the second orthogonal function comprise at least one of a Hermite-Gaussian function, a Laguerre-Gaussian function, an Ince-Gaussian function, a Legendre function, a Bessel function, a Jacobi polynomial function, Gegenbauer polynomial function, Legendre polynomial function, Chebyshev polynomial function and a prolate spheroidal function.

14. The transceiver of claim 8 further including pilot signal generation circuitry for generating a pilot signal to measure channel characteristics for the first channel and the second channel.

15. A method for providing full-duplex communications between a first transceiver and a second transceiver, comprising:

receiving first input data at the first transceiver;

modulating the first input data onto a first carrier signal for transmission;

receiving a second carrier signal at the first transceiver on a second channel from the second transceiver;

demodulating the second carrier signal into first output data at the first transceiver;

applying a first orthogonal function of a plurality of orthogonal functions to the first carrier signal;

removing a second orthogonal function of the plurality of orthogonal functions from the second carrier signal;

transmitting the first carrier signal on a first channel using a first patch antenna array;

receiving the second carrier signal on a second channel using a second patch antenna array;

wherein the steps of transmitting and receiving further comprise transmitting and receiving a different phase from each patch antenna of a plurality of patch antennas on each layer of a multilevel patch antenna array;

wherein the first carrier signal having the first orthogonal function applied thereto on the first channel is transmitted at a same time the second carrier signal including the second orthogonal function is being received on the second channel; and wherein the first channel having the first orthogonal function applied thereto and the second channel having the second orthogonal function applied thereto do not interfere with each other enabling full duplex transmissions between the first transceiver and the second transceiver.

16. The method of claim 15, wherein the first and the second orthogonal functions further comprises at least one of orbital angular momentum functions and Laguerre-Gaussian functions implemented in a cylindrical coordinate system.

17. The method of claim 15, wherein the steps of transmitting and receiving further comprise generating the first carrier signal and the second carrier signal in a cylindrical coordinate system.

18. The method of claim 15, wherein the steps of transmitting and receiving further comprise transmitting and receiving on the first and second channels to increase signal propagation distance using a parabolic dish.

19. The method of claim 15, wherein the steps of transmitting and receiving further comprise transmitting and receiving on an independent Eigen channel from each layer of the multilevel patch antenna array.

20. The method of claim 15, wherein the first orthogonal function and the second orthogonal function comprise at least one of a Hermite-Gaussian function, a Laguerre-Gaussian function, an Ince-Gaussian function, a Legendre function, a Bessel function, a Jacobi polynomial function, Gegenbauer polynomial function, Legendre polynomial function, Chebyshev polynomial function and a prolate spheroidal function.

21. The method of claim 15 further including the steps of:
transmitting a pilot signal on each of the first and second channels;
receiving the pilot signal transmitted on each of the first and second channels; and
measuring channel characteristics for the first channel and the second channel responsive to the received pilot signals.

22. A system for providing full-duplex communications, comprising:
a first transceiver for transmitting first signals having a first orthogonal function of a plurality of orthogonal functions applied thereto on a first channel and receiving second signals having a second orthogonal function of the plurality of orthogonal functions on a second channel at a same time, wherein the first transceiver further includes:
a first patch antenna array for transmitting a first carrier signal on the first channel;
a second patch antenna array for receiving a second carrier signal on the second channel;
wherein each of the first and second patch antenna arrays comprise first and second multilevel patch antenna array respectively, each layer including a plurality of patch antennas thereon, each of the plurality of patch antennas on a layer having a different phase applied thereto;
a second transceiver for transmitting the second signals having the second orthogonal function of the plurality of orthogonal functions on the second channel and receiving the first signals having the first orthogonal function of the plurality of orthogonal functions on the first channel at the same time, wherein the second transceiver further includes:
a third patch antenna array for transmitting the second carrier signal on the second channel;
a fourth patch antenna array for receiving the first carrier signal on the first channel;
wherein each of the third and fourth patch antenna arrays comprise third and fourth multilevel patch antenna array respectively, each layer including a plurality of patch antennas thereon, each of the plurality of patch antennas on a layer having a different phase applied thereto; and
wherein the first channel having the first orthogonal function applied thereto and the second channel having the second orthogonal function applied thereto do not interfere with each other enabling full duplex transmissions between the first transceiver and the second transceiver.

23. The system of claim 22, wherein the first orthogonal function and the second orthogonal function comprise at least one of a Hermite-Gaussian function, a Laguerre-Gaussian function, an Ince-Gaussian function, a Legendre function, a Bessel function, a Jacobi polynomial function, Gegenbauer polynomial function, Legendre polynomial function, Chebyshev polynomial function and a prolate spheroidal function.

24. The system of claim 22, wherein the first and third patch antenna arrays generate the first carrier signal and the second carrier signal in a cylindrical coordinate system.

25. The system of claim 22, wherein each of the first, second, third and fourth patch antenna arrays further including a parabolic dish for transmitting and receiving on the first and second channels to increase signal propagation distance.

26. The system of claim 22, wherein each layer of the multilevel patch antenna arrays transmit signals on an independent Eigen channel.

* * * * *